US010585247B2

(12) United States Patent
Takano et al.

(10) Patent No.: US 10,585,247 B2
(45) Date of Patent: Mar. 10, 2020

(54) MODULAR CONNECTOR AND ADAPTER DEVICES

(71) Applicant: Senko Advanced Components Inc., Marlborough, MA (US)

(72) Inventors: Kazuyoshi Takano, Tokyo (JP); Jeffery Gniadek, Oxford, ME (US); Kimman Wong, Kowloon (HK); Siu Kei Ma, Tuen Mun (HK)

(73) Assignee: Senko Advanced Components, Inc, Marlborough, MA (US)

( * ) Notice: Subject to any disclaimer, the term of this patent is extended or adjusted under 35 U.S.C. 154(b) by 0 days.

(21) Appl. No.: 16/176,661

(22) Filed: Oct. 31, 2018

(65) Prior Publication Data

US 2019/0179089 A1 Jun. 13, 2019

Related U.S. Application Data

(62) Division of application No. 15/881,309, filed on Jan. 26, 2018, now Pat. No. 10,185,100.
(Continued)

(51) Int. Cl.
*G02B 6/32* (2006.01)
*G02B 6/38* (2006.01)
(Continued)

(52) U.S. Cl.
CPC ......... *G02B 6/3825* (2013.01); *G02B 6/3879* (2013.01); *G02B 6/3887* (2013.01);
(Continued)

(58) Field of Classification Search
CPC .. G02B 6/3825; G02B 6/3879; G02B 6/3887; G02B 6/3893
(Continued)

(56) References Cited

U.S. PATENT DOCUMENTS 4,150,790 A  4/1979 Potter
4,327,964 A  5/1982 Haesley et al.
(Continued)

FOREIGN PATENT DOCUMENTS

CA  2495693 A1  4/2004
CN  2836038 Y  11/2006
(Continued)

OTHER PUBLICATIONS

European Search Report and Written Opinion dated Mar. 3, 2015 for EP 14187661.
(Continued)

*Primary Examiner* — Alexander Gilman
(74) *Attorney, Agent, or Firm* — Edward S. Jarmolowicz, Esq.

(57) ABSTRACT

Embodiments disclosed herein are directed to a device and system of devices including: a connector comprising a housing comprising a groove lengthwise in a surface of the housing and a push-pull tab comprising a protrusion, a widthwise recess on the connector housing accepting protrusions on a removable anchor device that retains the connector in a port, wherein the push-pull tab releases the connector from the port using protrusions on the anchor device and the receiver device comprising one or more ports for receiving one or more connector types; and the receiver device comprising one or more ports without an anchor; said port secures a second connector type comprising a latch release mechanism; and the receiver device ports are opposite one another; wherein the opposite ports can accept a first connector and a second connector; wherein the first connector release mechanism and differs from the second connector release mechanism.

19 Claims, 99 Drawing Sheets

US 10,585,247 B2
Page 2

Related U.S. Application Data

(60) Provisional application No. 62/581,961, filed on Nov. 6, 2017, provisional application No. 62/546,920, filed on Aug. 17, 2017, provisional application No. 62/457,150, filed on Feb. 9, 2017, provisional application No. 62/452,147, filed on Jan. 30, 2017.

(51) Int. Cl.
*G02B 6/42* (2006.01)
*G02B 6/40* (2006.01)

(52) U.S. Cl.
CPC .......... *G02B 6/3893* (2013.01); *G02B 6/403* (2013.01); *G02B 6/4292* (2013.01); *G02B 6/3821* (2013.01); *G02B 6/3885* (2013.01)

(58) Field of Classification Search
USPC ......................................................... 385/71
See application file for complete search history.

(56) References Cited

U.S. PATENT DOCUMENTS

| | | | |
|---|---|---|---|
| 4,478,473 A | 10/1984 | Frear | |
| 4,762,388 A | 8/1988 | Tanaka et al. | |
| 4,764,129 A | 8/1988 | Jones et al. | |
| 4,840,451 A | 6/1989 | Sampson et al. | |
| 4,872,736 A | 10/1989 | Myers et al. | |
| 4,979,792 A | 12/1990 | Weber et al. | |
| 5,041,025 A | 8/1991 | Haitmanek | |
| D323,143 S | 1/1992 | Ohkura et al. | |
| 5,212,752 A | 5/1993 | Stephenson et al. | |
| 5,265,181 A | 11/1993 | Chang | |
| 5,289,554 A | 2/1994 | Cubukciyan et al. | |
| 5,317,663 A | 5/1994 | Beard et al. | |
| 5,335,301 A | 5/1994 | Newman et al. | |
| 5,348,487 A | 9/1994 | Marazzi et al. | |
| 5,444,806 A | 8/1995 | deMarchi et al. | |
| 5,481,634 A | 1/1996 | Anderson et al. | |
| 5,506,922 A | 4/1996 | Grois et al. | |
| 5,521,997 A | 5/1996 | Rovenolt et al. | |
| 5,570,445 A | 10/1996 | Chou et al. | |
| 5,588,079 A | 12/1996 | Tanabe et al. | |
| 5,684,903 A | 11/1997 | Kyomasu et al. | |
| 5,687,268 A | 11/1997 | Stephenson et al. | |
| 5,781,681 A | 7/1998 | Manning | |
| 5,937,130 A | 8/1999 | Amberg et al. | |
| 5,956,444 A | 9/1999 | Duda et al. | |
| 5,971,626 A | 10/1999 | Knodell et al. | |
| 6,041,155 A | 3/2000 | Anderson et al. | |
| 6,049,040 A | 4/2000 | Biles et al. | |
| 6,134,370 A | 10/2000 | Childers et al. | |
| 6,178,283 B1 | 1/2001 | Weigel | |
| 6,193,420 B1* | 2/2001 | Sikorski, Jr. ......... | G02B 6/3825 174/67 |
| RE37,080 E | 3/2001 | Stephenson et al. | |
| 6,206,577 B1 | 3/2001 | Hall, III et al. | |
| 6,206,581 B1 | 3/2001 | Driscoll et al. | |
| 6,227,717 B1 | 5/2001 | Ott et al. | |
| 6,238,104 B1 | 5/2001 | Yamakawa et al. | |
| 6,247,849 B1 | 6/2001 | Liu | |
| 6,364,537 B1* | 4/2002 | Maynard ............. | G02B 6/3831 385/55 |
| 6,461,054 B1 | 10/2002 | Iwase | |
| 6,471,412 B1 | 10/2002 | Belenkiy et al. | |
| 6,471,414 B2* | 10/2002 | Carberry ............. | G02B 6/3807 385/134 |
| 6,478,472 B1 | 11/2002 | Anderson et al. | |
| 6,551,117 B2 | 4/2003 | Poplawski et al. | |
| 6,579,014 B2 | 6/2003 | Melton et al. | |
| 6,634,801 B1 | 10/2003 | Waldron et al. | |
| 6,648,520 B2 | 11/2003 | McDonald et al. | |
| 6,682,228 B2* | 1/2004 | Rathnam ............. | G02B 6/3825 385/55 |
| 6,685,362 B2* | 2/2004 | Burkholder .......... | G02B 6/3825 385/78 |
| 6,695,486 B1 | 2/2004 | Falkenberg | |
| 6,854,894 B1 | 2/2005 | Yunker et al. | |
| 6,872,039 B2 | 3/2005 | Baus et al. | |
| 6,935,789 B2 | 8/2005 | Gross, III et al. | |
| 7,091,421 B2 | 5/2006 | Kukita et al. | |
| 7,090,406 B2 | 8/2006 | Melton et al. | |
| 7,090,407 B2 | 8/2006 | Melton et al. | |
| 7,111,990 B2 | 9/2006 | Melton et al. | |
| 7,113,679 B2 | 9/2006 | Melton et al. | |
| D533,504 S | 12/2006 | Lee | |
| D534,124 S | 12/2006 | Taguchi | |
| 7,150,567 B1 | 12/2006 | Luther et al. | |
| 7,153,041 B2 | 12/2006 | Mine et al. | |
| 7,198,409 B2 | 4/2007 | Smith et al. | |
| 7,207,724 B2 | 4/2007 | Gurreri | |
| D543,146 S | 5/2007 | Chen et al. | |
| 7,258,493 B2 | 8/2007 | Milette | |
| 7,281,859 B2 | 10/2007 | Mudd et al. | |
| D558,675 S | 1/2008 | Chien et al. | |
| 7,315,682 B1 | 1/2008 | En Lin et al. | |
| 7,325,976 B2 | 2/2008 | Gurreri et al. | |
| 7,325,980 B2* | 2/2008 | Pepe .................... | G02B 6/3879 385/55 |
| 7,329,137 B2 | 2/2008 | Martin et al. | |
| 7,331,718 B2 | 2/2008 | Yazaki et al. | |
| 7,354,291 B2 | 4/2008 | Caveney et al. | |
| 7,371,082 B2* | 5/2008 | Zimmel .............. | G02B 6/3843 439/78 |
| 7,387,447 B2 | 6/2008 | Mudd et al. | |
| 7,390,203 B2 | 6/2008 | Murano et al. | |
| D572,661 S | 7/2008 | En Lin et al. | |
| 7,431,604 B2 | 10/2008 | Waters et al. | |
| 7,463,803 B2 | 12/2008 | Cody et al. | |
| 7,465,180 B2 | 12/2008 | Kusuda et al. | |
| 7,510,335 B1 | 3/2009 | Su et al. | |
| 7,513,695 B1 | 4/2009 | Lin et al. | |
| 7,561,775 B2 | 7/2009 | Lin et al. | |
| 7,591,595 B2 | 9/2009 | Lu et al. | |
| 7,594,766 B1 | 9/2009 | Sasser et al. | |
| 7,641,398 B2 | 1/2010 | O'Riorden et al. | |
| 7,695,199 B2 | 4/2010 | Teo et al. | |
| 7,699,533 B2 | 4/2010 | Milette | |
| 7,824,113 B2* | 11/2010 | Wong .................. | G02B 6/387 385/53 |
| 7,837,395 B2* | 11/2010 | Lin ...................... | G02B 6/3825 385/134 |
| D641,708 S | 7/2011 | Yamauchi | |
| 8,083,450 B1* | 12/2011 | Smith ................. | F16B 37/0842 411/111 |
| 8,186,890 B2 | 5/2012 | Lu | |
| 8,192,091 B2 | 6/2012 | Hsu et al. | |
| 8,202,009 B2 | 6/2012 | Lin et al. | |
| 8,251,733 B2 | 8/2012 | Wu | |
| 8,267,595 B2* | 9/2012 | Lin ...................... | G02B 6/3825 385/55 |
| 8,270,796 B2 | 9/2012 | Nhep | |
| 8,408,815 B2 | 4/2013 | Lin et al. | |
| 8,465,317 B2 | 6/2013 | Gniadek et al. | |
| 8,636,424 B2 | 1/2014 | Kuffel et al. | |
| 8,651,749 B2 | 2/2014 | Dainese Junior et al. | |
| 8,734,027 B2* | 5/2014 | Zoss .................... | G02B 6/3825 385/139 |
| 8,770,863 B2 | 7/2014 | Cooke et al. | |
| 9,297,962 B2* | 3/2016 | Lee .................... | G02B 6/3825 |
| 9,411,110 B2 | 8/2016 | Barnette et al. | |
| 9,494,744 B2 | 11/2016 | de Jong | |
| 9,548,557 B2 | 1/2017 | Liu | |
| 9,551,842 B2 | 1/2017 | Theuerkom | |
| 9,568,686 B2 | 2/2017 | Fewkes et al. | |
| 9,581,768 B1 | 2/2017 | Baca et al. | |
| 9,599,778 B2* | 3/2017 | Wong .................. | G02B 6/3825 |
| 9,684,313 B2 | 6/2017 | Cline et al. | |
| 9,709,753 B1 | 7/2017 | Chang et al. | |
| 9,869,825 B2* | 1/2018 | Bailey ................. | G02B 6/3879 |
| 10,228,521 B2* | 3/2019 | Gniadek .............. | G02B 6/387 |
| 10,295,755 B1* | 5/2019 | Zhou ................... | G02B 6/3825 |

(56) References Cited

U.S. PATENT DOCUMENTS

| | | | |
|---|---|---|---|
| 10,302,874 B2* | 5/2019 | Tong | G02B 6/3871 |
| 10,302,875 B1* | 5/2019 | Yang | G02B 6/3874 |
| 2002/0159712 A1* | 10/2002 | Holmquist | G02B 6/3825 |
| | | | 385/70 |
| 2002/0172467 A1* | 11/2002 | Anderson | G02B 6/3825 |
| | | | 385/53 |
| 2003/0053787 A1 | 3/2003 | Lee | |
| 2003/0157825 A1* | 8/2003 | Kane | H01R 13/641 |
| | | | 439/352 |
| 2004/0052473 A1 | 3/2004 | Seo et al. | |
| 2004/0136657 A1 | 7/2004 | Ngo | |
| 2004/0141693 A1 | 7/2004 | Szilagyi et al. | |
| 2004/0161958 A1 | 8/2004 | Togami et al. | |
| 2004/0234209 A1 | 11/2004 | Cox et al. | |
| 2005/0111796 A1 | 5/2005 | Matasek et al. | |
| 2005/0141817 A1 | 6/2005 | Yazaki et al. | |
| 2006/0089049 A1 | 4/2006 | Sedor | |
| 2006/0127025 A1 | 6/2006 | Haberman | |
| 2006/0160429 A1* | 7/2006 | Dawiedczyk | H01R 12/7005 |
| | | | 439/676 |
| 2006/0269194 A1 | 11/2006 | Luther et al. | |
| 2006/0274411 A1 | 12/2006 | Yamauchi | |
| 2007/0028409 A1 | 2/2007 | Yamada | |
| 2007/0079854 A1 | 4/2007 | You | |
| 2007/0098329 A1* | 5/2007 | Shimoji | G02B 6/3893 |
| | | | 385/76 |
| 2007/0149062 A1 | 6/2007 | Long et al. | |
| 2007/0232115 A1* | 10/2007 | Burke | H01R 13/6272 |
| | | | 439/344 |
| 2007/0243749 A1 | 10/2007 | Wu | |
| 2008/0008430 A1 | 1/2008 | Kewitsch | |
| 2008/0044137 A1 | 2/2008 | Luther et al. | |
| 2008/0069501 A1* | 3/2008 | Mudd | G02B 6/3825 |
| | | | 385/75 |
| 2008/0101757 A1 | 5/2008 | Lin et al. | |
| 2008/0226237 A1 | 9/2008 | O'Riorden et al. | |
| 2008/0267566 A1 | 10/2008 | Lin et al. | |
| 2009/0022457 A1 | 1/2009 | De Jong et al. | |
| 2009/0028507 A1* | 1/2009 | Jones | G02B 6/3825 |
| | | | 385/56 |
| 2009/0092360 A1 | 4/2009 | Lin et al. | |
| 2009/0175580 A1* | 7/2009 | Chen | G02B 6/3817 |
| | | | 385/75 |
| 2009/0196555 A1 | 8/2009 | Lin et al. | |
| 2009/0214162 A1 | 8/2009 | O'Riorden et al. | |
| 2009/0220197 A1 | 9/2009 | Gniadek | |
| 2009/0290938 A1 | 11/2009 | Lin et al. | |
| 2010/0034502 A1 | 2/2010 | Lu et al. | |
| 2010/0247041 A1 | 9/2010 | Szilagyi | |
| 2010/0322561 A1* | 12/2010 | Lin | G02B 6/3825 |
| | | | 385/55 |
| 2011/0044588 A1 | 2/2011 | Larson et al. | |
| 2011/0131801 A1 | 6/2011 | Nelson et al. | |
| 2011/0177710 A1 | 7/2011 | Tobey | |
| 2011/0274437 A1* | 11/2011 | Jones | G02B 6/3879 |
| | | | 398/141 |
| 2012/0099822 A1 | 4/2012 | Kuffel et al. | |
| 2012/0155810 A1* | 6/2012 | Nakagawa | G02B 6/3878 |
| | | | 385/78 |
| 2012/0189260 A1 | 7/2012 | Kowalczyk et al. | |
| 2012/0269485 A1* | 10/2012 | Haley | G02B 6/3887 |
| | | | 385/78 |
| 2012/0301080 A1 | 11/2012 | Gniadek | |
| 2013/0071067 A1 | 3/2013 | Lin | |
| 2013/0089995 A1* | 4/2013 | Gniadek | H01R 13/6335 |
| | | | 439/152 |
| 2013/0094816 A1 | 4/2013 | Lin et al. | |
| 2013/0121653 A1 | 5/2013 | Shitama et al. | |
| 2013/0183012 A1 | 7/2013 | Cabanne Lopez et al. | |
| 2013/0183018 A1* | 7/2013 | Holmberg | G02B 6/3893 |
| | | | 385/135 |
| 2013/0259429 A1 | 10/2013 | Czosnowski et al. | |
| 2013/0322825 A1 | 12/2013 | Cooke et al. | |
| 2014/0016901 A1* | 1/2014 | Lambourn | G02B 6/3895 |
| | | | 385/75 |
| 2014/0016902 A1* | 1/2014 | Pepe | G02B 6/3893 |
| | | | 385/76 |
| 2014/0023322 A1* | 1/2014 | Gniadek | G02B 6/3825 |
| | | | 385/56 |
| 2014/0050446 A1 | 2/2014 | Chang | |
| 2014/0133808 A1* | 5/2014 | Hill | G02B 6/3826 |
| | | | 385/81 |
| 2014/0219621 A1 | 8/2014 | Barnette et al. | |
| 2014/0226946 A1 | 8/2014 | Cook et al. | |
| 2014/0241678 A1 | 8/2014 | Brinquier et al. | |
| 2014/0241688 A1 | 8/2014 | Isenhour et al. | |
| 2014/0334780 A1 | 11/2014 | Nguyen et al. | |
| 2014/0348477 A1 | 11/2014 | Chang | |
| 2015/0301294 A1 | 10/2015 | Chang | |
| 2015/0355417 A1 | 10/2015 | Takano | |
| 2015/0331201 A1 | 11/2015 | Takano et al. | |
| 2015/0378113 A1 | 12/2015 | Good et al. | |
| 2016/0131849 A1* | 5/2016 | Takano | G02B 6/3825 |
| | | | 385/60 |
| 2016/0172852 A1 | 6/2016 | Takano | |
| 2016/0291262 A1 | 6/2016 | Chang | |
| 2016/0195682 A1 | 7/2016 | Takano | |
| 2016/0259135 A1 | 9/2016 | Gniadek et al. | |
| 2016/0266326 A1 | 9/2016 | Gniadek | |
| 2016/0320572 A1 | 11/2016 | Gniadek | |
| 2017/0003458 A1 | 1/2017 | Gniadek | |

FOREIGN PATENT DOCUMENTS

| | | |
|---|---|---|
| CN | 201383588 Y | 1/2010 |
| CN | 202600189 U | 12/2012 |
| DE | 202006011910 U1 | 4/2007 |
| DE | 102006019335 A1 | 10/2007 |
| EP | 1074868 A1 | 7/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009229545 A | 10/2009 |
| JP | 2009276493 A | 11/2009 |
| TW | 200821653 A | 5/2008 |
| WO | 2001/79904 A2 | 10/2001 |
| WO | 2004/027485 A1 | 4/2004 |
| WO | 2008/112986 A1 | 9/2008 |
| WO | 2009/135787 A1 | 11/2009 |
| WO | 2010/024851 A2 | 3/2010 |
| WO | 2012/136702 A1 | 10/2012 |
| WO | 2012/162385 A1 | 11/2012 |
| WO | 2014/028527 A1 | 2/2014 |
| WO | 2014/182351 A1 | 11/2014 |
| WO | 2015/191024 A1 | 12/2015 |
| WO | 2016/148741 A1 | 9/2016 |

OTHER PUBLICATIONS

European Search Report and Written Opinion dated Feb. 19, 2015 for EP 14168005.

"Fiber Optic Connectors and Assemblies Catalog" 2009, Huber & Suhner Fiver Optics, Herisau, Switzerland, www.hubersuhner.com.

"Fiber Optic Interconnect Solutions, Tactical Fiber Optical Connectors, Cables and Termini" 2006, Glenair, Inc., Glendale, California, www.mps-electronics.de.

"Fiber Optic Products Catalog" Nov. 2007, Tyco Electronics Corporation, Harrisburg, Pennsylvania, www.ampnetconnect.com.

International Search Report and Written Opinion dated Apr. 27, 2012 for PCT/US2011/058799.

International Search Report and Written Opinion dated Aug. 27, 2012 for PCT/US2012/039126.

International Search Report and Written Opinion dated Jan. 16, 2014 for PCT/US2013/54784.

International Search Report and Written Opinion dated Oct. 9, 2014 for PCT/US2014/041500.

International Search Report and Written Opinion dated May 14, 2014 for PCT/US2014/012137.

(56) References Cited

OTHER PUBLICATIONS

International Search Report and Written Opinion dated Aug. 21, 2008 for PCT/US2008/057023.
International Prelimiary Report on Patentability dated Aug. 22, 2016 from related International Application No. PCT/US2015/059458, International Filing Date Nov. 6, 2015.
International Search Report (ISR) WO2008112986 dated Sep. 15, 2009.
ISR WO2014028527ISR dated Feb. 20, 2014.
ISR WO2015US57610ISR dated Jan. 21, 2016.
ISR WO2016176083ISR dated May 19, 2016.
International Preliminary Report on Patentability, Application No. PCT/US2018/015733, dated Aug. 8. 2019, pp. 9.

* cited by examiner

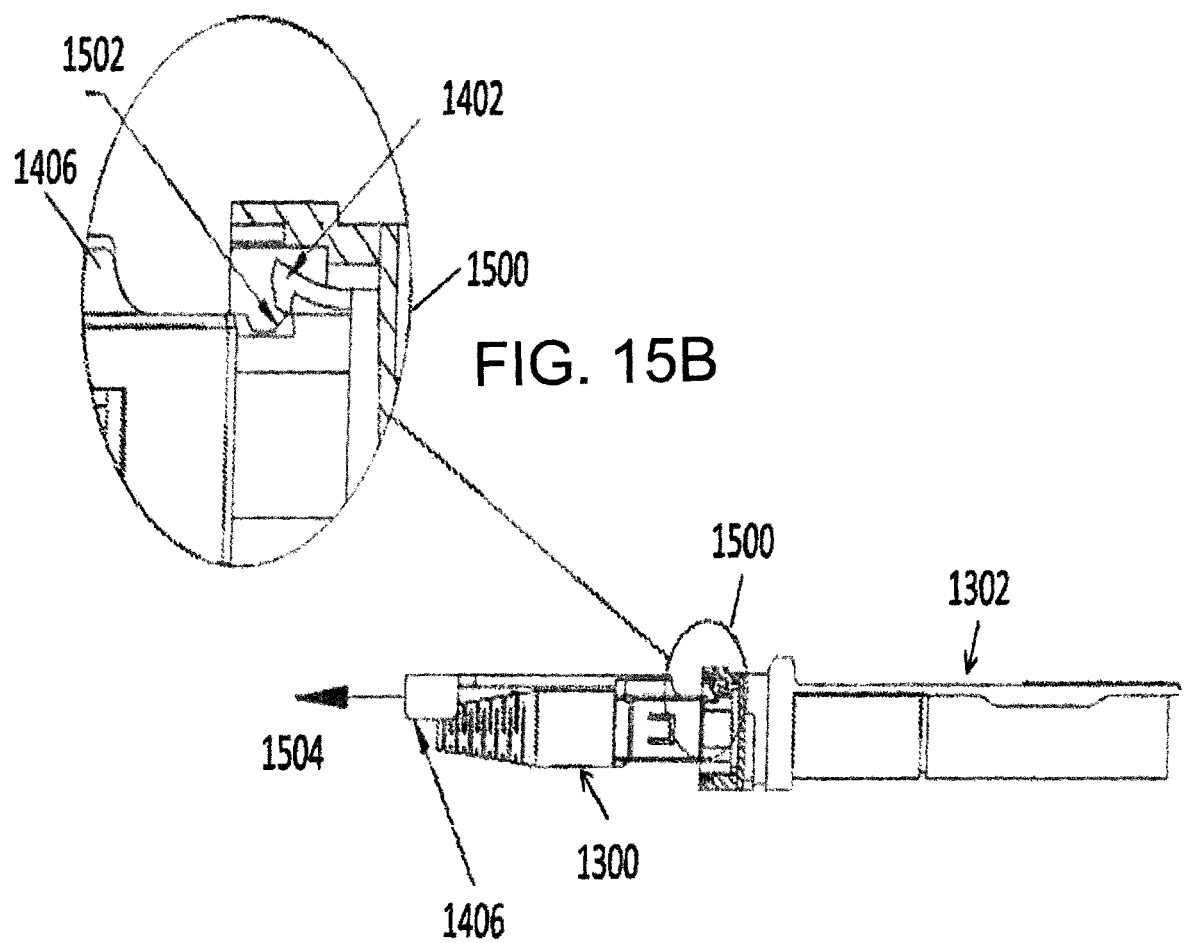

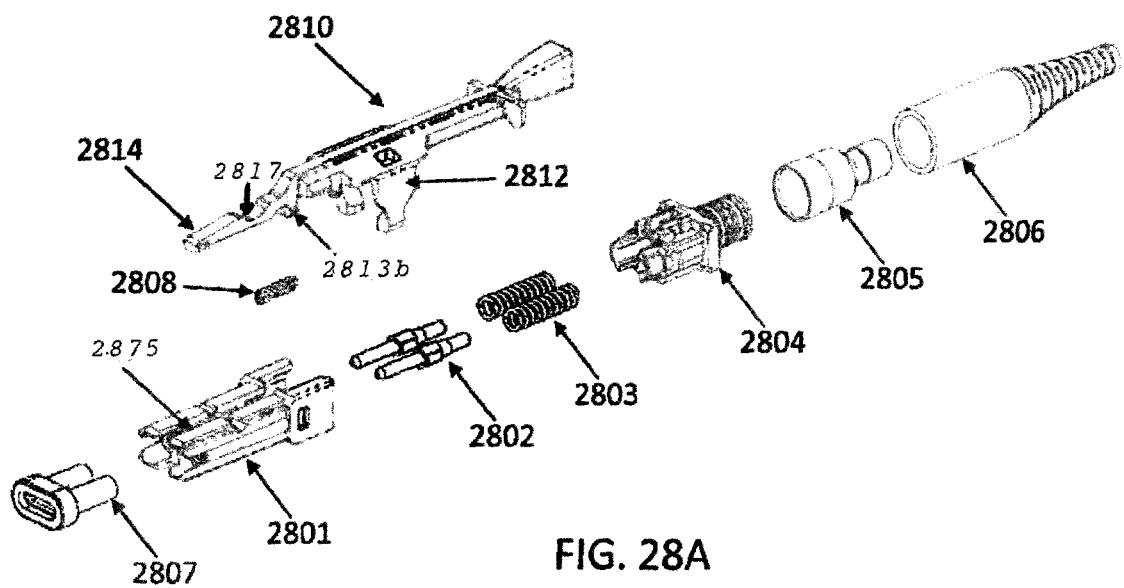
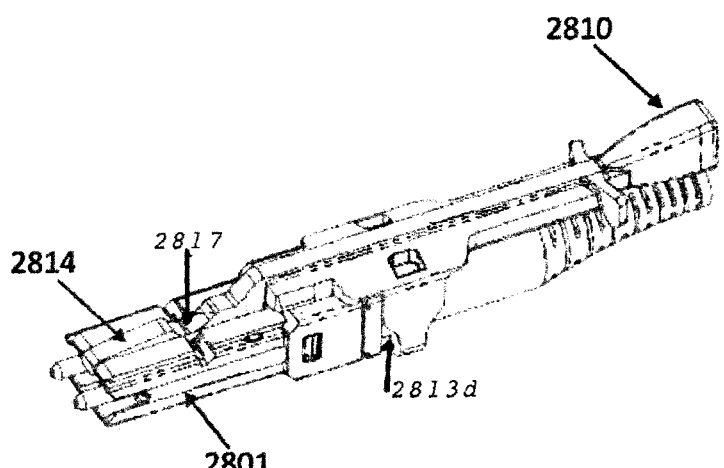
FIG. 28A
FIG. 28B

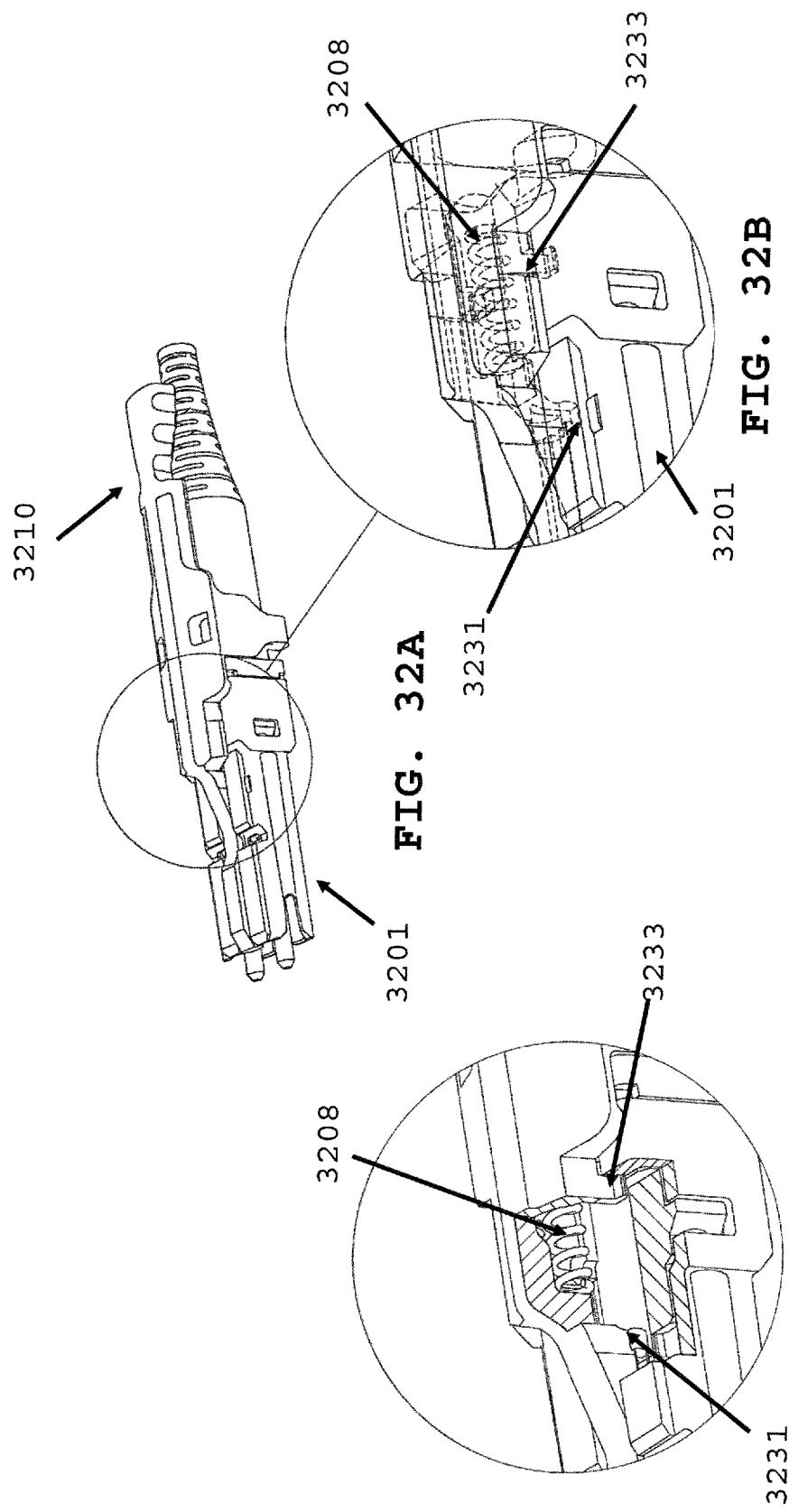

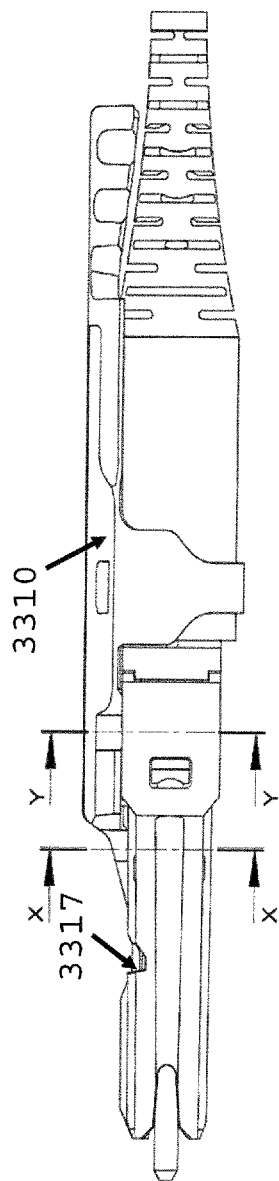
FIG. 33A
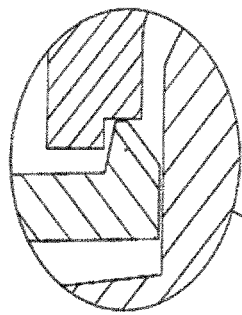
FIG. 33C.1
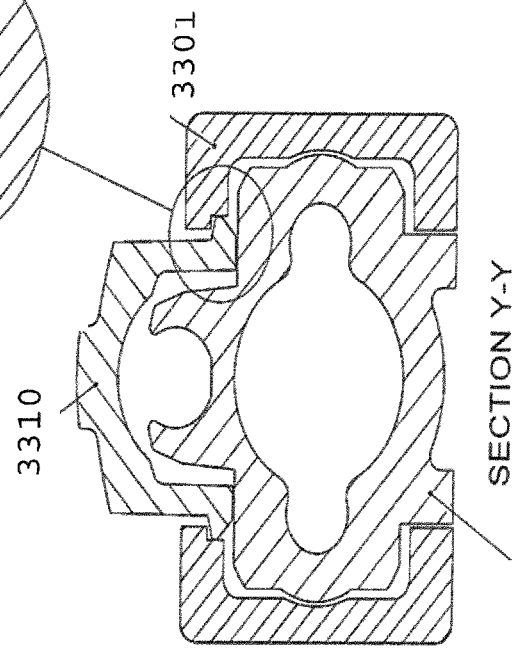
FIG. 33C
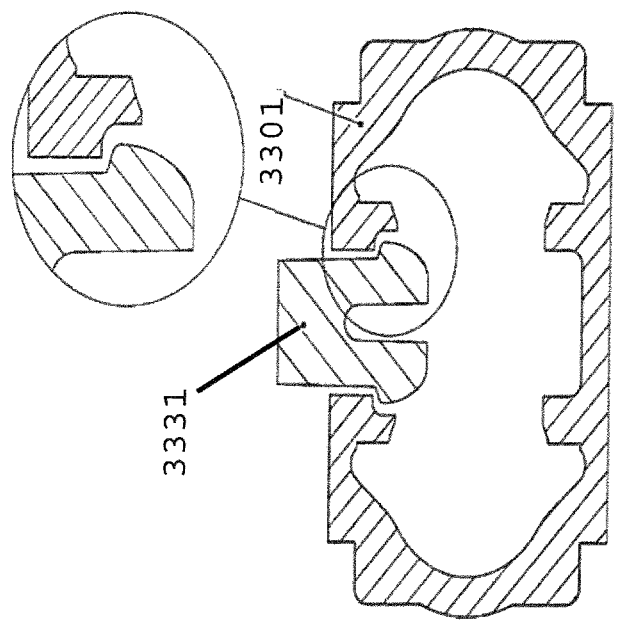
FIG. 33B

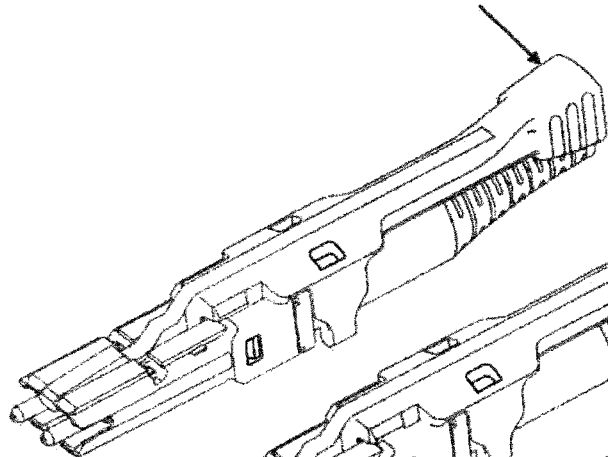
FIG. 34.1
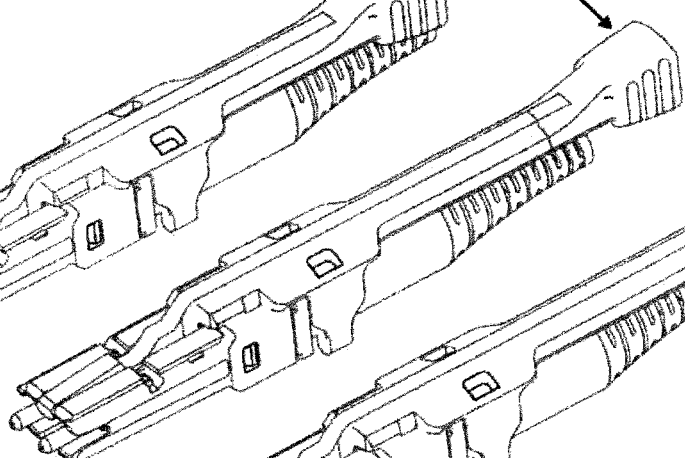
FIG. 34.2
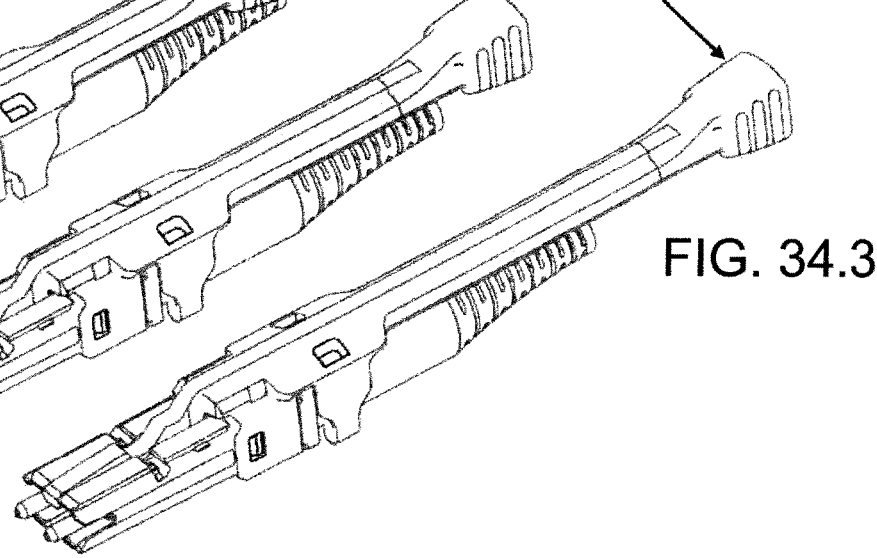
FIG. 34.3

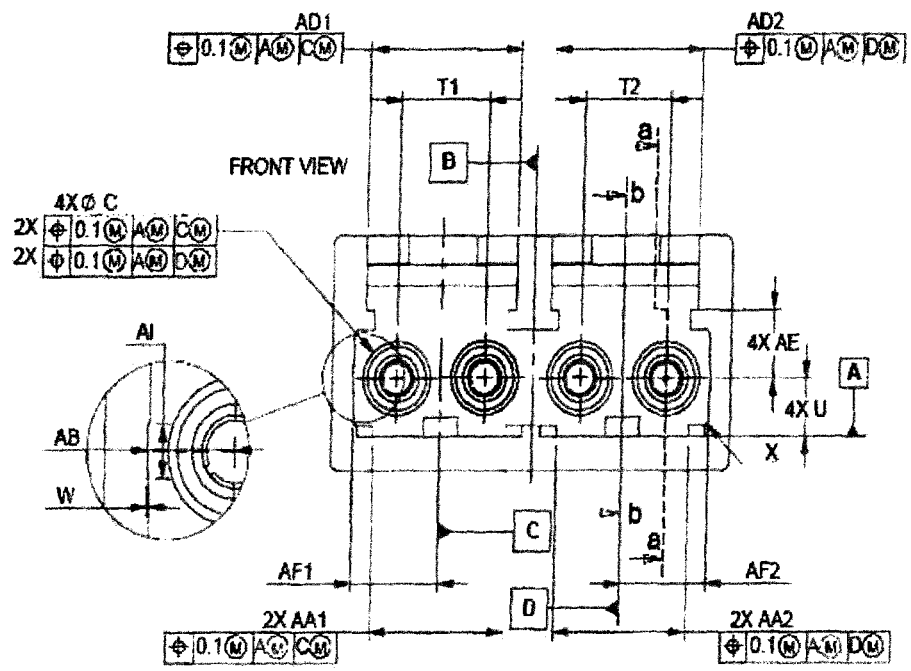
FIG. 35A
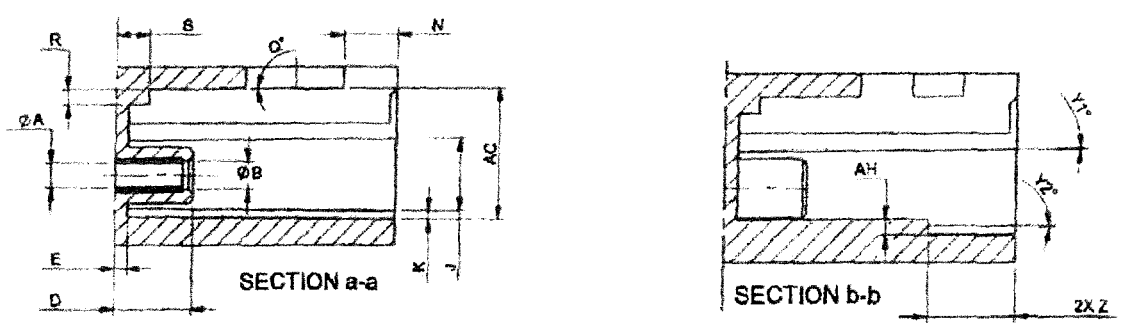
FIG. 35B
FIG. 35C

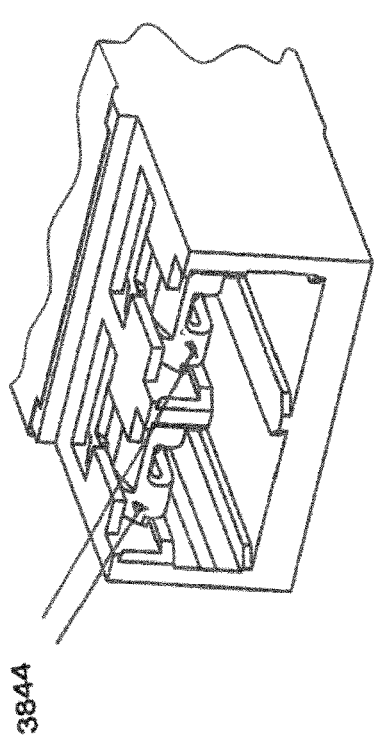
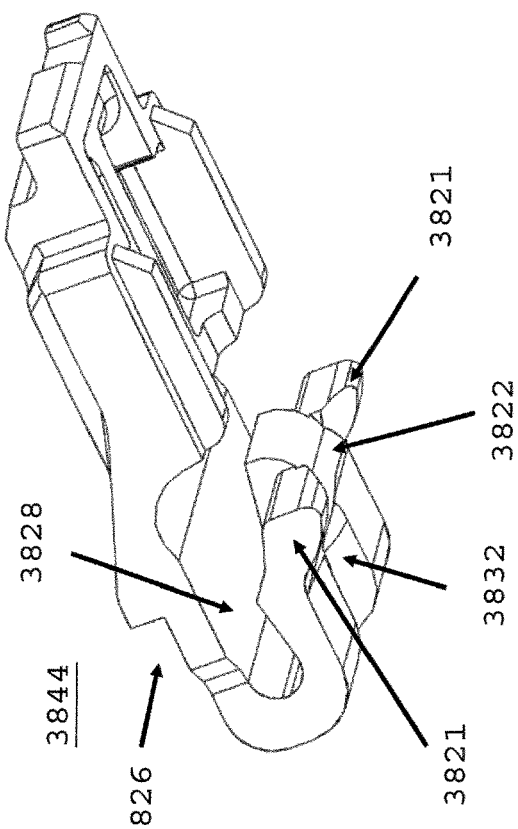
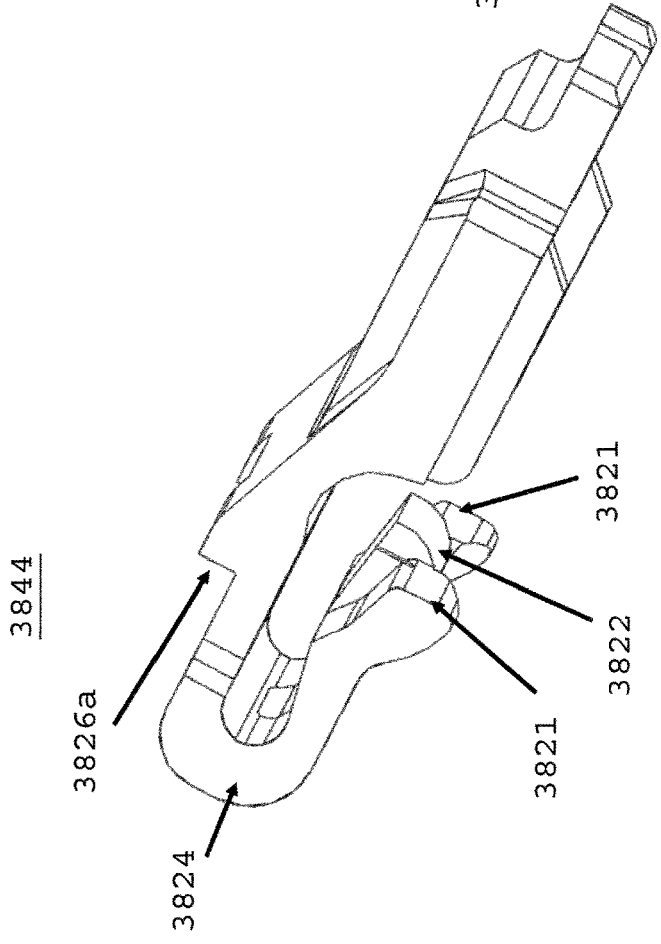
FIG. 38A
FIG. 38B
FIG. 38C

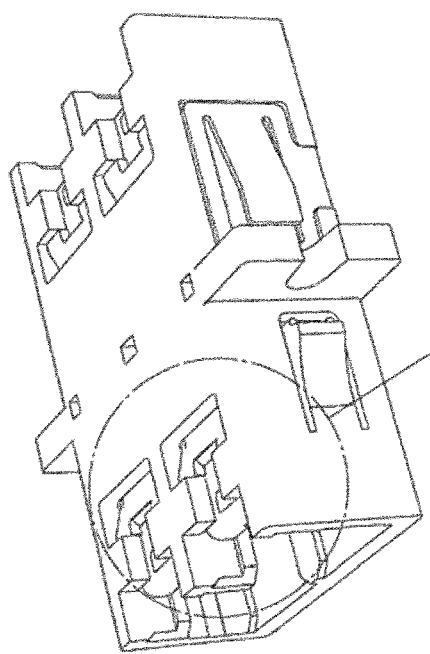
FIG. 40C
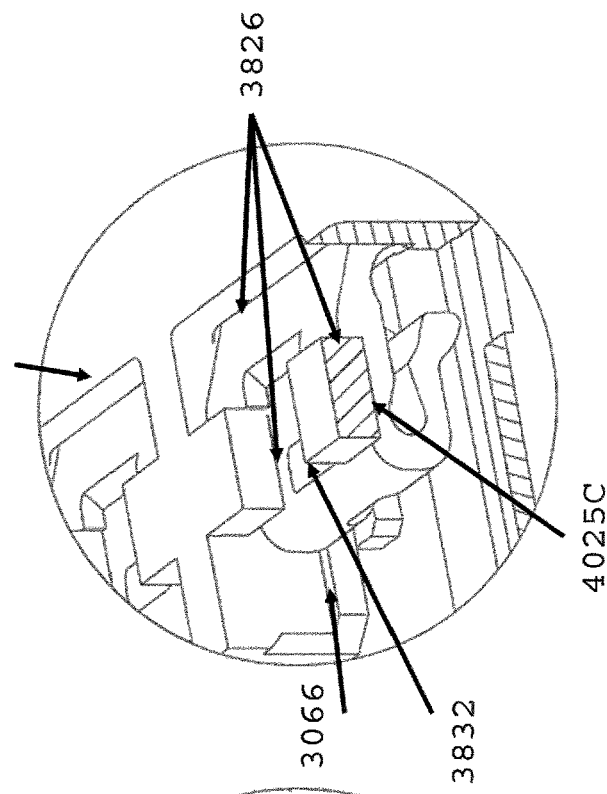
FIG. 40C.1
FIG. 40C.2

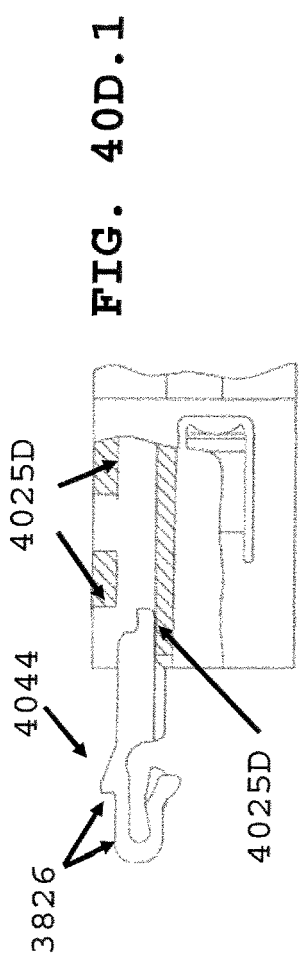
FIG. 40D.1
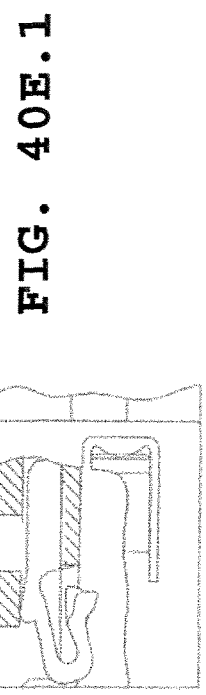
FIG. 40E.1
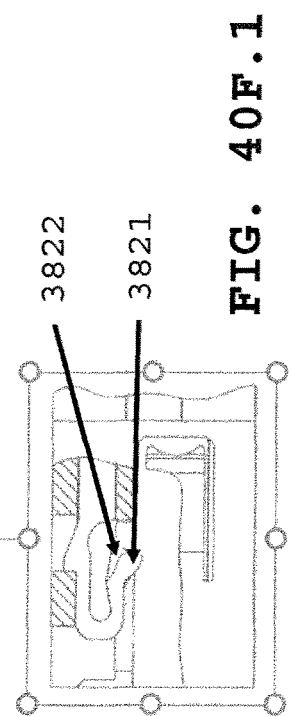
FIG. 40F.1
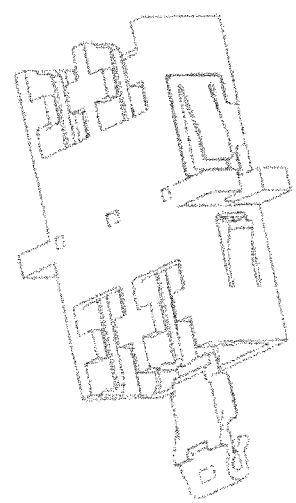
FIG. 40D
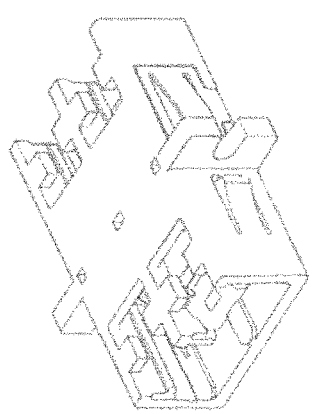
FIG. 40E
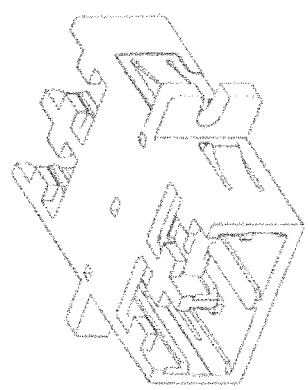
FIG. 40F

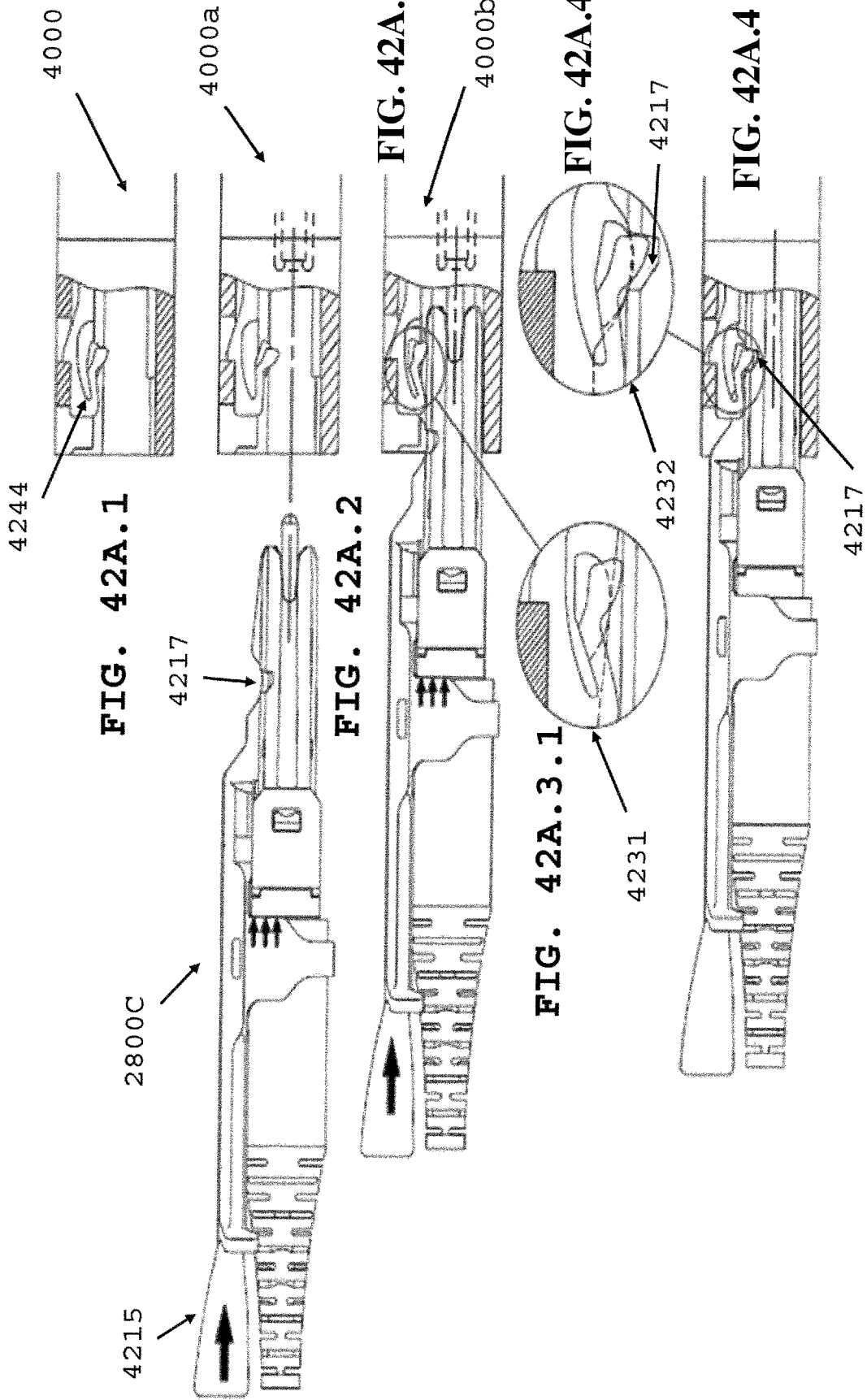

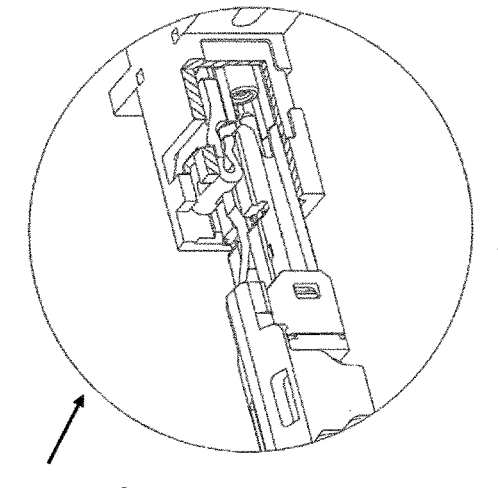
FIG. 42B.3
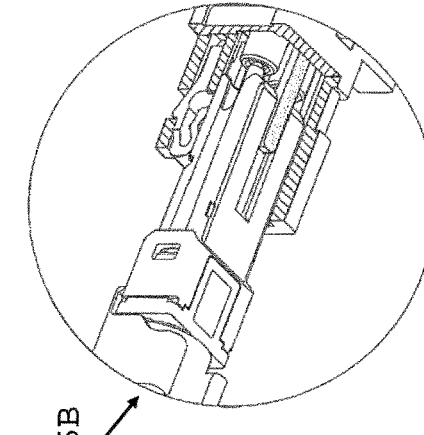
FIG. 42B.6
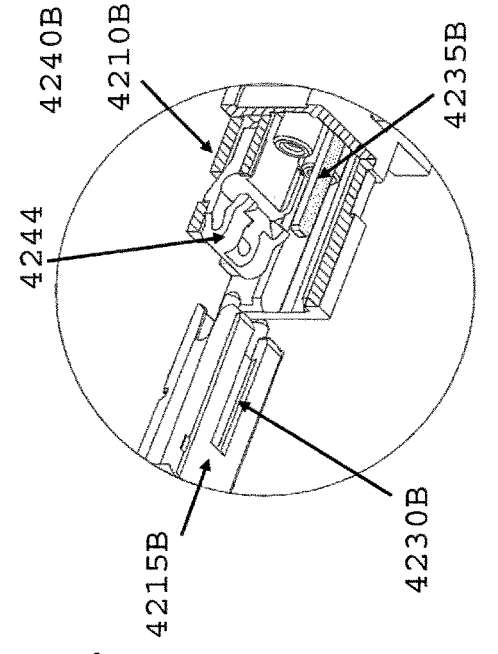
FIG. 42B.2
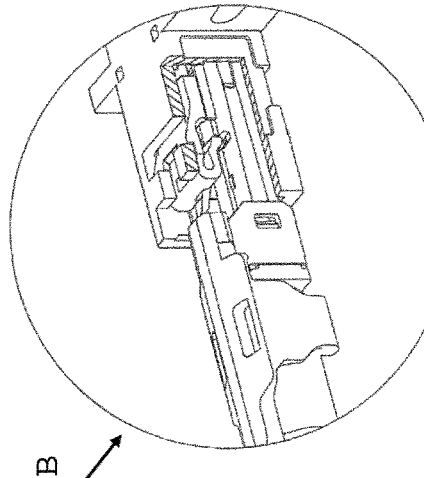
FIG. 42B.5
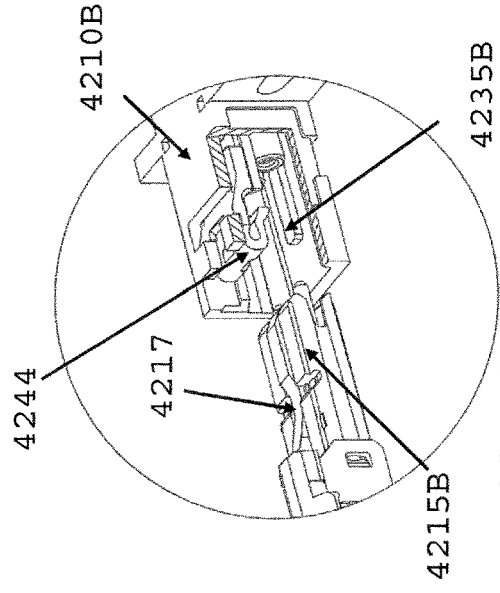
FIG. 42B.1
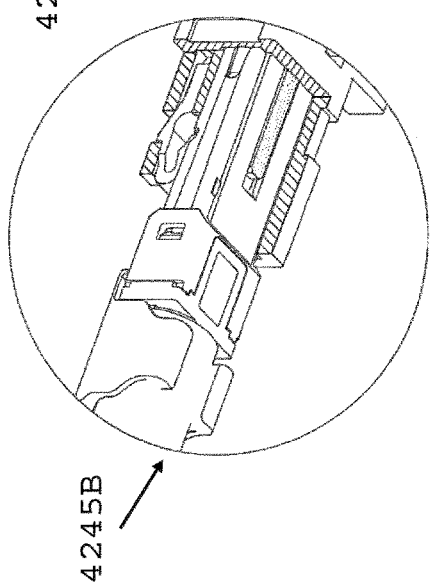
FIG. 42B.4

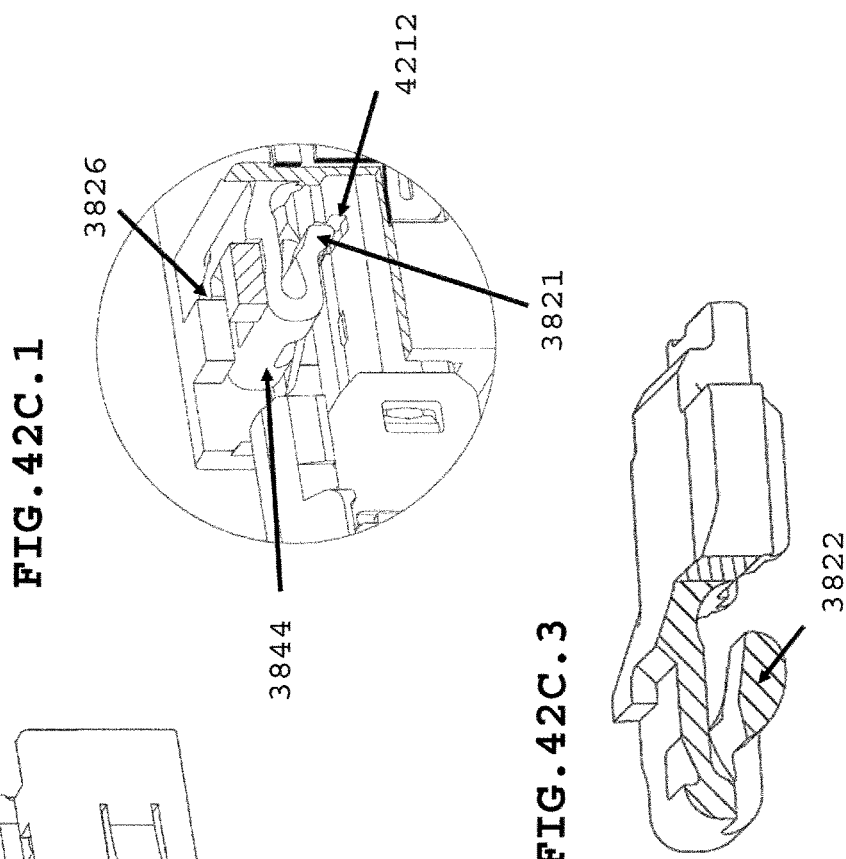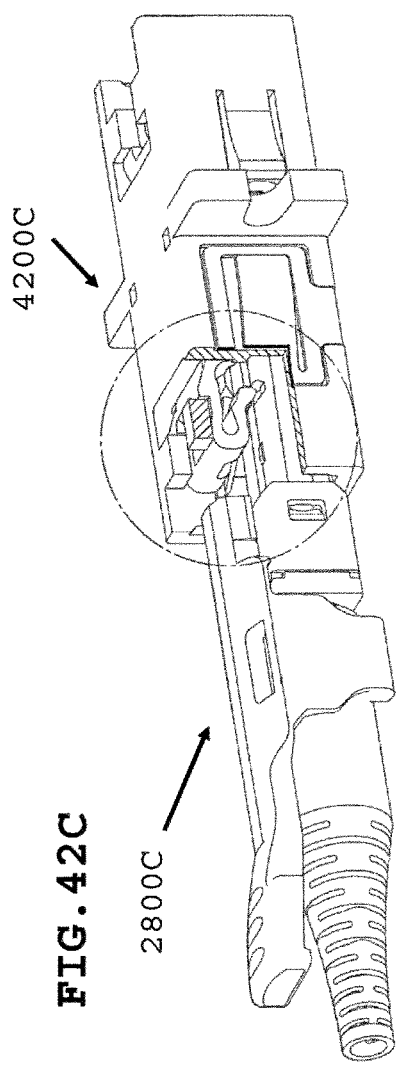

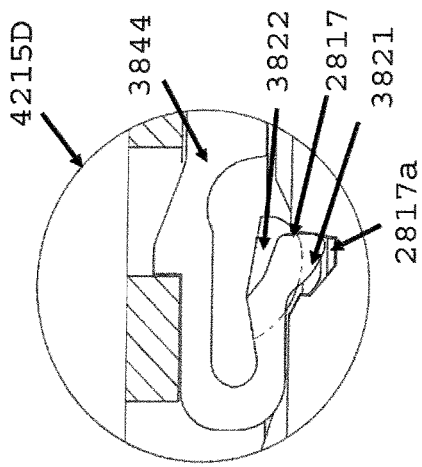
FIG. 42D.2
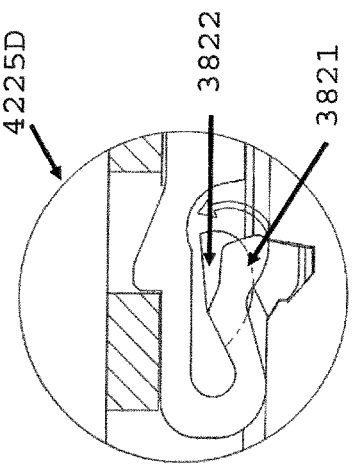
FIG. 42D.5
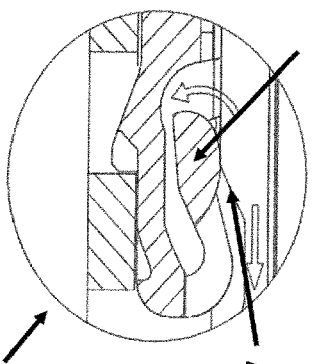
FIG. 42D.1
FIG. 42D.4
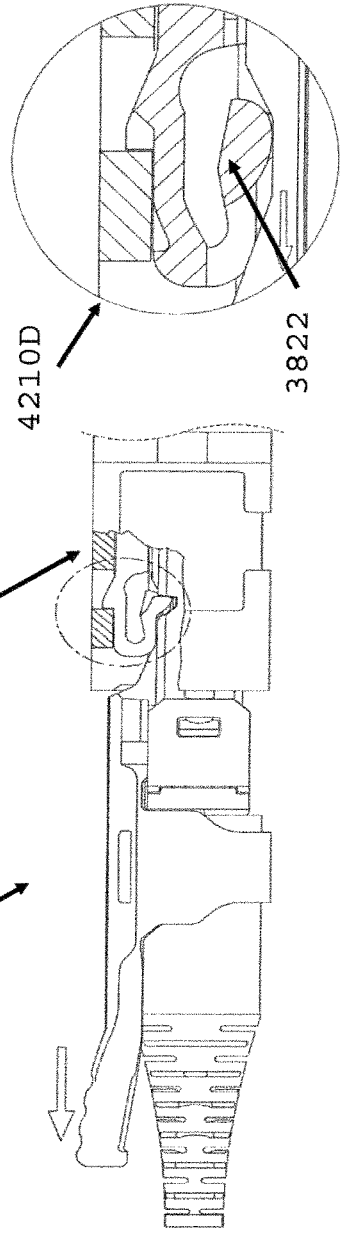
FIG. 42D
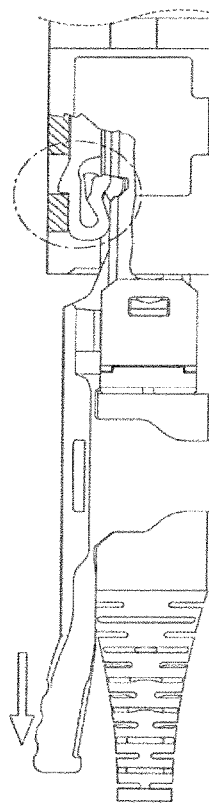
FIG. 42D.3

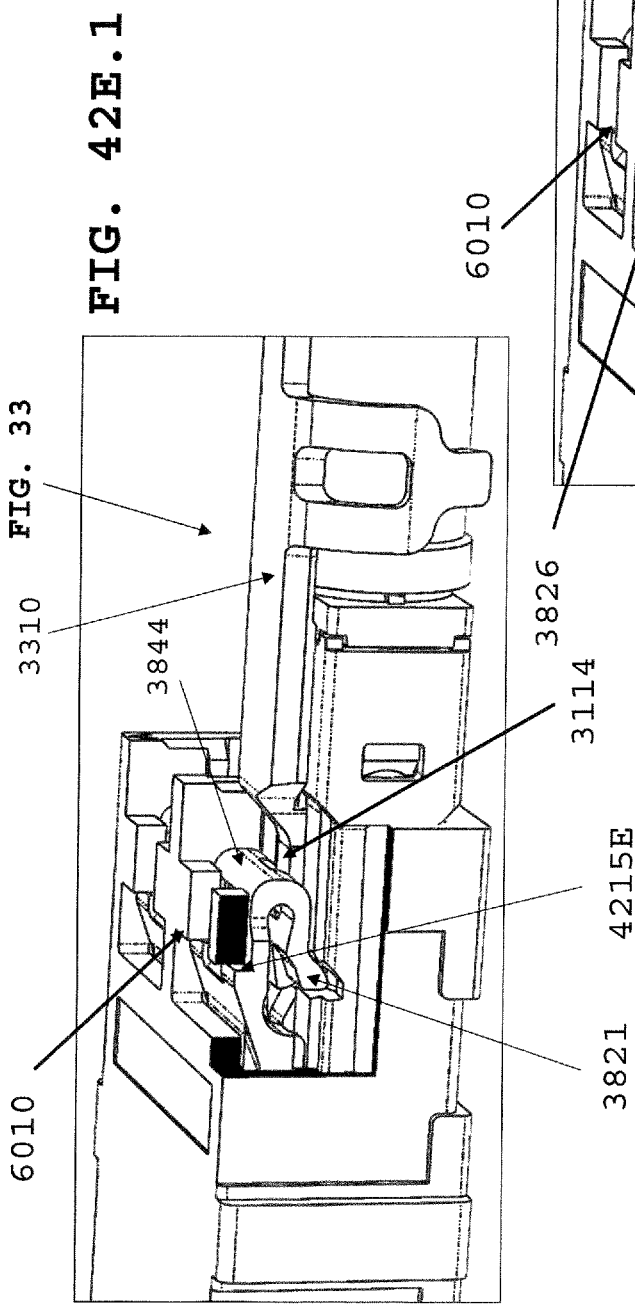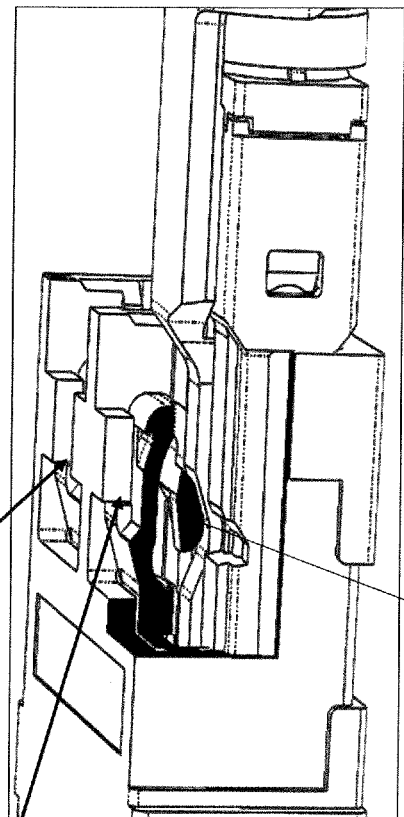

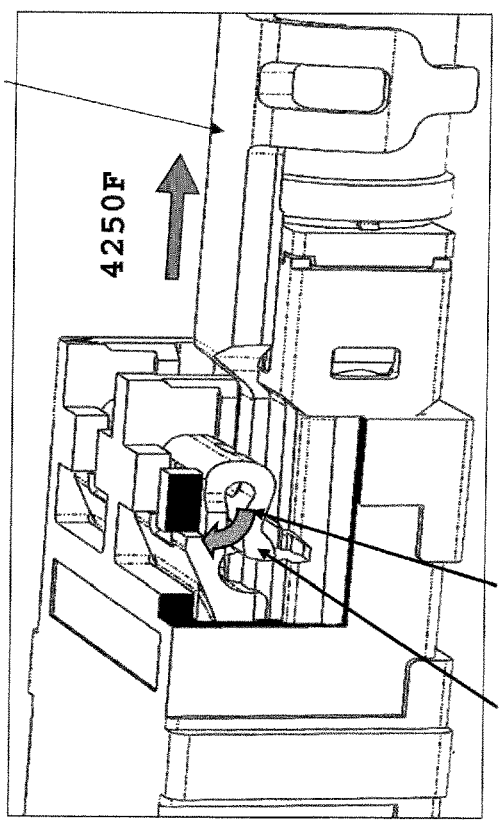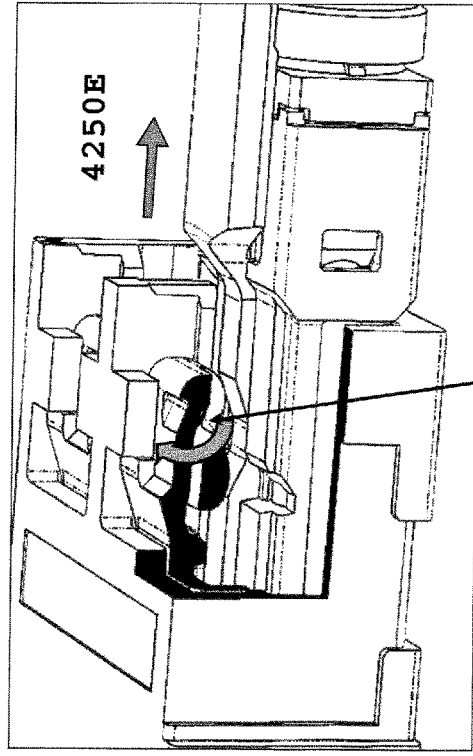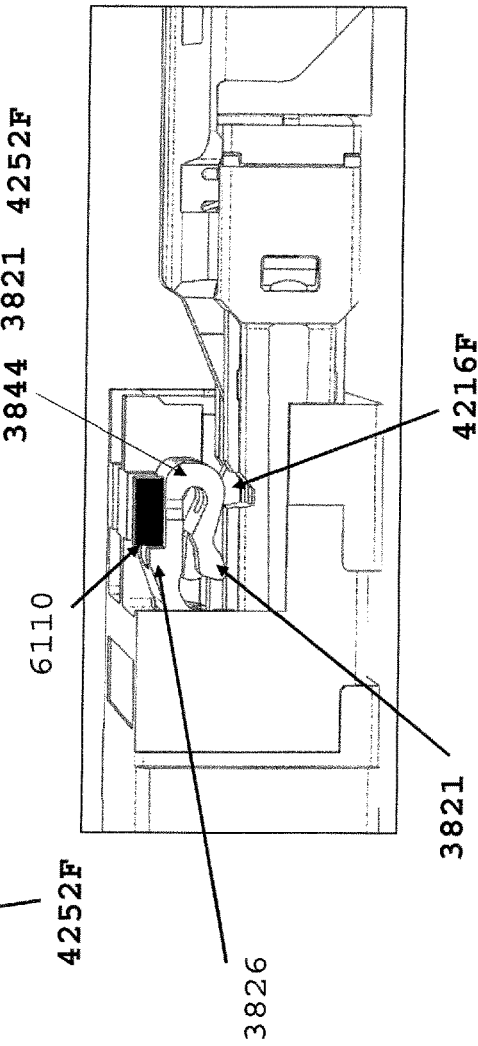

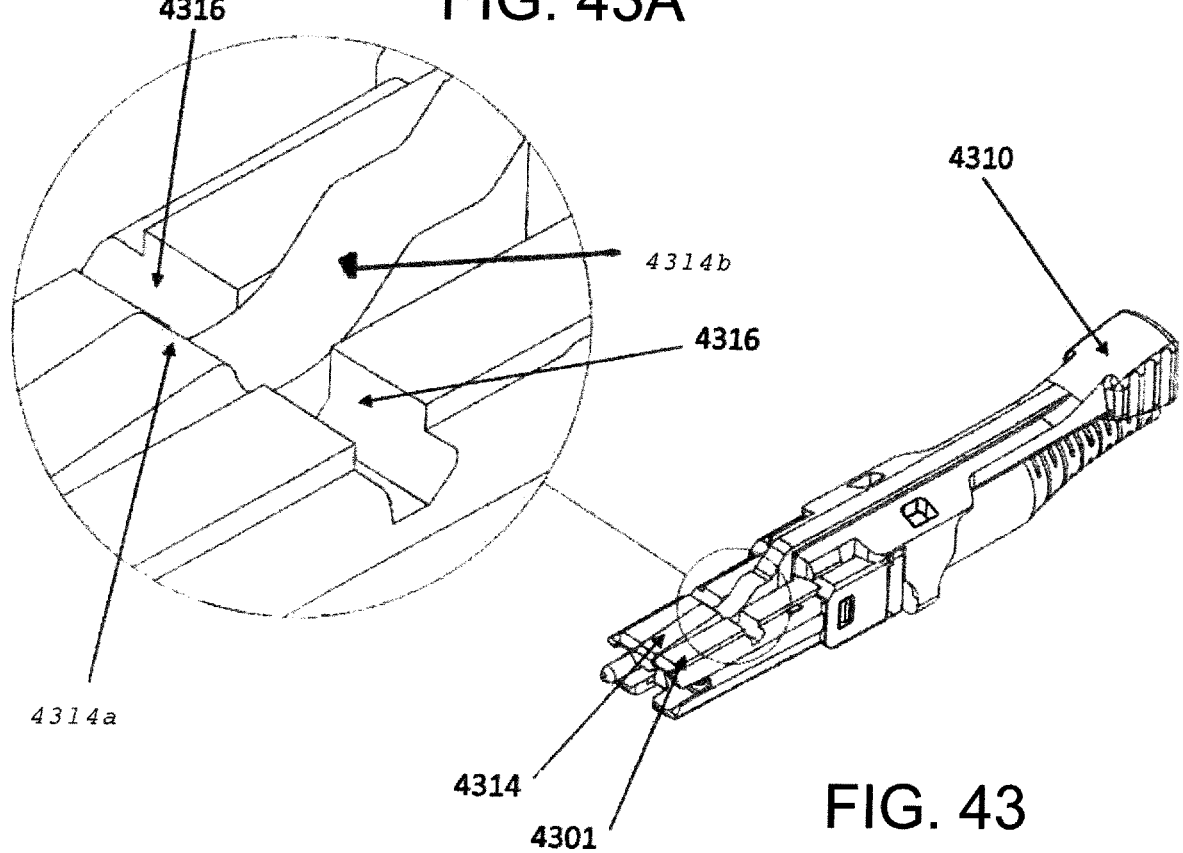

FIG. 45B SECTION C-C

FIG. 45C SECTION D-D

SECTION E-E

SECTION F-F

FIG. 48C
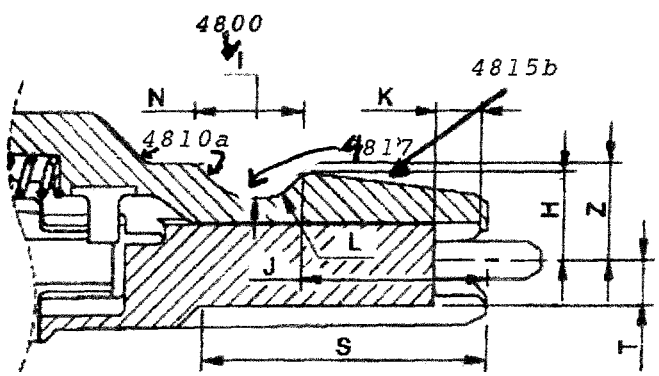
SECTION e-e
FIG. 48B
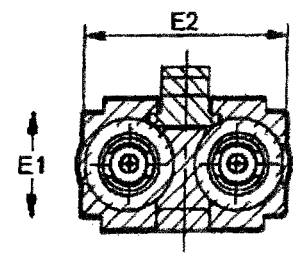
SECTION g-g
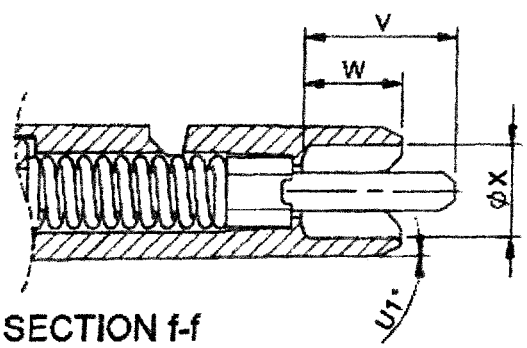
SECTION f-f
FIG. 48D
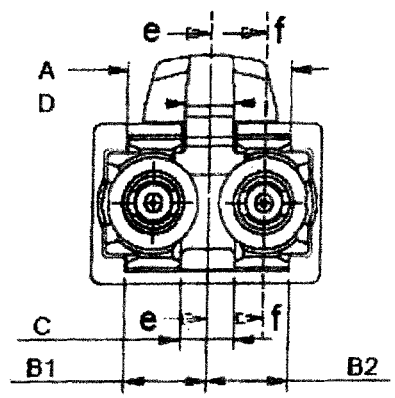
FIG. 48A FIG. 49A.1
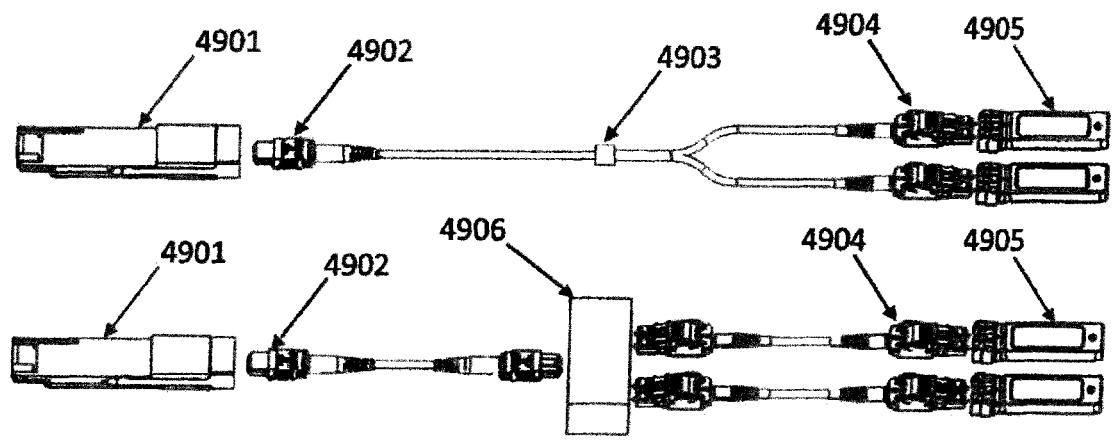
FIG. 49A.2
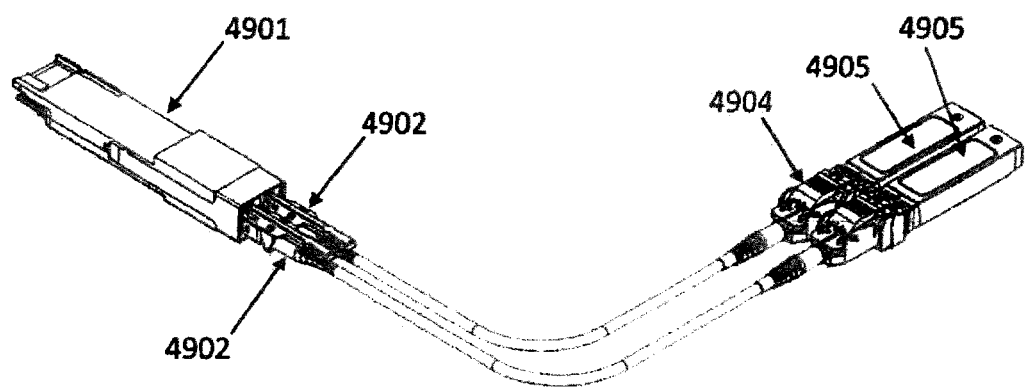
FIG. 49B FIG. 51A.1
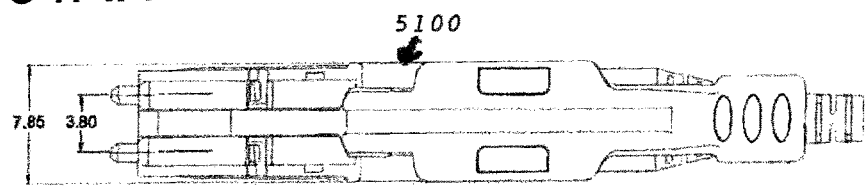
FIG. 51A.2
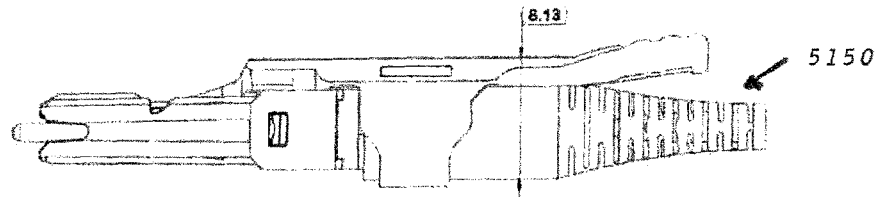
FIG. 51B.1
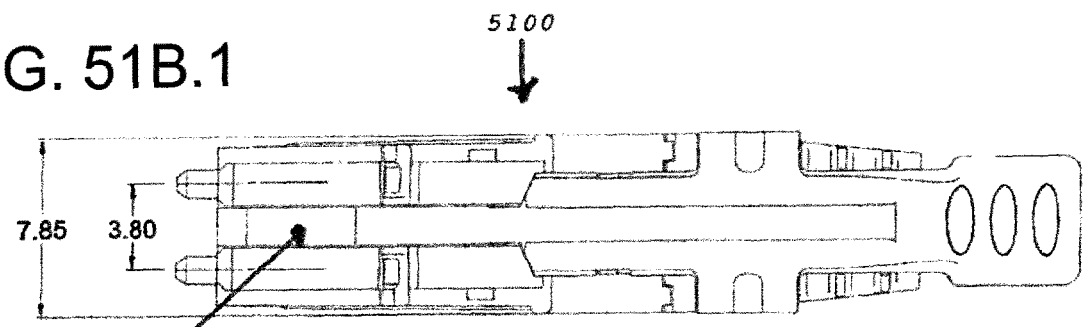
FIG. 51B2
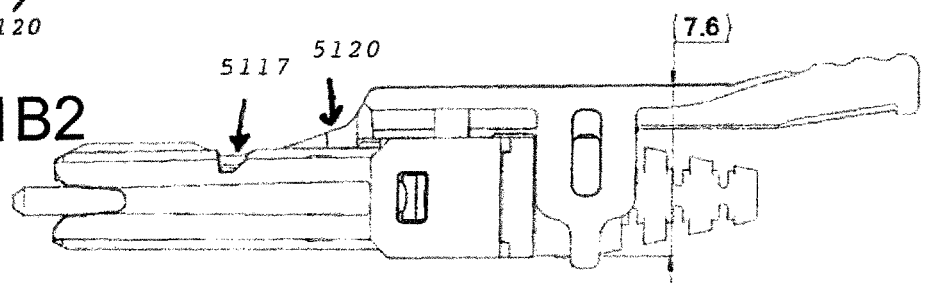

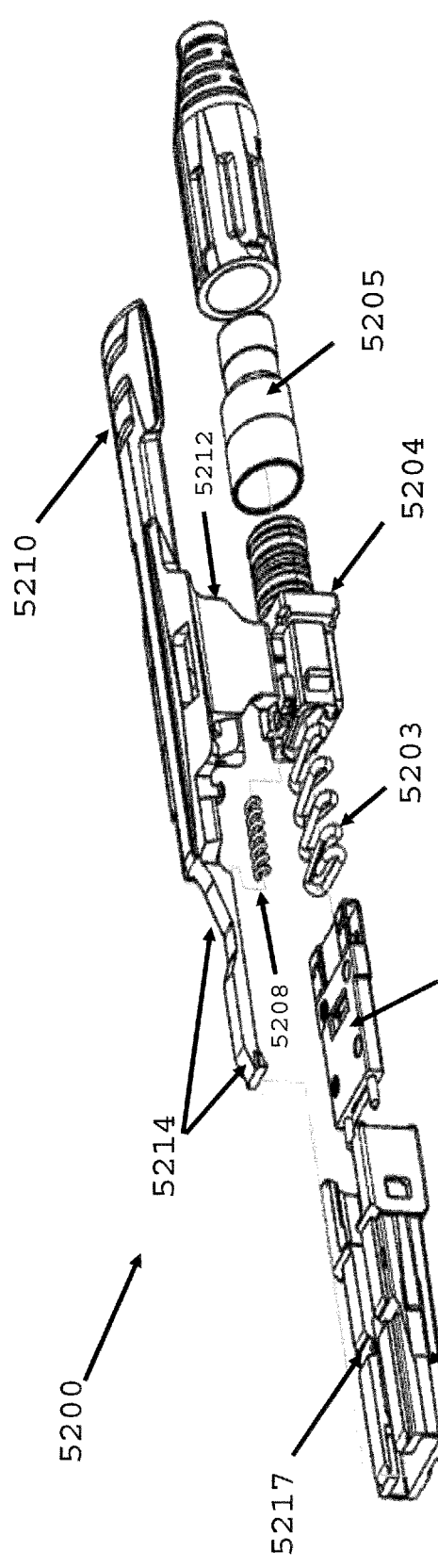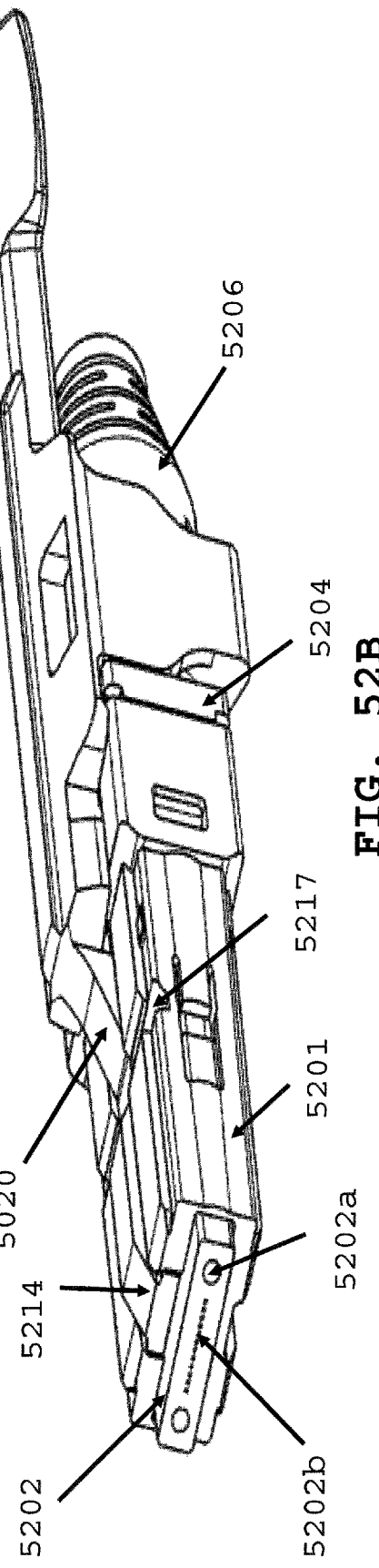

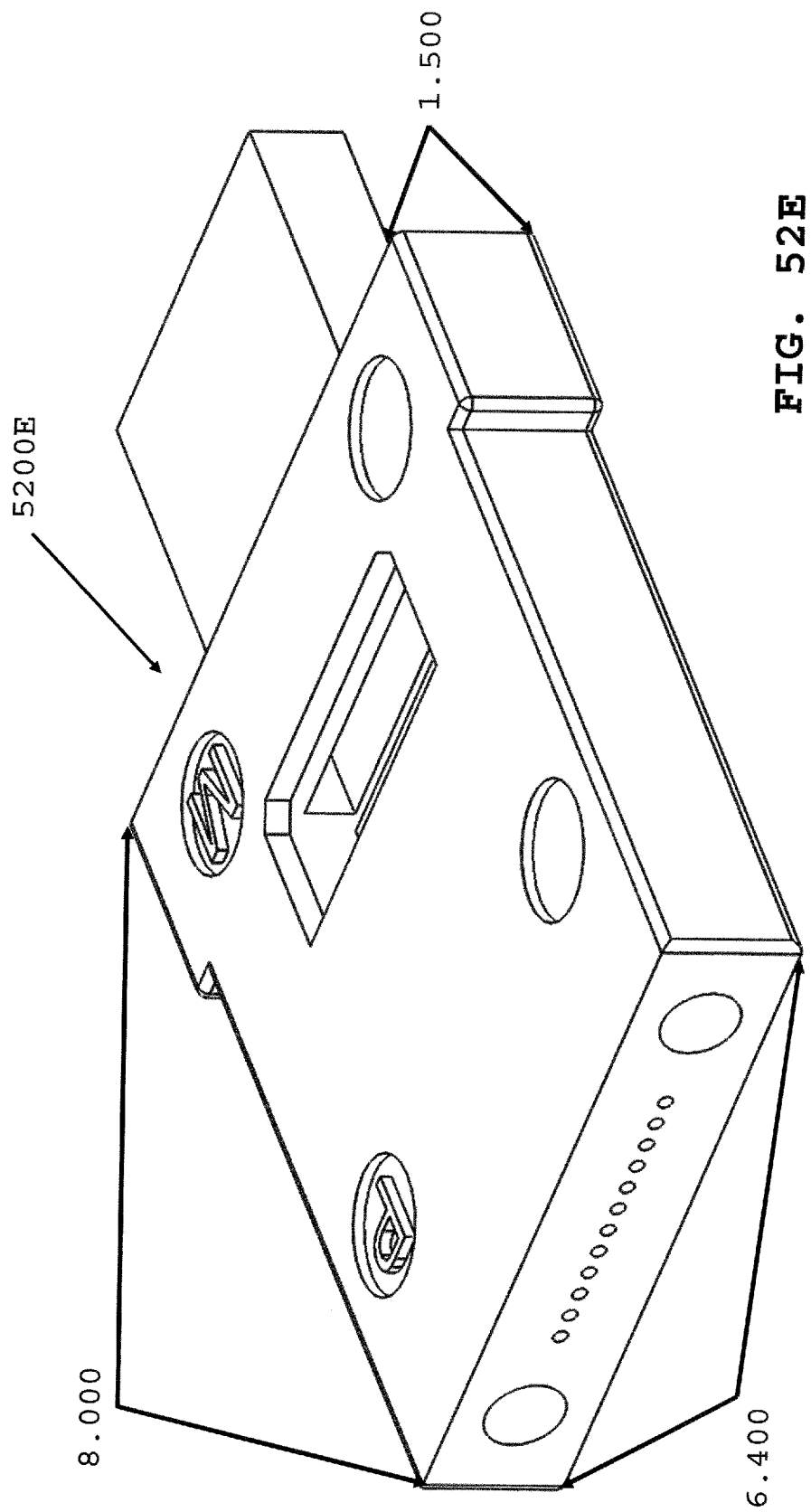

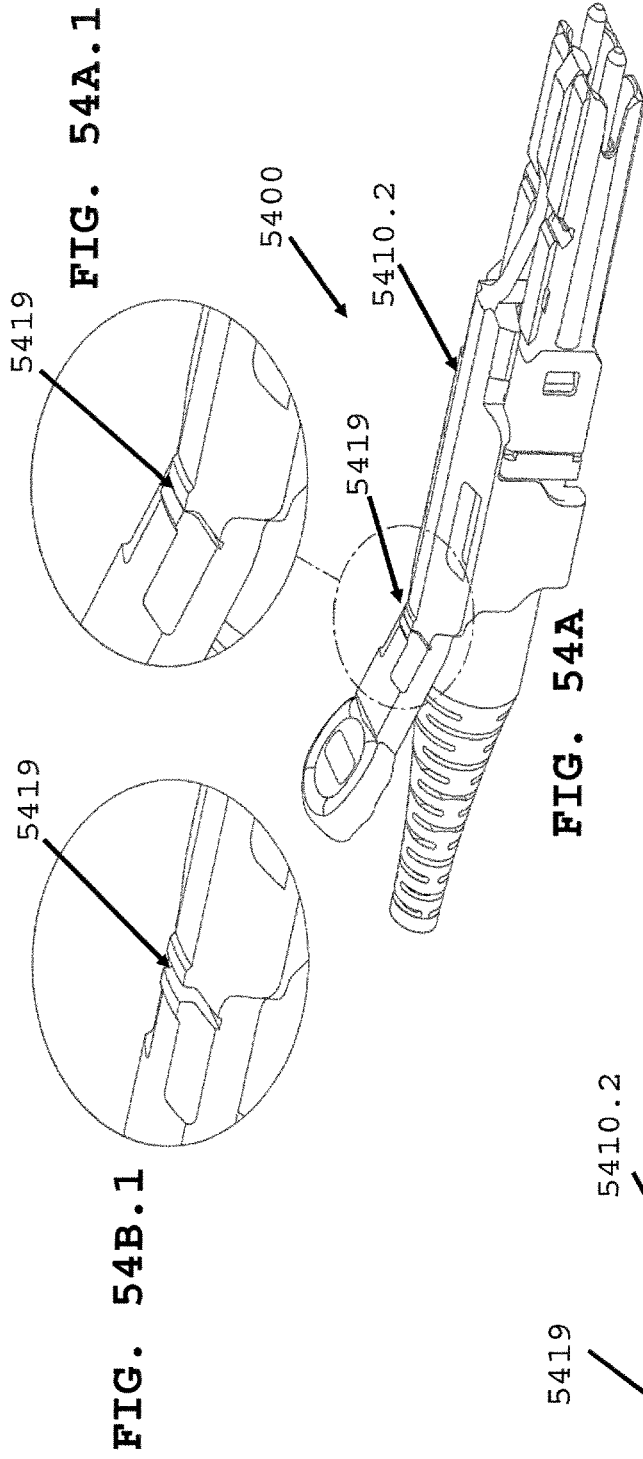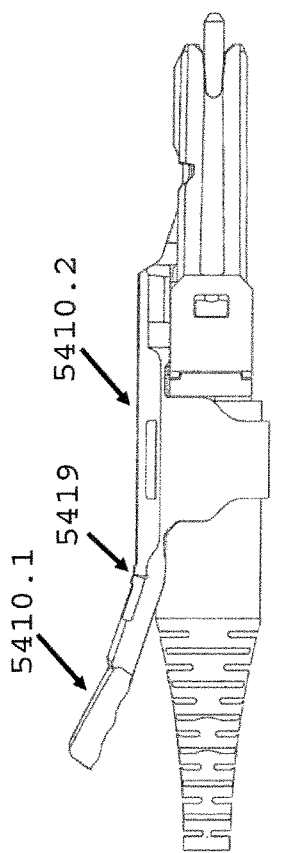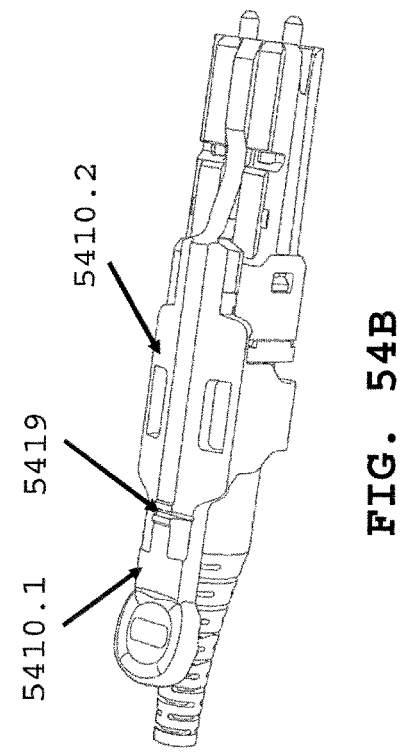

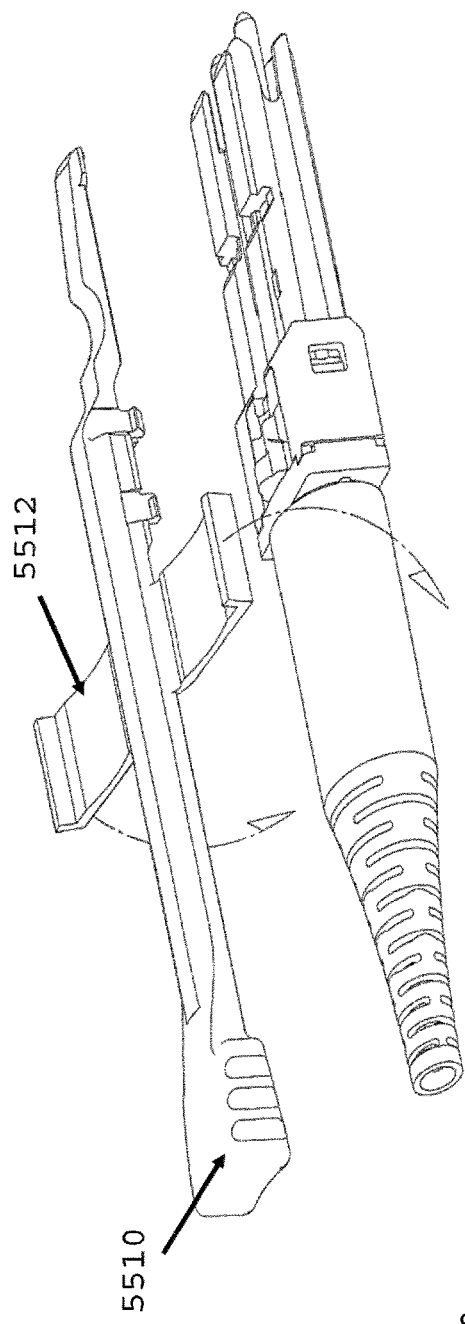
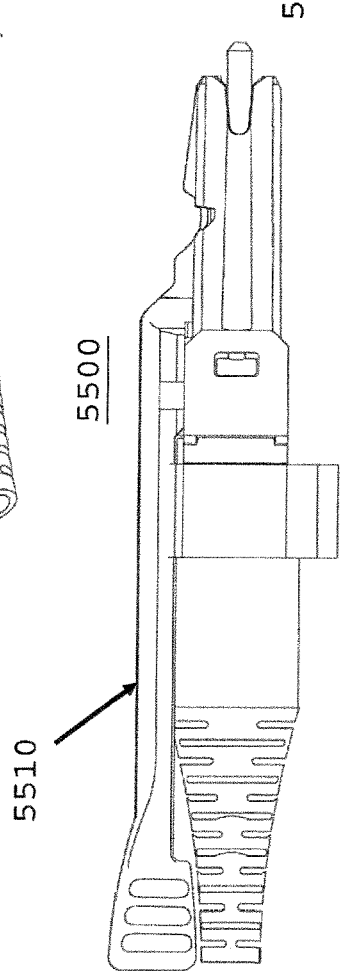
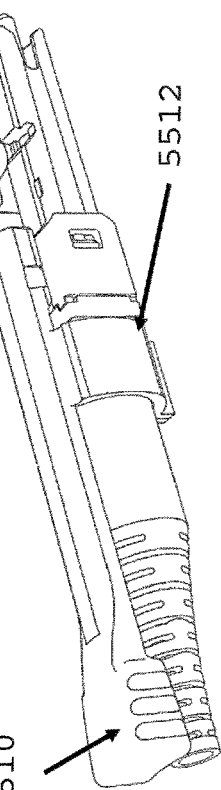
FIG. 55A
FIG. 55B
FIG. 55C

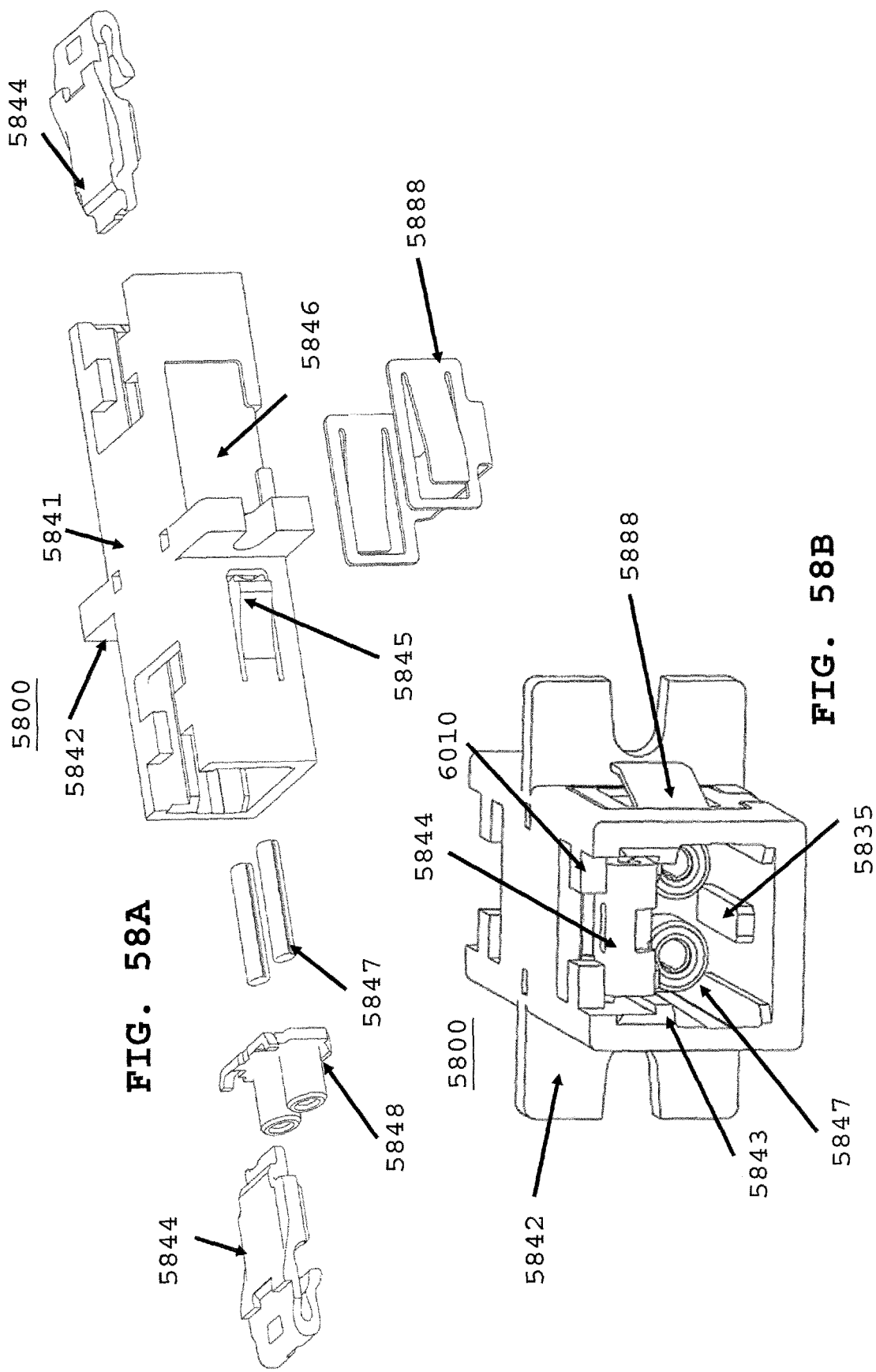

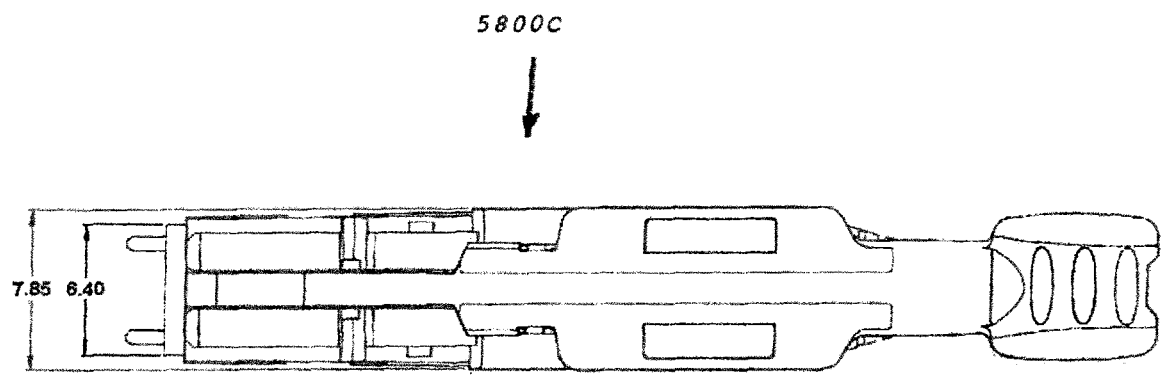
FIG. 58D
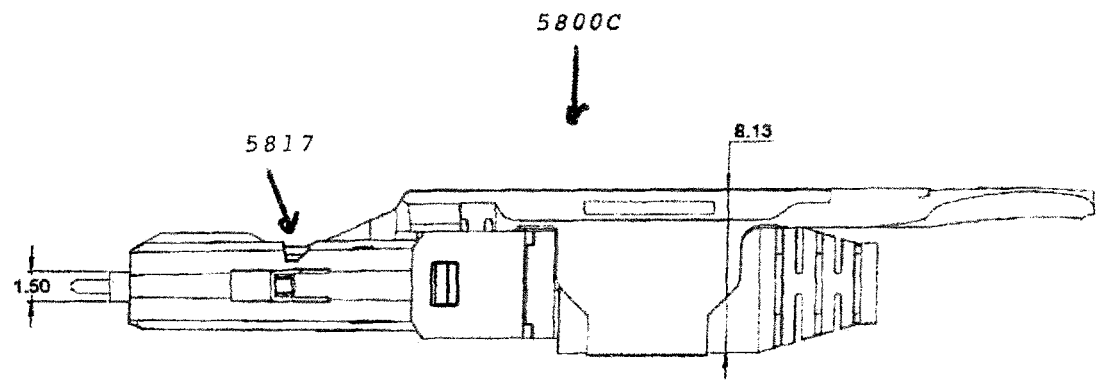
FIG. 58D.1

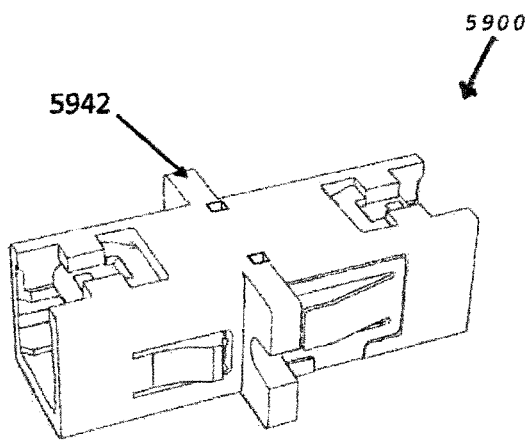
FIG. 59A.1
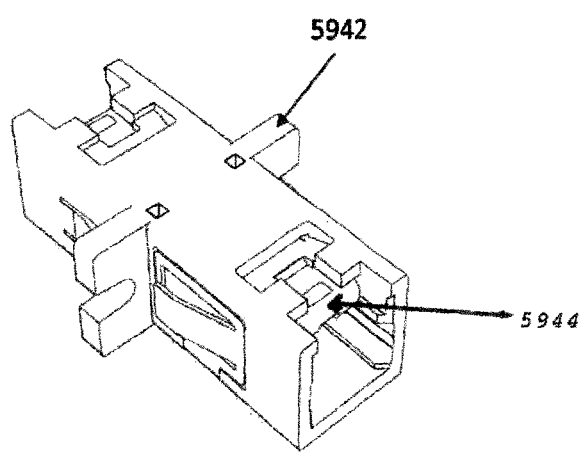
FIG. 59A.2
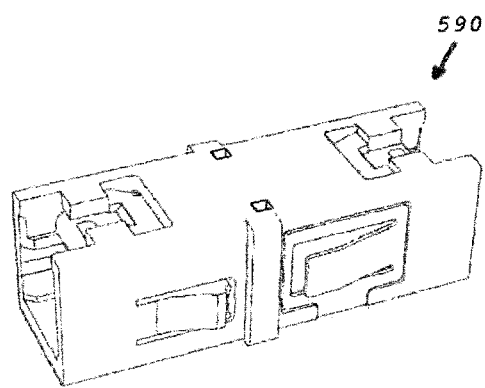
FIG. 59B.1
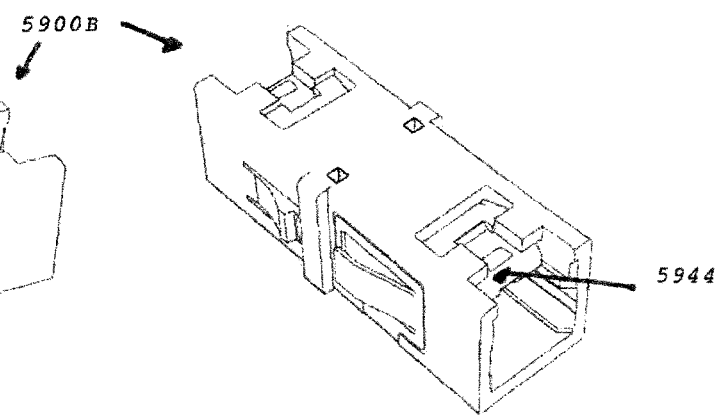
FIG. 59B.2

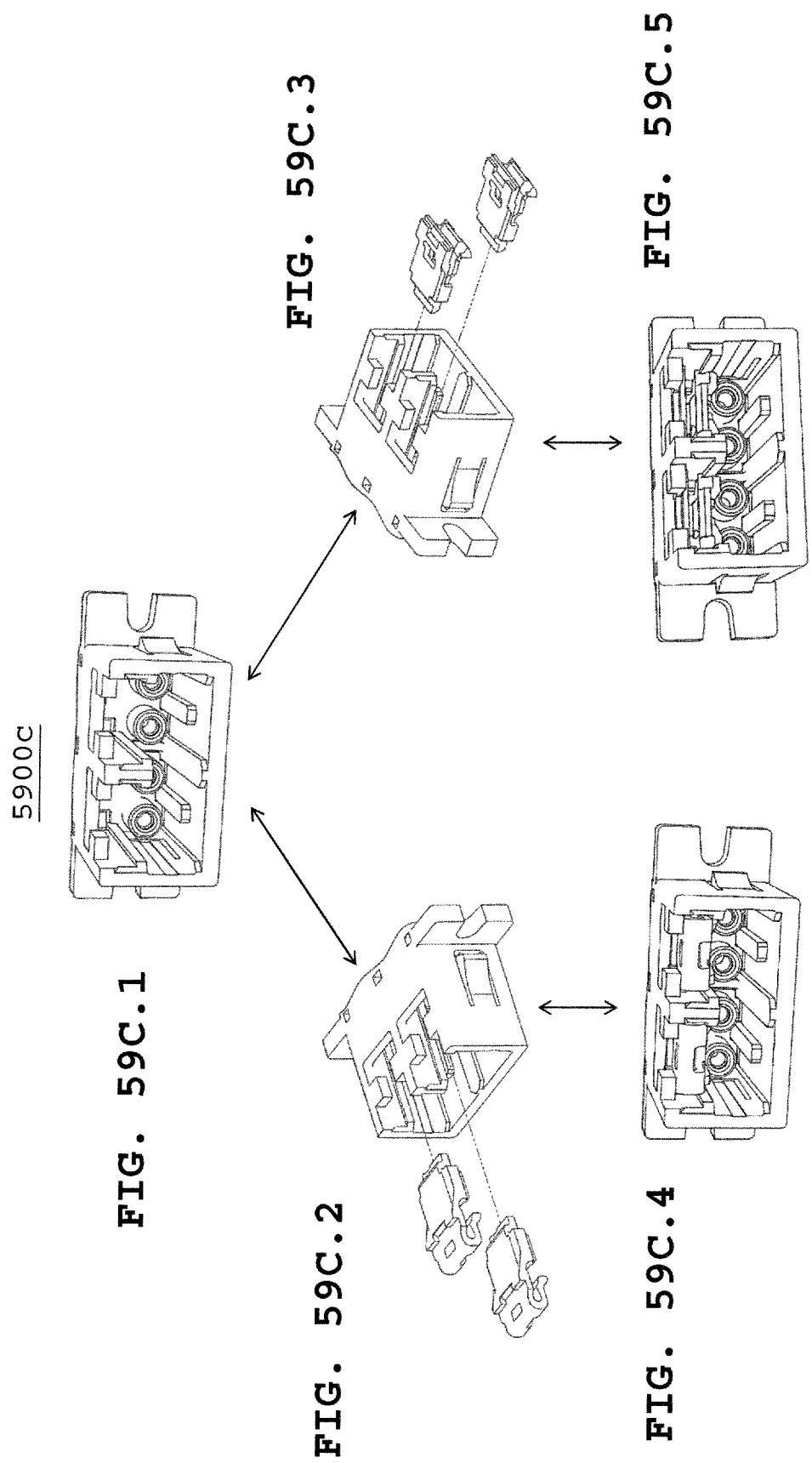

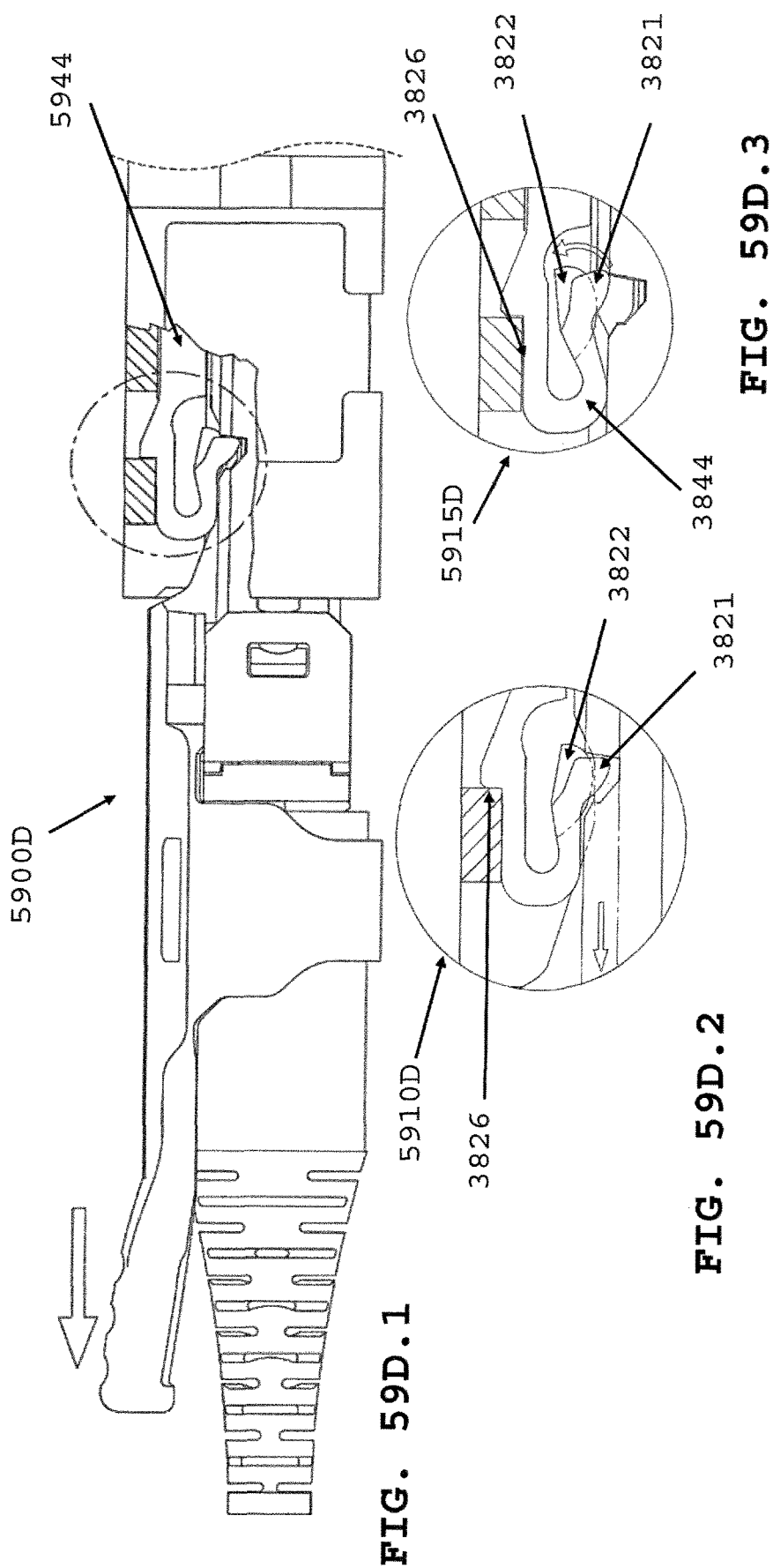

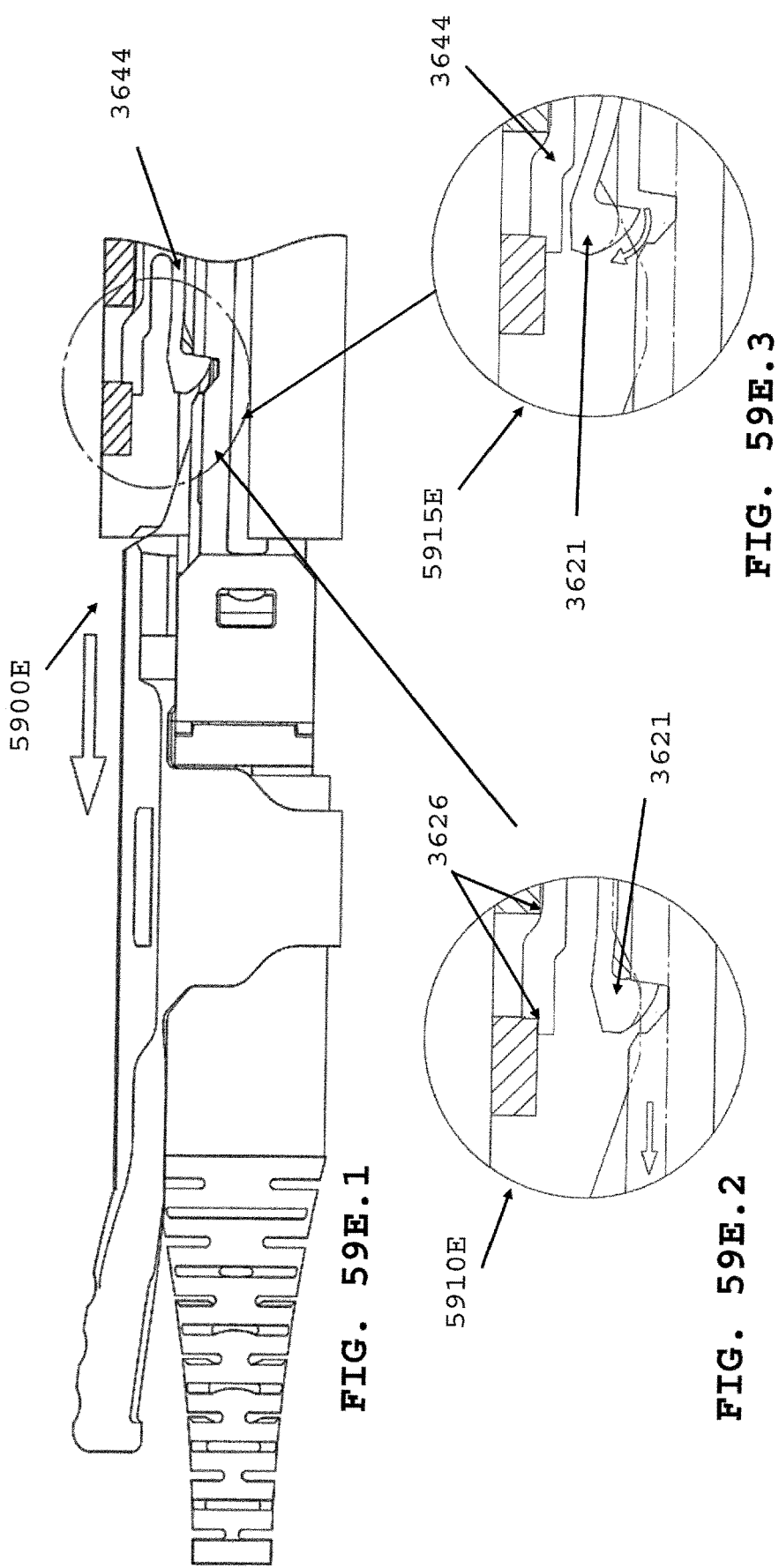

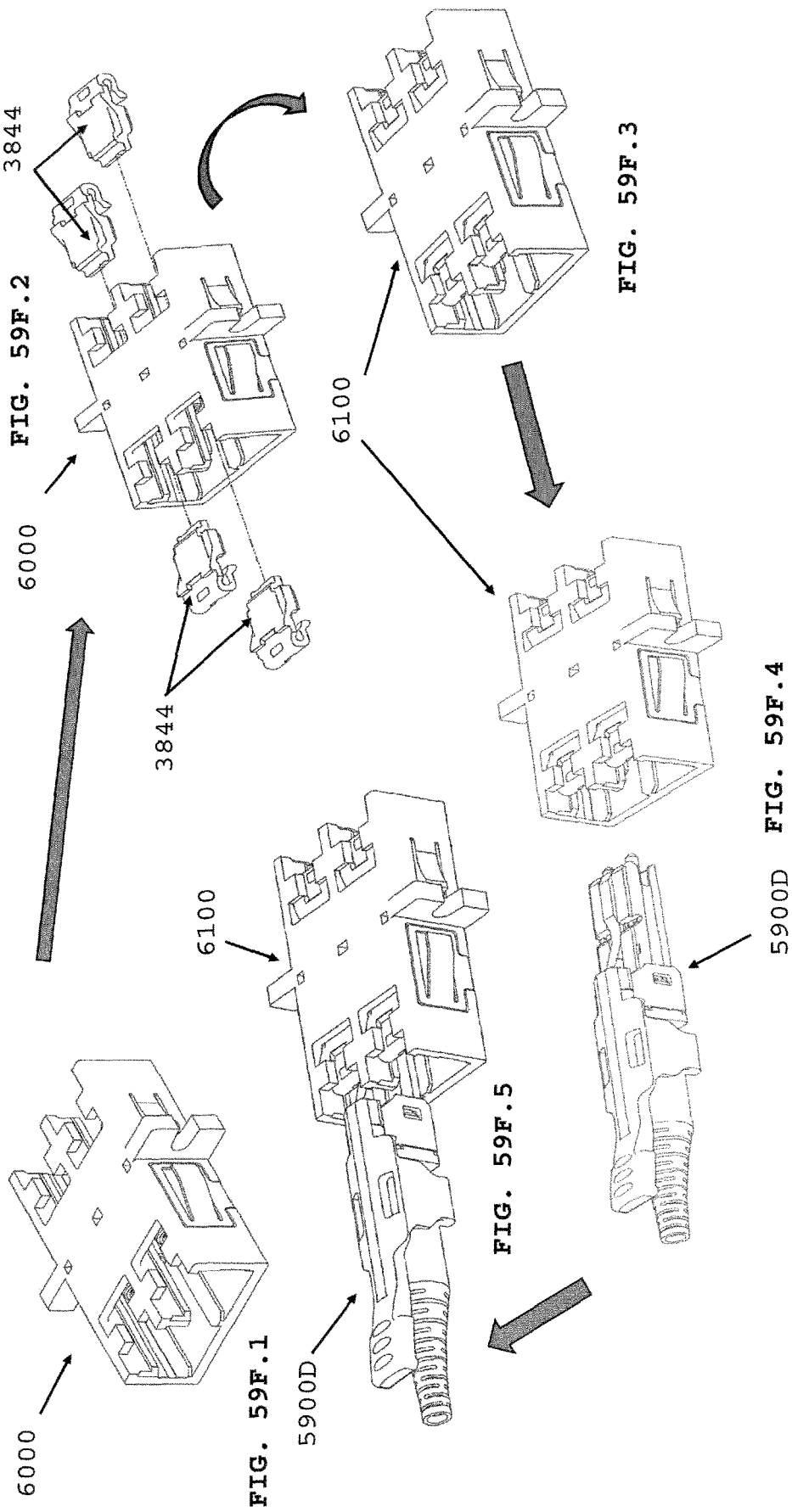

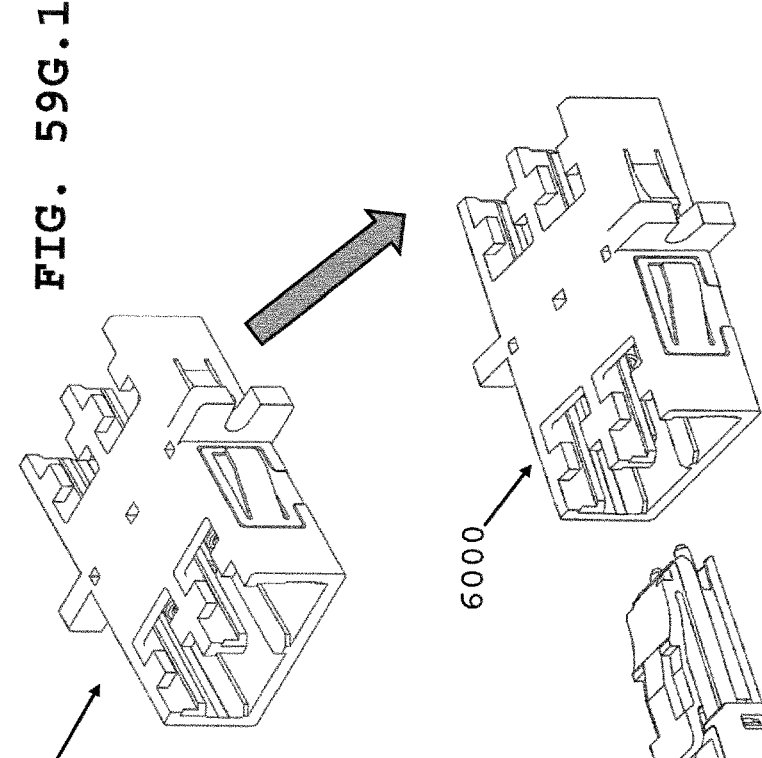
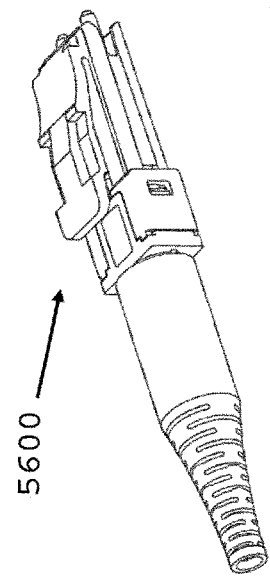
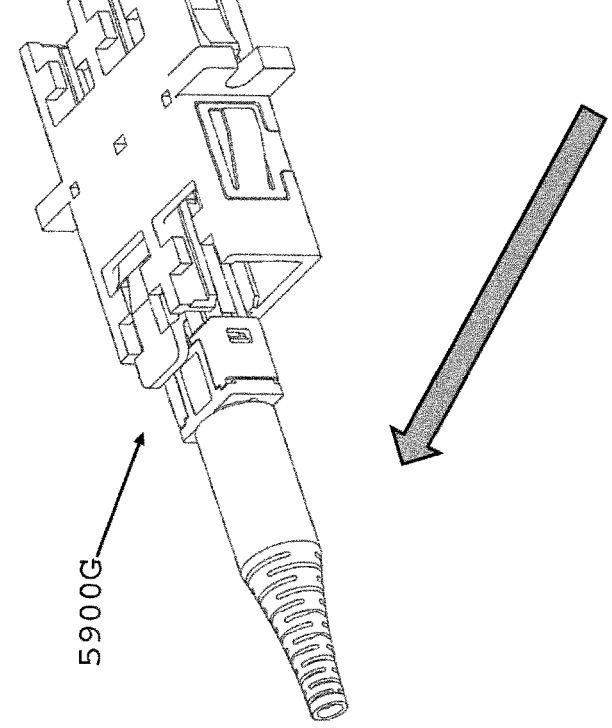
FIG. 59G.1
FIG. 59G.2
FIG. 59G.3

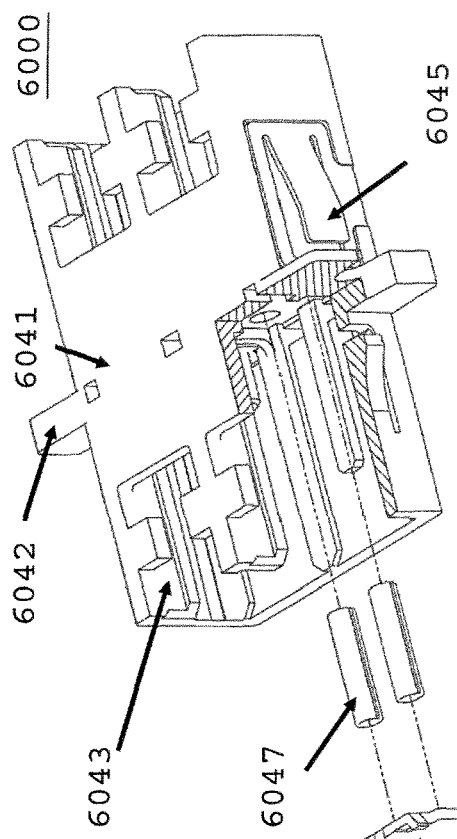
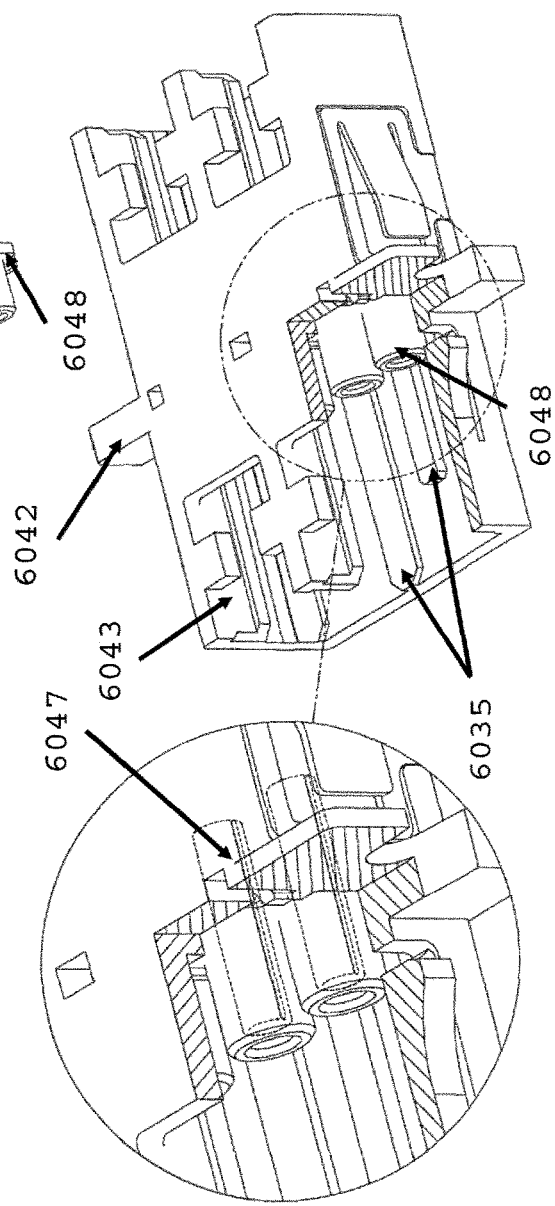
FIG. 60C
FIG. 60D
FIG. 60D.1

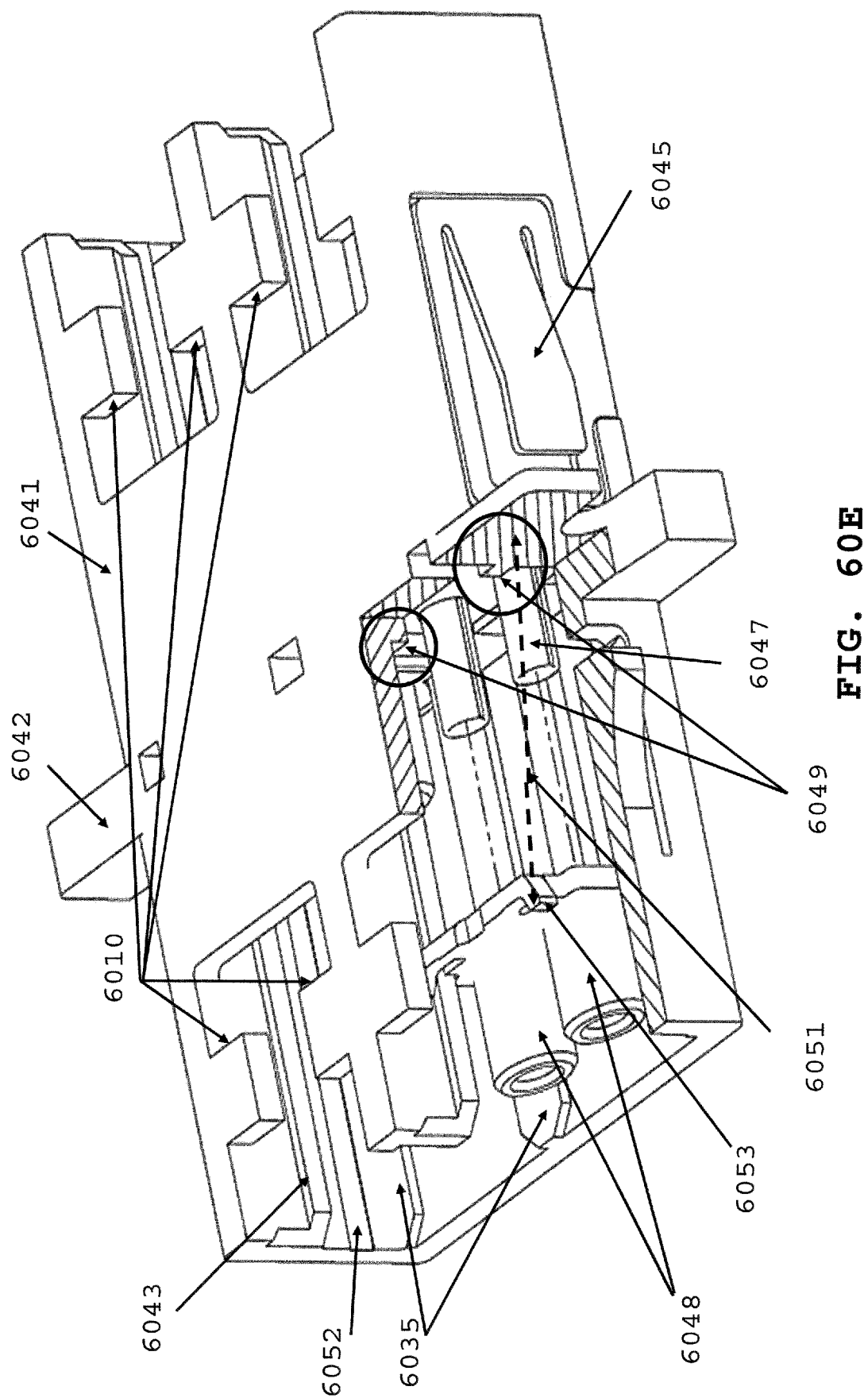

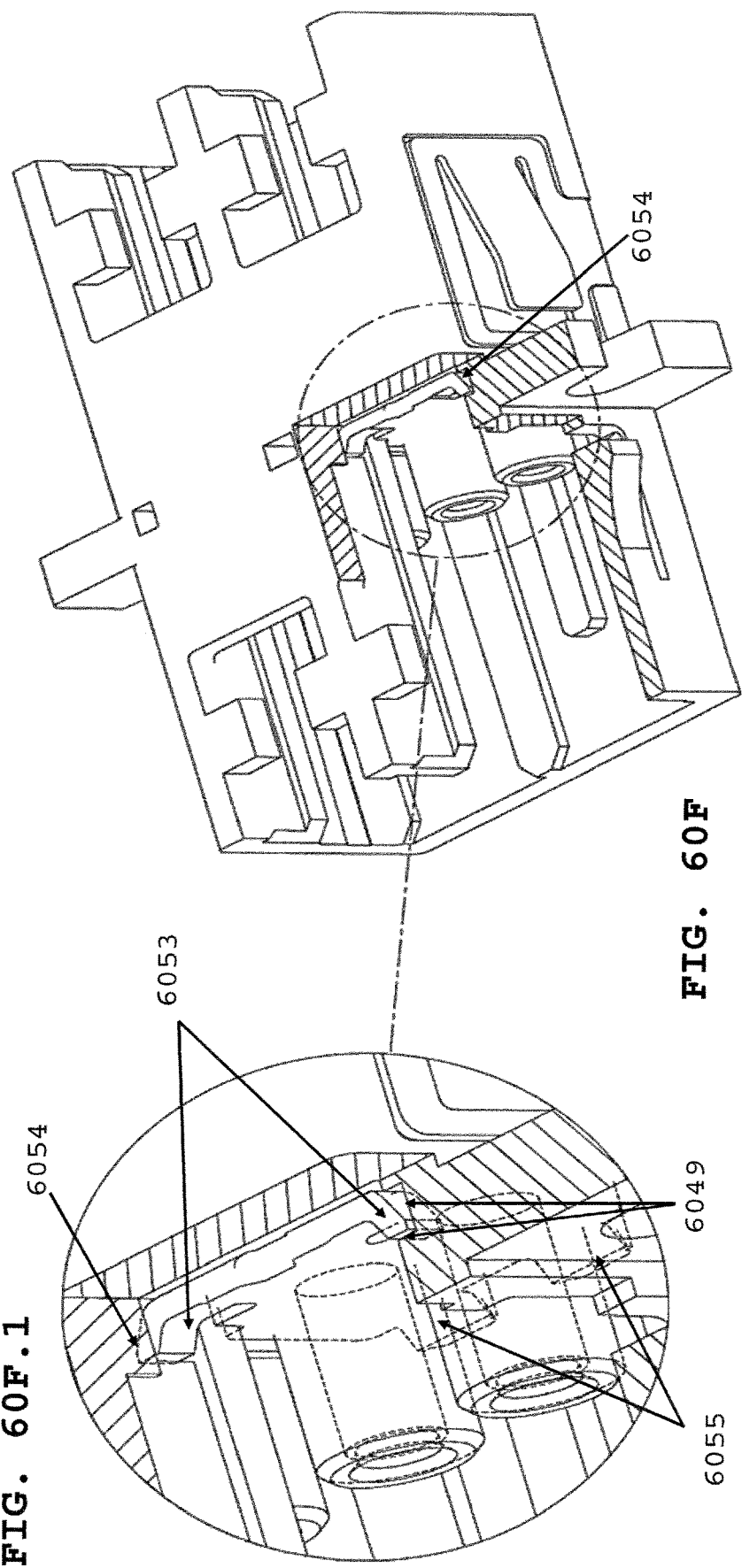

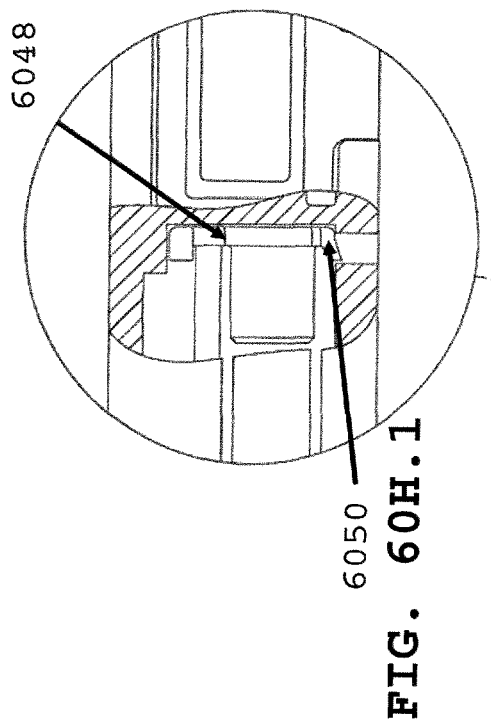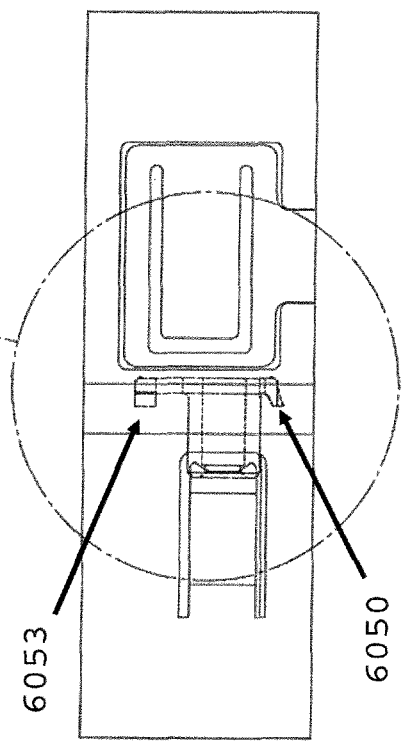
FIG. 60H.1  FIG. 60H
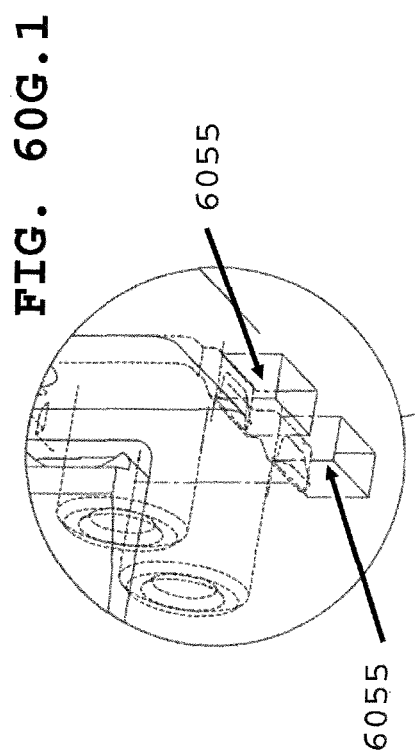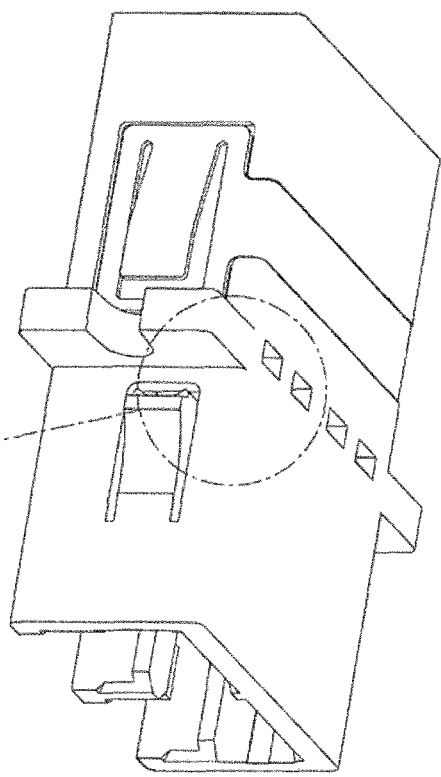
FIG. 60G.1  FIG. 60G

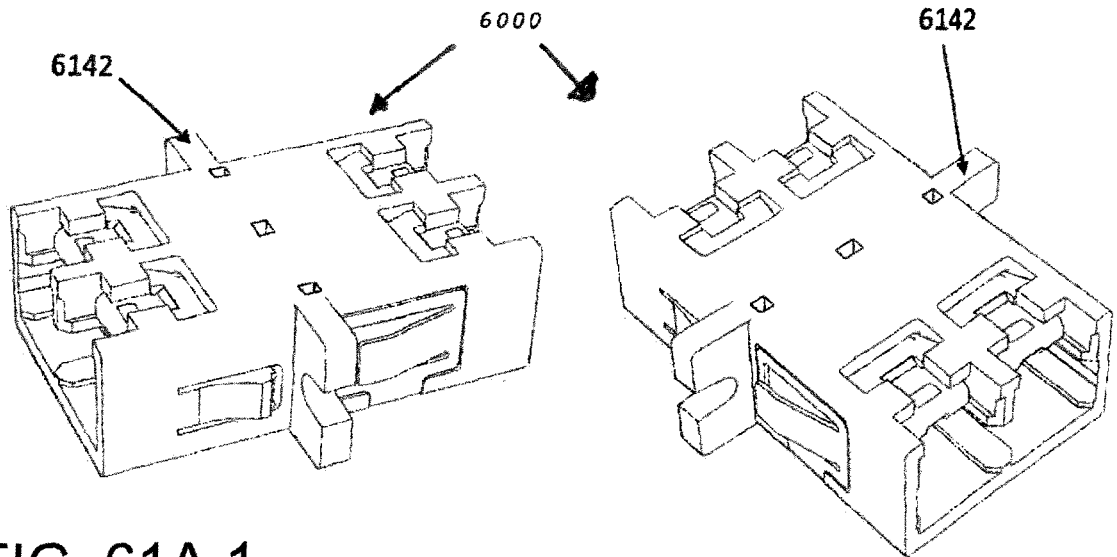
FIG. 61A.1
FIG. 61A.2
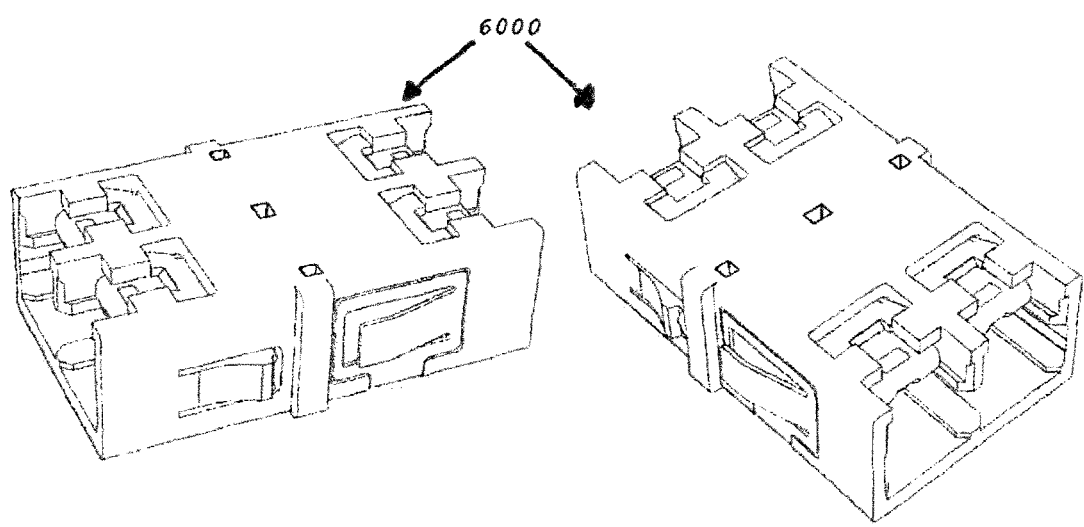
FIG. 61B.1
FIG. 61B.2

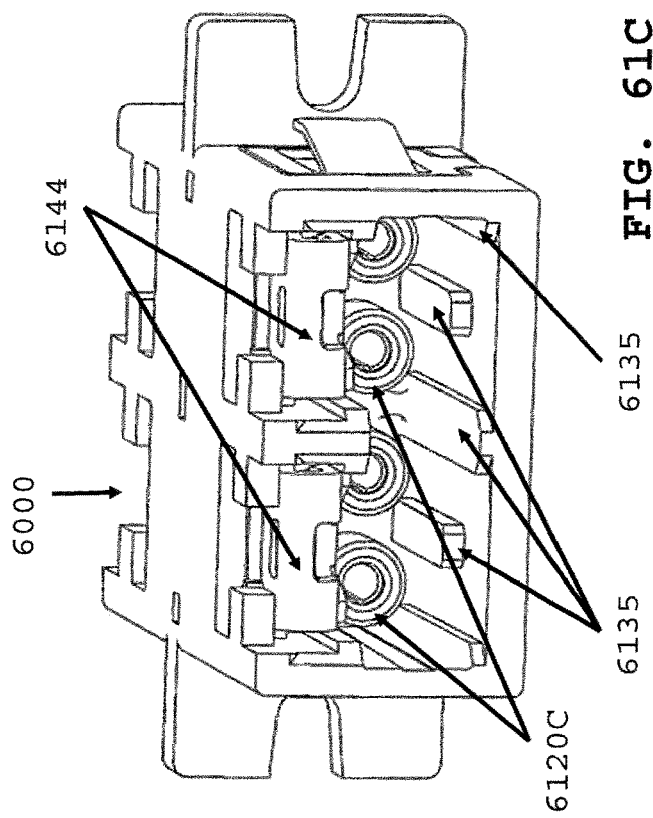
FIG. 61C
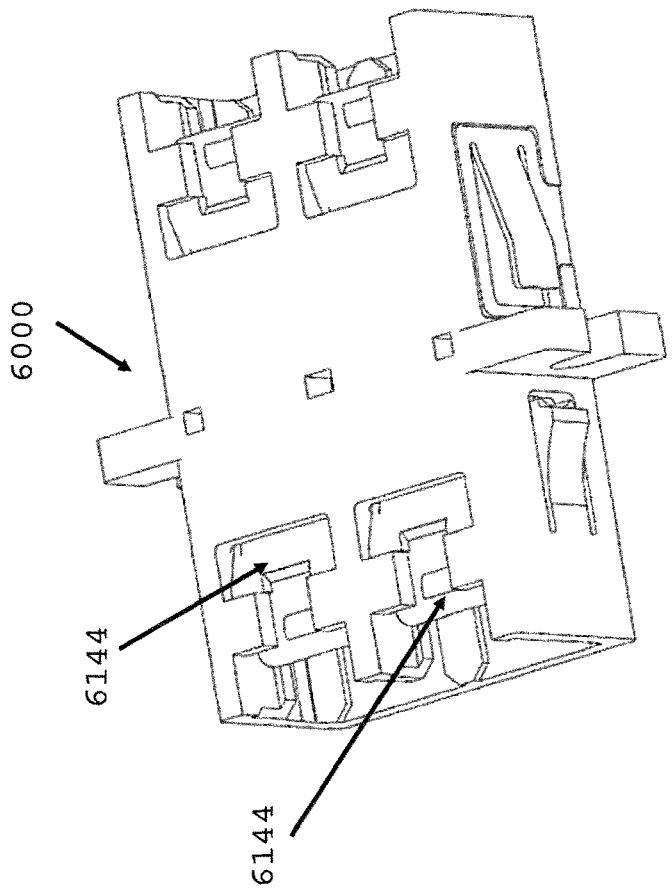
FIG. 61C.1

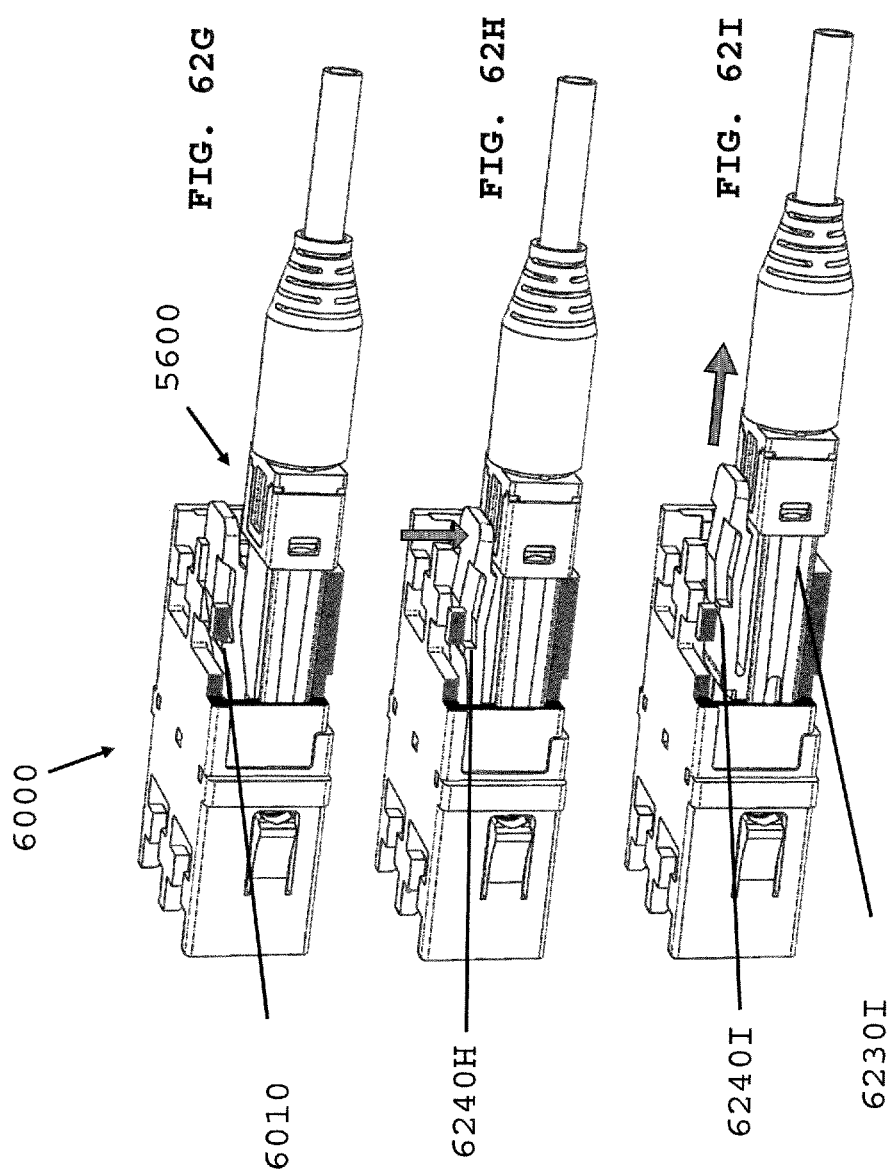

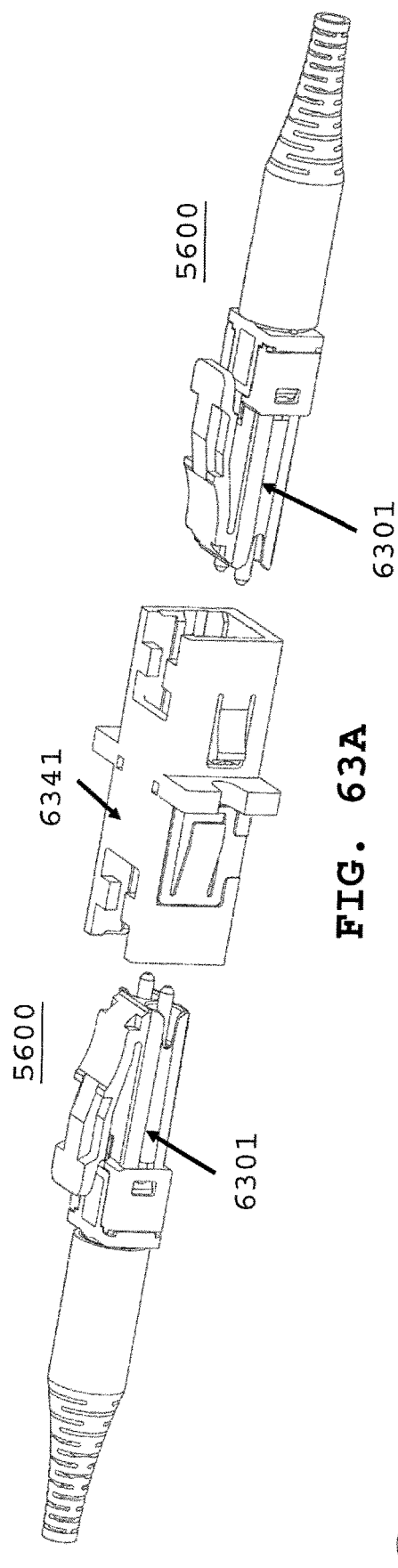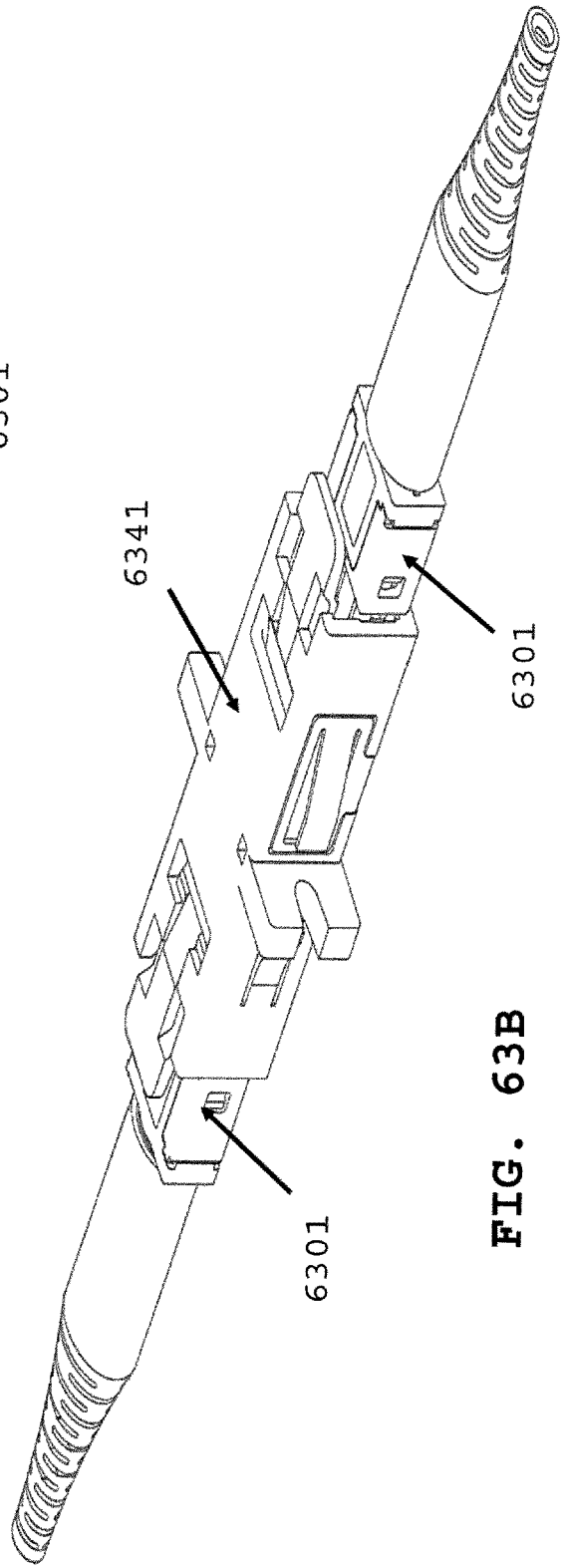
FIG. 63A
FIG. 63B

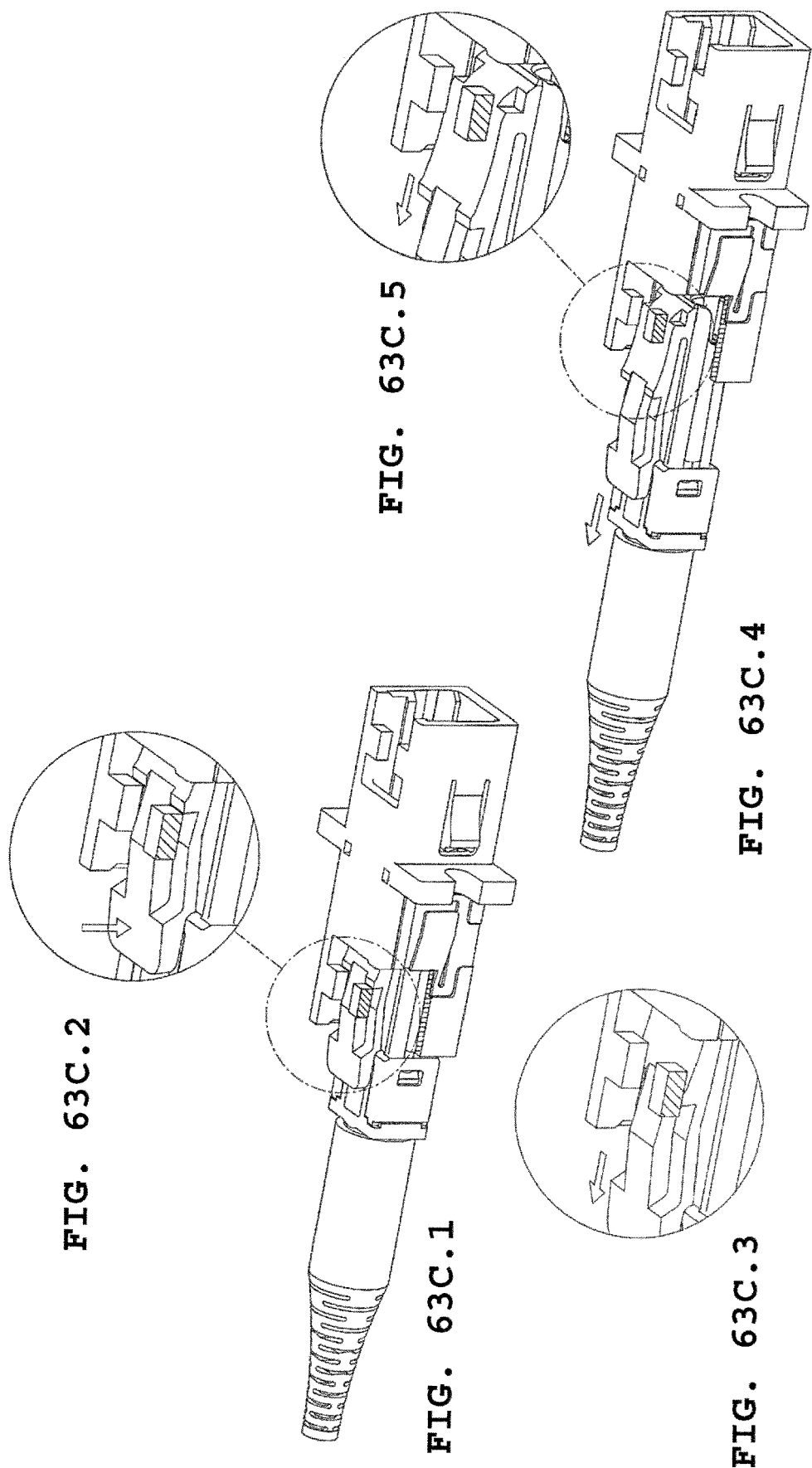

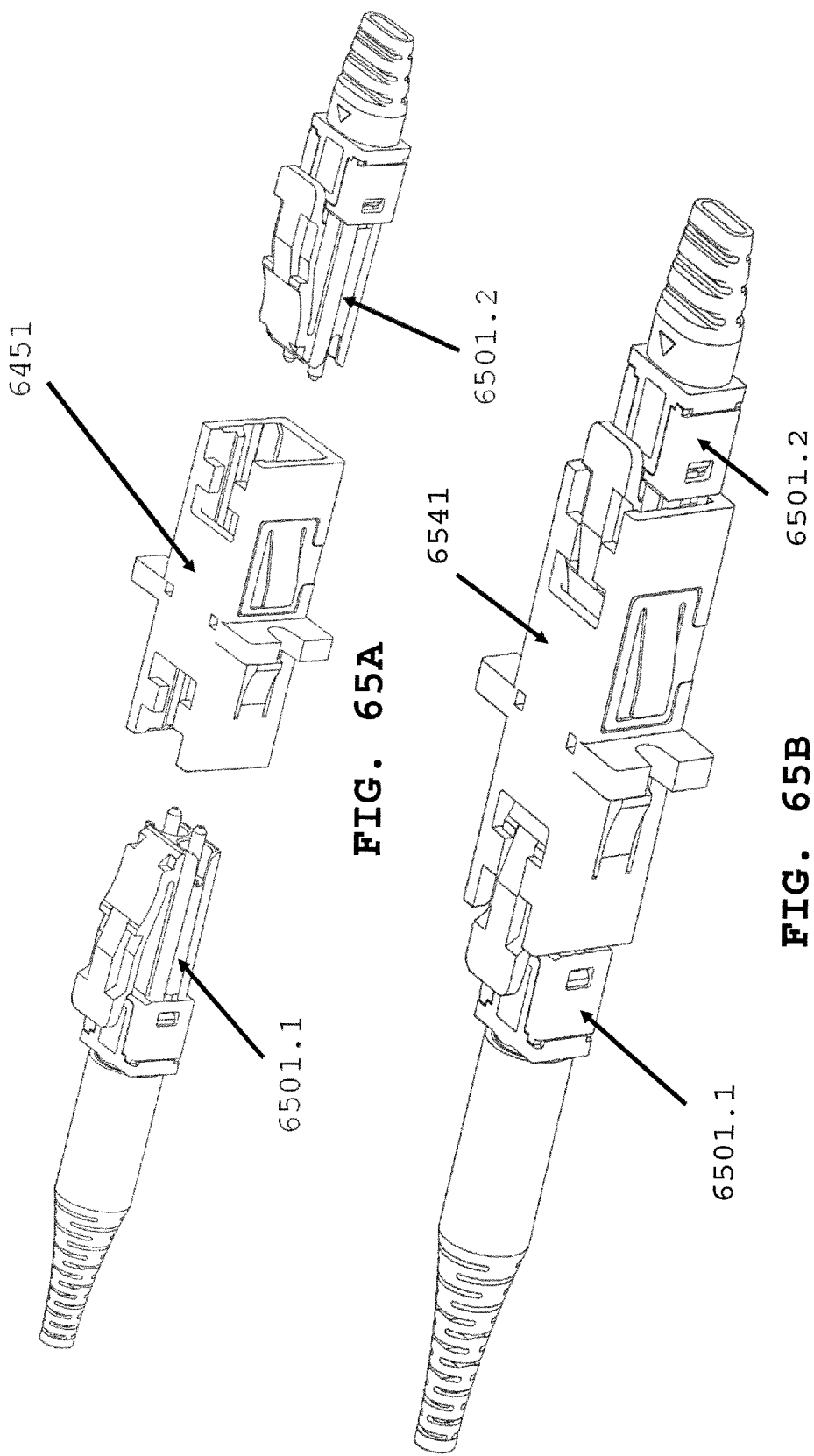

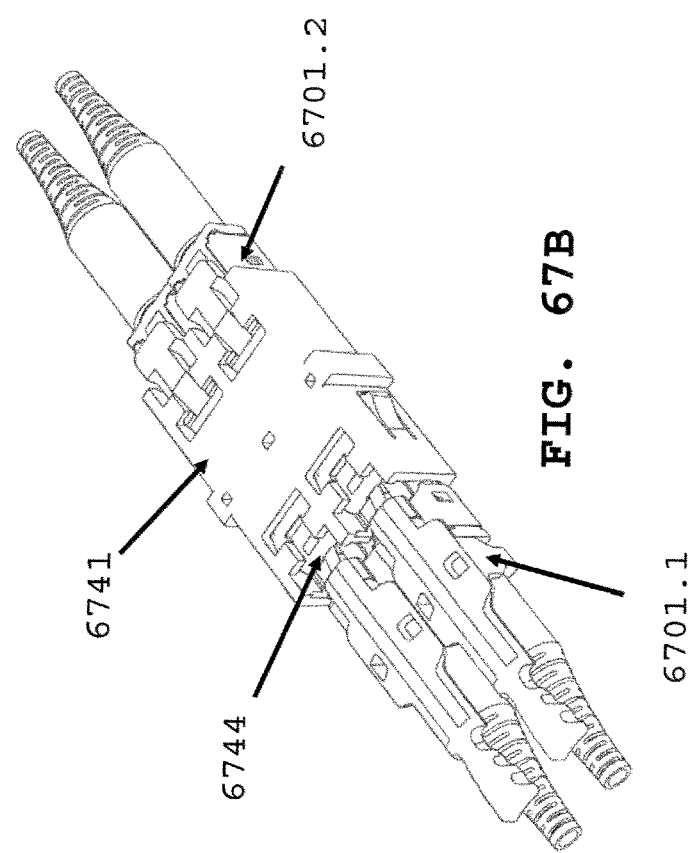
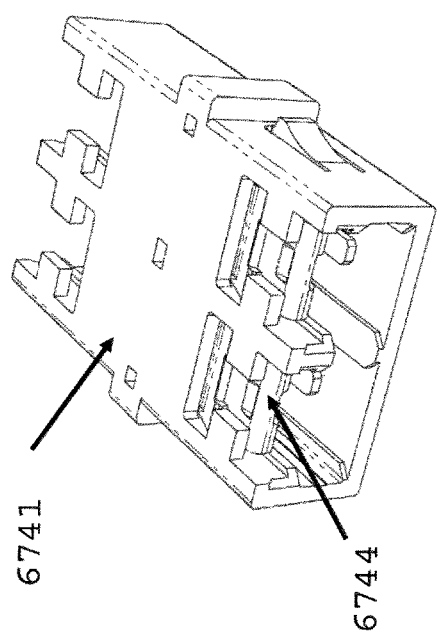
FIG. 67B
FIG. 67A

FIG. 69A.1    FIG. 69A.2    FIG. 69A.3
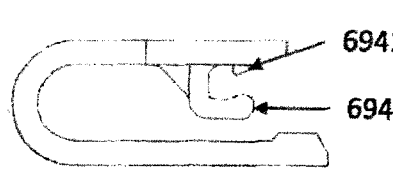
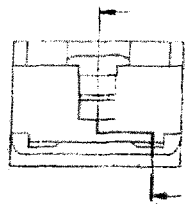
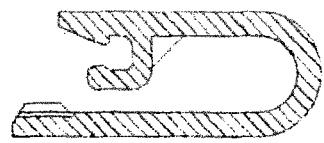
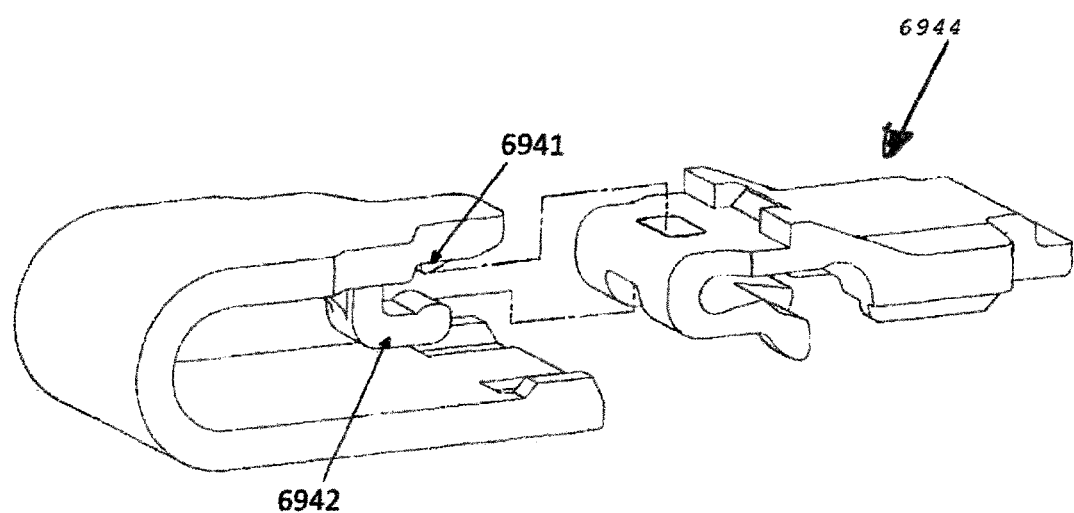
FIG. 69B FIG. 70A
FIG. 70B
6000
6944
FIG. 70C
FIG. 70D
FIG. 70E
FIG. 70F
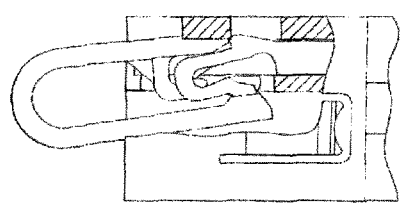
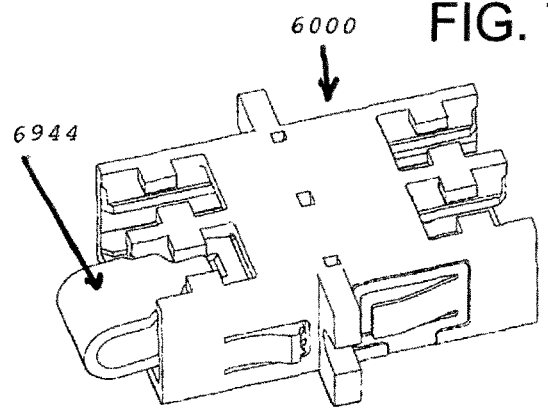
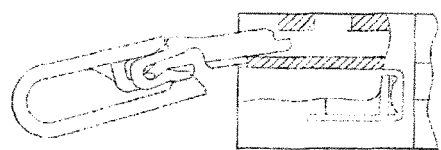
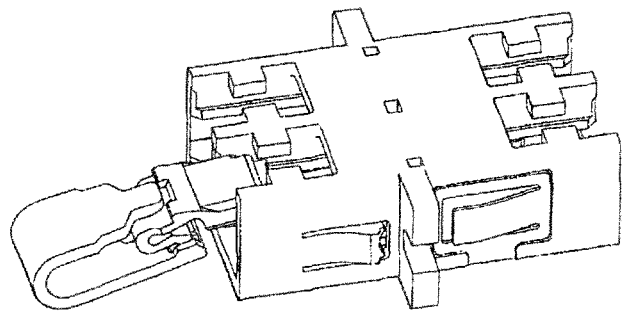
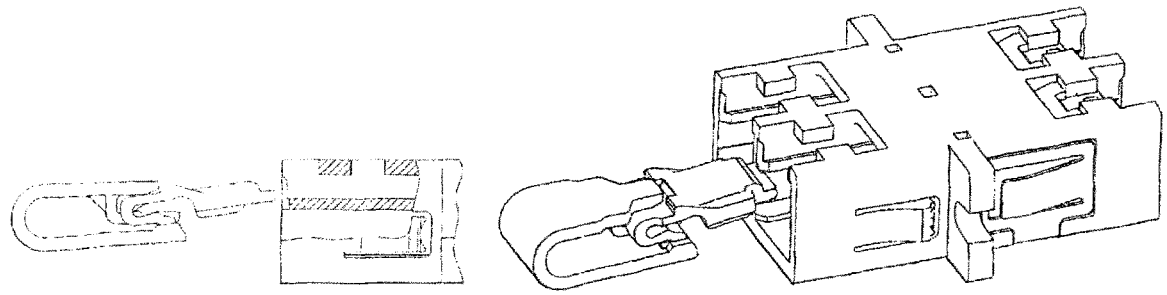

MODULAR CONNECTOR AND ADAPTER DEVICES

CROSS-REFERENCE TO RELATED-APPLICATIONS

This application is a Divisional filed, under 35 U.S.C 120, of U.S. Ser. No. 15/881,309 filed on Jan. 26, 2018 which claims the benefit of priority of U.S. Provisional Application No. 62/457,150 filed on Feb. 9, 2017, entitled "Optical Fiber Connector," U.S. Provisional Application No. 62/546,920 filed Aug. 17, 2017, entitled "Narrow Width Adapters and Connectors with Modular Latching Arm," U.S. Provisional No. 62/452,147, filed Jan. 30, 2017, entitled "Narrow Width Adapters and Connectors with Modular Latching Arm," and U.S. Provisional No. 62/581,961 filed Nov. 6, 2017, entitled "Narrow Width Adapters and Connectors with Modular Latching Arm," each of which is incorporated herein by reference in its entirety.

BACKGROUND

The present disclosure relates generally to connectors having remote release, and more specifically to narrow width adapters and connectors, such as narrow pitch distance Lucent Connector (LC) duplex adapters and narrow width multi-fiber connectors.

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, the deployment of high-density interconnect panels has not been fully realized.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to individual release mechanisms. Such physical obstructions may impede the ability of an operator to minimize the stresses applied to the cables and the connectors. For example, these stresses may be applied when a user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may not be effective at reducing support time and increasing the quality of service.

Small Form Factor Pluggable Transceivers (SFP) are used presently in telecommunication infrastructures within rack mounted copper-to-fiber media converters, and are also known as Ethernet switches and/or patching hubs. These infrastructure Ethernet and fiber optic connections are evolving quickly to increase connection density due to limited space for such equipment. Although fiber optic connectors have become smaller over the years, they have not been designed to be any smaller than necessary to plug into commonly sized and readily available SFPs. However, as transceiver technologies develop, smaller SFPs will be used to create higher density switches and/or patching hub equipment. Accordingly, there is a need for fiber optic connectors that will meet the needs of future developments in smaller SFPs.

SUMMARY

In summary, one aspect provides a connector comprising: a front body comprising: a top and a bottom, a groove running lengthwise on the top of the front body, a recess running widthwise on a surface of the front body, and a rear body detachably connected to the front body forming a housing, wherein a portion of the rear body fits inside the front body when detachably connected; and a push-pull tab comprising a front portion, a rear portion, and one or more side portions, wherein the push-pull tab is detachably connected to the housing using the one or more side portions, wherein the front portion sits in the groove.

Another aspect provides a port device comprising: one or more ports for receiving a connector having a top and a bottom; the one or more ports comprising at least one cutout on the top; and the one or more ports comprising at least one guide rail on the bottom, wherein the at least one cutout is configured to receive an interchangeable anchor device. The port device may have opposing ports to establish a communication signal path.

A further aspect provides a network system comprising: a connector comprising a housing comprising a groove running widthwise on a surface of the housing; and a push-pull tab comprising a complementary groove, wherein the push-pull tab is detachably connected to the housing; and a receiver device comprising one or more ports for receiving the connector, the one or more ports having an interchangeable anchor device including a first portion and a second portion; wherein the groove is configured to receive the first portion of the interchangeable anchor device when the connector is inserted into the receiving element, and wherein the complimentary groove is configured to receive the second portion of the interchangeable anchor device when the connector is inserted into the receiving element, the push-pull tab being configured to disengage the second portion of the interchangeable anchor device from the complementary groove when the push-pull tab is moved in a direction away from the connector, thereby disengaging the first portion of the interchangeable anchor device from the grove of the connector.

A further aspect provides an interchangeable anchor device secured in a port of the port device. The anchor device includes portions that interface with the corresponding port internal structure that holds the anchor device firmly fixed within the port. The anchor device includes multiple portions that engage corresponding structure on the connector front body that helps with connector alignment in the port, and prevents unintentional withdrawal or misalignment of the interconnection of one or more connectors unless connector removal is initiated using a release mechanism.

A further aspect provides additional anchor points lengthwise along the connector housing for securing the push-pull tab release mechanism to the connector including portions to prevent disengagement of the push-pull tab from the groove, from around the back body, or from the front portion of the connector during insertion and release of the connector from the port.

A further aspect provides for mix and match of connector types within an adapter or transceiver allowing a MPO connector and LC connector to communicate, and a MPO connector with a first or second release mechanism or a first or second boot to be interconnected, or interconnected with a LC type connector with the first or second release mechanism or the first or second boot. The interconnecting of connector types included, but are not limited to, LC connector with the first release mechanism and the second boot interconnected with a LC connector with the second release mechanism and the second boot. Another non-limiting interconnection schema is a MPO connector with a second release mechanism and the first boot interconnected with a LC connector with the second release mechanism and the second boot.

BRIEF DESCRIPTION OF THE DRAWINGS

FIG. 14A is a side view of a narrow width multi-fiber connector of FIG. 13A partially broken away and having a recess engaged with an SFP latch in a normal pull tab position according to aspects of the present disclosure;

FIG. 15A is a side view of the narrow width multi-fiber connector of FIG. 13A partially broken away, and being disengaged from the SFP latch by retracting the pull tab according to aspects of the present disclosure;

FIG. 15B is a zoomed view of FIG. 15A;

FIG. 17D.1 is a zoomed view of FIG. 17D;

FIG. 17E.1 is a zoomed view of FIG. 17E;

FIG. 28A is an exploded perspective view of a connector according to aspects of the present disclosure;

FIG. 28B is a perspective view of a connector according to aspects of the present disclosure;

FIG. 32A is a perspective view of a connector with the push-pull tab according to aspects of the present disclosure;

FIG. 32B is a zoomed perspective view of a connector with the push-pull tab according to aspects of the present disclosure;

FIG. 32C is another zoomed perspective view of a connector with the push-pull tab to aspects of the present disclosure;

FIG. 33A illustrates an example CS connector according to some embodiments with two separate cross-sectional areas identified;

FIG. 33B is a detailed cross sectional view of a CS connector at the first identified cross-sectional area of the CS connector identified by line X-X in FIG. 33A;

FIG. 33B.1 is a zoomed view of FIG. 33B;

FIG. 33C is a detailed cross sectional view of a CS connector at the second identified cross-sectional area of the CS connector identified by line Y-Y in FIG. 33A;

FIG. 33C.1 is a zoomed view of FIG. 33C;

FIGS. 34.1-34.3 are perspective views of a group of connectors with push-pull tabs of differing increasing lengths according to aspects of the present disclosure;

FIG. 35A is a detailed dimensional front view of a duplex adapter/transceiver according to aspects of the present disclosure;

FIG. 35B is a detailed dimensional cross sectional view taken in the plane including line a-a of FIG. 35A of a duplex adapter/transceiver according to aspects of the present disclosure;

FIG. 35C is a detailed dimensional cross sectional view taken in a plane including line b-b of FIG. 35A of a duplex adapter/transceiver according to aspects of the present disclosure;

FIG. 38A is another a perspective view of a duplex adapter/transceiver with removable anchors installed;

FIG. 38B is another perspective view of a removable anchor device;

FIG. 38C is another perspective view of a removable anchor device;

FIG. 40C is a perspective view of the adapter configured to accept a pull release connector with hooks positioned or inserted into adapter as shown in the transparent view and section view;

FIG. 40C.1 is a zoomed view of FIG. 40C with an outer housing of the adapter shown as transparent;

FIG. 40C.2 is a zoomed view of FIG. 40C with an outer housing partially broken away FIG. 40D is a perspective view of an adapter hook prior to insertion into an adapter;

FIG. 40D.1 is a zoomed side view of the adapter of FIG. 40D with parts broken away to show internal construction;

FIG. 40E is a perspective view of an adapter hook partially inserted into an adapter;

FIG. 40E.1 is a zoomed side view of the adapter of FIG. 40E with parts broken away to show internal construction;

FIG. 40F is a perspective view of an adapter hook fully inserted into an adapter;

FIG. 40F.1 is a zoomed side view of the adapter of FIG. 40F with parts broken away to show internal construction;

FIG. 42A.1 is a cutaway view of a hook inserted into an adapter without a connector installed;

FIG. 42A.2 is side cutaway view of a CS connector being inserted into an adapter/transceiver with a hook of FIG. 42A.1;

FIG. 42A.3 is a side cutaway view of the connector of FIG. 42A.2 partially inserted into the adapter with a hook of FIG. 42A.1;

FIG. 42A.3.1 is a zoomed view of the hook engaging the connector ramp and groove of FIG. 42A.3;

FIG. 42A.4 is side cutaway view of the connector of FIG. 42A.2 fully inserted into the adapter with a hook of FIG. 42A.1;

FIG. 42A.4.1. is a zoomed view of the hook in a widthwise groove the connector of FIG. 42A.4 fully inserted into the adapter of FIG. 42A.1;

FIG. 42B.1 is a cutaway view of adapter as pull release connector is being inserted into an adapter with a hook;

FIG. 42B.2 is a bottom cutaway view of FIG. 42B.1;

FIG. 42B.3 is a cutaway view of the connector partially inserted into the adapter of FIG. 42B.1;

FIG. 42B.4 is a bottom cutaway view of FIG. 42B.3;

FIG. 42B.5 is a cutaway view of the connector fully inserted into the adapter of FIG. 42B.1;

FIG. 42B.6 is a bottom cutaway view of FIG. 42B.5;

FIG. 42C is a cutaway perspective view of the pull release connector inserted into the adapter;

FIG. 42C.1 is a zoomed view of FIG. 42C;

Figure 36A:
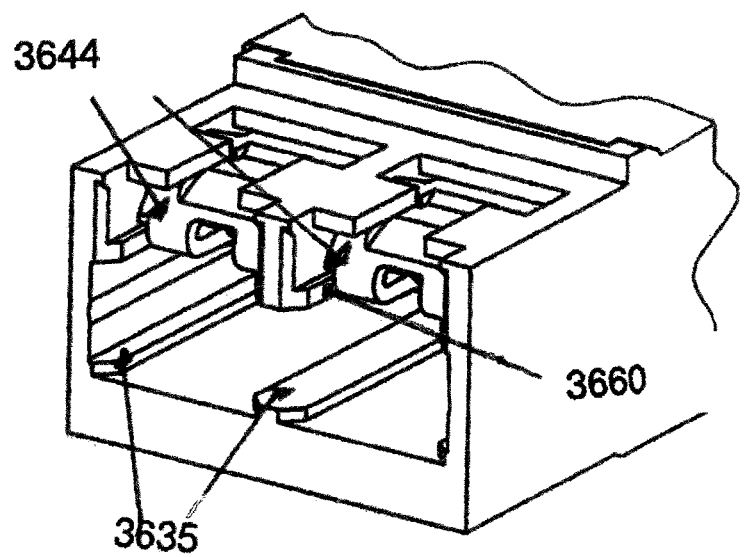
FIG. 36A is a perspective view of a duplex adapter/transceiver with removable anchors installed.
Figure 36B:
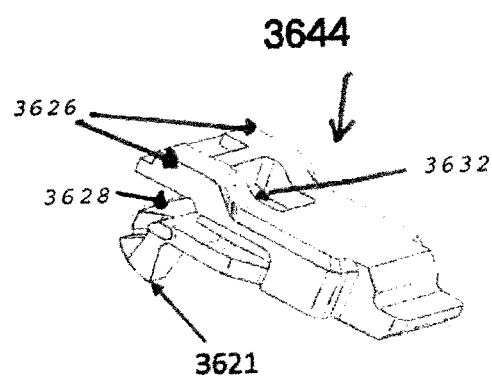
FIG. 36B is a perspective view of a removable anchor device.
Figure 36C:
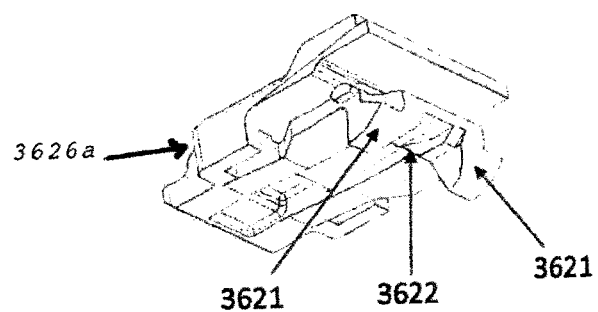
FIG. 36C is another perspective view of a removable anchor device.
Figure 37A:
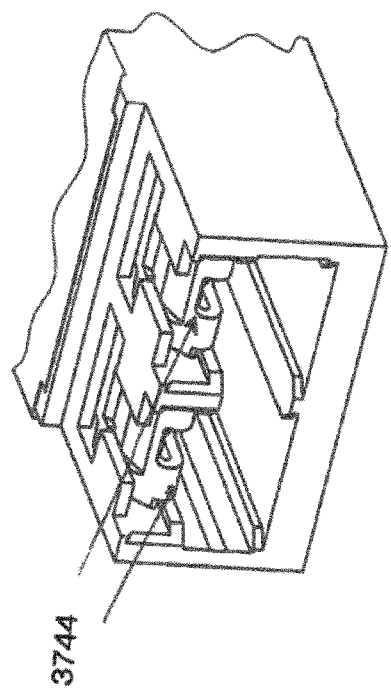
FIG. 37A is another a perspective view of a duplex adapter/transceiver with removable anchors installed.
Figure 44A:
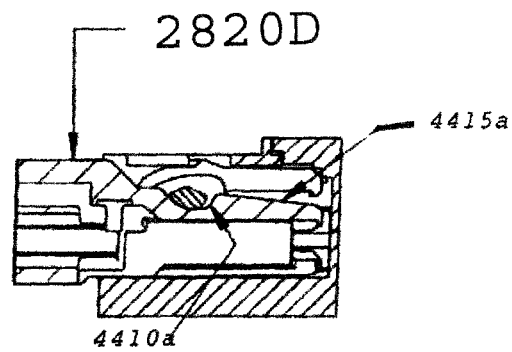
Figure 44B:
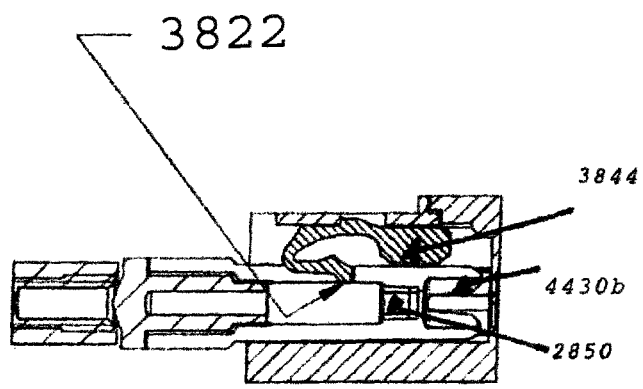
Figure 45A:
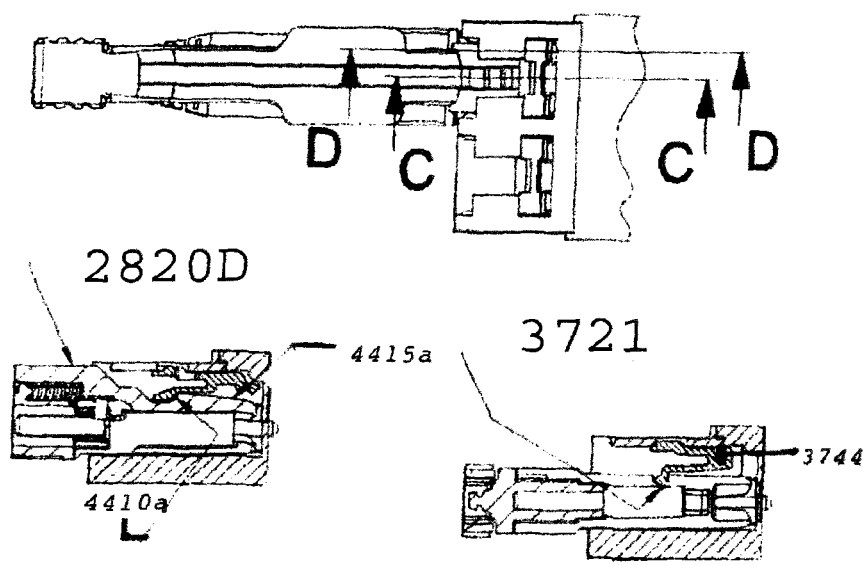
Figure 46A:
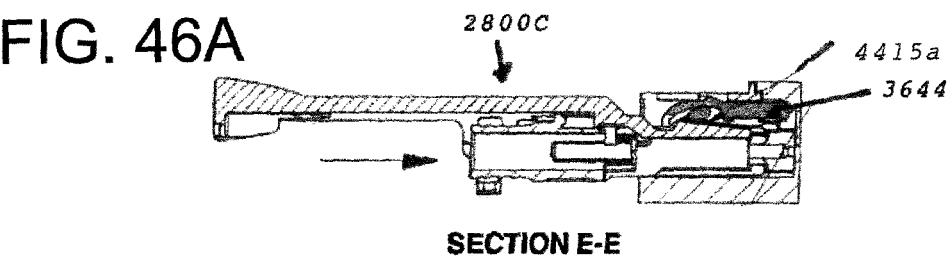
Figure 46B:
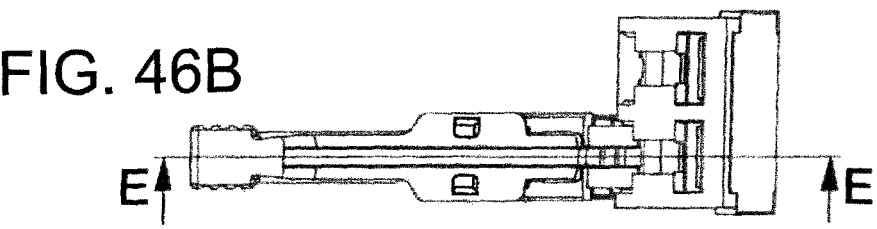
Figure 46C:
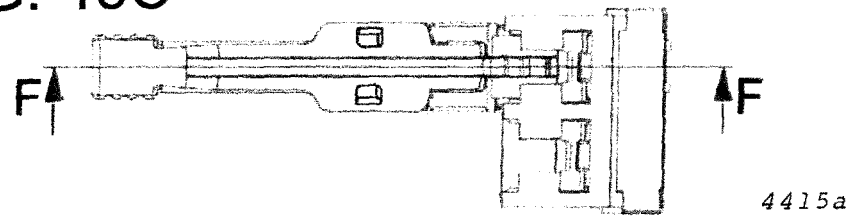
Figure 46D:
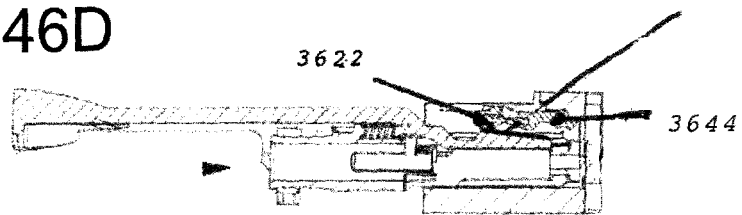
Figure 47A:
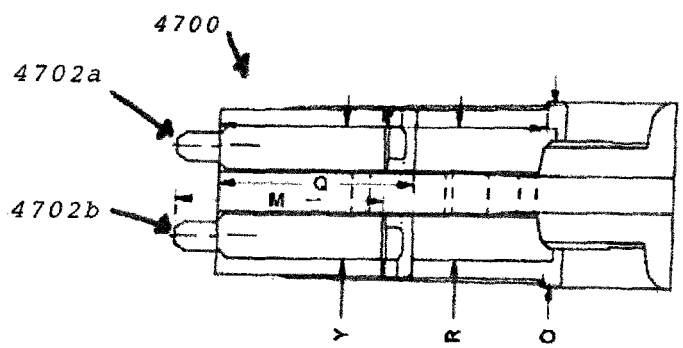
Figure 47B:
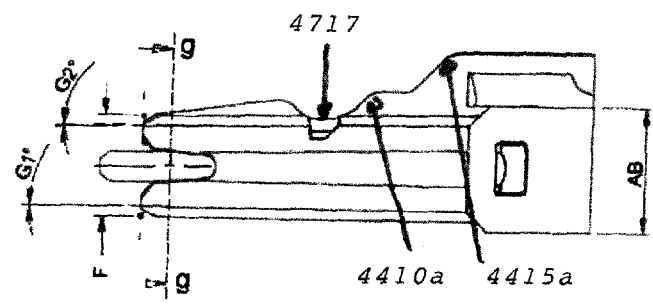
Figure 47C:
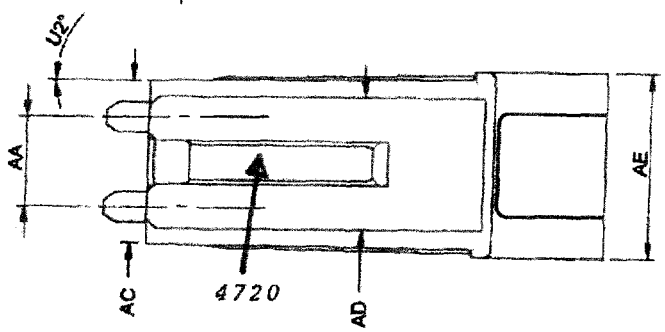
Figure 50A:
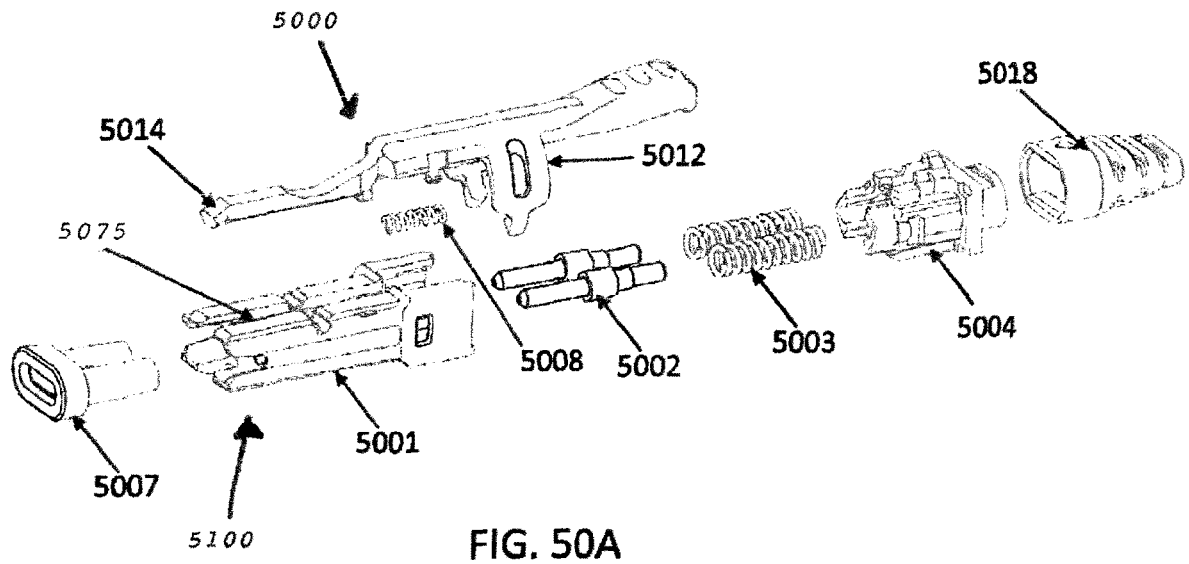
Figure 50B:
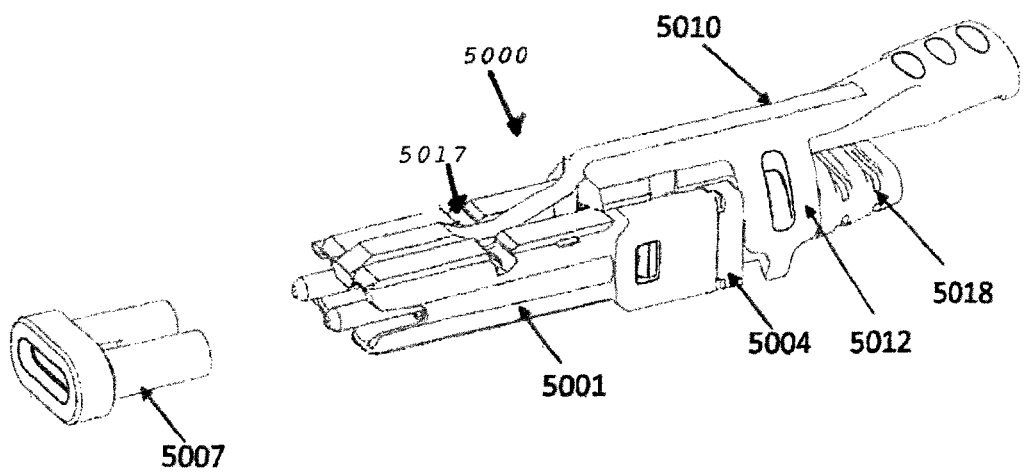
Figure 52C:
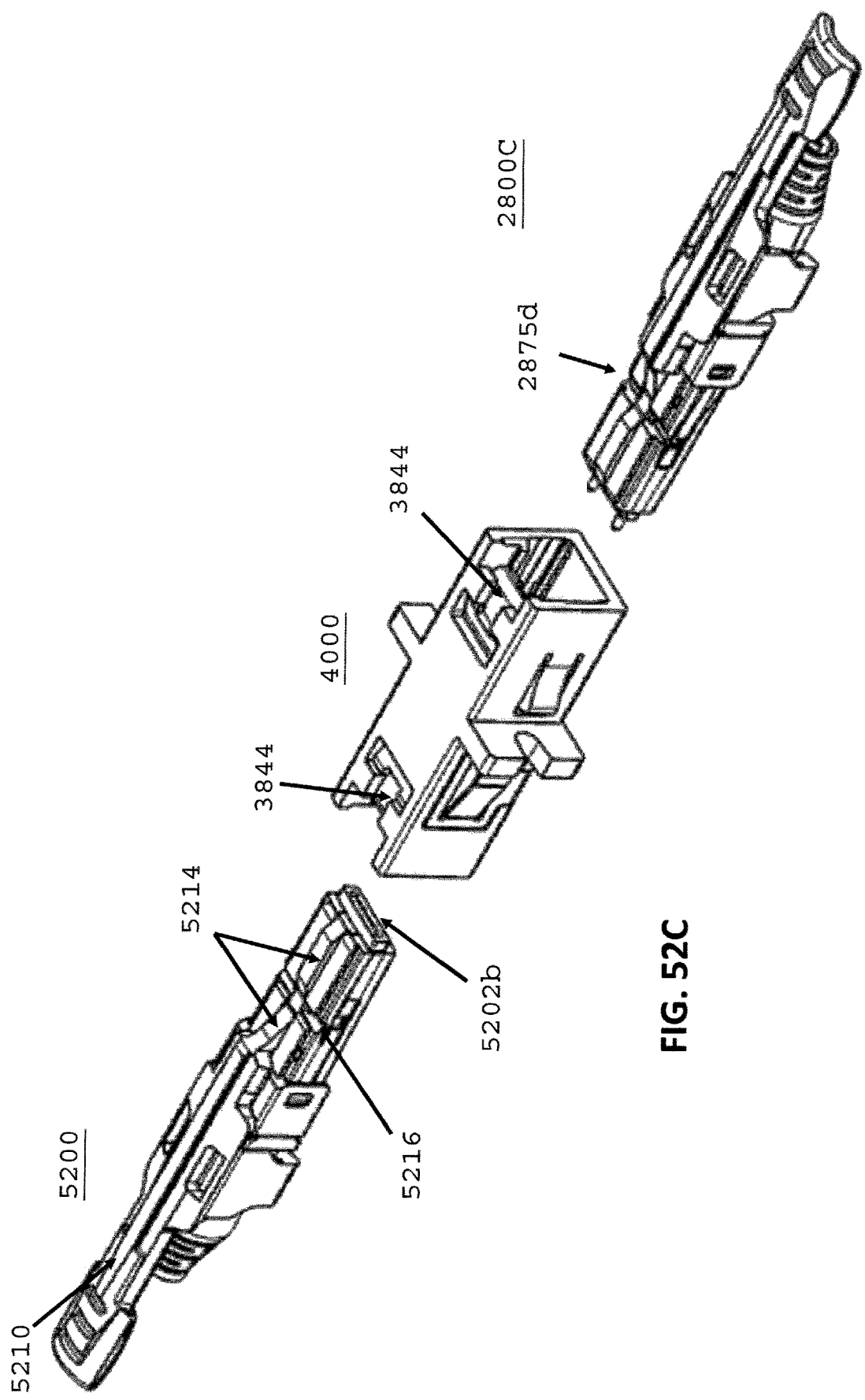
Figure 52D:
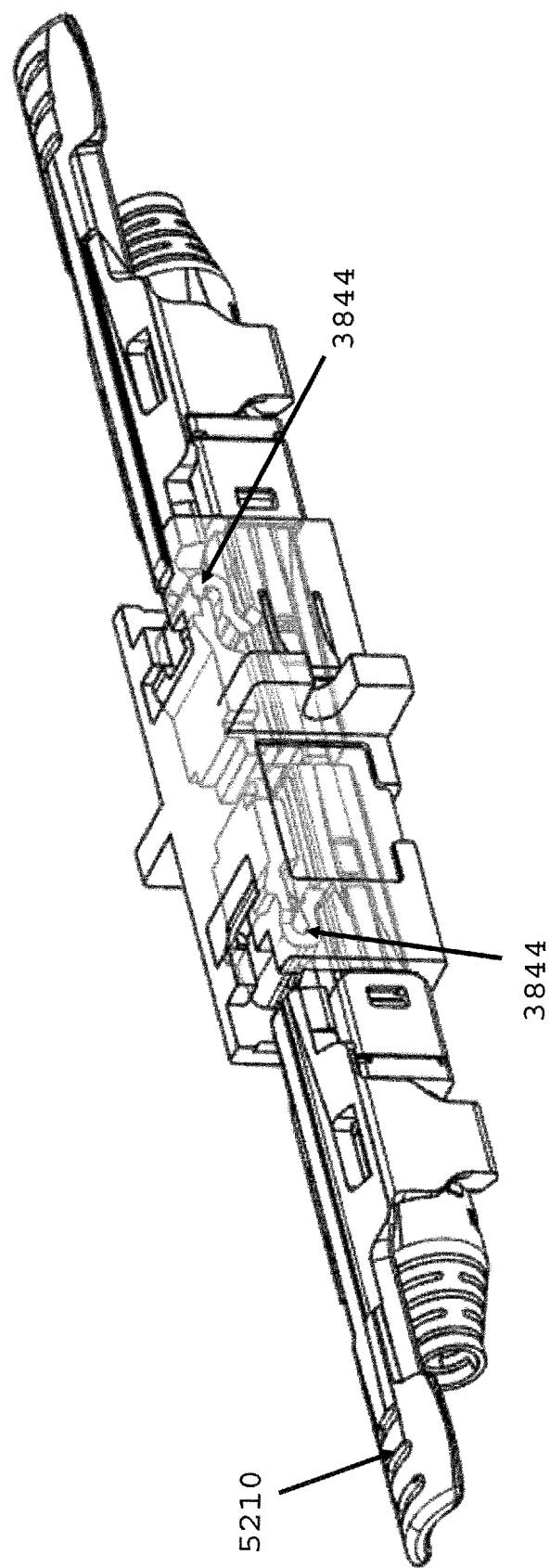
Figure 53A:
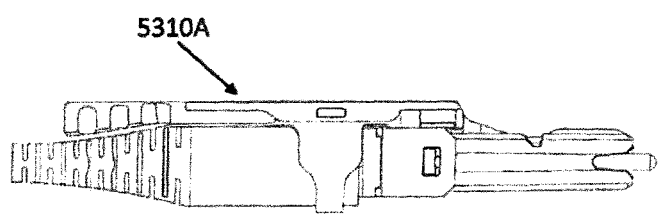
Figure 53B:
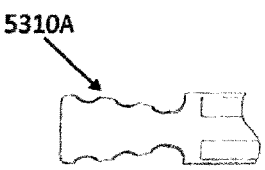
Figure 53C:
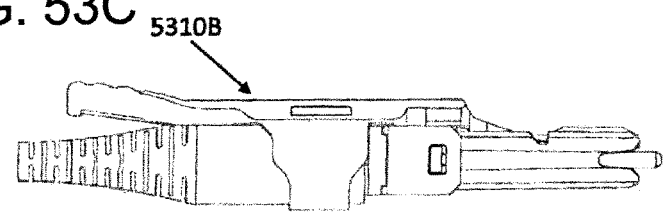
Figure 53D:
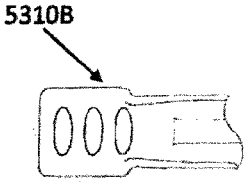
Figure 53E:
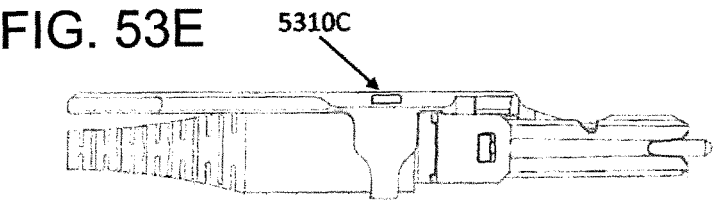
Figure 53F:
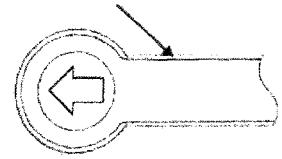
Figure 53G:
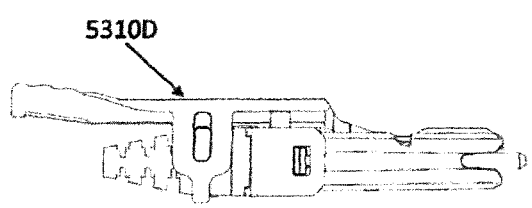
Figure 53H:
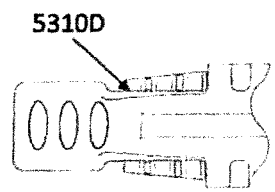
Figure 53I:
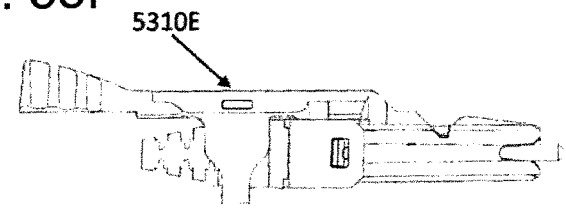
Figure 53J:
Figure 56A:
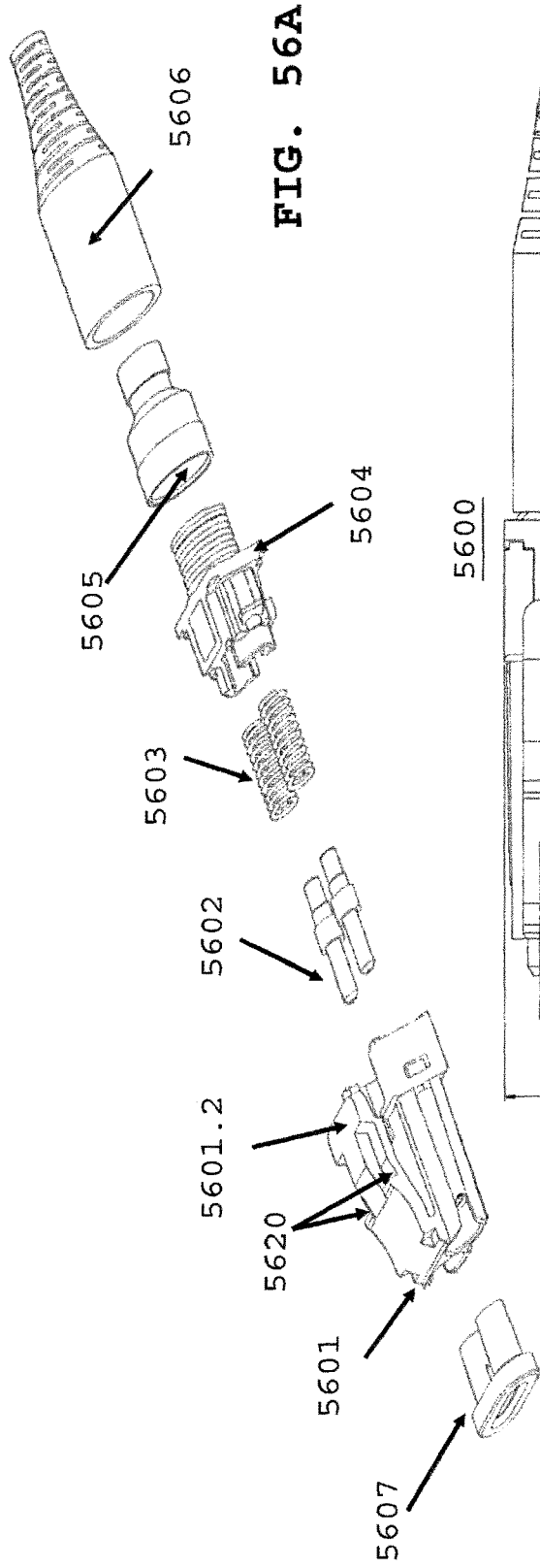
Figure 56B:
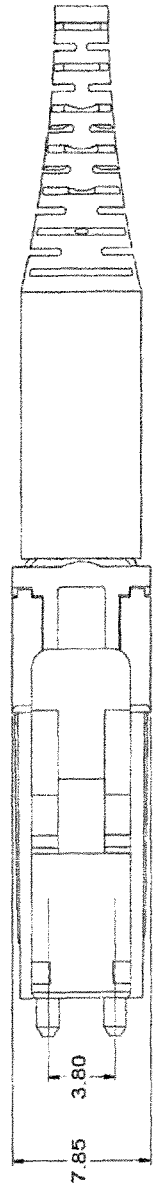
Figure 56C:
Figure 57A:
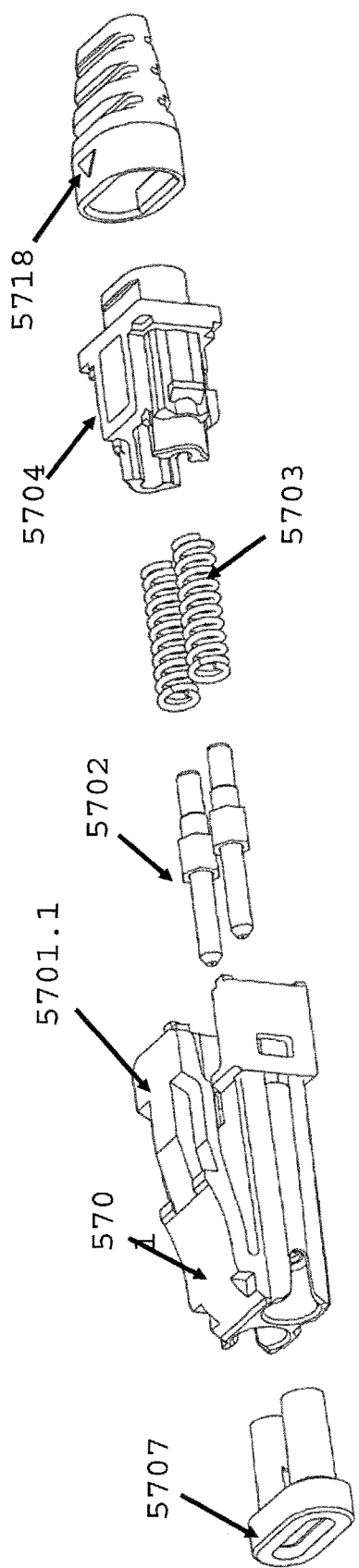
Figure 57B:
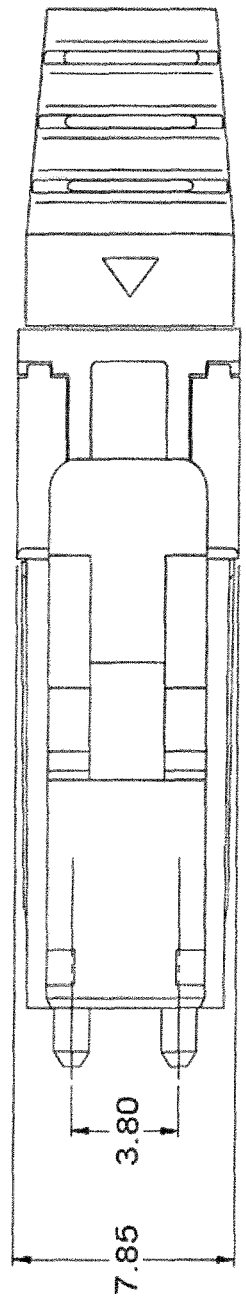
Figure 57C:
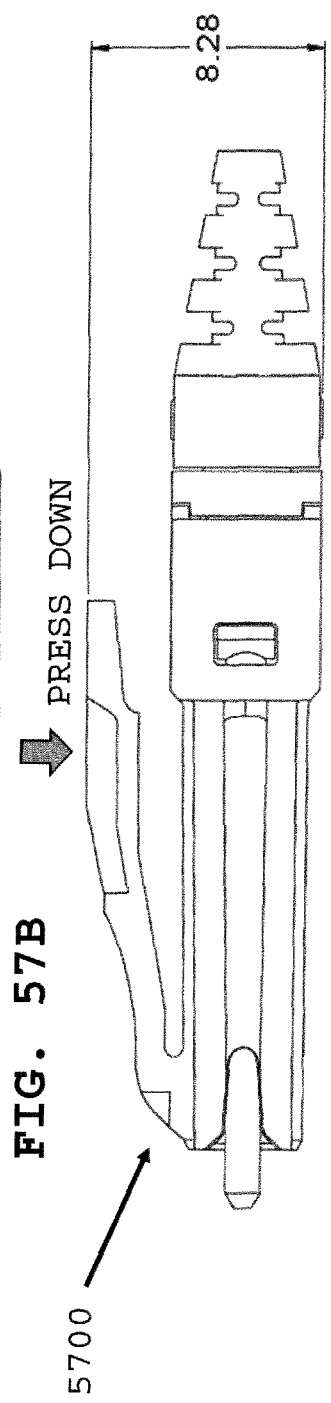
Figure 58C:
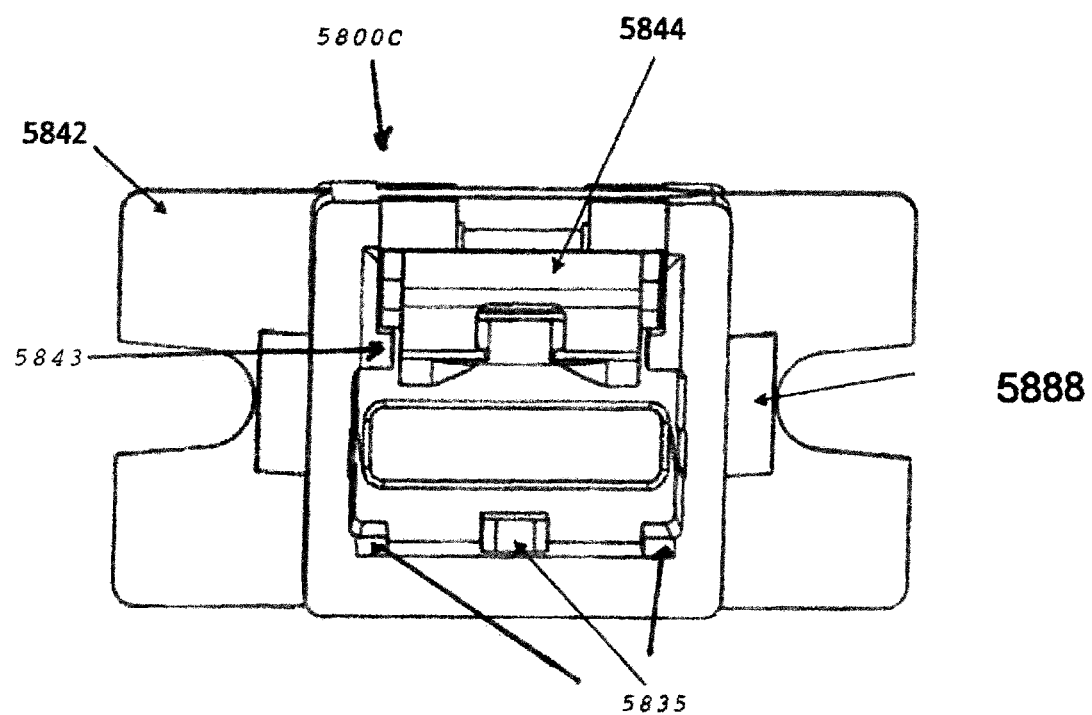
Figure 59H:
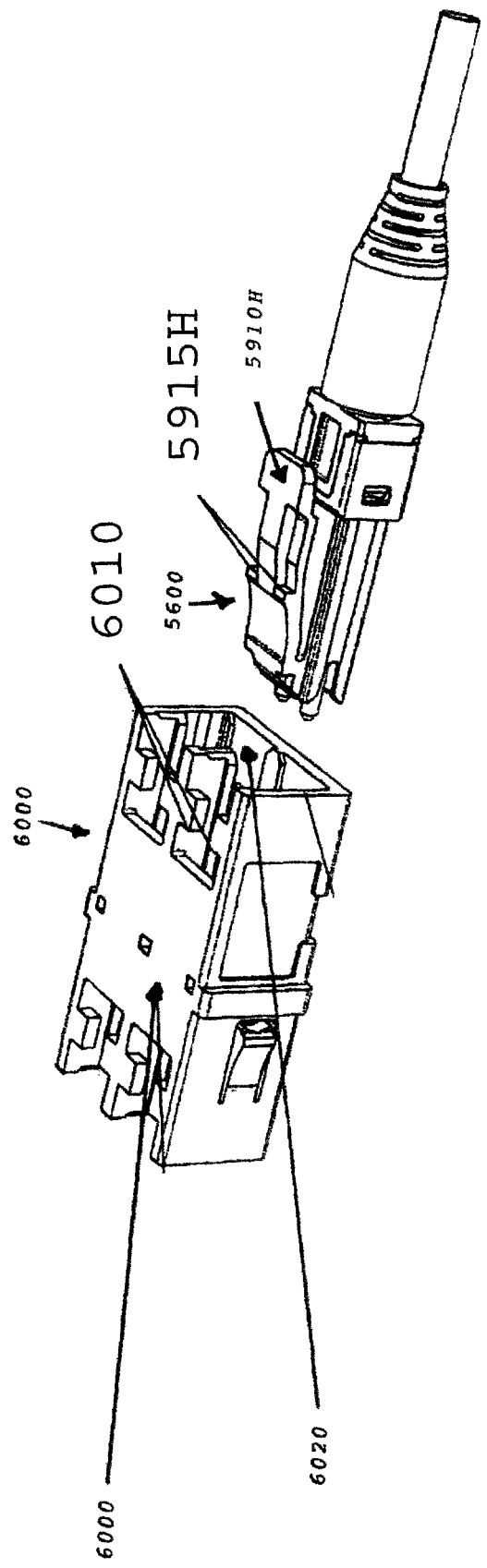
Figure 60A:
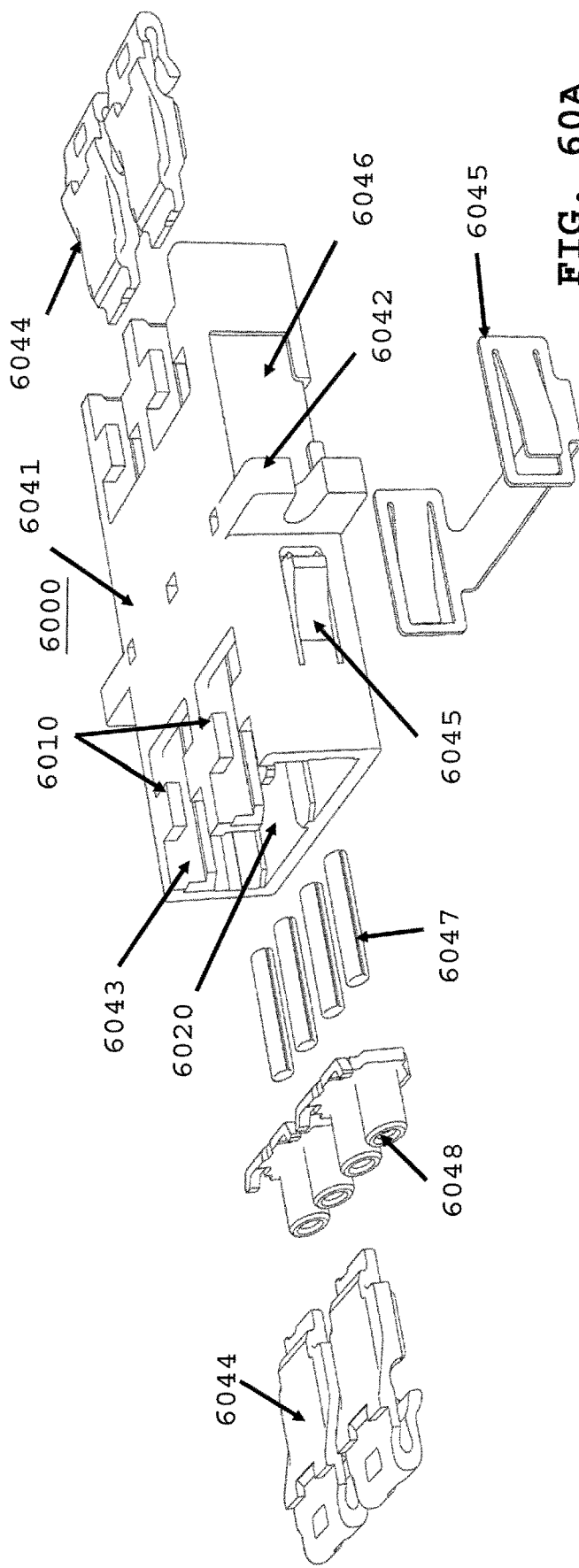

FIG. 42C.2 is a perspective of a reverse latch hook;

FIG. 42C.3 is the perspective of FIG. 42C partially broken away;

FIG. 42D is a cutaway side view of the pull release connector pulling the tab rearward first amount;

FIG. 42D.1 is a zoomed view of FIG. 42D;

FIG. 42D.2 is another zoomed view of FIG. 42D;

FIG. 42D.3 is a cutaway side view of the pull release connector pulling the tab rearward a second, further amount;

FIG. 42D.4 is a zoomed view of FIG. 42D.3;

FIG. 42D.5 another zoomed view of FIG. 42D.3;

FIG. 42E.1 is a cutaway view of a CS connector similar to FIG. 33A fully inserted into the adapter of FIG. 60A;

FIG. 42E.2 is a cutaway view of a CS connector similar to FIG. 33A fully inserted into the adapter of FIG. 60A;

FIG. 42F.1 is a cutaway view of a CS connector similar to FIG. 33A being removed in the direction of the arrow;

FIG. 42F.2 is a cutaway view of a CS connector similar to FIG. 33A being further removed in the direction of the arrow;

FIG. 42F.3 is a cutaway view of a CS connector similar to FIG. 33A released from the hook contained in the adapter of FIG. 60A;

FIG. 43 is a perspective view of a CS connecter;

FIG. 43A is a zoomed view of FIG. 43 illustrating a horizontal groove;

FIG. 44A is a side cutaway view of a CS connector inserted into an adapter/receiver;

FIG. 44B is another side cutaway view of a CS connector inserted into an adapter/receiver;

FIG. 45A shows an illustrative top view of a CS connector inserted into an adapter/receiver;

FIG. 45B is a section taken as indicated by line C-C of FIG. 45A;

FIG. 45C is a section taken as indicated by line D-D of FIG. 45A;

FIG. 46A is a section taken in the plane E-E of FIG. 46B;

FIG. 46B show an illustrative top view of a CS connector inserted into one of two receptacles in an adapter/receiver;

FIG. 46C shows an illustrative top view of a CS connector inserted into another of two receptacles of the adapter/receiver;

FIG. 46D is a section taken in the plane including line F-F of FIG. 46C;

FIG. 47A shows a dimensional detailed top view of the CS connector;

FIG. 47B shows a dimensional detailed side view of the CS connector;

FIG. 47C shows a dimensional detailed bottom view of the CS connector;

FIG. 48A shows a front view of another dimensional detailed view of the CS connector;

FIG. 48B is a lateral section of the CS connector of FIG. 48A;

FIG. 48C is a zoomed vertical and longitudinal section of the CS connector taken on line e-e of FIG. 48A;

FIG. 48D is a zoomed vertical and longitudinal section of the CS connector taken on line f-f of FIG. 48A;

FIG. 49A.1 shows a fan-out method for distributing the connection to a slower version of the system;

FIG. 49A.2 shows a cassette method for distributing the connection to a slower version of the system;

FIG. 49B shows an alternative for distributing the connection to a slower version of the system without requiring a fan-out and/or a cassette method;

FIG. 50A shows an exploded perspective view of a duplex connector of the pull release type with a dust cap;

FIG. 50B shows an assembled perspective view of FIG. 50A;

FIG. 51A.1 is a top view of a duplex (2 fiber) connector of the push/pull release type with a pull tab housing configured to engage the connector outer housing;

FIG. 51A.2 is a side view of the connector of FIG. 51A.1;

FIG. 51B.1 is a top view of a duplex (2 fiber) connector with behind the wall (BTW) boot of the push/pull release type with a pull tab housing configured to engage the connector outer housing;

FIG. 51B.2 is a side view of the connector of FIG. 51B.1;

FIG. 52A is an exploded perspective view of a male MPO connector of FIG. 52B;

FIG. 52B is an assembled view of a female MPO connector of FIG. 51B.1;

FIG. 52C is a perspective view prior to insertion into an adapter of the MPO connector of FIG. 52B (at left side of adapter) and the male MPO connector of FIG. 52A (on right side of adapter);

FIG. 52D is the fully inserted view of the connectors of FIG. 52C with the shadow lines showing the hook (of FIG. 38B) engaged the latch recess as shown in FIGS. 42A-B;

FIG. 52E is a perspective view of a MT thin ferule for a compact, low profile connector of the type shown in FIG. 52B;

FIG. 53A is a side view of a connector having a push/pull tab of a first embodiment;

FIG. 53B is a zoomed top view of the push/pull tab of FIG. 53A;

FIG. 53C is a side view of a connector having a push/pull tab of a second embodiment;

FIG. 53D is a zoomed top view of the tab of FIG. 53C;

FIG. 53E is a side view of a connector having a push/pull tab of a third embodiment;

FIG. 53F is a zoomed top view of the tab of FIG. 53E;

FIG. 53G is a side view of a connector having a push/pull tab of a fourth embodiment;

FIG. 53H is a zoomed top view of the tab of FIG. 53G;

FIG. 53I is a side view of a connector having a push/pull tab (or knob) of a fifth embodiment;

FIG. 53J is a zoomed top view of the knob of FIG. 53I;

FIG. 54A is a top, side perspective view of the bend latch push/pull type compact, low profile connector in the up position;

FIG. 54A.1 is a zoomed view of the low profile connector of FIG. 54A;

FIG. 54B is a top perspective view of the bend latch push/pull type connector in the flush position;

FIG. 54B.1 is a zoomed view of the low profile connector of FIG. 54B;

FIG. 54C is a side view perspective view of the bend latch push/pull type in the up position;

FIG. 55A is a perspective view of a pull release connector prior to attaching the pull tab onto connector body;

FIG. 55B is a side view of the push/pull type tab attached to the connector body;

FIG. 55C is a side perspective view of the push/pull type tab attached to the connector body;

FIG. 56A is an exploded perspective view of the CS connector with a latch having a ruggedized boot;

FIG. 56B is a top view of the assembled CS connector of FIG. 56A;

FIG. 56C is a side view of the assembled CS connector of FIG. 56A;

FIG. 57A is an exploded perspective view of the CS connector with latch having a behind the wall (BTW) boot;

FIG. 57B is a top view of the assembled CS connector of FIG. 57A;

FIG. 57C is a side view of the assembled CS connector of FIG. 57A showing direction of latch movement to release from adapter port housing (not shown);

FIG. 58A is an exploded perspective view of an adapter with a flange receiving a hook of FIG. 36A, 37A or 38A in a port of the adapter housing;

FIG. 58B is a front perspective view of an adapter port of FIG. 58A after receiving a hook of FIG. 36A, 37A or 38A showing alignment sleeve holder of FIG. 60F configured to accept a push/pull type duplex connector;

FIG. 58C is a front view of adapter port for receiving a MPO connector of FIG. 52 with hook installed for push/pull MPO type connector;

FIG. 58D is a top view of a push/pull type CS connector with a BTW boot;

FIG. 58D.1 is a side view of the connector of FIG. 58D;

FIG. 59A.1 is a perspective view from a first vantage of a low profile duplex (2 fiber) adapter with a mounting flange for panel mounting with hook inserted for receiving a push/pull type CS connector of FIG. 58D;

FIG. 59A.2 is a perspective view of the connector of FIG. 59A.1 from a second vantage;

FIG. 59B.1 is a perspective view from a first vantage of a low profile duplex (2 fiber) flangeless adapter of FIGS. 59A.1 and 59A.2;

FIG. 59B.2 is a perspective view of the connector of FIG. 59B.1 from a second vantage;

FIG. 59C.1 is a perspective front view of a dual port (4 fiber) low profile adapter without hooks of FIG. 36A-C, 37A-C or 38A-C installed and alignment sleeve holder installed (top view);

FIGS. 59C.2-59C.3 are perspective views just prior to installing hooks into an adapter;

FIGS. 59C.4-59C.5 are a perspective front views after hooks installed (bottom view);

FIG. 59D.1 is a side view of a CS connector of FIG. 53C being released by pulling on the tab in the direction of the arrow a first amount;

FIG. 59D.2 is a zoomed view of the connector of FIG. 59D;

FIG. 59D.3 is a zoomed view of the connector of FIG. 59D with the tab pulled somewhat farther than in FIG. 59D.1;

FIG. 59E.1 is a side view of a CS connector of FIG. 53C being released by pulling on the tab in the direction of the arrow pulled a second, farther amount;

FIG. 59E.2 is a zoomed view of the connector of FIG. 59E.1;

FIG. 59E.3 is an enlarged fragment of the connector of FIG. 59E.1 pulled somewhat farther than in FIG. 59E.2;

FIG. 59F.1 is a perspective view of a low profile dual port (4 fiber) adapter;

FIG. 59F.2 is a perspective view of the adapter of FIG. 59F.1 being fitted with an adapter hook of FIGS. 36A-C;

FIG. 59F.3 is a perspective view of the adapter with hooks of FIG. 59F.2 inserted;

FIG. 59F.4 is a perspective view of the adapter with hooks of FIG. 59F.3 with a push/pull connector of FIG. 53C prior to insertion into the adapter;

FIG. 59F.5 is a perspective view of the connector of FIG. 59F.4 inserted into adapter port to allow conversion of adapter from latch type (FIGS. 56A-C) to push/pull type (FIG. 53C);

FIG. 59G.1 is a perspective view of an adapter without hooks;

FIG. 59G.2 is a perspective view of the adapter of FIG. 59G.1 and a latch CS connector or bend latch connector prior to insertion into the adapter;

FIG. 59G.3 is a perspective view of a low profile dual port (4 fiber) adapter without hooks of FIG. 36A-C, 37A-C or 38A-C illustrating the insertion of a latch CS connector or bend latch CS connector into an adapter;

FIG. 59H is a perspective view of a low profile dual port (4 fiber) adapter without hooks prior to insertion of a CS connector configured as a latch type.

Figure 60B:
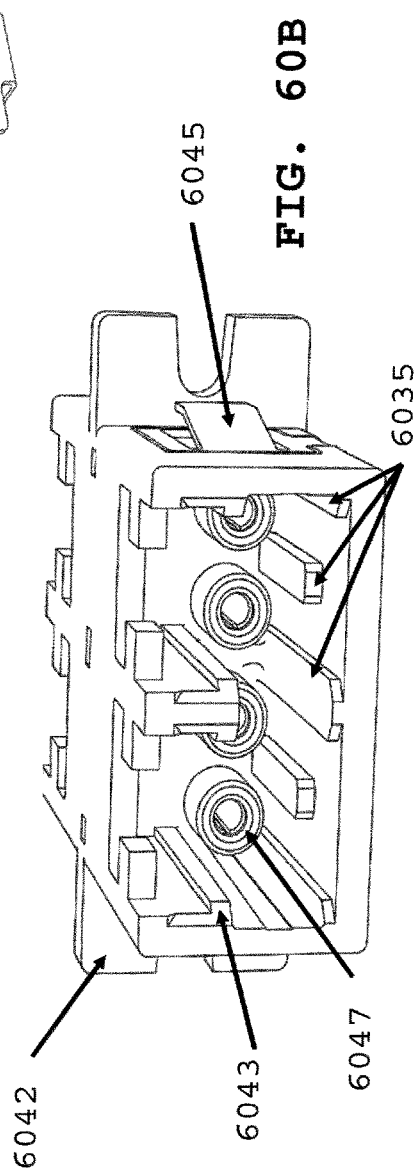
Figure 62A:
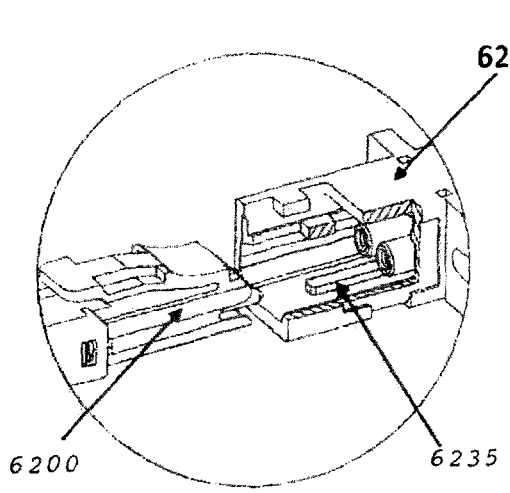
Figure 62B:
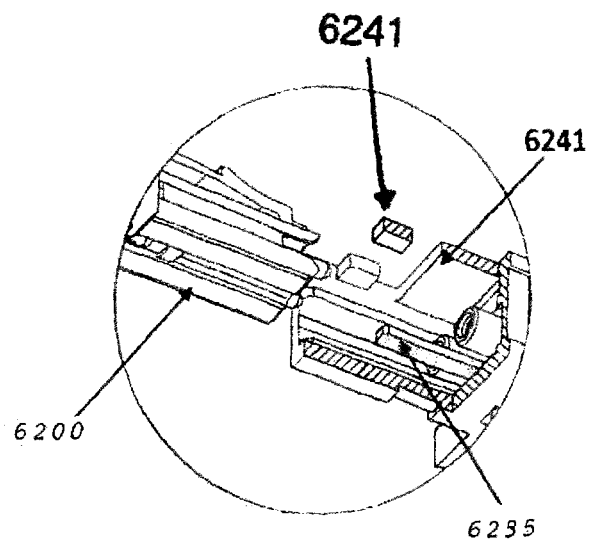
Figure 62C:
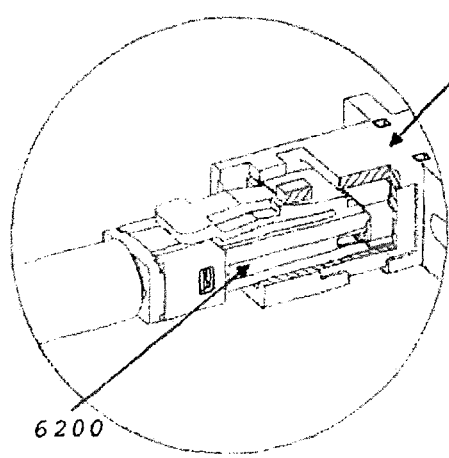
Figure 62D:
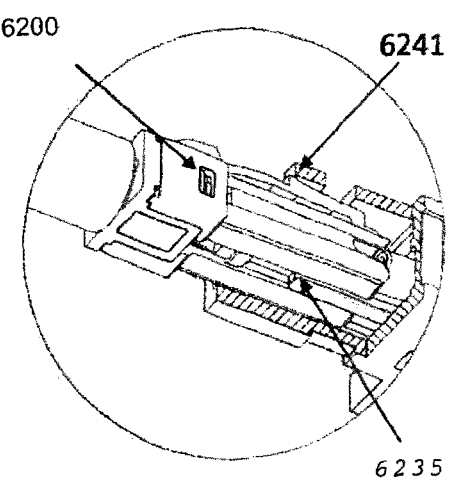
Figure 62E:
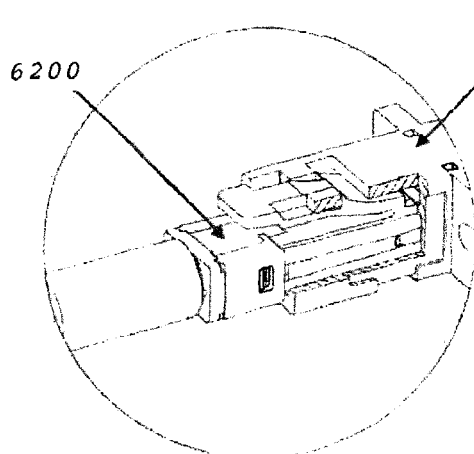
Figure 62F:
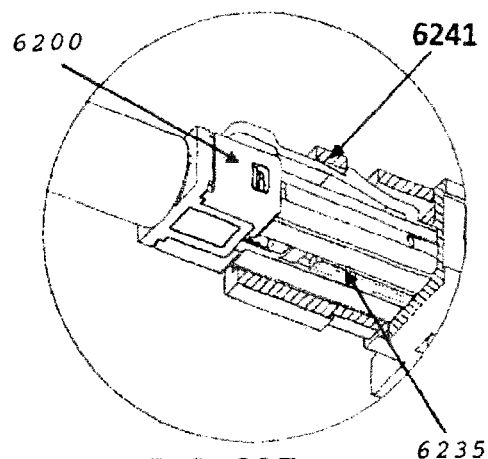
Figure 64A:
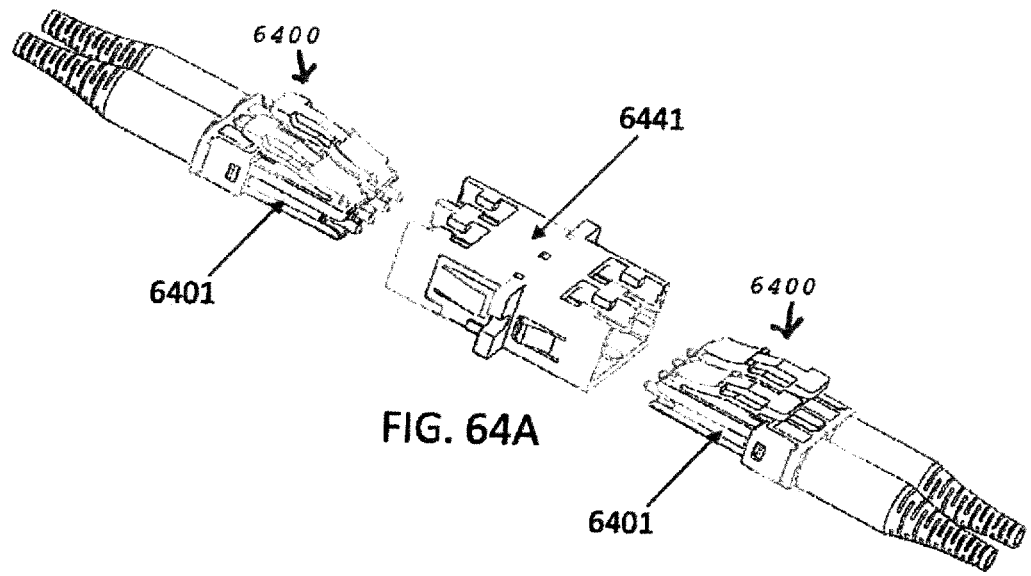
Figure 64B:
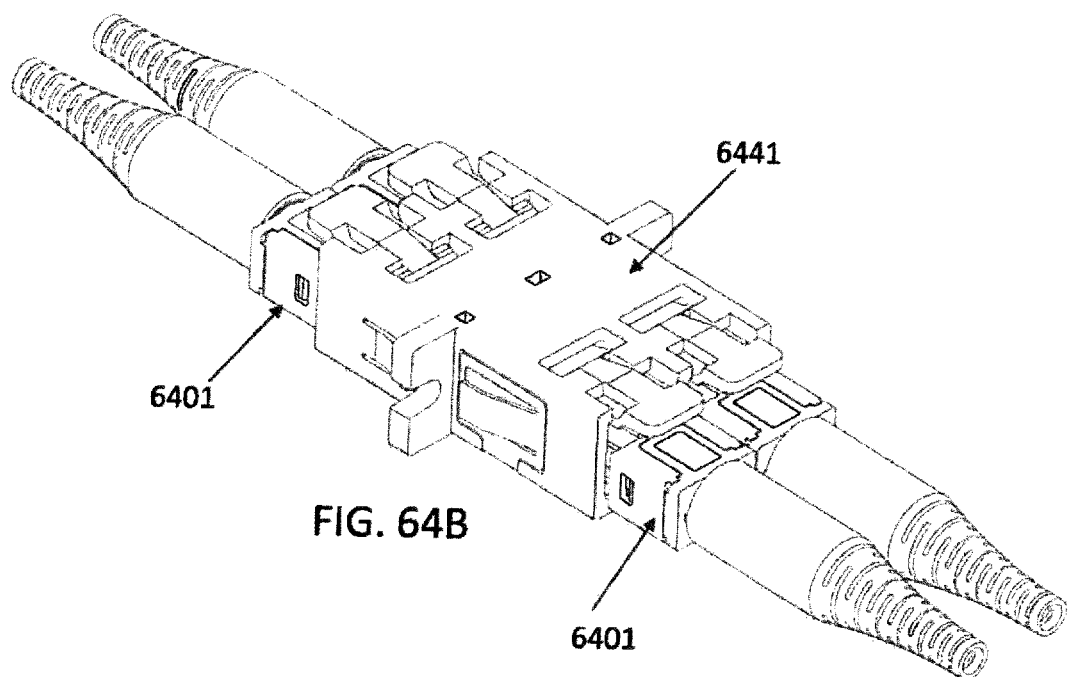
Figure 66A:
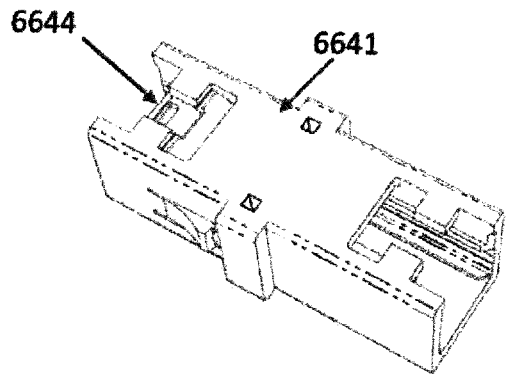
Figure 66B:
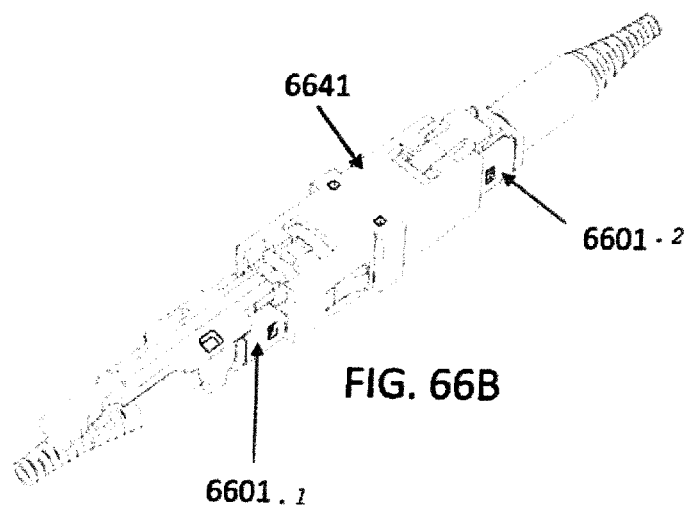
Figure 68B:
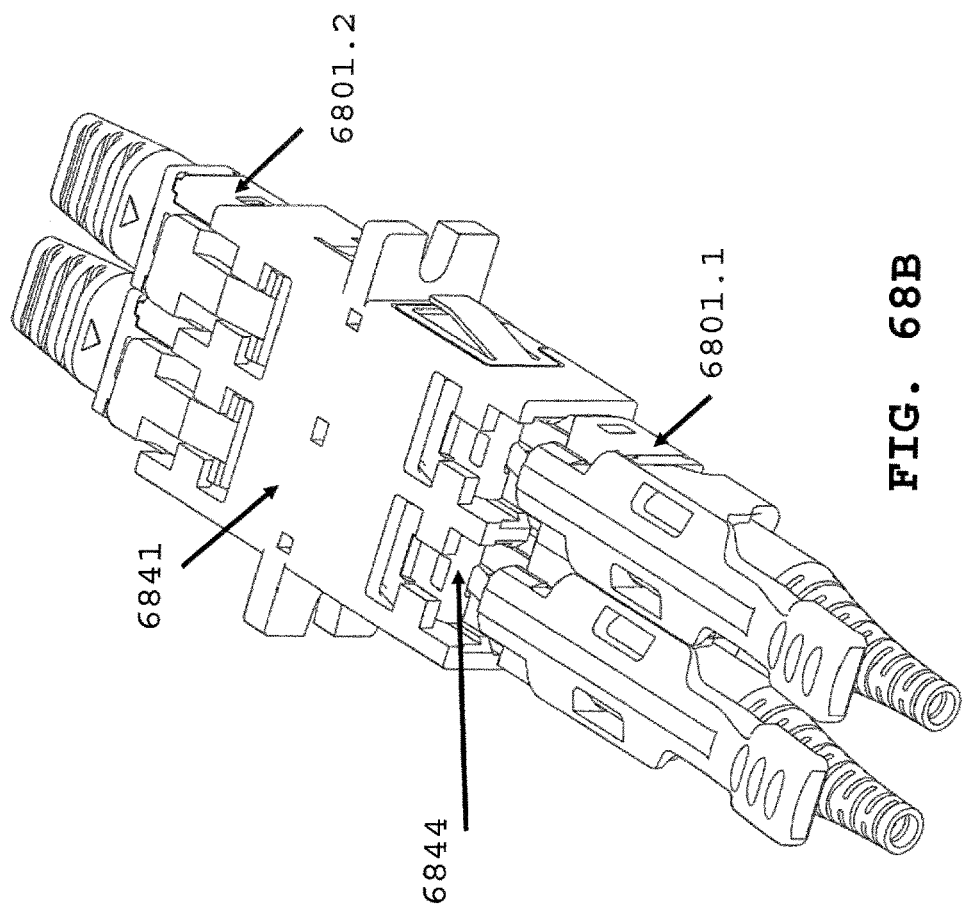
Figure 68A:
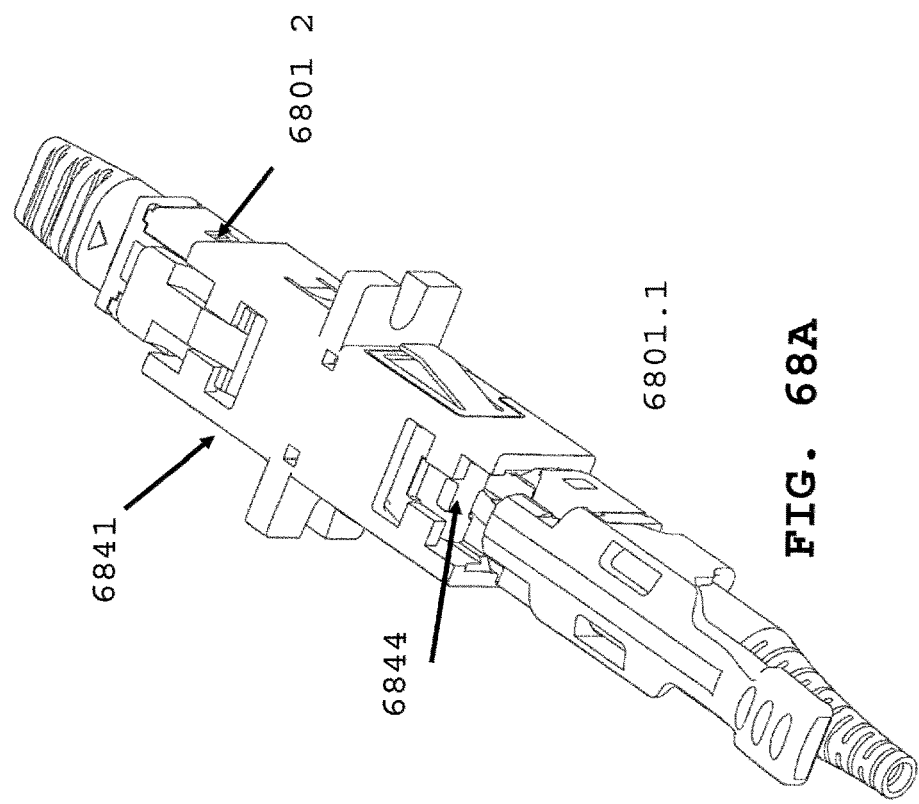

FIG. 60A is an exploded perspective view of low profile dual port (4 fiber) adapter with hooks of FIG. 36A, 37A or 38A;

FIG. 60B is a front perspective view of low profile dual port (4 fiber) adapter without hooks and inserted alignment sleeve holder of FIG. 60A;

FIG. 60C is an exploded perspective view with a section view of a port of a low profile dual port (4 fiber) adapter;

FIG. 60D is the perspective view of FIG. 60C with the sleeves inserted into an adapter housing port;

FIG. 60D.1 is a zoomed view from FIG. 60D;

FIG. 60E is a zoomed view of the FIG. 60C section view with the sleeves inserted and the alignment sleeve holders partially inserted into an adapter housing port;

FIG. 60F is a perspective view of FIG. 60C perspective view with the sleeve and alignment sleeve holder fully inserted into an adapter housing port;

FIG. 60F.1 is a zoomed view of FIG. 60F;

FIG. 60G is a bottom perspective view of adapter;

FIG. 60G.1 is a zoomed view of FIG. 60F from the bottom of the adapter;

FIG. 60H is a cutaway side view of an alignment sleeve holder fully inserted into an adapter housing port;

FIG. 60H.1 is a zoomed view showing the cuts of an alignment sleeve holder fully inserted into an adapter housing port;

FIG. 61A.1 is a perspective view of a flanged dual port (4 fiber) low profile adapter from a first vantage;

FIG. 61A.2 is a perspective of the adapter of FIG. 61A.1 from a second vantage;

FIG. 61B.1 is a perspective view of a flangeless dual port (4 fiber) low profile adapter from a first vantage;

FIG. 61B.2 is a perspective of the adapter of FIG. 61B.1 from a second vantage;

FIG. 61C is a front perspective view of a dual port (4 fiber) low profile adapter with hooks inserted, and a top view of the same;

FIG. 61C.1 is a top perspective view of FIG. 61C;

FIG. 62A is a zoomed view just prior to insertion of a latch type connector (e.g. FIG. 56A-C or 57A-C) into a duplex (2 fiber) low profile adapter housing port without a hook;

FIG. 62B is a zoomed view showing structural contact points within adapter housing that engage a latch type connector (e.g. FIG. 56A-C or 57A-C);

FIG. 62C is a zoomed side view showing a latch type connector partially inserted into a duplex (2 fiber) low profile adapter housing port without a hook;

FIG. 62D is a zoomed bottom view showing a latch type connector partially inserted into a duplex (2 fiber) low profile adapter housing port without a hook;

FIG. 62E is a zoomed top-side view showing a latch type connector fully inserted into a duplex (2 fiber) low profile adapter housing port without a hook;

FIG. 62F is a zoomed bottom-side view showing a latch type connector fully inserted into a duplex (2 fiber) low profile adapter housing port without a hook;

FIG. 62G is a cutaway view of a latch type CS connector similar to FIGS. 56A-C fully inserted into an adapter of FIG. 60A;

FIG. 62H is a cutaway view of FIG. 62G where the connector latch is being pressed in the direction of the arrow to being releasing from the adapter port;

FIG. 62I is a cutaway view of FIG. 62H where the connector is being pulled in the direction of the arrow to complete the releasing from the adapter port;

FIG. 63A is a perspective view prior to insertion of a latch type connector into either side a duplex (2 fiber) low profile adapter;

FIG. 63B is a perspective view of fully inserted latch type connectors into both sides of a duplex (2 fiber) low profile adapter;

FIG. 63C.1 is a cutaway perspective of the connector in the adapter housing with the latch depressed (e.g., FIGS. 57A-C) prior to removal of the connector from the adapter housing, in the direction of the arrow, without a hook;

FIG. 63C.2 is a zoomed view of FIG. 63C.1;

FIG. 63C.3 is a further enlargement of FIG. 63C.2, but indicating a direction of removal of the connector from the adapter housing;

FIG. 63C.4 is a cutaway perspective view of the connector and the adapter housings showing partial removal of the connector from the adapter housing;

FIG. 63C.5 is a zoomed view of FIG. 63C.4;

FIG. 64A is a perspective view of prior to insertion of two duplex latch type (e.g. FIGS. 57A-C) connectors, on either side of the dual (4 fiber) low profile adapter housing without hooks;

FIG. 64B is a perspective view after insertion of two duplex latch type (e.g. FIGS. 57A-C) connectors, on either side of the dual (4 fiber) low profile adapter housing without hooks;

FIG. 65A is a perspective view before insertion into a low profile duplex (2 fiber) adapter housing of a crimp boot latch type connector into a first port and a behind the wall (BTW) latch type connector into a second port;

FIG. 65B is a perspective view after insertion into a low profile duplex (2 fiber) adapter housing of a crimp boot latch type connector into a first port and a behind the wall (BTW) latch type connector into a second port;

FIG. 66A is a perspective view of a duplex (2 fiber) adapter without flanges configured at a first adapter port with a hook and at a second adapter port without hook;

FIG. 66B is a perspective view of the FIG. 66A adapter with a latch type connector inserted into the second adapter port and a push/pull type connector inserted into the first adapter port;

FIG. 67A is a perspective view of a dual port (4 fiber) adapter without flanges configured at a first adapter port with hooks and at a second adapter port without hooks;

FIG. 67B is a perspective view of a dual port (4 fiber) adapter with a push/pull connector inserted into the first adapter port and a latch type connector inserted into the second adapter port;

FIG. 68A is a perspective view of a duplex (2 fiber) adapter with flanges and a latch type connector inserted into a first port and a push/pull type connector inserted into a second port of the low profile adapter;

FIG. 68B is a perspective view of a dual (4 fiber) adapter with flanges and two latch type connectors inserted into one side and two push/pull type connectors inserted into a second side of the low profile adapter;

FIG. 69A.1 is a side view of a tool to remove a hook from an adapter housing port;

FIG. 69A.2 is a front view of the tool of FIG. 69A.1;

FIG. 69A.3 is a section of the tool as indicated by the section line on FIG. 69A.2;

FIG. 69B is a perspective view of the tool of FIG. 69A.1 being connected to a hook of FIG. 36A, 37A or 38A;

FIG. 70A is a zoomed section view of the tool of FIGS. 69A.1-69A.3 attached to the hook inserted in the adapter housing port;

FIG. 70B is a perspective view of the tool of FIGS. 69A.1-69A.3 attached to the hook inserted in the adapter housing port as shown in FIG. 70A;

FIG. 70C is a zoomed section view of the tool of FIGS. 69A.1-69A.3 attached to the hook partially removed from the adapter housing port;

FIG. 70D is a perspective view of the tool of FIGS. 69A.1-69A.3 attached to the hook partially removed from the adapter housing port as shown in FIG. 70C;

FIG. 70E is a zoomed section view of the tool of FIGS. 69A.1-69A.3 attached to the hook fully removed from the adapter housing port; and FIG. 70F is a perspective view of the tool of FIGS. 69A.1-69A.3 attached to the hook fully removed from the adapter housing port as shown in FIG. 70E.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A connector, as used herein, refers to a device and/or component thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide a remote release mechanism such that a user can remove cable assembly connectors that are closely spaced together on a high-density panel without damaging surrounding connectors, accidentally disconnecting surrounding connectors, disrupting transmissions through surrounding connectors, and/or the like. Various embodiments also provide narrow pitch LC duplex connectors and narrow width multi-fiber connectors, for use; for example, with future narrow pitch LC SFPs and future narrow width SFPs. The remote release mechanisms allow use of the narrow pitch LC duplex connectors and narrow width multi-fiber connectors in dense arrays of narrow pitch LC SFPs and narrow width multi-fiber SFPs.

Figures 1A, 1B:
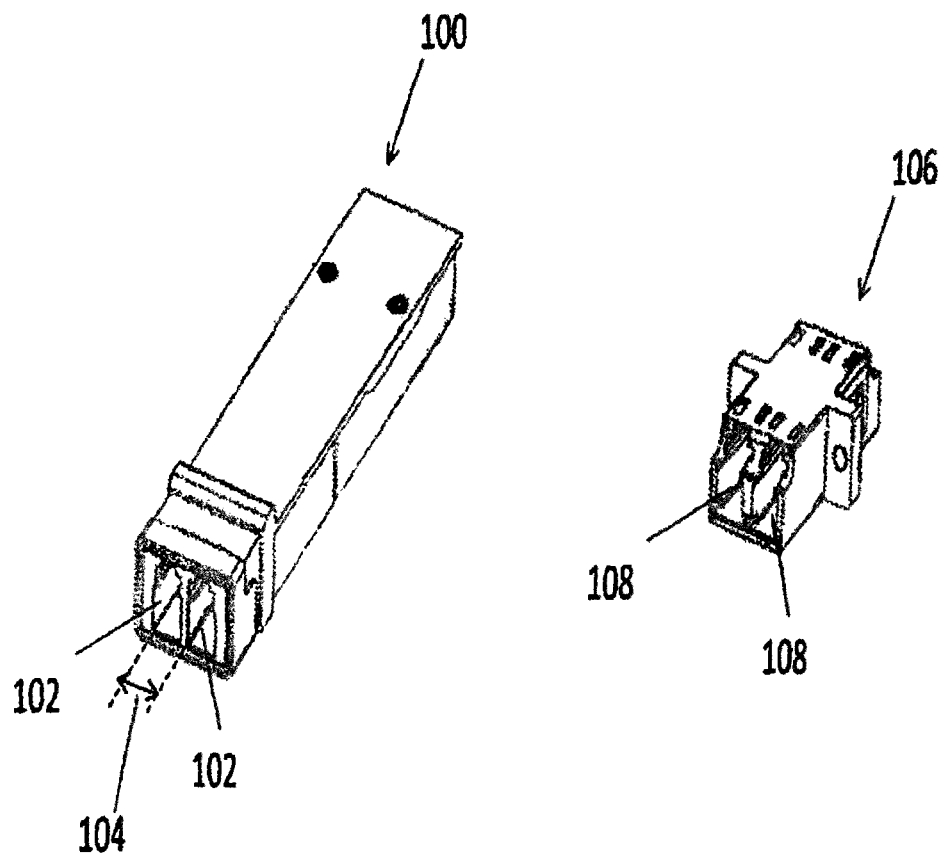
FIG. 1A is a perspective view of a prior art standard 6.25 mm pitch LC connector SFP.
FIG. 1B is a perspective view of a prior art standard 6.25 mm pitch LC adapter.
Figures 1C, 1D:
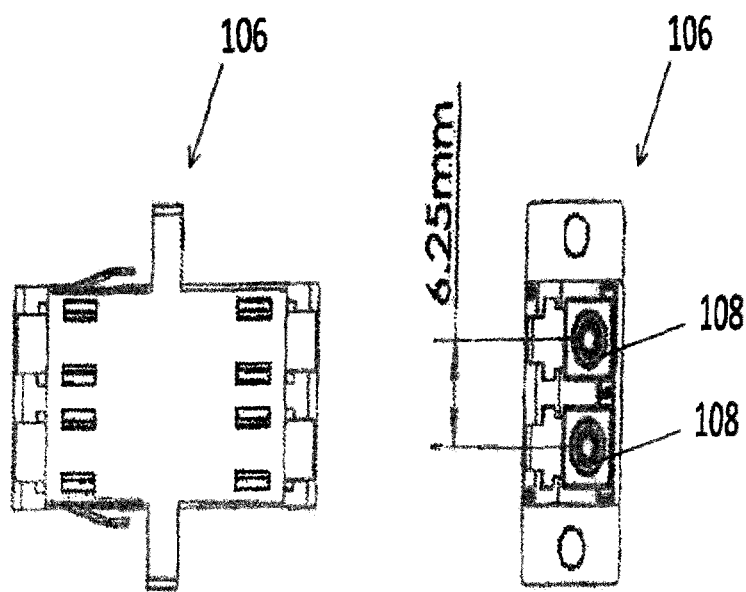
FIG. 1C is a top view of the prior art adapter of FIG. 1B.
FIG. 1D is a front view of the prior art adapter of FIG. 1B, showing the 6.25 mm pitch.

FIG. 1A shows a perspective view of a prior art standard 6.25 mm pitch LC connector SFP 100. The SFP 100 is configured to receive a duplex connector and provides two ports 102, each for receiving a respective LC connector. The pitch 104 is defined as the axis-to-axis distance between the central longitudinal axes of each of the two ports 102. FIG. 1B shows a perspective view of a prior art standard 6.25 mm pitch LC adapter 106. The adapter 106 is also configured to receive a duplex connector, and provides two ports 108, each for receiving a respective LC connector. FIG. 1C is a top view of the adapter 106 of FIG. 1B. The pitch of the adapter 106 is defined similarly to that of the SFP 100, as the axis-to-axis distance between the central longitudinal axes of each of the two ports 108, as illustrated in FIG. 1D, which shows a front view of the adapter 106.

Figures 2A, 2B:
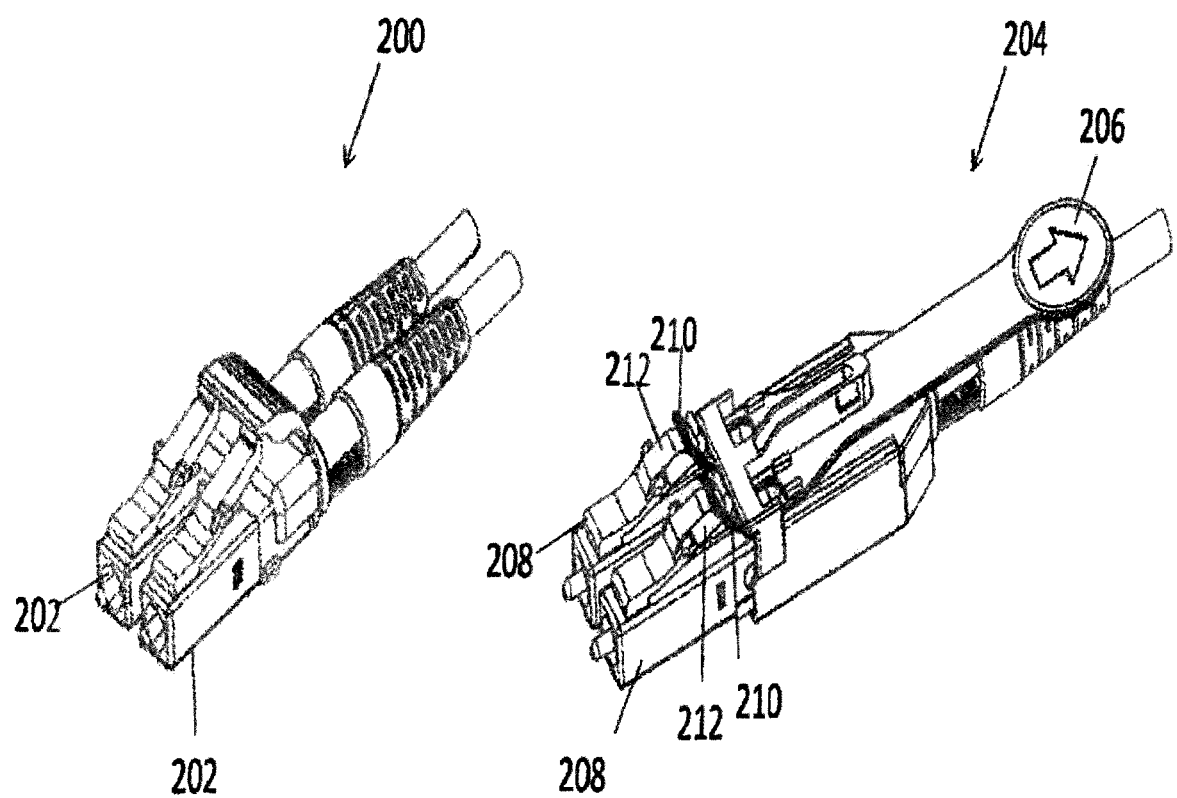
FIG. 2A is a perspective view of a prior art LC duplex connector.
FIG. 2B is a perspective view of a prior art LC duplex connector with a remote release pull tab.
Figures 2C, 2D:
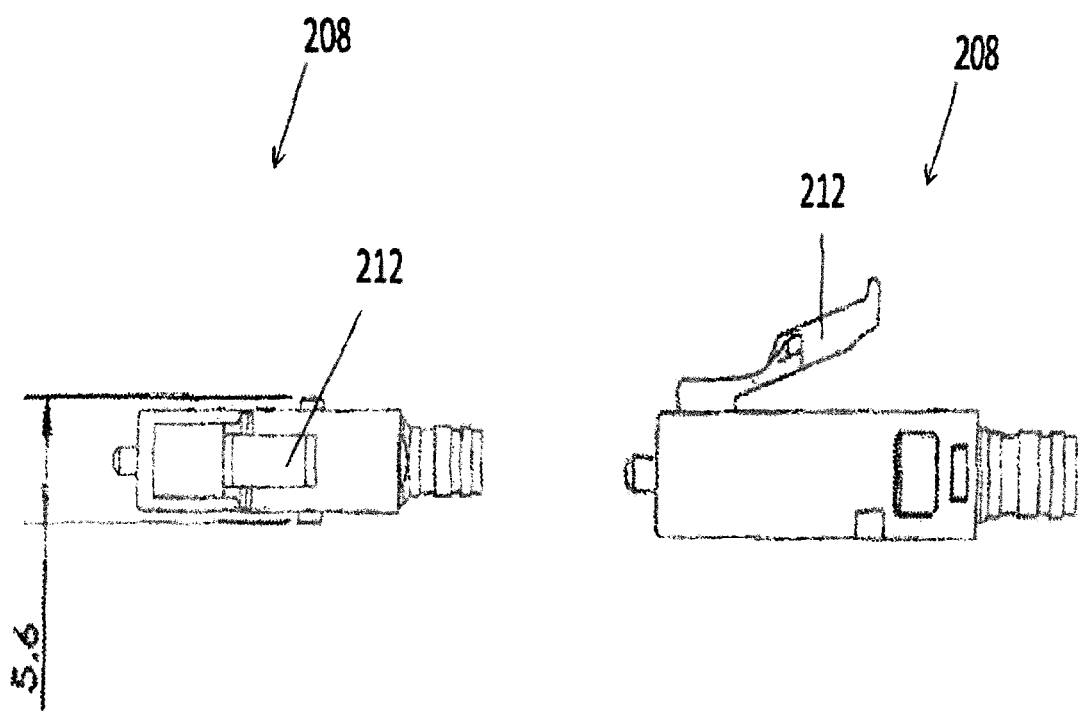
FIG. 2C is a top view of a prior art LC connector used in the embodiments shown in FIGS. 2A and 2B.
FIG. 2D is a side view of the prior art LC connector of FIG. 2C.

FIG. 2A shows a prior art LC duplex connector 200 that may be used with the conventional SFP 100 and the conventional adapter 106. The LC duplex connector 200 includes two conventional LC connectors 202. FIG. 2B shows another prior art LC duplex connector 204 having a remote release pull tab 206, and including two conventional LC connectors 208. As shown, the remote release pull tab includes two prongs 210, each configured to couple to the extending member 212 of a respective LC connector 208. FIGS. 2C and 2D show top and side views, respectively, of the conventional LC connector 208, having a width of 5.6 mm, and further showing the extending member 212.

Figure 3:
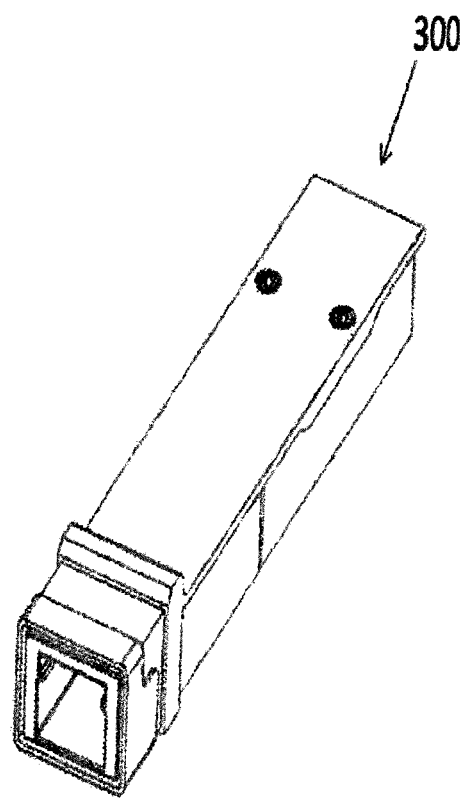
FIG. 3 is a perspective view of a future narrow pitch LC SFP for receiving connectors disclosed herein according to aspects of the present disclosure.

Various embodiments disclosed herein are configured for use with a future SFP, such as the narrow pitch LC SFP 300 shown in FIG. 3, having a pitch less than that of conventional 6.25 mm and 5.25 mm pitches. Various embodiments utilize LC type fiber optic connectors in duplex arrangements (having transmitting and receiving fibers) but with a connector axis-to-axis distance that is less than the conventional 6.25 mm and 5.25 mm pitches, as described further below.

Figures 4A, 4B, 4C:
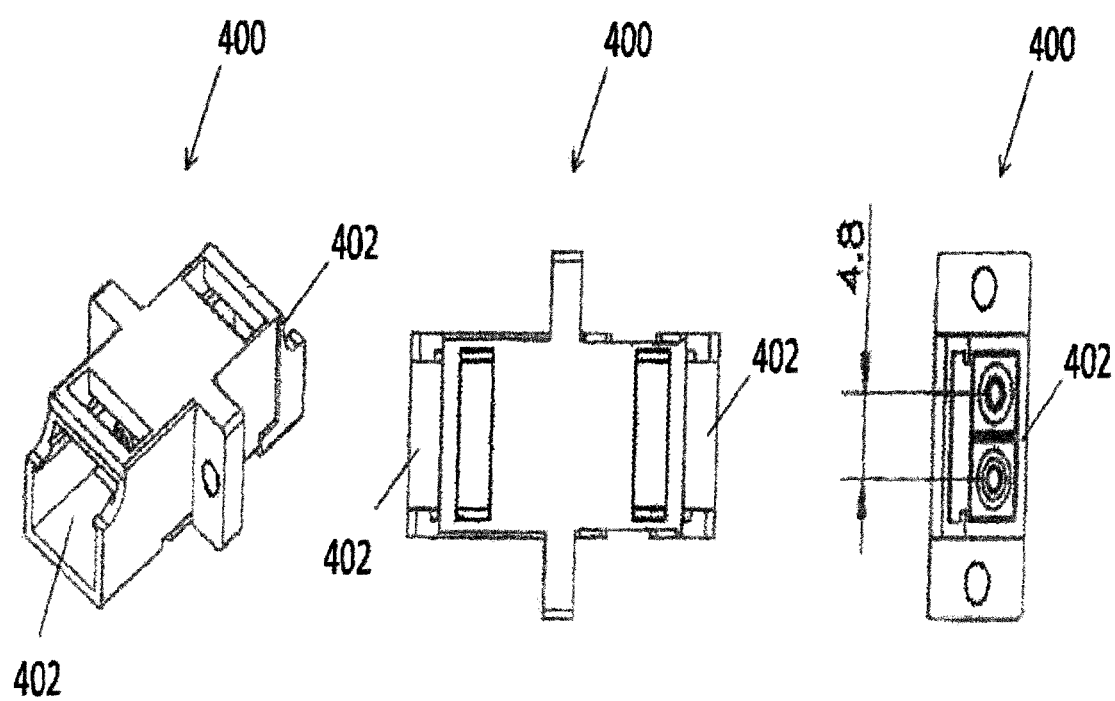
FIG. 4A is a perspective view of one embodiment of a narrow pitch LC adapter according to aspects of the present disclosure.
FIG. 4B is a top view of the narrow pitch LC adapter of FIG. 4A.
FIG. 4C is a front view of the narrow pitch LC adapter of FIG. 4A, showing a 4.8 mm pitch.

According to another aspect, embodiments of narrow pitch duplex LC adapters are disclosed. FIGS. 4A to 4C show an embodiment of a narrow pitch adapter 400. The narrow pitch adapter 400 has ports 402 on opposite ends thereof, configured for mating two narrow pitch LC duplex connectors according to aspects disclosed herein. FIG. 4B shows a top view of the adapter 400. FIG. 4C shows a front view, further illustrating that the adapter 400 has a pitch of 4.8 mm. The adapter 400 is configured to receive a duplex LC connector, with a pitch of the adapter corresponding to the axis-to-axis distance between the LC connectors of the LC duplex connector. Although the adapter 400 has a pitch of 4.8 mm, various embodiments of narrow pitch adapters disclosed herein may have a different pitch that is less than that of the pitch of conventional adapters, for example less than 6.25 mm and less than about 5.25 mm. In some embodiments, the pitch may be about 4.8 mm or less.

In addition to the need for narrow connectors, there is a need for remote unlatching of the narrow connectors used in dense narrow SFP arrays. This is because finger access to connectors is nearly impossible without disruption to the service of adjacent optical fibers. Although there are current designs of remotely unlatching fiber optic connectors, as shown for example in FIG. 2B, they have proven to be difficult to function as desired when plugged into the die cast construction that is typical of all SFP's. The die cast SFP is not one that is ever free of sharp edges and internal flashing (burrs) that can interfere with the normal flexing motion of the plastic latches of the fiber optic connectors. The interference between metal edges and burrs may prevent the fiber optic connector's plastic latch from either becoming fully engaged or easily disengaged, especially with latches that are remotely triggered by pull tabs that project a distance behind the connector so as to keep fingers from disturbing adjacent optical fibers.

To make the latching/unlatching of the connectors from the SFP more reliable, various embodiments disclosed herein add a spring force to the remote latching component (pull tab), for example as shown and described in relation to FIGS. 5, 7, 8 and 12 below, to ensure that the connector latches are allowed to return to the undisplaced position and thereby become fully engaged inside the SFP's recess.

Figure 5:
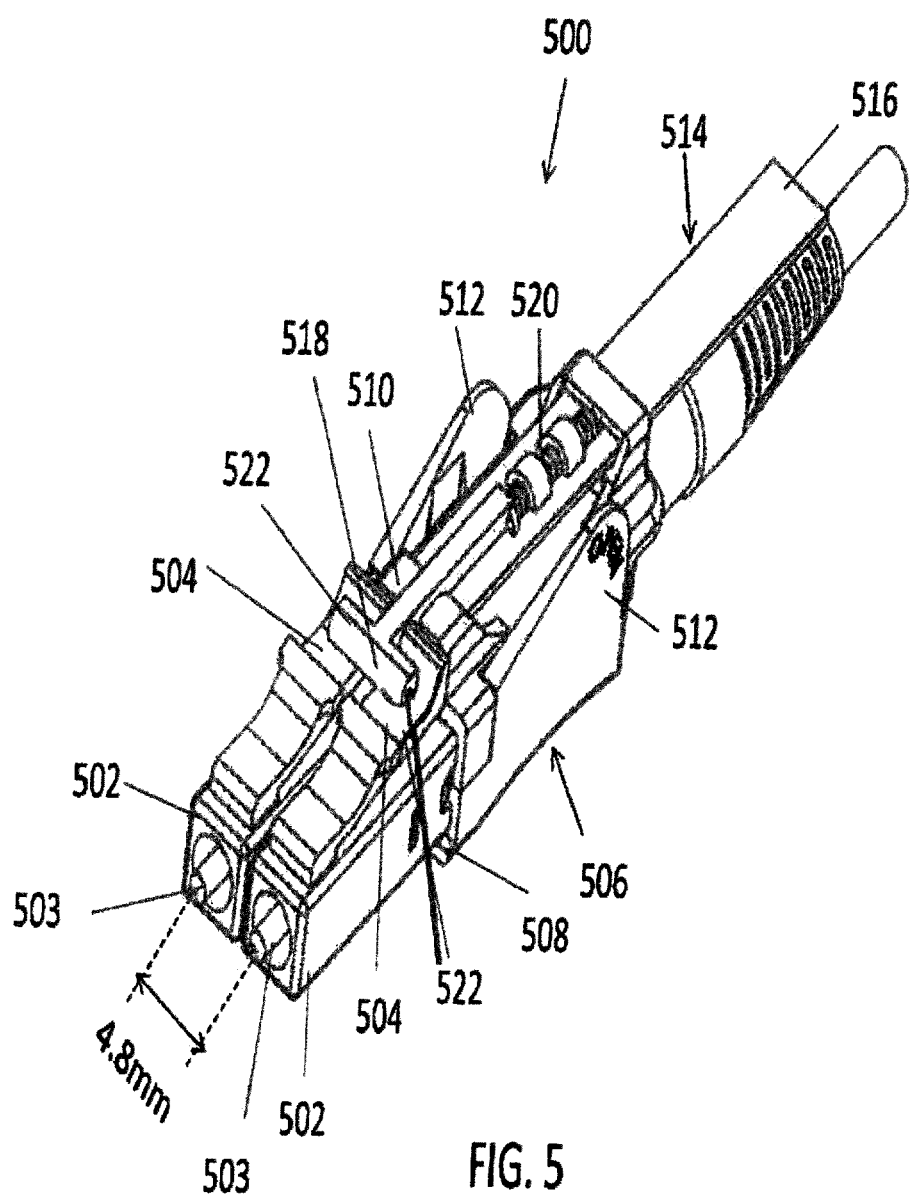
FIG. 5 is a perspective view of one embodiment of a narrow pitch LC duplex connector with remote release according to aspects of the present disclosure.

FIG. 5 shows one embodiment of a narrow pitch connector 500 according to aspects disclosed herein. The narrow pitch connector 500 is a duplex LC connector including two LC connectors 502. Each of the LC connectors 502 includes a respective ferrule 503 and a respective extending member or latching arm 504. The connector 500 has a pitch of 4.8 mm, defined as the axis-to-axis distance between the central axes of the LC connectors 502. In other embodiments, the connector pitch may be less than that of the pitch of conventional connectors, for example less than 6.25 mm and less than about 5.25 mm. In some embodiments, the pitch may be about 4.8 mm or less.

The connector 500 further includes a housing 506 having a bottom housing 508 and a top housing 510. The bottom housing 508 includes side walls 512. In various embodiments, the housing 506 of the connector 500 may be a switchable housing. The side walls 512 may be configured to open so as to facilitate opening of the housing 506, for example, to change polarity of the connector 500. The side walls 512 may be raised towards the rear of the connector 500, as shown in FIG. 5. One advantage of raising the side walls 512 towards the rear of the connector 500 is easier access. In other embodiments, the side walls 512 may be raised at another location.

The connector 500 further includes a pull tab 514 having a distal end 516 and a proximal end 518. The pull tab 514 further includes a spring 520 configured to provide a force such that the connector latching arms 504 return to the undisplaced position and thereby become fully engaged inside the SFP's recess. The distal end 516 of the pull tab 514 may be pulled to (e.g., in the direction D of the arrow shown in FIG. 7) remotely release the connector 500 from an SFP or adapter. The proximal end 518 of the pull tab 514 is uniquely shaped so as to engage with the unique profile of the latching arms 504 of the narrow pitch LC connector 500. The proximal end 518 engages both latching arms 504 of the duplex LC connector 500. That is, the proximal end 518 includes a single prong configured to engage the latching arms of both connectors 502. At the proximal end 518 of the pull tab 514 there are outwardly pointing pins 522 configured to rest directly above and slide along the semi-circular surface of latching arms 504 of the duplex LC connectors 502. The horizontal and rearward path direction of the pins 522 causes the semi-circular profile of the connector latching arms 504 to flex downward. Because the pins 522 are not contained inside ramped grooves of the connector latching arms 504, the pull tab 514 can also be pushed down at a location directly behind the LC connectors 502 rather than pulling the tab in a rearward motion from a remote distance behind the connectors, such as from the distal end 516. The action of pushing down the connectors' integral levers or latching arms 504 unlatches the connector 500. In some cases, the horizontal motion of the pull tab 514 may not be desirable. Thus, the connector latching arms 504 may be pushed down without resulting in a horizontal motion of the pull tab 514.

Figure 6A:
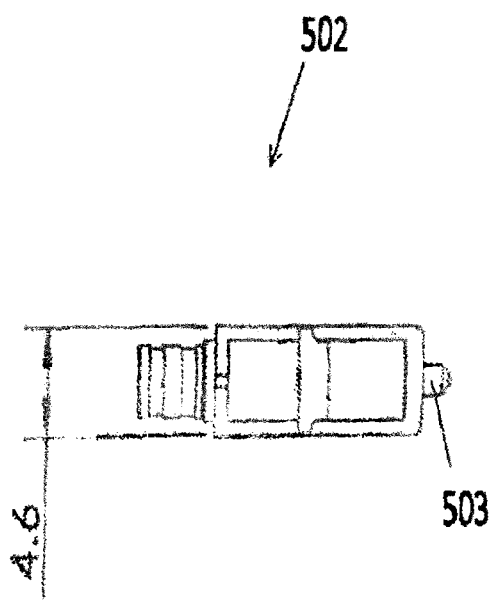
FIG. 6A is a top view of an LC connector used in the embodiment of FIG. 5 according to aspects of the present disclosure.
Figure 6B:
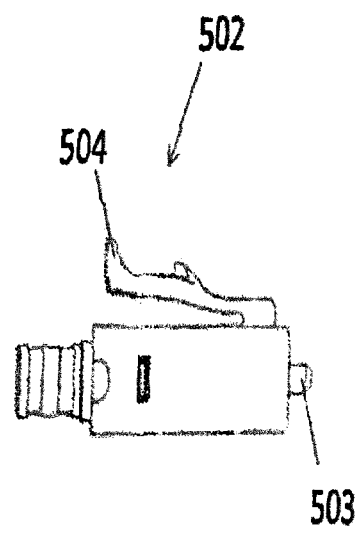
FIG. 6B is a side view of the LC connector of FIG. 6A according to aspects of the present disclosure.

FIGS. 6A and 6B show top and side views, respectively, of the LC connector 502 of the narrow pitch connector 500. FIG. 6A further shows that the LC connector 502 has a width of 4.6 mm. FIG. 6B shows the semi-circular profile of the latching arm 504.

Figure 7:
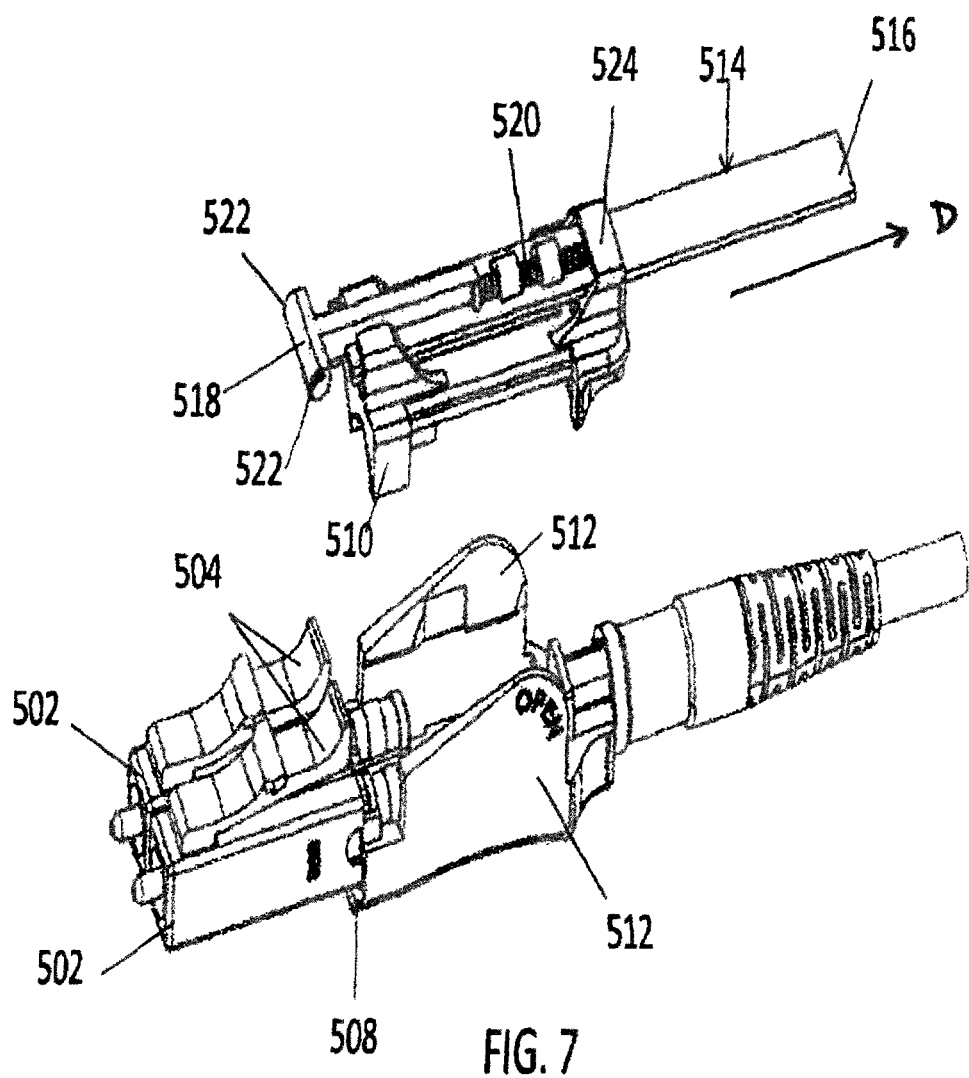
FIG. 7 is a perspective view of narrow pitch LC duplex connector of FIG. 5, with the release mechanism being exploded from the remainder of the connector.

FIG. 7 shows a partially disassembled view of the narrow pitch connector 500 of FIG. 5. The top housing 510 is separated from the bottom housing 508. The pull tab 514 is coupled to the top housing 510 and configured to slide longitudinally along the length of the connector. The top housing 510 also includes a restraint 524 configured to receive the pull tab 514.

Figure 8:
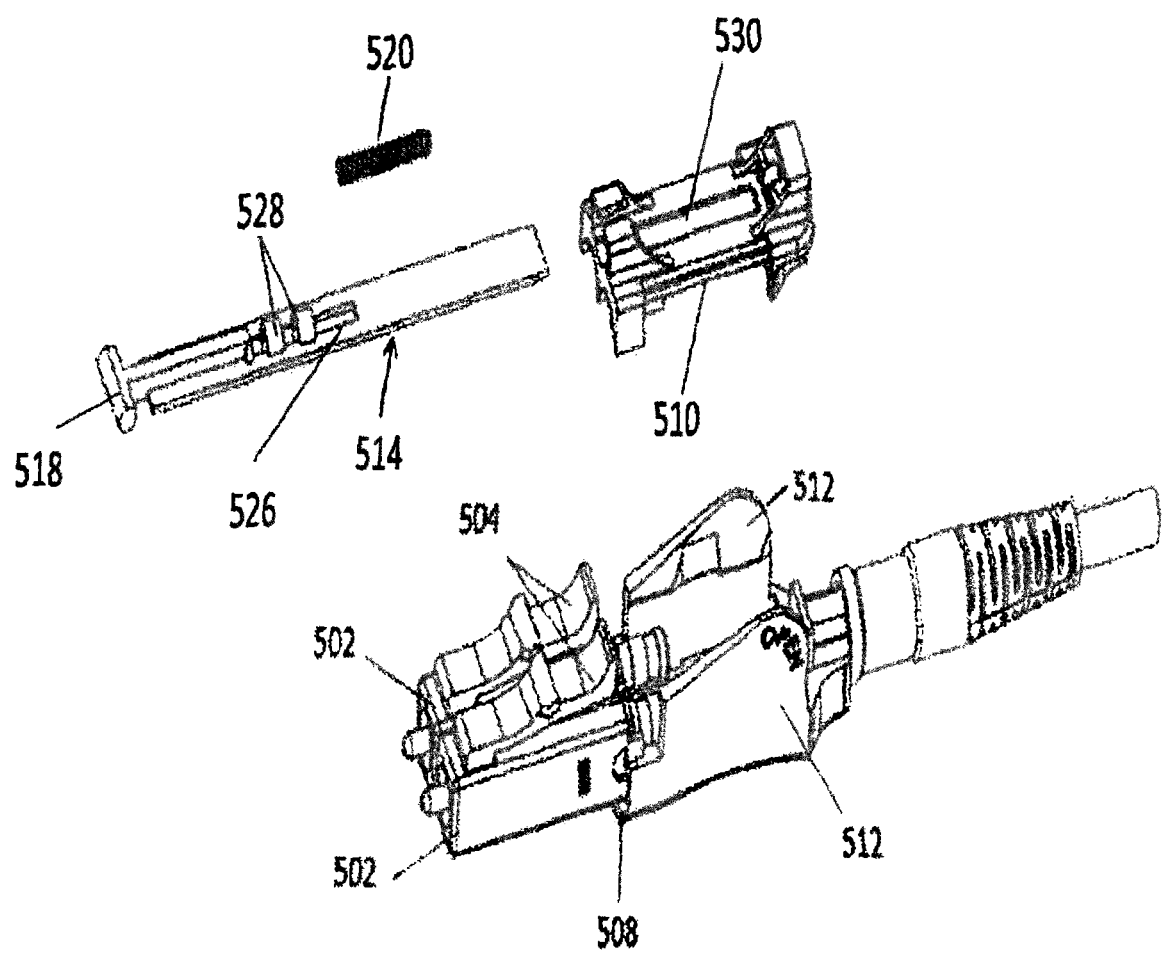
FIG. 8 is a perspective disassembled view of the narrow pitch LC duplex connector of FIG. 5 according to aspects of the present disclosure.

FIG. 8 shows a further disassembled view of the narrow pitch connector 500. Specifically, the pull tab 514 is shown to be separated from the top housing 510, and the spring 520 is removed from the pull tab. The pull tab 514 includes a longitudinal recess 526 configured to receive the spring 520, and at least one restraint 528 configured to retain the spring. The top housing 510 also includes a recess 530 configured to accommodate at least a portion of the pull tab 514, such as the spring 520 and the proximal end 518. In various embodiments, the pull tab may be removably coupled to the connector via the top housing.

Figure 9:
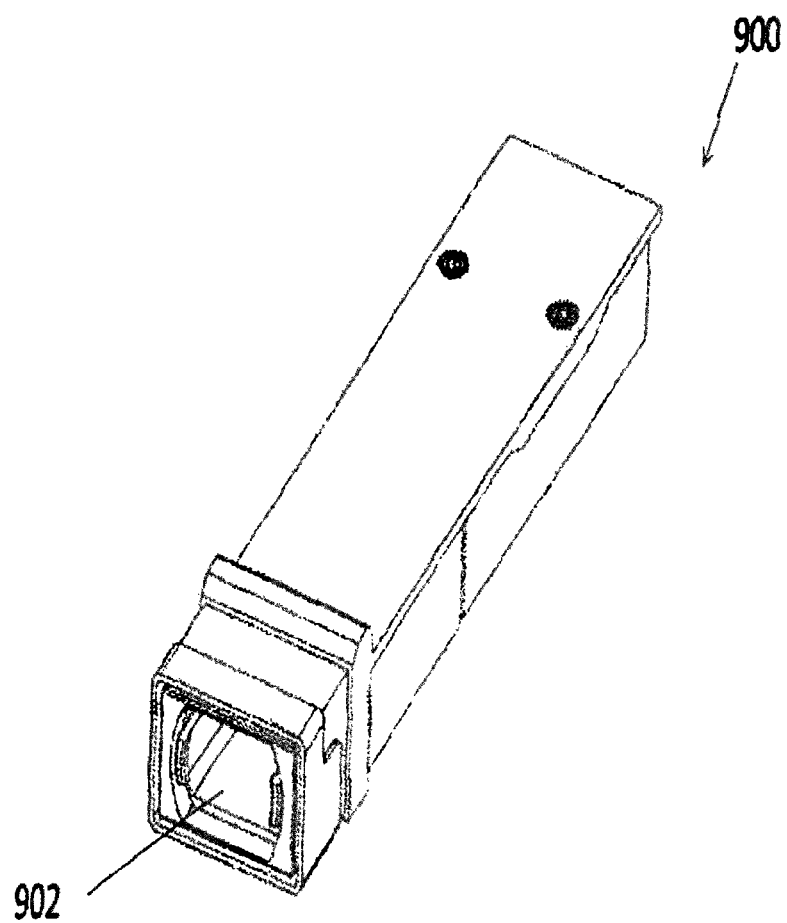
FIG. 9 is a perspective view of a prior art standard multiple-fiber push-on/pull-off (MPO) SFP.

FIG. 9 shows a perspective view of a prior art standard MPO SFP 900. The SFP 900 is configured to receive a standard MPO connector and provides a port 902 for receiving an MPO connector having a conventional width, as shown for example in FIGS. 10A to 10C.

Figure 10A:
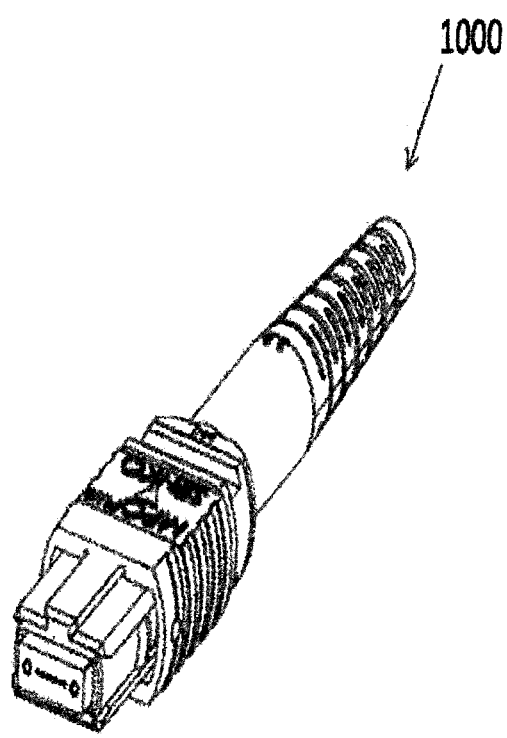
FIG. 10A is a perspective view of a prior art standard MPO connector.
Figures 10B, 10C:
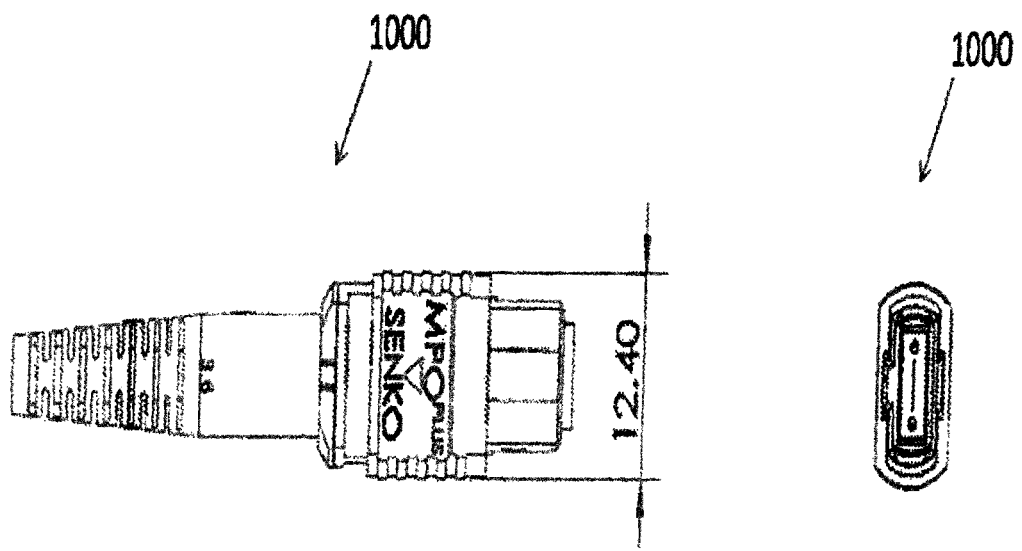
FIG. 10B is a top view of the prior art MPO connector of FIG. 10A, having a width of 12.4 mm.
FIG. 10C is a front view of the prior art MPO connector of FIG. 10A.

FIG. 10A shows a perspective view of conventional MPO connector 1000. As shown in FIG. 10B, the conventional MPO connector 1000 has a width of 12.4 mm. FIG. 10C shows a front view of the MPO connector 1000.

Figure 11:
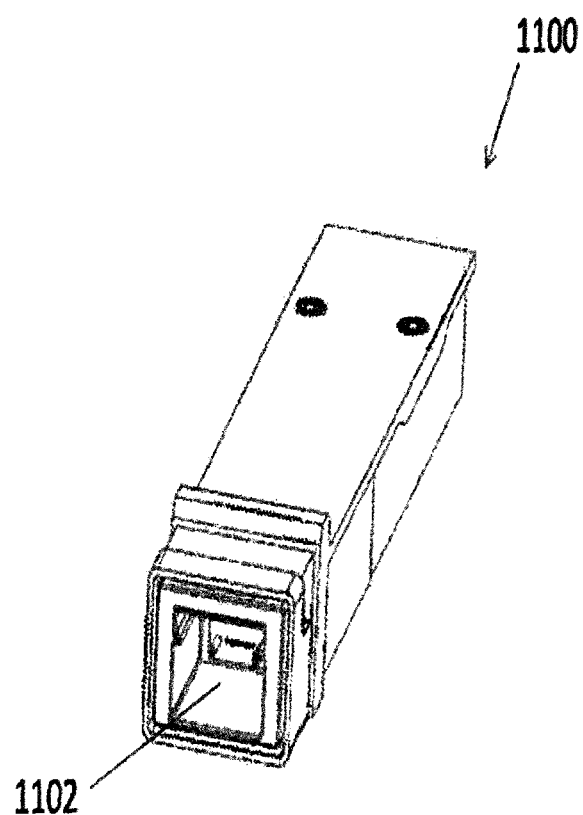
FIG. 11 is a perspective view of a future narrow width multi-fiber SFP for receiving connectors disclosed herein according to aspects of the present disclosure.

FIG. 11 shows an embodiment of a future narrow width multi-fiber SFP 1100 according to aspects of the present disclosure. Various embodiments disclosed herein are configured for use with the narrow width multi-fiber SFP 1100, having a width less than that of conventional MPO connectors, that is less than about 12.4 mm. The narrow width multi-fiber SFP has a port 1102 configured to receive a narrow width multi-fiber connector, such as a narrow width connector having an MT ferrule (e.g., that shown in FIG. 12A).

Figure 12A:
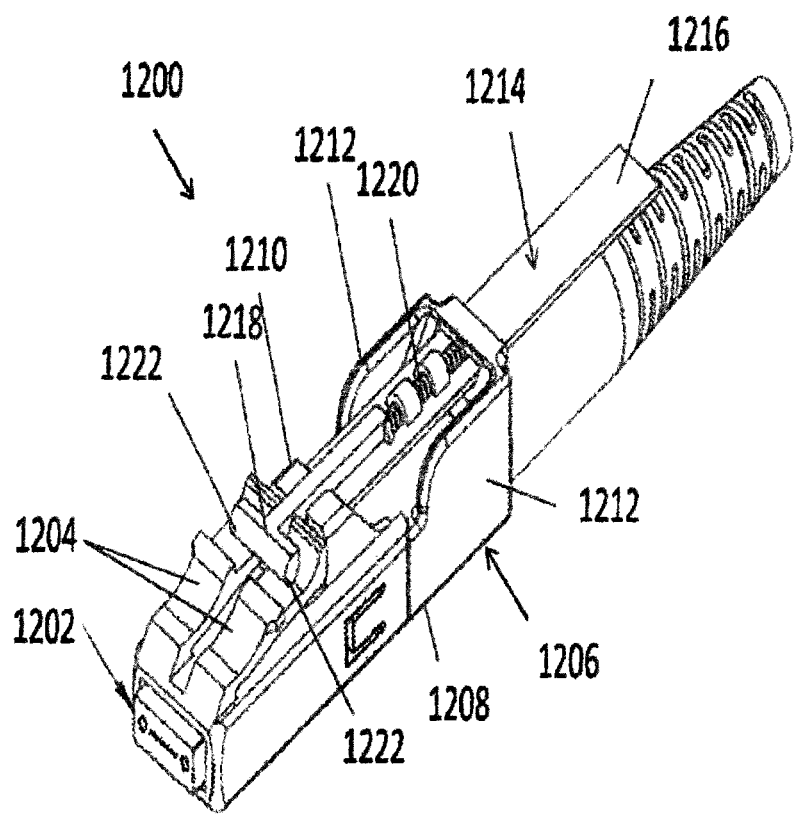
FIG. 12A is a perspective view of one embodiment of a narrow width multi-fiber connector (e.g. female MPO connector) with remote release according to aspects of the present disclosure.

FIG. 12A shows one embodiment of a narrow width connector 1200 according to aspects disclosed herein. The narrow width connector 1200 is a multi-fiber connector including a multi-fiber MT/MPO ferrule 1202. The connector 1200 includes two extending members or latching arms 1204. In other embodiments, the connector may include at least one latching arm. The connector 1200 has a width of 9.6 mm, as shown in the top view of the connector 1200 in FIG. 12B. In other embodiments, the connector width may be less than that of the width of conventional multi-fiber connectors, for example less than the 12.4 mm of the conventional MPO connector shown in FOG. 10B. In some embodiments, the width may be about 9.6 mm or less.

The connector 1200 further includes a housing 1206 having a bottom housing 1208 and a top housing 1210. The bottom housing 1208 includes side walls 1212. In various embodiments, the housing 1206 of the connector 1200 may be a switchable housing. The side walls 1212 may be configured to open so as to facilitate opening of the housing 1206, for example, to change polarity of the connector 1200. The side walls 1212 may be raised towards the rear of the connector 1200. One advantage of raising the side walls 1212 towards the rear of the connector 1200 is easier access. The side walls 1212 may also be raised at another location.

The connector 1200 further includes a pull tab 1214 having a distal end 1216 and a proximal end 1218. The pull tab 1214 further includes a spring 1220 configured to provide a force such that the connector latching arms 1204 return to the undisplaced position and thereby become fully engaged inside the SFP's recess. The distal end 1216 of the pull tab 1214 may be pulled to remotely release the connector 1200 from an SFP or adapter. The proximal end 1218 of the pull tab 1214 is uniquely shaped so as to engage with the unique profile of the latching arms 1204 of the narrow width multi-fiber connector 1200. The proximal end 1218 engages both latching arms 1204 of the multi-fiber connector 1200. That is, the proximal end 1218 includes a single prong configured to engage the latching arms 1204. At the proximal end 1218 of the pull tab 1214 there are outwardly pointing pins 1222 configured to rest directly above and slide along the semi-circular surface of latching arms 1204. The horizontal and rearward path direction of the pins 1222 causes the semi-circular profile of the connector latching arms 1204 to flex downward. Because the pins 1222 are not contained inside ramped grooves of the connector latching arms 1204, the pull tab 1214 can also be pushed down at a location directly behind the latching arms 1204 rather than pulling the tab in a rearward motion from a remote distance behind the connector, such as from the distal end 1216. The action of pushing down the connector's integral levers or latching arms 1204 unlatches the connector 1200. In some cases, the horizontal motion of the pull tab 1214 may not be desirable. Thus, the connector latching arms 1204 may be pushed down without resulting in a horizontal motion of the pull tab 1214.

Figures 12B, 12C:
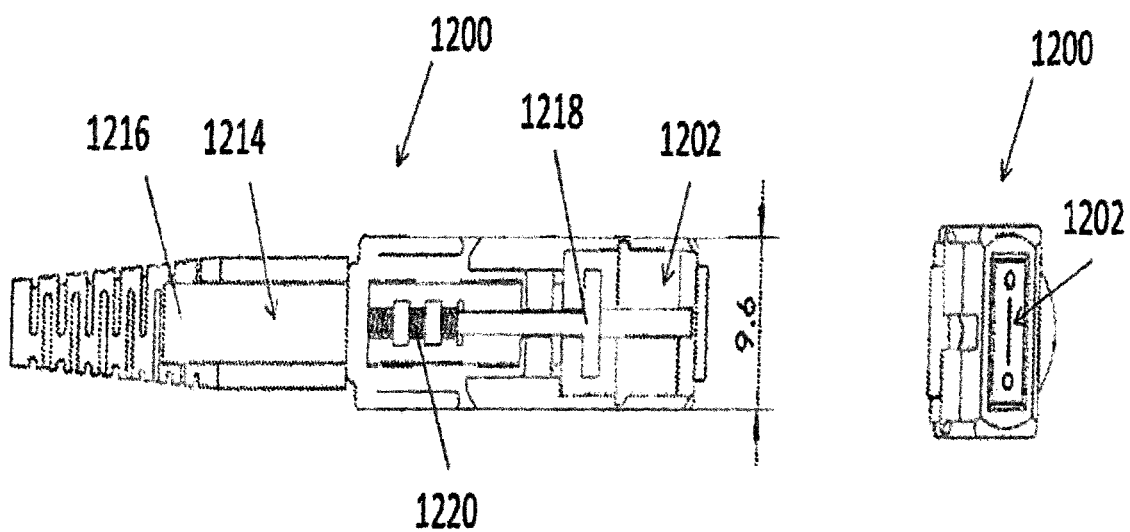
FIG. 12B is a top view of the narrow width multi-fiber connector of FIG. 12A, having a width of 9.6 mm according to aspects of the present disclosure.
FIG. 12C is a front view of the narrow width multi-fiber connector of FIG. 12A according to aspects of the present disclosure.

FIGS. 12B and 12C show top and front views, respectively, of the narrow width multi-fiber connector 1200. FIG. 12B further shows that the connector 1200 has a width of 9.6 mm.

In various embodiments described above, the narrow width connectors have latching arms configured to engage with a fixed or immovable recess within a narrow width SFP or a narrow width adapter. In these embodiments, the pull tab of the connector displaces the flexible latching arm of the connector so as to disengage the latching arm from the recess of the SFP or the adapter. For example, the latching arms bend down as the pull tab is pulled back, so as to disengage the connector from the SFP or the adapter.

In other embodiments, as further described for example in relation with FIGS. 13A, 13B, 14A, 15A and 15B below, the remote latch release pull tab may be configured to couple with a latch or a hook within the adapter or the SFP. In these embodiments, the flexible latching arm of the connector is moved into the main cavity or port of the SFP or the adapter, and the latch of the SFP or the adapter engages a recess of the connector when the pull tab is in a normal location that is pushed forward by a spring. The pull tab may be configured to have a ramp area such that when the pull tab is pulled back, the latch of the SFP or the adapter is lifted by the retracted pull tab, thereby disengaging the latch of the SFP or the adapter from the connector. Attempting to pull on the connector 1300 body, not the pull tab, the SFP latch retains the connector within the adapter as shown in FIG. 14A.

Figures 13A, 13B:
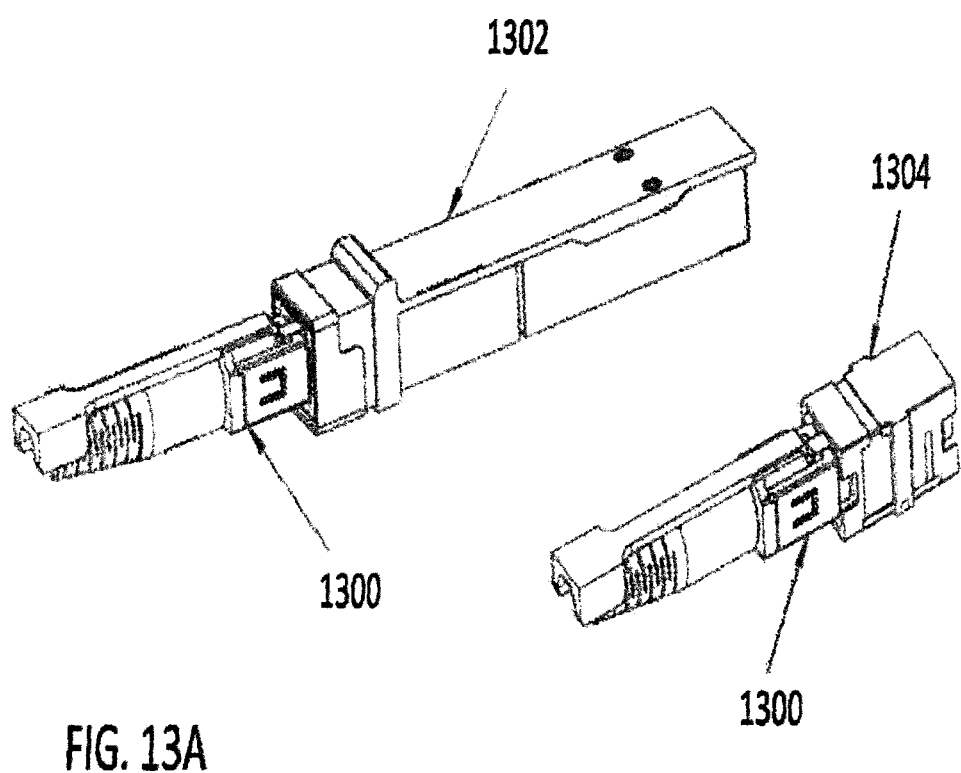
FIG. 13A is a perspective view of a narrow width multi-fiber connector inserted into a narrow width SFP having an SFP latch according to aspects of the present disclosure.
FIG. 13B is a perspective view of a narrow width multi-fiber connector inserted into a narrow width adapter having an adapter latch according to aspects of the present disclosure.

FIG. 13A shows a narrow pitch multi-fiber connector 1300 inserted into a narrow pitch SFP 1302 such that a recess of the connector engages an SFP latch 1402 FIG. 13B shows the narrow pitch connector 1300 inserted into a narrow pitch adapter 1304 such that a recess of the connector engages a latch 1402 of the adapter.

FIG. 14A shows a side view of the narrow width connector 1300 of FIG. 13A coupled to the narrow width SFP 1302. Details of the coupling are shown in the zoomed view of FIG. 15B within the circle 1500. Specifically, the SFP 1302 includes an SFP latch 1402. The connector 1300 includes a recess 1404. For example, the connector housing, on a side, may comprise a recess 1404. The pull tab 1406 may be spring-loaded as described in relation to various embodiments. This allows the pull tab 1406 to return to a position that will allow the SFP latch 1402 to engage with the connector recess 1404. When the pull tab 1406 is in the normal pull tab location, that is pushed forward by a spring, as shown in FIG. 14A, the SFP latch 1402 is engaged with the connector recess 1404.

FIG. 15A shows a side view of the narrow width connector 1300 of FIG. 13A as it is disengaged from the narrow width SFP 1302. Details of the decoupling are shown in the zoomed view FIG. 15B within the circle 1500. The pull tab 1406 includes a taper or a ramp area 1502. As the pull tab 1406 is pulled back in the direction of the arrow 1504 as shown, the SFP latch 1402 is lifted by the ramp area 1502 of the retracted pull tab, thereby disengaging the SFP latch 1402 from the connector as illustrated within the circle 1500. The same effect described herein in conjunction with FIG. 15A also occurs in other embodiments of connectors coupled to a narrow width adapter as shown, for example, in FIG. 13A.

Figures 14, 14B:
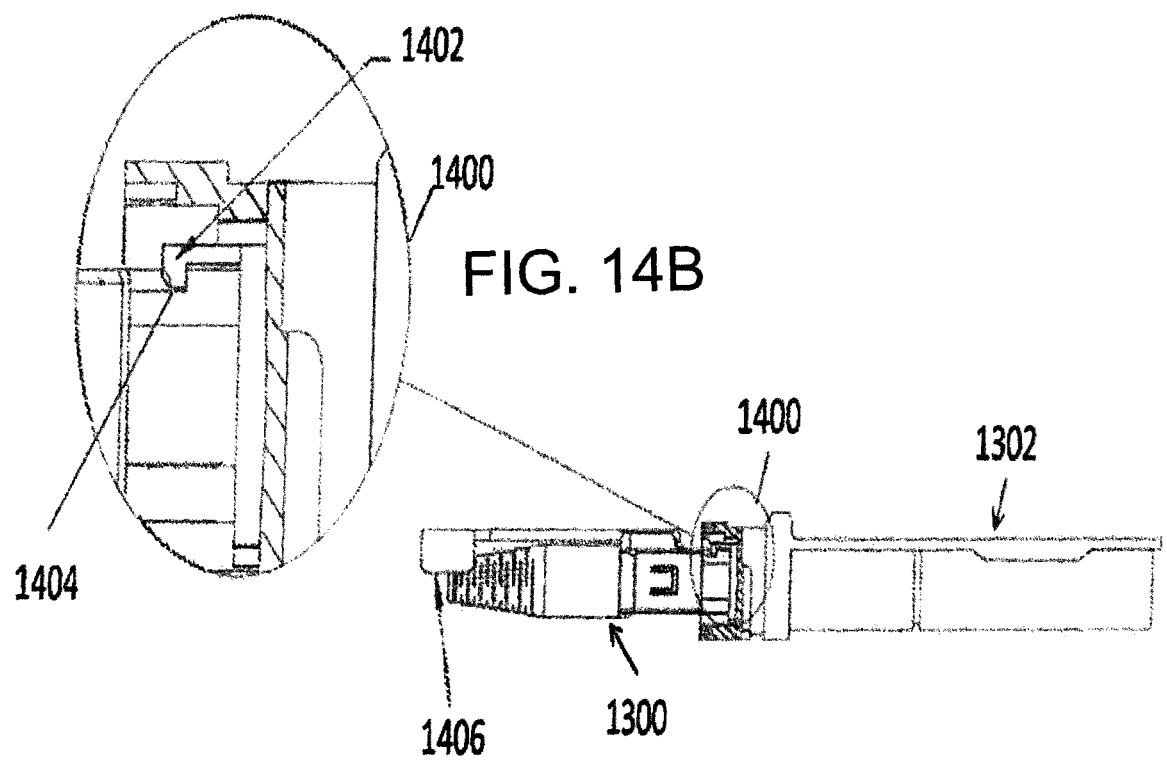
FIG. 14B is a zoomed view of FIG. 14A

Although FIGS. 14A and 15A illustrate coupling of the connector to a narrow width SFP, in other embodiments the connector may be coupled to a narrow width adapter having an adapter latch, similar to that of the SFP latch. Further, although the embodiments shown in FIGS. 13A, 13B, 14, and 15 include a narrow width multi-fiber connector, other embodiments herein may include narrow pitch LC connectors.

As described above, the embodiments of FIGS. 14A and 15A show an improvement over the prior art adapters (FIG. 1) and connectors (FIG. 2). The improvement is the latch 1402 and recess 1404 area for the latch when the connector is fully inserted into the adapter or transceiver port. Unless the pull tab 1406 is retracted 1504, the latch 1404 will hold the connector within the port 1302, 1304, 1400 (as shown in FIGS. 13 and 14) up to an acceptable pull force. Further embodiments in the present invention improve on the pull strength, stability of the connector while in the port, and connector alignment upon insertion into a port with the improvements in the port interface and connector release mechanism.

Briefly referring to FIGS. 49A.1-49B, connectors can be bundled or clustered together with cabling of varying lengths among the connectors. Cables become entangled, and can be pulled on by trained users. This pull force loosens the connector within the port. The connector may become dislodged if the pull force is greater than the latching force, or at the very least the interface between the connector fiber optic path and the optical-electrical interface can get misaligned resulting in signal loss. Connectors are also placed in a panel via an adapter similar to FIGS. 40A and 40B, where two connectors are interfaced or patched. The patching occurs when a first connector is inserted into a first port and a second connector is inserted into a second port. Not unlike inserting into a transceiver, aligning the fiber optic path along the x-y axis between the opposite facing connectors is directly related to the quality of the signal path.

So determining the defective connector interface in a room of thousands of connectors can be time consuming and typically goes undetected. Also with the decrease in connector size, access to release a connector is becoming problematic for the user. Furthermore, connectors may be used behind the wall or behind the panel (e.g. the connector is not directly accessible by the user) as opposed front patch connectors. For an example of the different connector types compare FIGS. 56A-C and 57A-C Due to structural differences between the front and BTW type, the release mechanisms are different. But the port interface is the same. The present invention helps improve connection stability, connector to connector alignment, and ease of release.

Figure 16A:
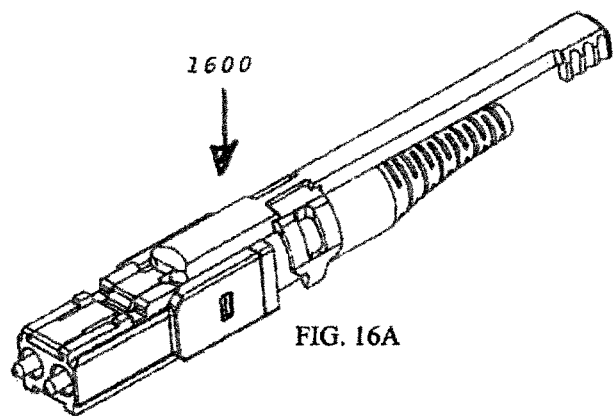
FIG. 16A is a perspective view of a narrow width multi-fiber connector having an adapter latch according to aspects of the present disclosure.
Figure 16B:
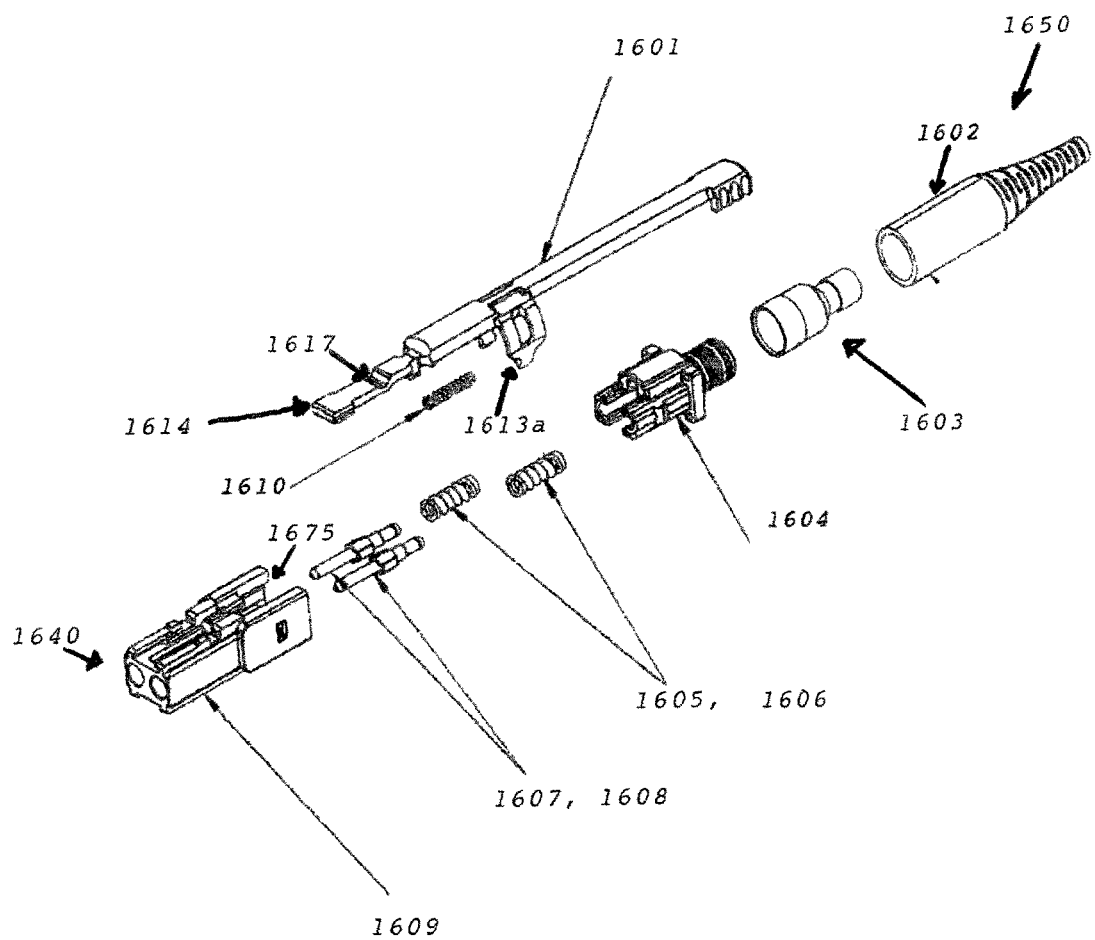
FIG. 16B is a perspective disassembled view of a narrow width multi-fiber connector having an adapter latch according to aspects of the present disclosure.

FIGS. 16A-22B are various views and details illustrate a connector, a SFP transceiver and the latching mechanisms associated therewith according to various aspects of a first embodiment of the invention. Referring to FIGS. 16A and 16B, the connector 1600 is a front patch type connector with a removable push/pull tab 1601. The proximal end 1640 of the connector 1600 is at the plug frame 1609 end, and the distal end 1650 of the connector 1600 is at the boot 1602 end. The recess 1614 accepts the latch 1402, while the spring 1610 urges forward the tab 1601. The boot 1602 is a ruggedized round cable typically found on the front type connectors used in patch panels or inserted into transceiver ports. The push-pull tab is anchored to the connector body by side tabs 1613 that press-fit against the connector 1600 back body 1604.

Figure 17A:
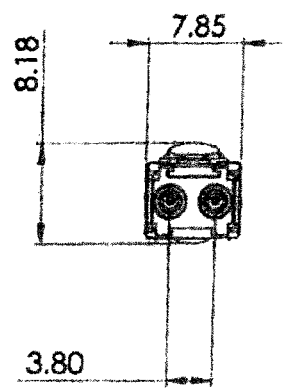
FIG. 17A is a front view of the narrow pitch adapter of FIG. 16A, showing a 3.80 mm pitch.
Figure 17B:
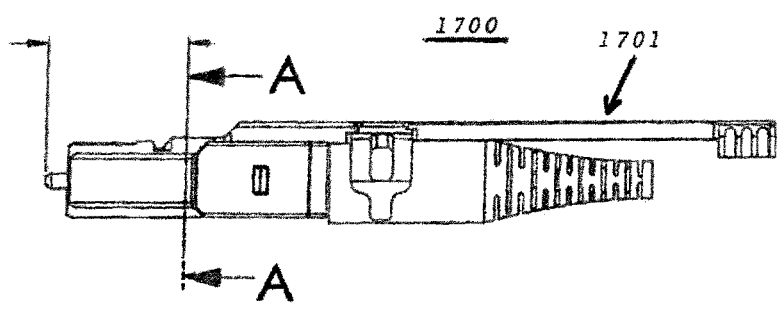
FIG. 17B is a side view of the narrow width connector of FIG. 16A.
Figure 17C:
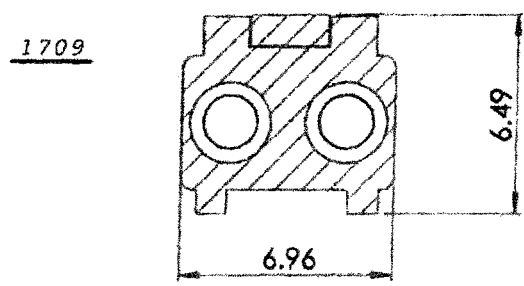
FIG. 17C is a section view taken in a plane including line A-A of FIG. 17B showing a plug frame fitting inside a SFP according to aspects of the present disclosure.

Referring to FIGS. 17A-17E.1, the connector 1600 is dimensioned to show the reduced size of the plug frame 1609 for a narrow pitched connector. Referring to FIG. 17A the ferrule pitch or distance between the ferrules is approximately 3.80 mm, while the overall outer dimension is 7.85 mm wide and 8.18 mm height. These dimensions are required by industry standard of all connector manufacturers. As the connector size decreases the available outer area to secure the connector within the port also decreases. Although port and connector size decrease, performance in terms of limited signal loss, pull strength and connector/port stability is not lowered.

For the present invention a port is an opening that receives the proximal end of a connector or interface device such as a computer card, and the port contains structure therein to secure and stabilize the connector, and to further ensure alignment of the opposing fiber optic signal paths. An adapter includes one or more ports (for example as shown in FIGS. 40A-40F.1 or FIGS. 60A-60H), for a patch panel or a transceiver as shown in FIGS. 18A-C, may have one or more ports.

Figure 17D:
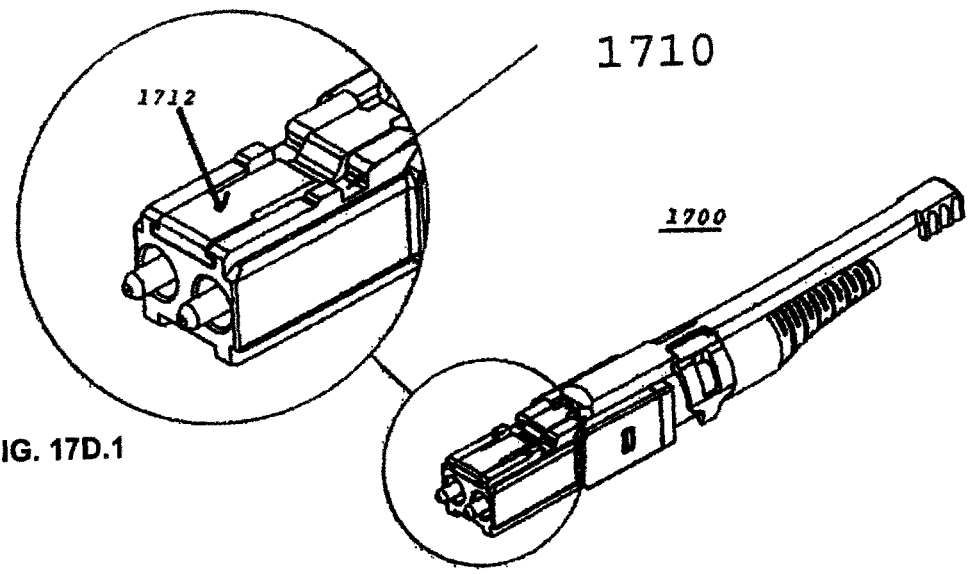
FIG. 17D is a perspective view of the narrow width connector of FIG. 16A with the push/pull tab in a normal position in the SFP latching recess according to aspects of the present disclosure.
Figure 17E:
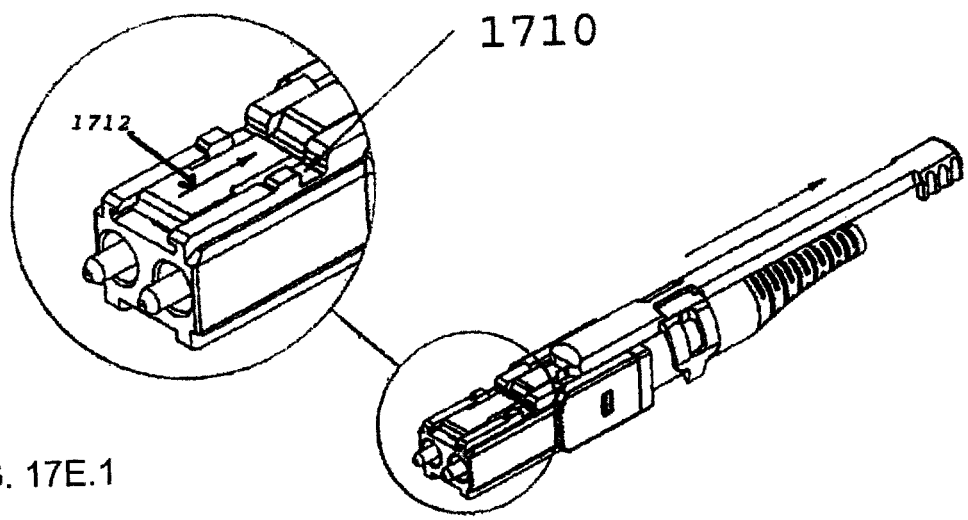
FIG. 17E is a perspective view of the narrow width connector of FIG. 16A with the push/pull tab in a pulled back position with respect to the SFP latching recess according to aspects of the present disclosure.

Referring to FIG. 17D-17E, the operation of the push/pull tab is shown. In FIG. 17D, the tab 1601 is at its normal proximal position urged forward by the spring 1610. This positions the latch release 1712 (as shown in FIG. 17D.1) in a proximal position relative the recess 1710. The ramp 1720 aids in lifting the latch as described herein. In FIG. 17E, the user pulls on the tab 1601 in the direction of the arrow, and the latch release 1712 (as shown in FIG. 17E.1) moves forward to engage the latch 1402 (not shown) and lifts the latch out of the recess 1710, which releases the connector from the port interface.

Figure 18A:
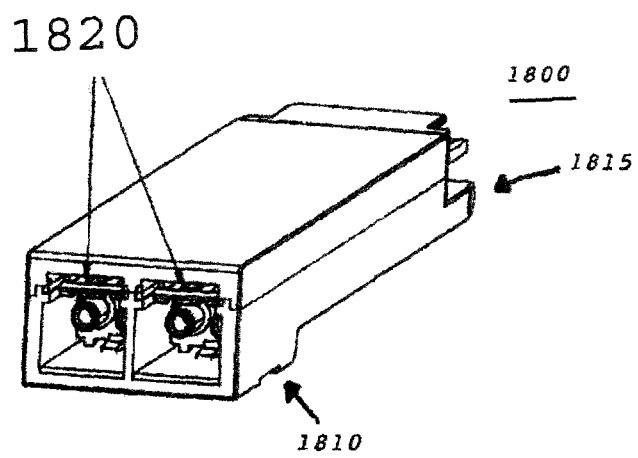
FIG. 18A is a perspective view of a small form factor transceiver according to aspects of the present disclosure.
Figure 18B:
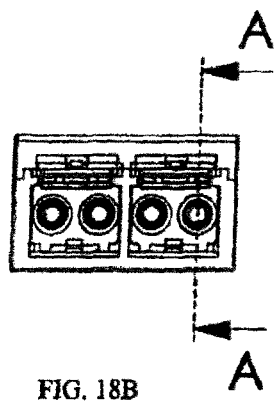
FIG. 18B is a front view of the transceiver of FIG. 18A according to aspects of the present disclosure.
Figure 18C:
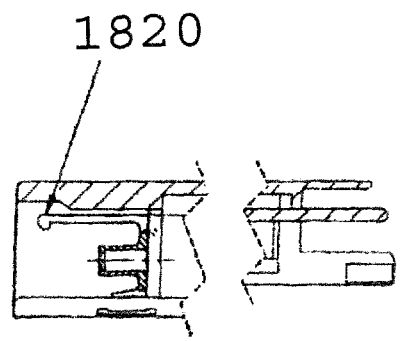
FIG. 18C is a fragmentary section taken in the plane including line A-A of FIG. 18B.

Referring to FIGS. 18A-C, a transceiver 1800 is shown with flexing latches 1820 inserted at the proximal end 1810 of a duplex transceiver 1800. The flexing latches 1820 is the interface structure within the port that secures the connector 1700 (not shown) therein. FIG. 18C shows the flexing latch 1820 at cross-section A-A of FIG. 18B. FIG. 18B a front view of the latches 1820 looking into the proximal end of the transceiver 1800.

Figure 19:
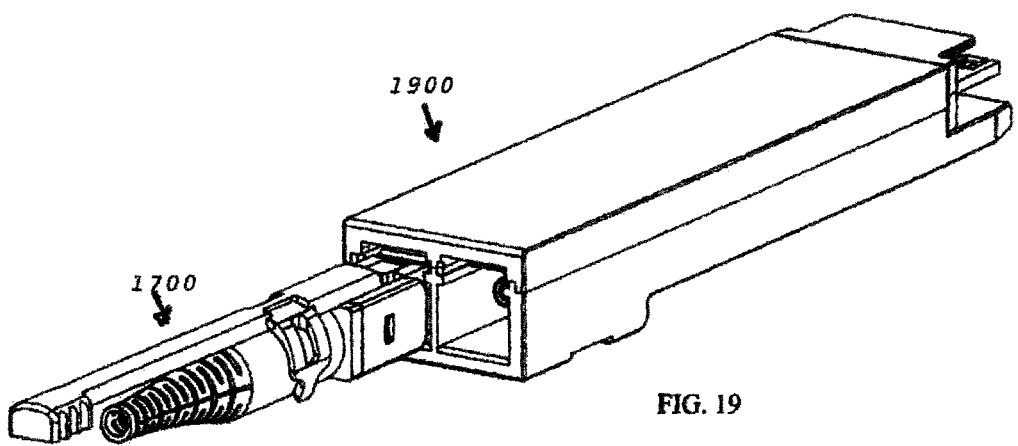
FIG. 19 is a perspective view of a SFP having one connector inserted.
Figure 20A:
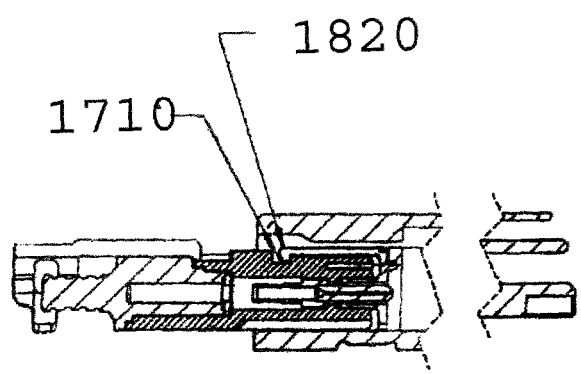
FIG. 20A is a fragmentary section taken in a plane including line B-B of FIG. 20B showing a SFP holding a connector according to aspects of the present disclosure.
Figure 20B:
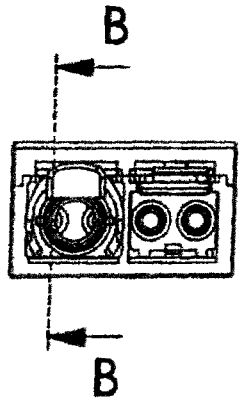
FIG. 20B is a front view of the SFP holding the connector of FIG. 20A.

Referring to FIG. 19, the connector 1700 is inserted into the port of the duplex transceiver 1900. FIG. 20A shows the flexing latch 1820 positioned in the connector recess 1710, at cross-section B-B of FIG. 20B. FIG. 20B is a front view of the SFP holding the connector of FIG. 20A. FIG. 20A is not unlike FIG. 14A as both show the connector secured within the port using the latch 1820. The pull tab is biased forward by the spring when the latch is in the recess.

Figure 21:
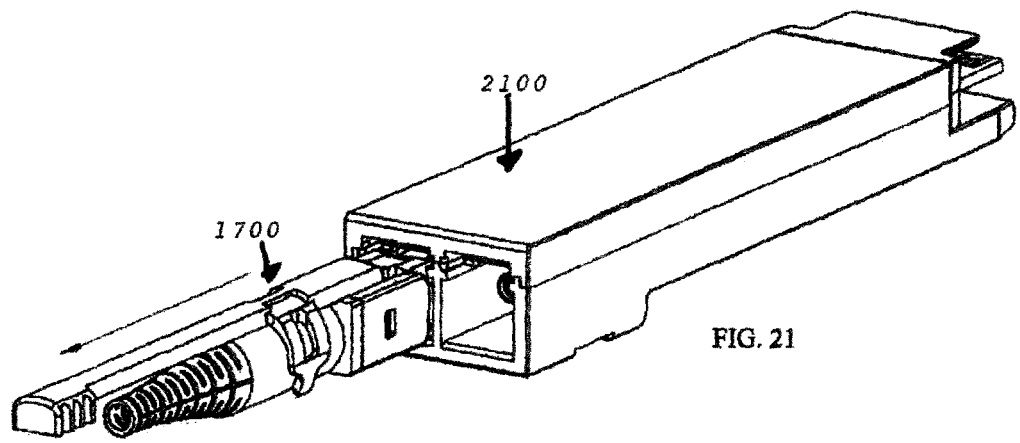
FIG. 21 is a perspective view of the SFP having one connector inserted and with the push/pull tab retracted according to aspects of the present disclosure.
Figure 22A:
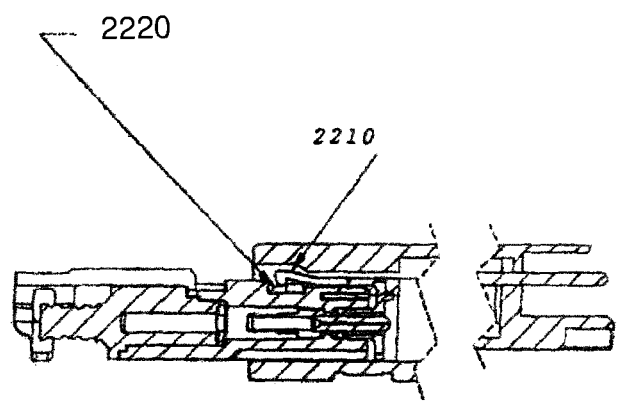
FIG. 22A is a section taken in the plane including line B-B of FIG. 22B showing the SFP latch in a lifted position to unlatch the connector according to aspects of the disclosure.
Figure 22B:
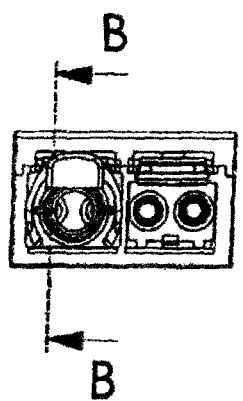
FIG. 22B is a front view of the SFP and connector of FIG. 22A.

FIGS. 21, 22A and 22B show the connector being removed from the transceiver 1900 in the direction of the arrow of FIG. 21. Referring to FIG. 22A, the ramp 2220 on the push/pull tab (refer to FIGS. 17A-17E.1) lifts the flexing latch 2210 to unlatch the connector 1700 from within the port. FIG. 22A is the cross-section B-B of FIG. 22B. FIG. 22B is a front view of the SFP and connector of FIG. 22A.

Figure 23:
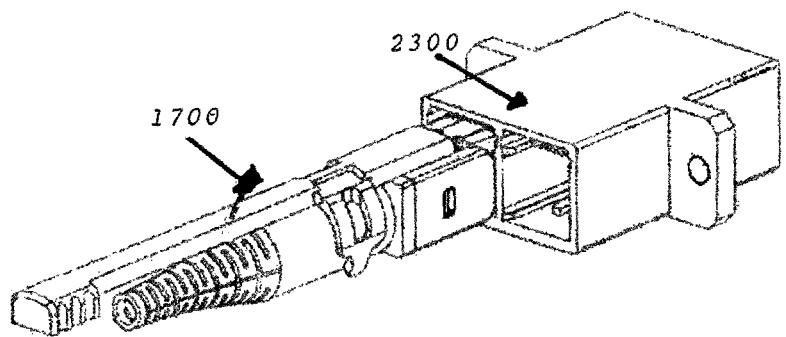
FIG. 23 is a perspective view of a connector inserted into an adapter according to aspect of the present disclosure.
Figure 24A:
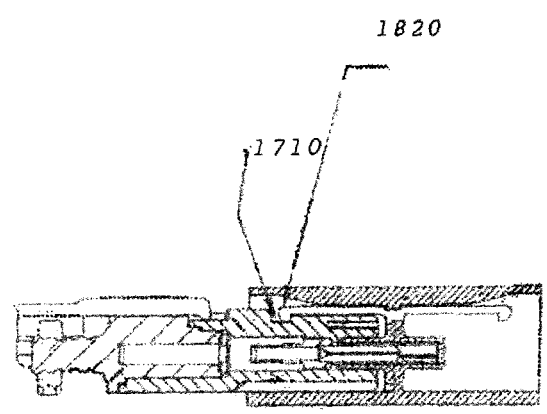
FIG. 24A is a section taken in the plane including line A-A of FIG. 24B showing the connector and the adapter of FIG. 24A with the latch in the normal position.
Figure 24B:
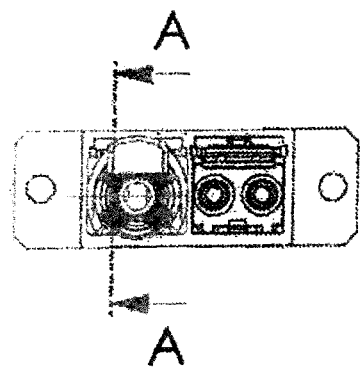
FIG. 24B is a front view of the connector and the adapter of FIG. 24A.
Figure 25:
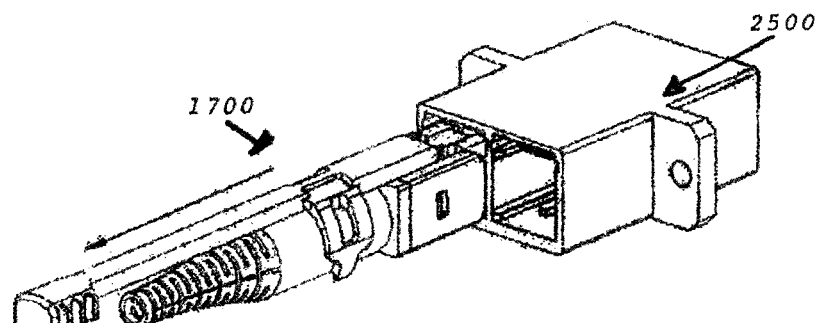
FIG. 25 is a perspective view of a connector inserted into an adapter with the push/pull tab retracted according to aspects of the present disclosure.
Figure 26A:
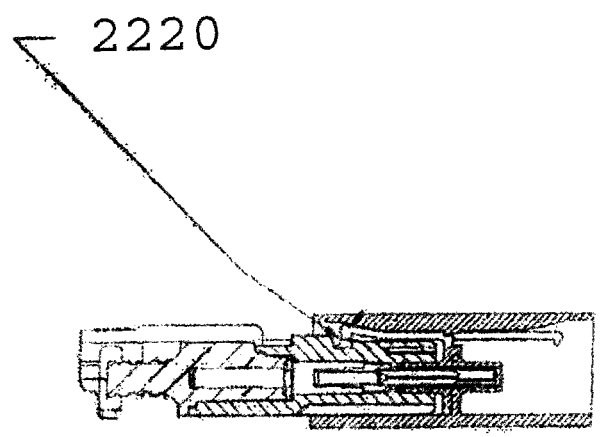
FIG. 26A is a section taken in the plane including line B-B of FIG. 26B showing the connector and adapter of FIG. 25 having the adapter latch in an unlatching position according to aspects of the present disclosure.
Figure 26B:
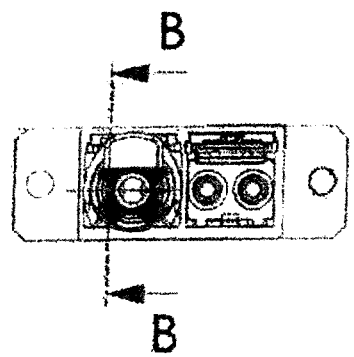
FIG. 26B is a front view of the connector and adapter of FIG. 26A.

FIGS. 23-24B show the operation of the connector 1700 using an adapter typically deployed in patch cabling systems having a similar latch mechanism to FIGS. 14A-B and similar operation as the transceiver in FIGS. 19-22B. FIG. 23 illustrates the connector 1700 inserted into the port of adapter 2300. The latch 1820 resides in the connector recess 1710, as shown in FIG. 24A. FIG. 24B is the front view of the connector inserted into the adapter as shown in FIG. 24A. FIGS. 25-26B, illustrate the same operation described in FIGS. 21-22B to release the connector 1700 from the port of the adapter in this case. The adapter port may also contain the flexible latch 1820 as does the transceiver port of FIG. 20A. FIG. 26B is a front view of the connector and adapter of FIG. 26A.

Figure 27A:
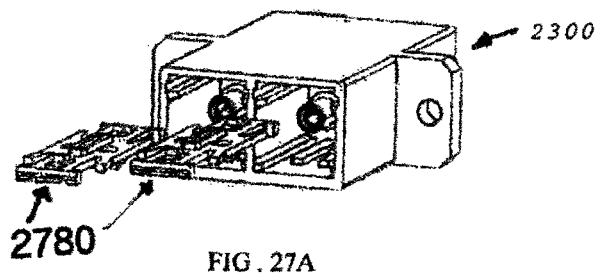
FIG. 27A is a perspective of the adapter showing the latch hooks exploded therefrom prior to assembly with the adapter.
Figure 27B:
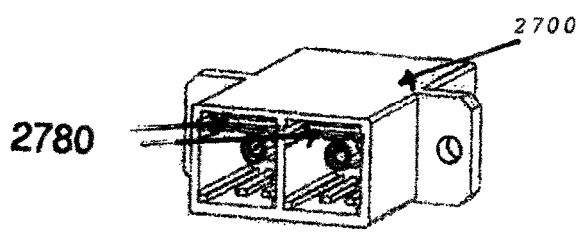
FIG. 27B is a perspective of the assembled adapter.
Figure 27C:
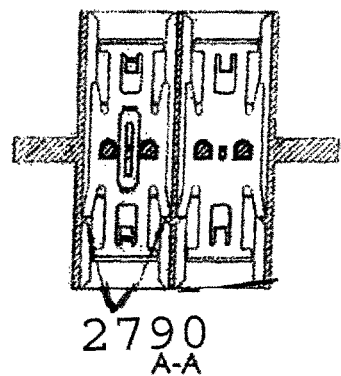
FIG. 27C is a section taken in the plane including line A-A of FIG. 27D.
Figure 27D:
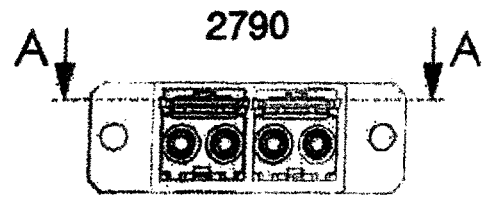
FIG. 27D is a front view of the assembled adapter.

Referring to FIGS. 27A-D, the adapter 2300 of FIG. 23 may have the flexible latch 2780 inserted into each port of the adapter 2700 as shown in FIG. 27B. FIG. 27C is the A-A cross-section of FIG. 27D, which is a front view of the assembled adapter. FIG. 27C shows the flexible latches 2780 engaged the support rails as shown and press fitted 2790 into the adapter body to secure the latches from being displaced upon insertion and removal of the connector. The flexible latches 2780 slide into and snap into place during assembly of the adapter 2300. A similar press fitting structure may be used in the transceiver port. The press fit structure helps retain the flexible latches in the port when the outer dimension of the flexible latch 2780 is slightly larger than the inner port, so upon insertion of the latch 2780, the friction between the latch and port support rails retain the latch 2780.

The embodiment disclosed in FIGS. 14A-27D suffers from a number of drawbacks that the additional embodiments discloser herein overcome. The latch 1402, 1820 and recess 1710 has a limited pull force that exceeded can result in removing the connector from the port. Also at the connector, the front portion 1614 may dislodge from an opening 1675 under stress at the connector or its cabling, and the connector front portion 1614 will become wedge or stuck in the port. Also the latch recess 1712 does not fully secure the latch 1820 therein, and stress on the connector body or its cabling can dislodge the latch wherein the connector becomes loose in the port, which is not visually detectable. This leads to signal loss when the interconnection is broken. Also the latch and recess has movement that can result in misalignment of the opposing fiber optic signal paths. As shown in FIG. 17E and FIG. 18C, the hook on the flexing latch can slide widthwise in the recess 1614 of the connector 1600. Also, the flexible latch is press fitted into the port which under sufficient pull force may be dislodged or misaligned which can prevent a connector from being inserted into the port. Furthermore, as connectors and ports decrease in overall size (e.g. outer, inner and length dimensions), the amount of exposed structure decreases to secure and align connectors. Since connectors are made primarily from plastic for cost reasons, and plastic fails more frequently than metal, and because testing is standardized, more innovated designs are needed to maintain the same performance as metal, as plastic components are smaller and have less structural integrity.

FIGS. 23-27D illustrated various views and details that show a narrow pitch multi-fiber connector both engaged and disengaged from an adapter port. The connector and the adapter include latching mechanisms are designed and arranged to be latched and unlatched, for example, with the use of a push/pull tab that is positioned on the connector body.

As discussed herein, structural improvements are needed to reduce connector and adapter (transceiver size also) and to incorporate new release mechanisms and boot designs to meet the varied industry environments. Referring now to FIG. 28A, an embodiment of an improved the narrow pitched connector or CS connector is shown exploded for detail. It should be noted that this visual example is for explanatory purposes, and that various alternative examples may exist, some of which are discussed herein. In some embodiments, a CS connector may be a miniature single-position plug generally characterized by dual cylindrical, spring-loaded butting ferrule(s) of approximately 1.25 mm in diameter, and a push-pull coupling mechanism.

In some embodiments, the CS connector may comprise a front body (i.e., plug frame) 2801, which houses the ferrule(s) and ferrules flange(s) 2802. A rear body (i.e., back post) 2804 may connect to the rear of the front body 2801 and contain the ferrule-flange(s) 2802. The ferrule-flange(s) 2802 may be held in place using one or more springs 2803. The rear body 2804, as shown, may include a crimp ring 2805 attached to the rear of the rear body. In some embodiments, a cable boot 2806 may surround the crimp ring 2805. In some embodiments, and as shown, a dust cap 2807 may be placed over the front body 2801 in order to protect the ferrules housed in the front body from damage and/or debris.

In additional embodiments, a push-pull tab 2810 may be attach to the CS connector, as discussed in more detail herein. The push-pull tab 2810 may have a side portion 2812 and a center protrusion (i.e., 2813*b*), which serves to anchor the pull-tab and other functions discussed further herein. The push-pull tab 2810 may utilize a tab spring 2808 to apply a constant directional force on the push-pull tab to allow for various benefits which are discussed herein. The pull-pull tab 2810 may have a widthwise recess 2817 and a multi-sloped ramp area 2820 that engages an anchoring device to help ensure repeatable release and connect of a connector within a port.

Referring briefly to FIG. 28B, one embodiment of an assembled CS connector with a push-pull tab is shown. In some embodiments, and as shown, the push-pull tab 2810 has a front portion 2814 which resides in a lengthwise groove 2875 within the front body 2801. Thus, when the push-pull tab 2810 traverses the connector, as discussed in detail herein, the front portion 2814 moves independently of the front body 2801. The side portion 2812 is one anchor point for the push-pull tab 2810 to the connector 2800C. The anchor point 2813*d* is an extended tab extending from the side portion 2812 beneath the rear body 2804.

Figure 28C:
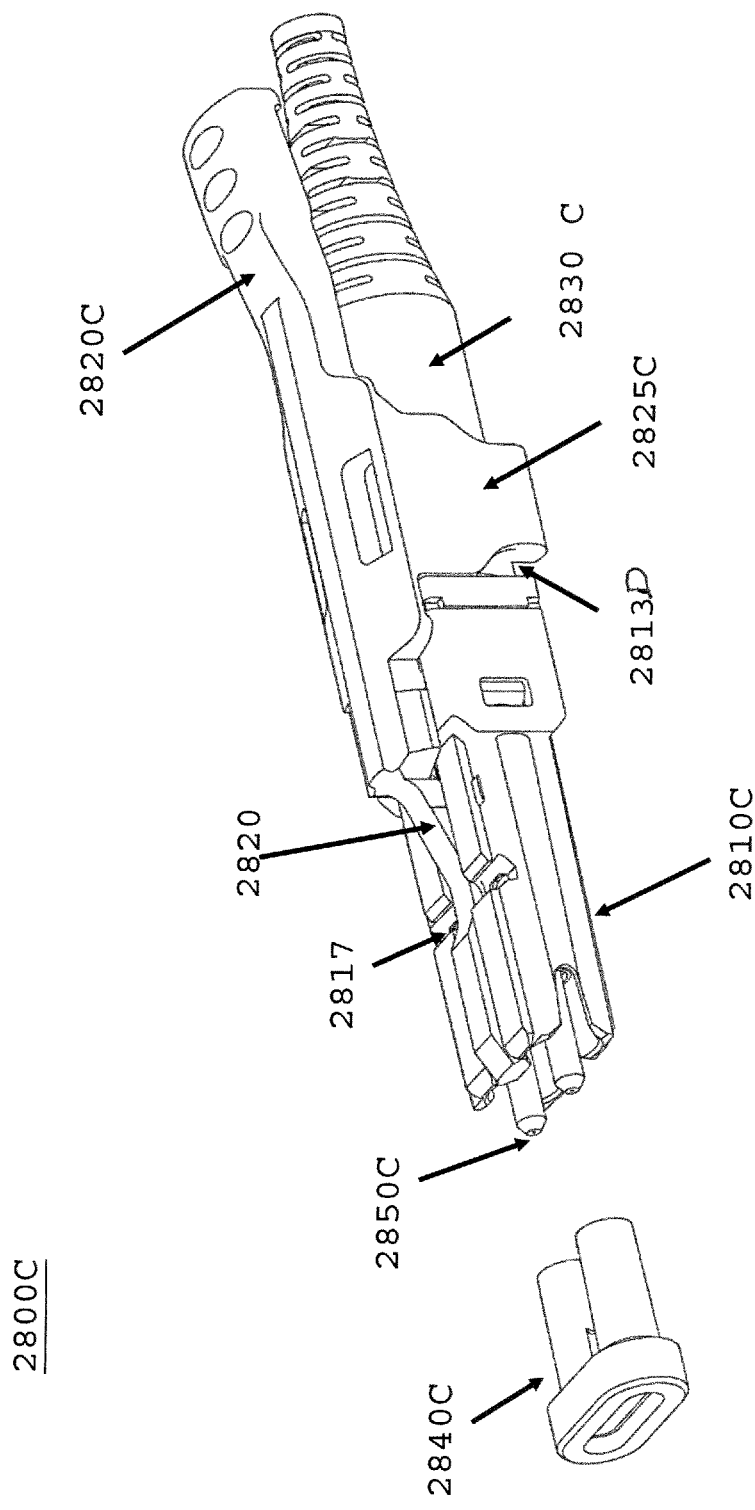
FIG. 28C is a perspective view of connector of FIG. 28B with a different push-pull tab knob according to aspects of the present disclosure.

FIG. 28C is a perspective view of the low profile, compact connector with a standard push-pull tab release having a ruggedized round cable. In some embodiments, the compact connector 2800C may comprise a dust cap 2840C, one or more ferrules 2850C, a connector housing 2810C, a push-pull tab 2820C, one or more ears 2825C, and a ruggedized round cable 2830C. The ears 2825C extend under the rear body and act as an anchor point 2813*d*, as shown in FIG. 28E. The ears help prevent inadvertent removal of the push-pull tab by popping off during use, and the ears further help guide the push-pull tab along the connector housing.

Figure 28D:
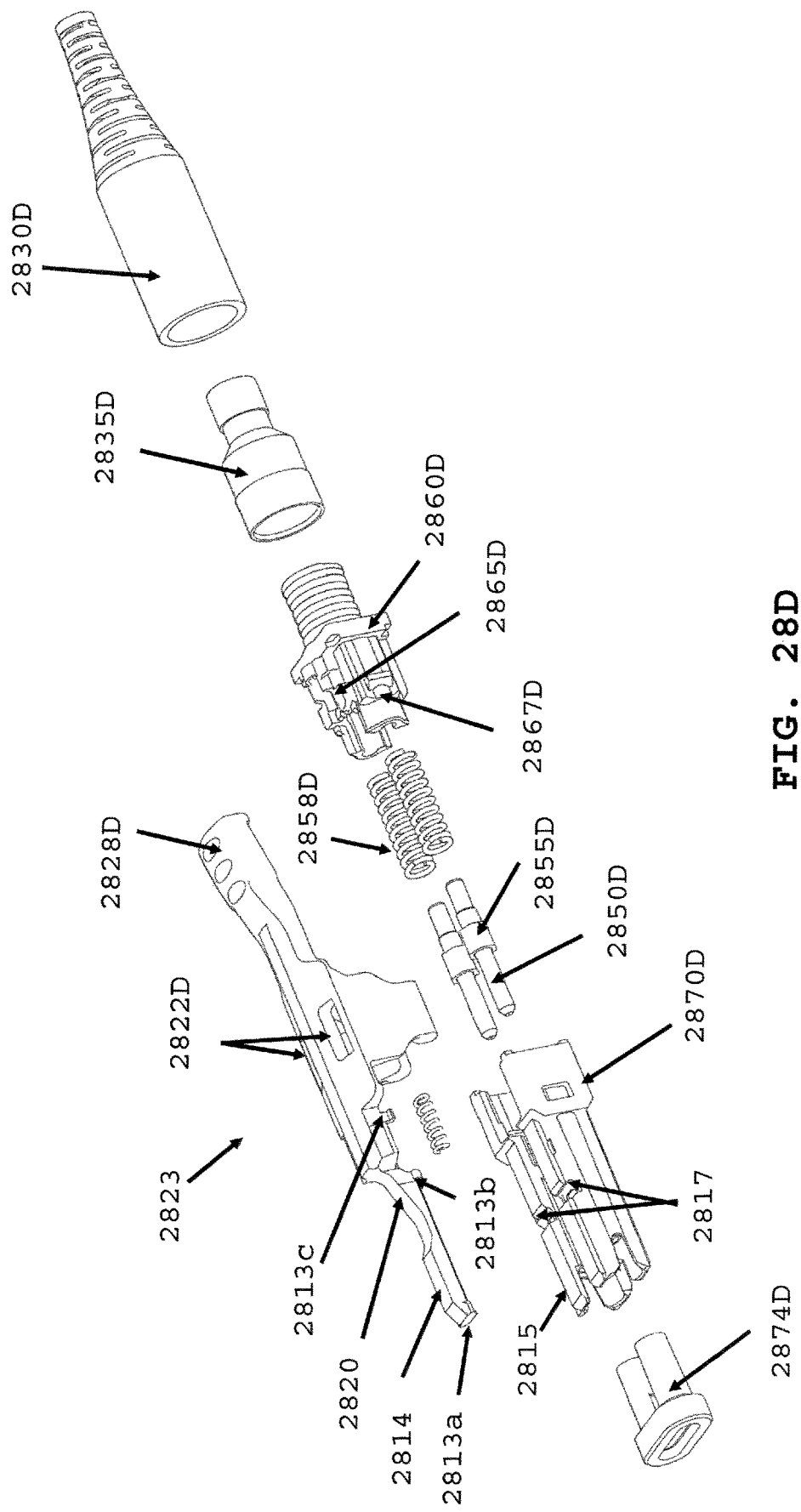
FIG. 28D is an exploded perspective view of the connector of FIG. 28C.
Figure 28E:
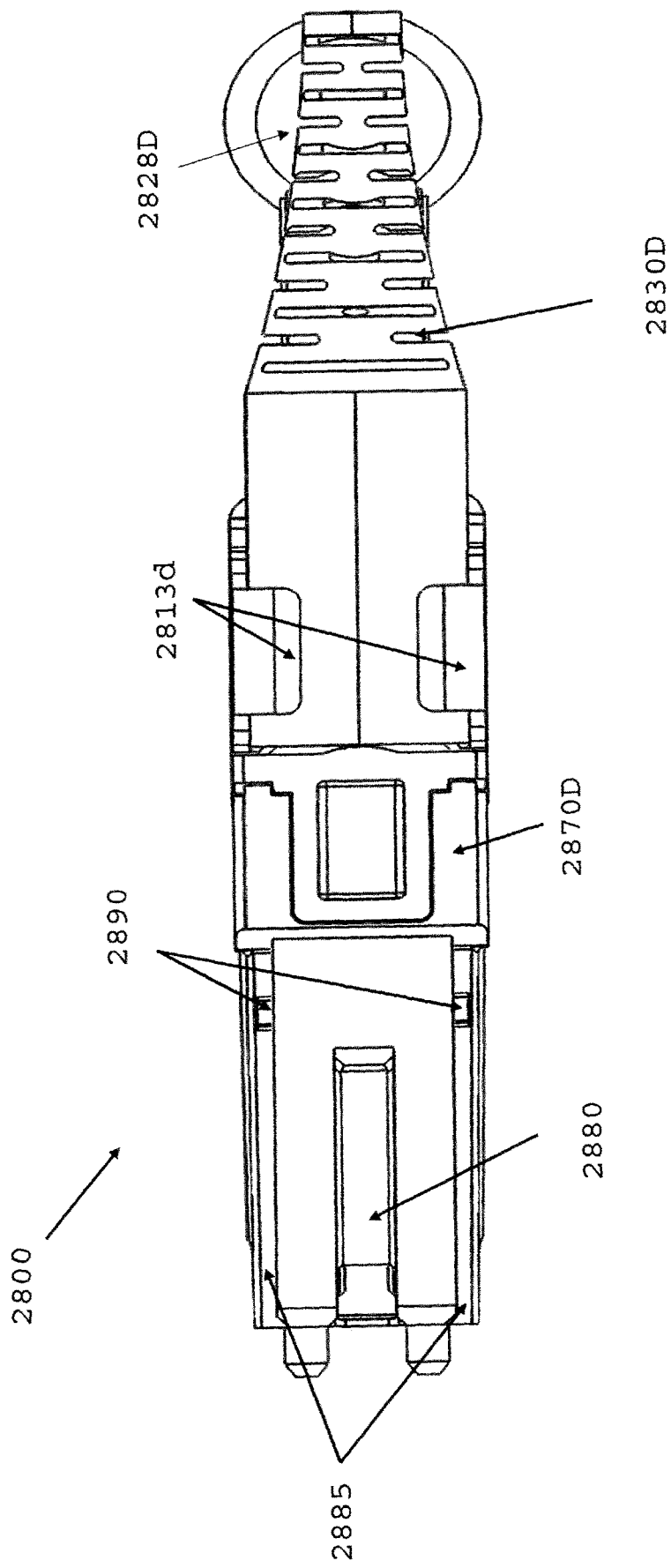
FIG. 28E is a bottom view of the connectors of FIGS. 28B and 28C according to aspects of the present disclosure.

Referring to FIG. 28D, the push-pull tab 2823 is improvement over the push/pull tab 1604. The push-pull tab 2823 has three additional anchor points 2813*a*, 2813*b*, and 2813*c*. The anchor point 2813*a* has a protrusion 2813*a* or tongue that extends perpendicular into the groove 2875, and provides stability to the proximal end of the push-pull tab that showed a tendency to jump out of the groove 2875 at the front portion 2814 when the force on the push-pull tab at the distal end was excessive. The front portion engagement surface 2815 engages the port inner surfaces to help align the connector therein. The anchor point 2813*b* is shown in FIGS. 32B, 32C and 33B. The second anchor point 2813*c* is show in FIGS. 32B, 32C and 33C. The increase number of anchor points helps ensure the pull-push tab 2823 front portion 2814 does not become dislodged from the groove 2875 in the connector body 2801. If the push-pull tab 2823 becomes dislodge there is no way to remove the connector from the port without damaging the transceiver or adapter, and destroying the connector.

Referring again to FIG. 28D, FIG. 28D shows an exploded view of a compact connector for more detail. In some embodiments, such as those shown in FIGS. 28A-E, the compact connector may have a push-pull tab 2823, which may have one or more back body latch openings and engagement surfaces 2822D, a latch adapter recess 2817, and a knob 2828D. As discussed herein, the connector may have a return spring to return the push-pull tab to its original location. The main connector body 2870D may also comprise a dust cap 2874D, a plug frame adapter engagement surface 2814, and one or more hooking surfaces (i.e. recesses) 2817 Some embodiments may also have ferrules 2850D, ferrule flanges 2855D, compressing springs 2858D, a back body housing 2860D, a crimp ring 2835D, and a cable boot 2830D. In some embodiments, the back body housing 2860D may also have a front body latch 2867D and a back body latch 2865D.

Referring to FIG. 28E, this figure shows a recess 2880 that runs lengthwise within the connector front body 2870D, at its underside. This recess 2880 engages a corresponding rail guide 5835 (FIG. 58B) that is part of the inner structure of the receiver device port 6020. The cutouts 2885 on either side underneath the connector front body 2870D engage and accept the guide rails 5835. The protrusions 2890 help stabilize the connector outer housing in the receiving device port. A receiver device may be an adapter 6000 or transceiver 1900.

Figure 29A:
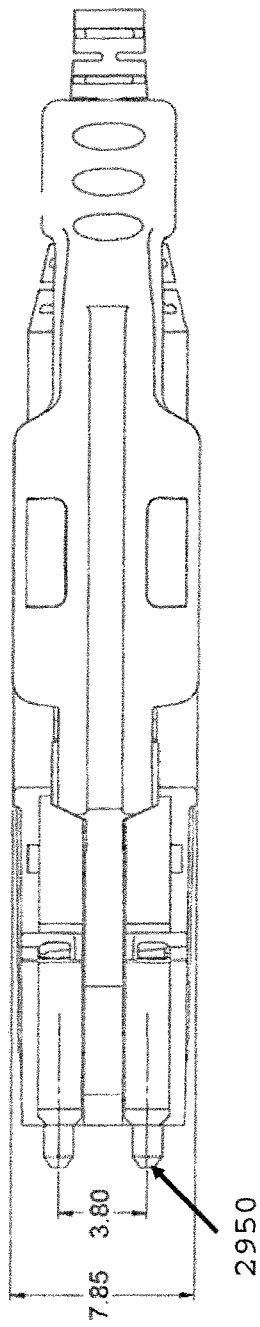
FIG. 29A is a top dimensional view of a connector according to aspects of the present disclosure.
Figure 29B:
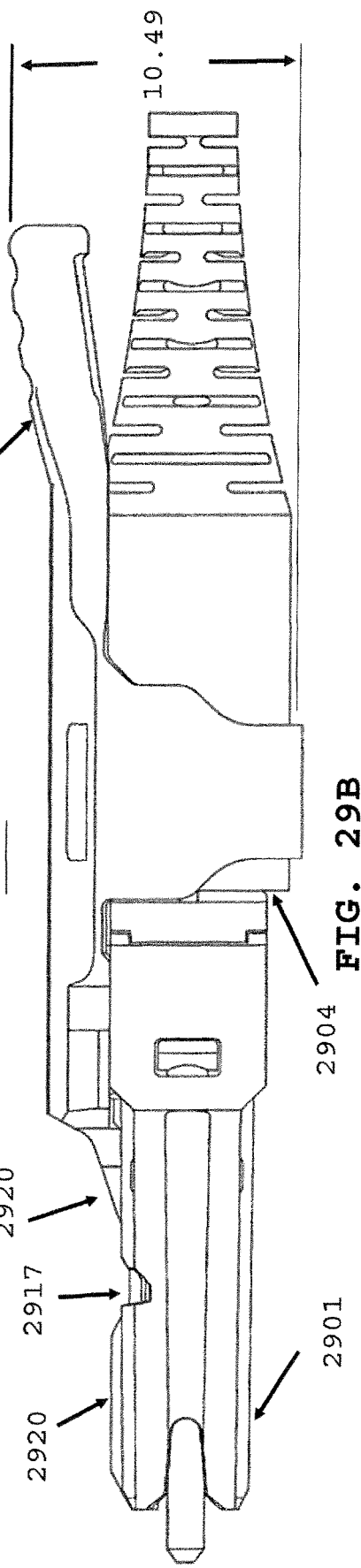
FIG. 29B is a side dimensional view of a connector according to aspects of the present disclosure.

In one or more embodiments, and as shown in FIG. 29A, a CS connector may have an overall dimensional width of 7.95 millimeters. Additionally, in further embodiments, the CS connector may have a pitch of 3.8 mm. As discussed herein, the pitch is defined as the axis-to-axis distance between the central axes of the CS connectors 2950. Moreover, as shown in FIG. 29B, an embodiment may have an overall dimensional height of 10.46 mm when the push-pull tab 2910 is attached to the front body 2901 and the rear body 2904. The connector recess 2917 accepts the latch (not shown) when inserted into a port. The ramp area 2920 and front portion 2914 aid in the release of the connector from a port.

Figure 30A:
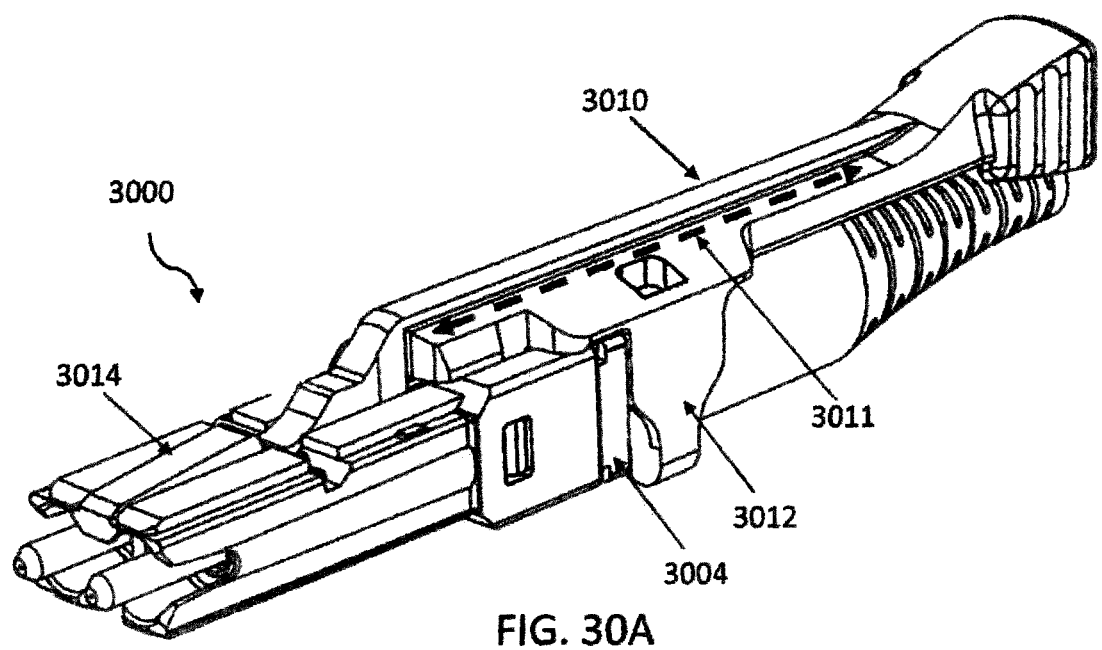
FIG. 30A is a perspective view of a connector with the push-pull tab in the forward position according to aspects of the present disclosure.
Figure 30B:
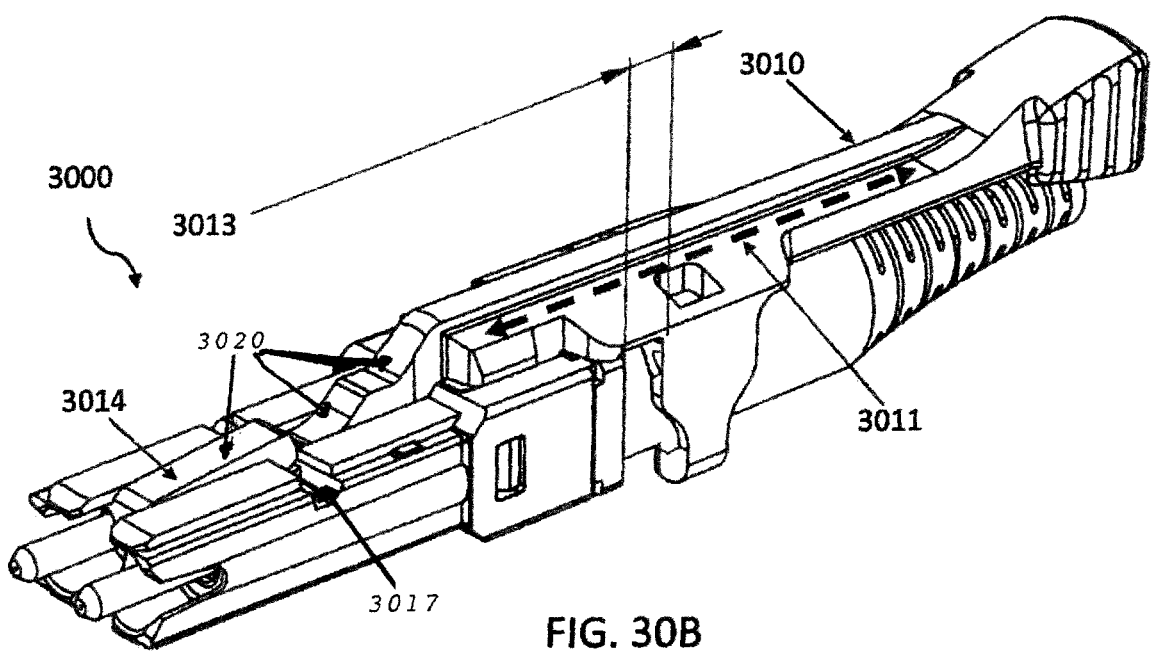
FIG. 30B is a perspective view of a connector with the push-pull tab in the rearward position according to aspects of the present disclosure.

As disclosed herein, a connector (e.g., a CS connector) may have a push-pull tab to allow for easy insertion and extraction from an adapter port. Referring now to FIGS. 30A and 30B, in some embodiments, the push-pull tab 3010 may slide forward and rearward in a lengthwise manner in a groove in relation to the connector as indicated by the dashed double-sided arrow 3011. FIG. 30A shows an embodiment in which the side portion 3012 of the push-pull tab 3010 contacts the rear body 3004. This contact between the side portion 3012 and the rear body 3004 stops the forward movement of the push-pull tab 3010. The positions the front portion 3014 of the push-pull tab 3010 at its proximal end, with the spring biased forward (not shown) is in a relaxed state. In this position, the connector 3000 can be inserted into a port, and the recess 3017 will lock with the corresponding internal port structure (not shown) to secure the connector in the adapter or transceiver. FIG. 30B shows the push-pull tab 3010 being pull rearward 3011 indicated by the distance 3013. This moves the front portion 3014 rearward, along with the front portion ramp area 3020, to engage the adapter latch or hook (not shown) to release the connector from the port.

In a further embodiment, the push-pull tab 3010 may be moved away from the rear body by a distance 3013 of about 1 mm to about 3 mm. The push-pull tab 3010 may have a center protrusion (such as 2813b in FIG. 28A) which makes contact with the rear body 3004. This contact between the center protrusion or front portion 3014 and the rear body 3004 may stop the rearward movement of the push-pull tab 3010.

Figure 31B:
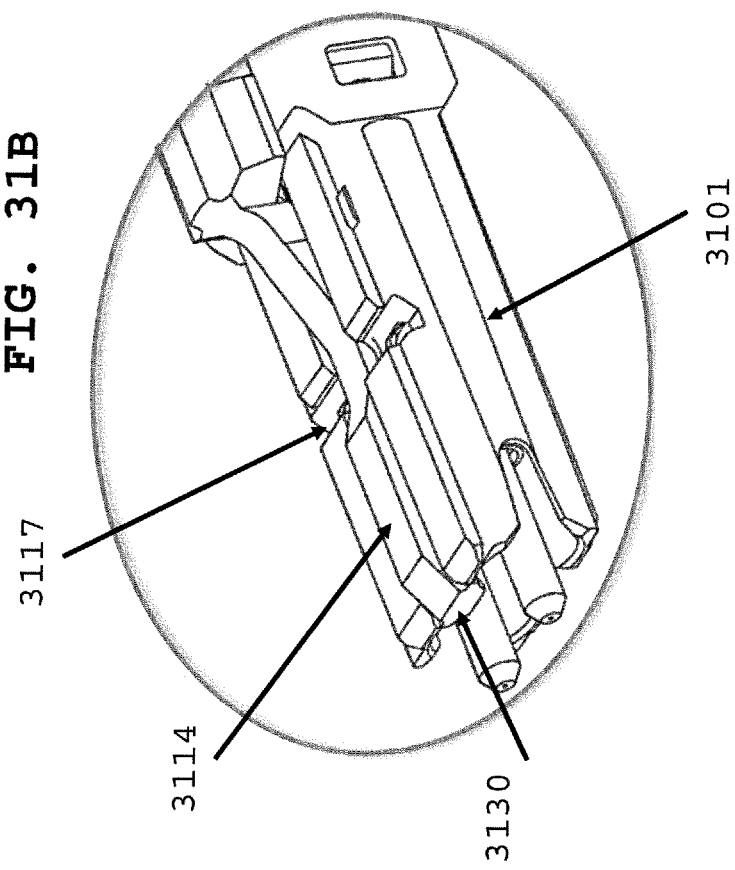
FIG. 31B is a zoomed perspective view of the connector of FIG. 31A with the push-pull tab according to aspects of the present disclosure.
Figure 31A:
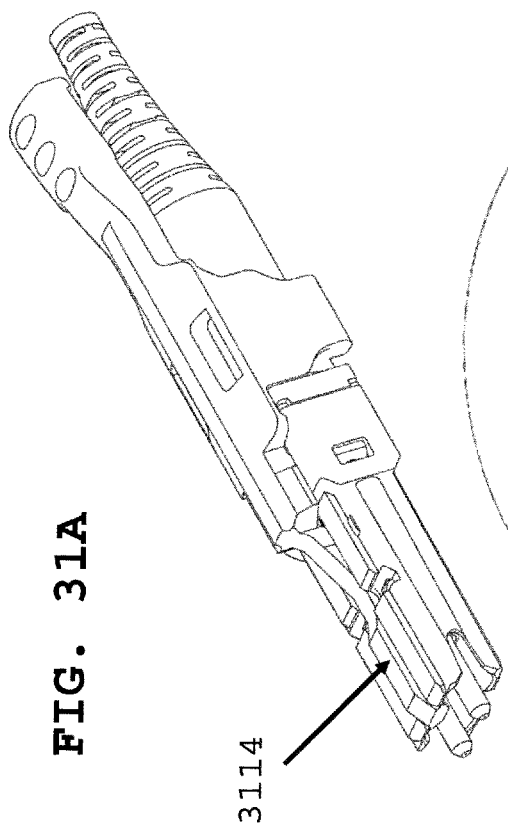
FIG. 31A is a perspective view of a connector with the push-pull tab according to aspects of the present disclosure.
Figure 31C:
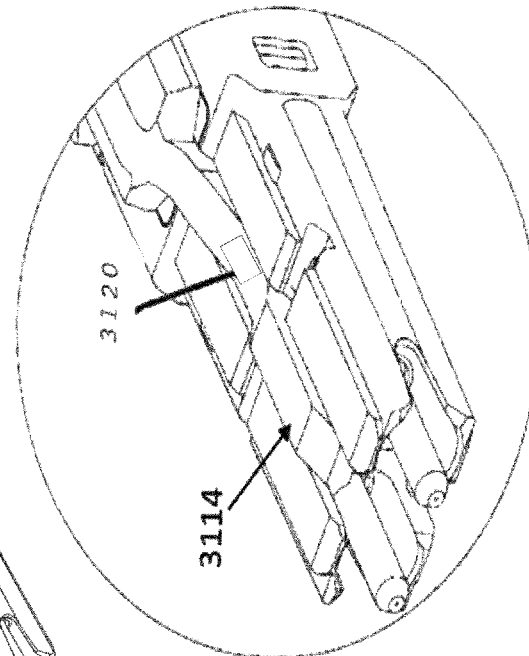
FIG. 31C is another zoomed perspective view of a connector with the push-pull tab to aspects of the present disclosure.

Referring to FIGS. 31A-C.1, a CS connector according to some embodiments is shown. As discussed herein, the push-pull tab has a front portion 3114. In some embodiments, the front portion 3114 may comprise a tip 3130. The tip 3130 may comprise a slit or groove (not shown) which may slide over a portion of the front body 3101 in order to securely fasten the front portion 3114 to the front body 3101. The tip 3130 corresponds to the anchor point 2813a. The slit or groove may, in some embodiments, be large enough to accommodate the movement of the push-pull tab as discussed herein. Stated differently, when the push-pull tab is pulled away from the front body (see FIG. 30B and corresponding description) the push-pull tab may slide along the front body (i.e., FIG. 31C), thus the slit or groove (e.g., FIG. 28A, 2875) must be large enough to allow for the movement of the push-pull tab while also ensuring a secure attachment in the non-retracted state (i.e., FIG. 31B). FIG. 31B shows the recess 3117 to receive the corresponding port structure to secure the connector upon insertion therein. The ramp area 3120 is involved in lifting the latch (not shown) to release the connector from the port, and described herein.

As shown in FIG. 32A, and discussed herein, an embodiment may comprise a spring 3208 (i.e., FIG. 28A, 2808). The spring 3208 applies a biasing force to the push-pull tab 3210 in the forward direction such that the groove of the front body 3201 and the groove of the push-pull tab 3210 align as discussed herein, and shown in FIGS. 47A-C. As shown in FIG. 32A, the hidden lines show the spring 3208 within the push-pull tab 3210. In additional embodiments, the push-pull tab 3210 may comprise a wedge portion 3231. The wedge portion 3231 is configured such that it can snap into the front body 3201 and slide/traverse the groove (see FIG. 28A at 2875) when the push-pull tab is moved along the housing (i.e., front body and rear body). This wedge portion 3231 is the second anchor point 2813b. Anchor point 2813b or wedge 3231 is detailed at cross-section X-X of FIG. 33B. As shown in FIG. 32B, the main connector body 2870D (i.e. the front body 2801) has a clip 3233 which is the third anchor point 2813c. The clip anchors the push-pull 3010 housing to the main connector body 2870D, as shown in FIG. 32C. The clip is detailed at cross-section Y-Y of FIG. 33C.

Referring now to FIGS. 33A-C.1, a CS connector is shown including cross-sections of various embodiments. FIG. 33A illustrates an example CS connector (shown at FIGS. 28, 29 and 30) according to some embodiments with two separate cross-sectional areas identified. The first cross-sectional area (i.e., X-X) is further detailed in FIG. 33B.1. FIG. 33B.1 shows how the wedge portion 3331 snaps into, or connects, with the front body 3301. It should be understood, that the design of the wedge portion 3331 ensures a secure connection to the front body 3301 while also allowing for the push-pull tab 3310 to move along the length of the front body 3301 in the groove as discussed herein. In additional to the wedge portion 3331, some embodiments may also have a further securing connection device comprising one or more clips 3332, as shown at FIG. 33C, which are formed as part of the push-pull tab. In some embodiments, and as shown, the one or more clips 3332 connect to and snap into the front body 3301 (as shown in FIG. 33C.1), and positioned adjacent to the rear body 3304 which is inserted into the front body. It should be understood that these are non-limiting examples, and that various connection means may be used to secure the push-pull tab 3310 to the housing. Specifically, the wedge portion 3331 and the one or more clips 3332 (as shown in FIG. 33C and detailed further at FIG. 330.1) may be located at various other locations on the push-pull tab 3310, as well as different location on the front body 3301 and the rear body 3304. It should be understood, that various portions of a connector system (e.g., CS connector system) may have adjustments made to accommodate various situations. One non-limiting example of these variations is shown in FIG. 34, which shows the push-pull tab 3410 being constructed with varying lengths as shown in FIG. 34.1, FIG. 34.2 and FIG. 34.3 with increasing length.

The connectors (e.g., CS connectors of FIGS. 28-30 and 34) disclosed herein may be inserted into an adapter and/or transceiver port (e.g., a fiber optic port), such as for example in a fiber array or server. A non-limiting illustrative example of a typical adapter is shown in FIG. 35A. FIG. 35A illustrates a dual port adapter for accepting two connectors (e.g., a dual ferrule CS connector). It should be understood, that the various dimensions provided herein are only for illustrative purposes, and that various other dimensions may be possible in various implementations. FIGS. 35B and 35C show specific cross-sectional cuts of the adapter shown in FIG. 35A. The various dimensions of FIGS. 35A, 35B, and 35C are listed below in Table 1. As shown in FIGS. 36A-C, 37A-C, and 38A-C, and discussed herein, the receiver/transceiver port may allow for the insertion of an anchor device.

TABLE 1

| Reference | Dimensions (mm) | |
|---|---|---|
| | Minimum | Maximum |
| F1 | 6.5 | 6.7 |
| F2 | 6.5 | 6.7 |
| G1 | 3.8 | |
| G2 | 3.8 | |
| GA1 | 1.90 | |
| GA2 | 1.90 | |
| H1 $^{a, b}$ | 2.87 | 2.97 |
| H2 $^{a, b}$ | 2.87 | 2.97 |
| I1 | 3.7 | 3.8 |
| I2 | 3.7 | 3.8 |
| J1 | 5.75 | 5.85 |
| J2 | 5.75 | 5.85 |

TABLE 1-continued

| Reference | Dimensions (mm) Minimum | Dimensions (mm) Maximum |
|---|---|---|
| K | 6.79 | 6.89 |
| L | 1.03 | 1.13 |
| M | 1.90 | |
| N | 0.05 | — |
| P | — | 0.8 |
| Q | — | 1.7 |
| R [a] | — | 1.25 |
| S | 0.55 | 0.75 |
| T | 4.0 | 4.1 |
| U | 0.3 | |
| V | 1.4 | 1.5 |
| W | 2.7 | |
| Y | 0.4 | 0.5 |
| Z | 3.7 | 3.8 |
| AA | 1.44 | 1.54 |
| AB | 4.35 | 4.55 |
| AC1 | 0.5 | |
| AC2 | 0.5 | |
| AD | 2.55 | 2.65 |
| AF | 9.24 | 9.38 |
| AG | 14.55 | 14.65 |
| AI1 | 3.0 | 3.2 |
| AI2 | 3.0 | 3.2 |
| AJ | 7.9 | 8.1 |
| AK1 | 1.43 | 1.53 |
| AK2 | 1.43 | 1.53 |
| AL | 90 | |
| AM | 2.24 | |
| AN | 2.65 | 2.75 |
| AO | 0 | 0.2 |
| AP | 2.1 | 2.3 |
| AQ1 | 4.0 | |
| AQ2 | 4.0 | |
| AR | 15.38 | |
| AS | 0.5 | |
| BA | 8.22 | 8.62 |
| BB | 0.2 | 0.4 |
| BC | 1.1 | 1.3 |
| BD | (0.75) | |
| BE | 3.5 | 3.7 |
| BF | (1.2) | |
| BG | 0.8 | 1.0 |
| P' | 0.75 | — |
| Q' | — | 1.15 |
| AD' | — | 2.3 |
| CA | 7.29 | 7.39 |
| CB | 1.65 | 1.75 |
| CC | 0.3 | — |
| CD | 2.3 | — |
| CE | (2.2) | |
| CF | (2.95) | |
| CG | 2.6 | 2.8 |
| CH | 2.45 | 2.55 |
| CI | 1.95 | 2.05 |
| F' | 6.25 | 6.35 |
| CJ | 1.75 | 1.85 |
| CK | 5.35 | 5.45 |
| CL | 0.67 | 0.77 |
| CM | 1.95 | 2.05 |

Figure 39:
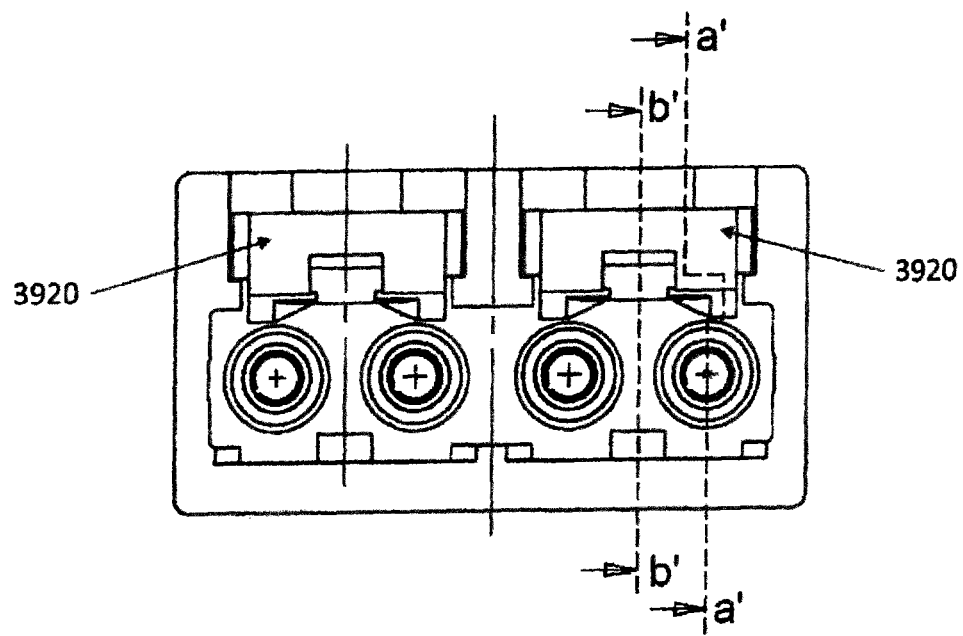
FIG. 39 is a detailed dimensional front view of a duplex adapter/transceiver with a removable anchor installed according to aspects of the present disclosure.

The embodiments shown in FIGS. 35A, 35B, and 35C illustrate an adapter capable of receiving various modifications. The adapter port structure is universal, in that, it can receive non-limiting variations of the removal modification device as shown in FIGS. 36A-C, 37A-C and 38A-C. The removal device is inserted into the slot AD1 and/or AD2 (FIG. 35A) of the adapter/transceiver port. The device 3920 is shown at FIG. 39 inserted into each slot. This device is an improved flexible latch with additional structure and novel shape that allows for more robust securing to the port inner structure, the latter having multiple contact points for mating with the front body 3201 outer housing of the connector.

For example, and referring to FIGS. 36A, 36B, and 36C, in some embodiments, a removable adaptor modification (e.g., the hook system of FIGS. 36B and 36C) may be inserted into the adaptor shown in FIG. 36A. The removable modification device 3644, such as that shown in FIGS. 36A, 36B and 36C, may comprise one or more hook tips 3621, a hook engagement surface 3626, the hook engagement surface may have a cutout as shown 3626a, a gap 3628, an adapter hook opening 3632, and a middle hook tip 3622, or a plurality of either (e.g., as shown, the modification device comprises two hook tips). The adapter hook opening 3632 is where the connector front portion 3114 resides when a connector is inserted into the adapter port. Adapter rails 3635 are for guiding and aligning the connector housing in the adapter port upon insertion of the connector into the adapter. The hook support 3660 holds the adapter hook 3644 inside the adapter port. The adapter port structure including the rails and hook support can be used in the transceiver port without departing from the scope of this invention.

Figure 37C:
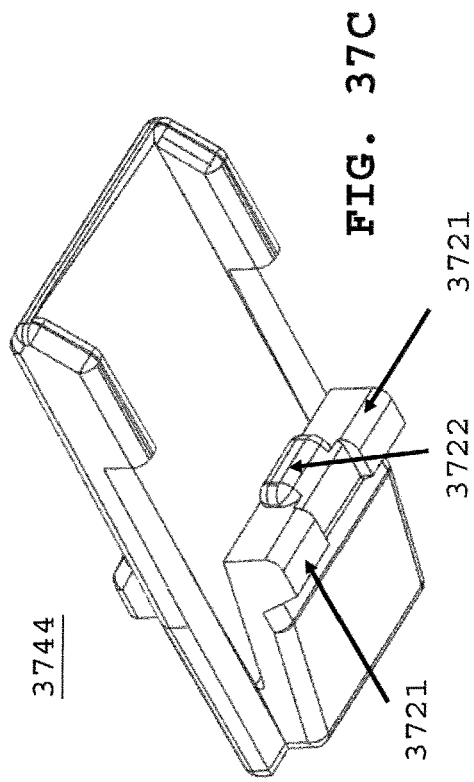
FIG. 37C is another perspective view of a removable anchor device.
Figure 37B:
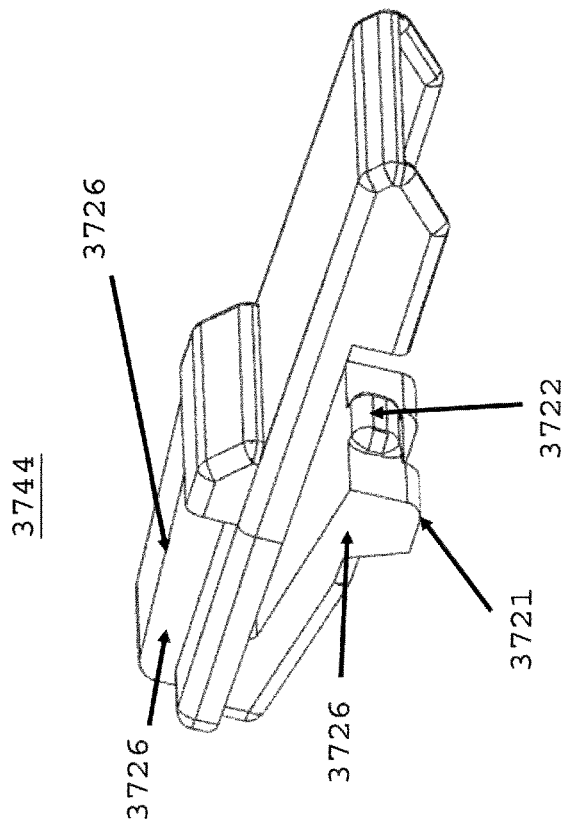
FIG. 37B is another perspective view of a removable anchor device.

It should be understood, that the removable modification device (i.e., interchangeable anchor device) may vary in style and design. FIGS. 37B and 37C provide an illustrative non-limiting example of a potential design for the interchangeable anchor device. As discussed herein, in some embodiments, a removable adaptor modification (e.g., the hook system of FIGS. 37B and 37C) may be inserted into the adaptor port as shown in FIG. 37A. The removable modification device 3744, such as that shown in FIGS. 37B and 37C, may comprise one or more hook tips 3721, hook engagement surfaces 3726, a hook engagement surface cutout 3726a, and a middle hook tip 3722, or a plurality of either (e.g., as shown, the modification device comprises two hook tips). The hook engagement surfaces mate with corresponding surfaces in the port to ensure stability and fit against connector movement upon impact or the like that may lead to signal loss due to misaligning of the fiber optic signal path between fiber optic ferrules.

In a further embodiment, and as shown in FIGS. 38A, 38B, and 38C, a removable adaptor modification (e.g., the hook system of FIGS. 38B and 38C) may be inserted into the adaptor shown in FIG. 38A. The removable modification device 3844, such as that shown in FIGS. 38B and 38C, may comprise a hook tip 3821, a hook engagement surface 3826, a hook radius 3824, a gap 3828, an adapter hook opening 3832 and a middle hook tip 3822, or a plurality of either (e.g., as shown, the modification device comprises two hook tips). This device is also called the reverse hook latch. Without departing from the scope of the present invention, the hook engagement surface may have a cutout 3826a. The cutout 3826a seats behind a corresponding adapter cutout 6010 (FIG. 60A) to secure the hook 3844 in a port.

Figure 40A:
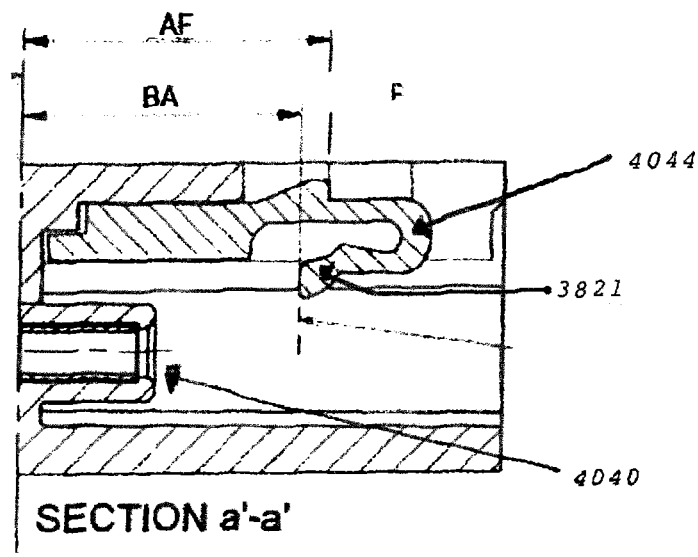
FIG. 40A is a section taken along line a'-a' of FIG. 39.
Figure 40B:
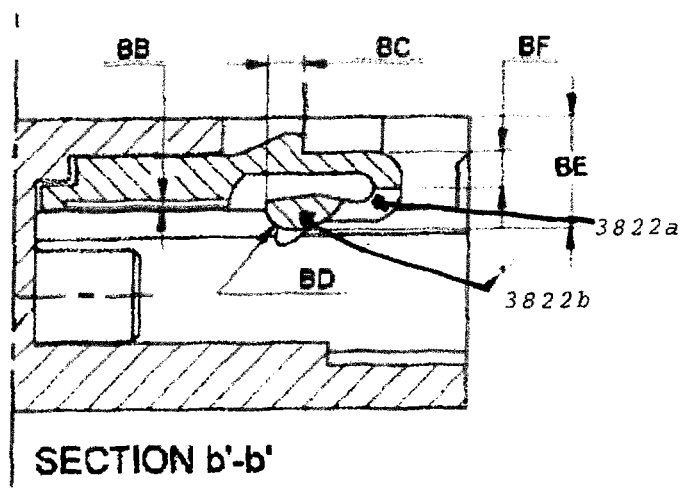
FIG. 40B is a section view taken in the plane including line b'-b' of FIG. 39.

FIG. 39 illustrates a dual port adapter for accepting two connectors (e.g., a dual ferrule CS connector) similar to that shown in FIG. 35A, however, FIG. 39 includes two removable modification devices 3920. It should be understood, that the various dimensions provided herein are only for illustrative purposes, and that various other dimensions may be possible in various implementations. FIGS. 40A and 40B show specific cross-sectional cuts of the adapter shown in FIG. 39, and thus, the identified dimensions of FIGS. 39, 40A and 40B are also listed in Table 1. FIG. 40A shows the modification device (e.g. anchor or hook 3844) 4044 inserted in adapter. Located within the adapter housing is an alignment sleeve holder 4040 that accepts a ferrule (1602, 1604) of FIG. 16C. The hook tip 3821 is shown in FIG. 40A. Referring to FIG. 40B, the middle hook tip 3822a is shown in a first position (without cross-hatching) and no connector inserted, and in a second position (with cross-hatching) showing the middle hook tip 3822b deflected upon insertion of the connector. The deflecting is described in more detail below. Furthermore, FIG. 40C illustrates an example embodiment comprising a push-pull configured adapter with one or more hooks inserted in an adapter port. The hook 4044 position is shown in a standard, transparent, and section cut view, at FIGS. 40C.1 and 40C.2 respectively. Referring to the section cut view and transparent view of adapter 4000, the hook engagement surface 3826 seats up against its corresponding port hook engagement surface 4025C. This prevents the hook from being unintentional remove when excessive force is used to release the connector, if the connector body or its cabling is stressed. Moreover, the hook placement as shown helps prevent lateral movement of the hook in the adapter port. As compared with FIGS. 27A-D, the updated hook designs over the flexible latch 1820 and the port structure (FIG. 40C) over the rails only in FIG. 27A is an obvious improvement when the port inner wall structure is being used to secure the hook, over press fitted securing.

Further illustration examples are also shown in FIGS. 40D-40F. As shown in FIG. 40D or FIG. 40D.1, a hook 4044 or FIG. 40AC at hook 4044, may be inserted horizontally into the adapter 4000 port along the hook support 3660 located at the inner sides of the port. FIG. 40D illustrates a dual or duplex port adapter 4000, although the same adapter 4000 may have a single port without departing from the scope of the invention. FIG. 40D shows the hook 4044 just prior to insertion. FIG. 40E shows the hook 4044 partially inserted into the port of the adapter 4000. FIG. 40E further shows how the hook changes when it is forced through the adapter (i.e., the hook must deform when passing through the latch slide feature underneath the top region until it reaches its final secure location. This deforming imparts stress into the hook, which is released once the hook gets in behind the adapter to hook engagement surfaces or adapter cutouts (FIG. 60A, 6010). Finally, FIGS. 40F-F.1 show the hook when it is entirely installed, and the latch (3821, 3822 combined) feature is back to a normal or standard shape. The hook engagement surfaces 3826 are in contact with the adapter hook engagement surfaces 4025D as shown comparing FIG. 40D.1 with FIGS. 40E and 40E.1.

Figure 41A:
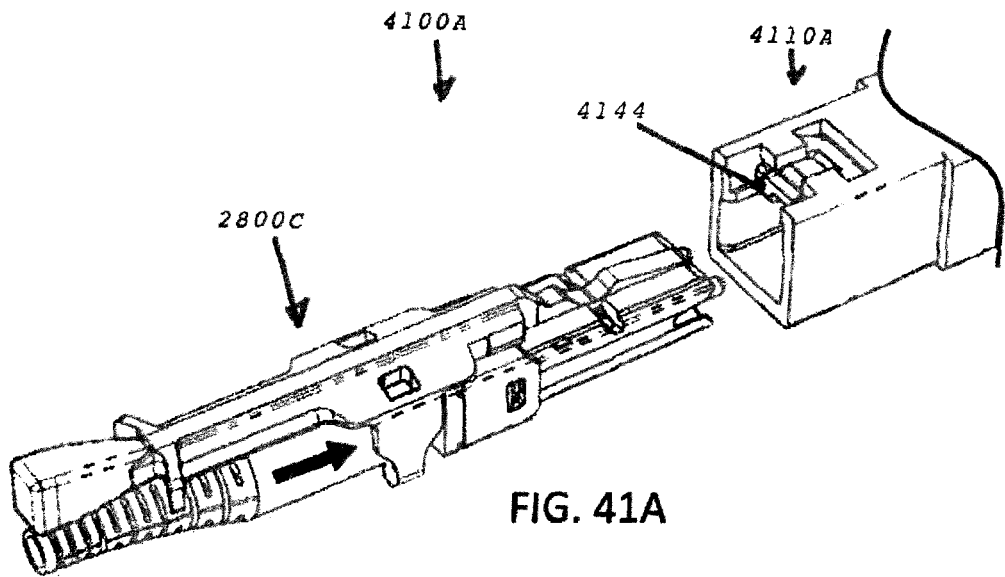
FIG. 41A is a perspective view of a CS connecter being inserted into an adapter/transceiver.
Figure 41B:
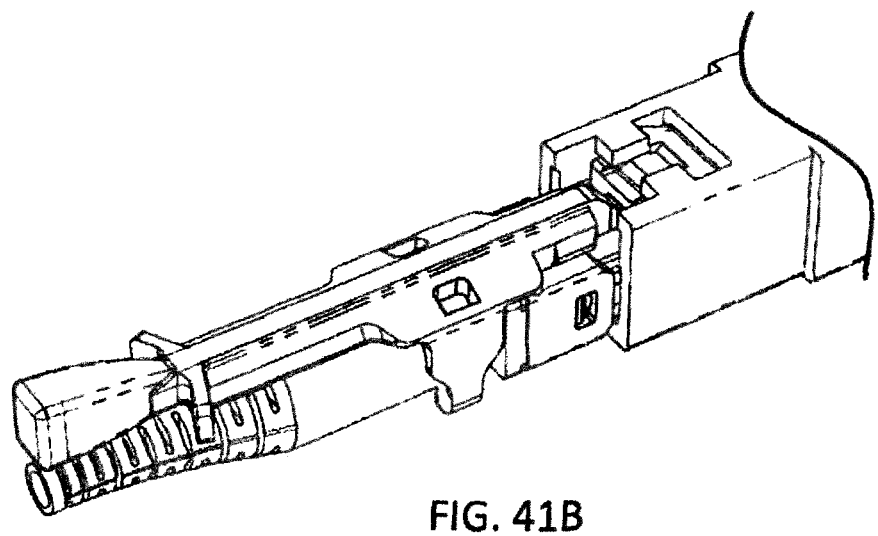
FIG. 41B is a perspective view of a CS connecter after being inserted into an adapter/transceiver.

Referring now to FIGS. 41A and 41B, illustrative examples of a CS connector 2800C (e.g. LC Type connector which is low profile and compact) being inserted into a single port adapter 4110A as shown, with a hook 4144 (e.g. 3644, 3744, 3844) embedded in the adapter port. As discussed herein, the adapter shown in FIG. 41B comprises the modification device (or hook), which engages with portions of the CS connector 2800C as discussed below in detail.

FIGS. 42A.1-42A4.1 shows a CS connector 2800C being inserted into an adapter (4000, 4110A). The modification device 4244 engages and interacts with the CS connector as the connector is inserted into the adapter housing. In some embodiments, as the CS connector is inserted, the front of the CS connector contacts hook ramp (FIGS. 37B and 37C at 3722, and FIGS. 38B and 38C at 3822) which lifts the portion of the modification device that is interacting with the CS connector. Referring to FIGS. 42A.1-42A4.1, the hook 4244 is located in the adapter housing 4000, and the connector 2800C is positioned outside the adapter port just prior to insertion into the adapter 4000, and the second drawing connector 2800C is partially inserted into the adapter port 4000a, and in the final drawing connector 2800C is fully inserted into the port of adapter 4000b. Upon full insertion, cutout 4231 shows the front portion ramp 3020 lifting the middle hook tip 3822 sometimes called hook ramps, and when the connector front portion 2814 passes beyond the middle hook tip 3822, the front portion resides in a hook opening 3832.

Still referring to FIGS. 42A.1-42A4.1, the movement of the modification device is shown in zoomed-in detail views 4231 and 4232. As shown, the hidden (e.g., dashed) line represents the profile hook ramp or ramps 3622, 3722, and 3822, and the solid lines represent the profile of the hook tips 3621, 3721, and 3821. The hooks 3621, 3721, and 3821 rise above the surface of the connector allowing for insertion of the connector into the adapter. Once the connector reaches the predetermined destination within the adapter (e.g., when a secure fiber connection is made), the hook tips 3621, 3721, and 3821 interlock with a recess 4217 on the connector. This interlocking action secures the connector within the adapter housing by using tab 4215 during push-in action.

Additional detail related to the adapter features is shown in FIGS. 42B.1-42B.6. The first stop in the connection of the adapter 4210B and the connector 4215B is to insert the connector into the adapter as shown in the top two images of FIGS. 42B.1-42B.2. The inserted connector front portion compresses the hooks 4244, as shown in the second two of illustrations, FIGS. 42B.3-42B.4. Finally, the last two of illustrations show the connector 4215B is securely fastened in the adapter via the hook 4244B, as shown in FIGS. 42B.5 and 42B.6. The illustration 4250B is the top proximal end of the connector fully inserted into the adapter housing, and the hook has latched into the recess 4217 on the top part of the connector. The second illustration 4245B shows the insertion from the bottom of the connector at its proximal end. The guiding rail 4235B of the adapter housing engages a track or recess 4230B located on the bottom side of the proximal end of the connector. The guiding rail 4235B can be considered a key that locates and aligns the connector upon and during insertion into the adapter, and further ensures no lateral movement of the connector while latched into the adapter housing. Movement can occur from incidental bumping of the connector, or vibration over time from the equipment can cause unwanted movement. If the connector is disrupted while in the adapter, the ferrules can misalign reducing signal strength. The final connection with hook 3844 is again shown in FIG. 42C-42C.3 which shows the connector 2800C inserted into the adapter 4200C and the hook tip 3821, 3822 interlocking with the widthwise recess 4217 as discussed herein. The outer hook tips 3821 become seated in the recess upon full insertion of the connector front portion 2814 in the port. The front portion 2814 resides in the hook opening 3828.

FIGS. 42D-42D.5 shows an embodiment wherein a specific adapter housing 4210B (i.e., pull release type as defined by a hook placed in a port of the adapter) is utilized. As discussed at length herein to release the connector 2800C from the adapter or transceiver port, a user is pulling (in the direction of the arrow) on the push-pull tab moved the tab along the length of the connector 2800C and continually lifts the hook mechanism, as shown in illustrations 4210D, 4215D, 4220D and 4225D, then at full extension of the push-pull tab, the connector is easily removed from the adapter port. As shown prior to pulling the push-pull tab 2820C the outer hook tip 3822 resides in the recess 2817. An improvement over the push/pull tab of FIG. 16A is the hook tips 3821, 3822 will catch and hold on the inner slope 2817a of the recess as shown in 4210D, at hook tip 3821, when a stress, such as an inadvertent pull is made on the cable or boot and not the pull/push tab 2820C.

Still referring to FIGS. 42D-42D.5, pulling at the tab 2820C, the front portion (2814, 3014) lifts the middle hook tip 3822, as shown as 4215D. Further pulling the pull knob rearward, the middle hook tip 3822 lifts out of the recess 2817, and continued rearward pulling lifts outer hook tips 3821, as the outer hook tips 3821 are connected to the middle hook 3822 as shown in FIGS. 38A-C.

Still referring to FIGS. 42D-42D.5, the hooks (3644, 3744, 3844) can be used inside the port of a transceiver (FIG. 1A) without departing from the scope of the invention. The inside structure of the transceiver port (FIG. 1A) is similar to FIGS. 35 and 39, as shown to accept and engage a connector 2800C. The inside of an adapter port is a transceiver at a first end without departing from the scope of the invention. The second end of the transceiver is connected to a computer interface card.

Referring to FIGS. 42E.1-42E.2, the connector of FIG. 33A is fully inserted into the adapter port of FIG. 60A. The hook tip 3821 is resting in the connector recess 3317. The hook engagement surface 3826 is fixed against the adapter to hook engagement surfaces or adapter cutouts 6010. This secures the hook 3844 firmly in the port of the adapter 6000. FIG. 42E.2 shows a cross-section of the FIG. 42E.1 that illustrates the position of the middle hook tip 3822 resting in the recess 3317.

Referring to FIGS. 42F.1 thru 42F.3 show the release of the hook tips of hook 3844 from the connector recess 3317, when the user pulls on the push-pull tab 3310 in the arrow direction 4250E. At FIG. 42F.1, the middle hook tip 3822 is lifted up out of the recess, as described in FIGS. 42D-42D.5, in the direction of the arrow 4252F. Continued pulling in the direction of the arrow 4250F on the push-pull tab 3310, the outer hook tips 3821 are lifted up out of the recess (as described in FIGS. 42D-42D.5), in the direction of the arrow 4252F. Continued pulling eventually the hook tips (3821, 3822) are lifted out of the recess 4216F, and the connector is removable from the port. As the middle hook tip is lifted, the outer hook tips are lifted, as the hook tips are connected as shown in FIG. 38B.

Referring now to FIGS. 43-43A, it is important to note that the front portion 4314a of the push-pull tab 4310 moves independently of the front body 4301, as discussed herein. This movement allows the release of the connector from the hook located inside the adapter housing at the port. Accordingly, the front portion 4314a of the push-pull tab 4310, which is shown in detail, may align with the recesses 4317 of the front body 4301. In this configuration, the hook tips 3621, 3721, and 3821 are able to securely fasten the connector to the adapter. However, depending on the embodiment, the push-pull tab 4310 may be moved in the forward or rearward direction thus knocking out the latch 1820 from the recess 1710. When the front portion 4314a of the push-pull tab 4310 is moved out of alignment, it interacts with the hook ramp 3622, 3722, and 3822 via the ramp 4314b. The differing slope along the ramp area 4314b helps reduce lateral movement of the middle hook tip 3822, which in turn reduces lateral movement of the outer hook tips 3821 within the widthwise recess 4316, as the middle hook tip and outer hook tips are one structure. Accordingly, in some embodiments, moving rearward the push-pull tab 3810 independently of the front body 4301 may allow the ramp area 4314b to apply a force to the hook ramp 3622, 3722, and 3822, thereby raising the hook tips 3621, 3721, and 3821. Once the hook tips 3621, 3721, and 3821 are raised, the connector can be safely removed from the adapter and/or transceiver. This is also shown in FIGS. 42D-42D.5.

FIGS. 44-46 show further detail and cross-sectional illustrations of a connector interacting with an adapter and/or transceiver. Additionally, FIGS. 47 and 48 show further detail and possible dimensions of an embodiment, see Table 2.

TABLE 2

| Reference | Dimensions (mm) | |
|---|---|---|
| | Minimum | Maximum |
| BA' [a] | 8.7 | 8.9 |
| DA | 8.28 | 8.48 |
| DB | 7.45 | 7.6 |
| DC | 5.2 | 5.4 |
| DD | 5.5 | 5.7 |
| DE | 5.5 | 5.7 |
| AG' | 13.75 | 14.05 |
| AM' | 2.08 | 2.18 |
| AN' | 2.08 | 2.18 |
| AC' 1 [b] | — | 0.5 |
| AC' 2 [b] | — | 0.5 |
| Z' [b] | 3.32 | 3.72 |
| AR' [c] | 6.88 | 7.28 |
| DF [c] | — | 0.5 |
| G' | | 3.8 |
| DG | 6.86 | 7.06 |
| J' | 5.5 | 5.7 |
| DI | 7.75 | 7.95 |
| DJ | | (0.81) |
| DK | | (3.57) |
| DL | | (1.3) |
| DM [d] | 1.45 | — |
| DN | | (6.24) |
| AA' | 1.4 | 1.6 |
| AB' | 9.33 | 9.53 |
| DO | | (2.92) |
| DP | | (3.22) |
| DQ [a] | 5.14 | 5.26 |
| T' | 3.3 | 3.4 |
| H' | 3.0 | 3.2 |
| AF' 1 | | (2.80) |
| AF' 2 | | (2.80) |
| AK' | 1.78 | 1.94 |
| DR | — | 0.5 |
| DS | 1.60 | 1.72 |

Referring to FIG. 44A, the push-pull tab 2820D ramp areas or surfaces (4410A, 4415A) engage and lift the middle hook tip 3822 (in this embodiment), to allow the hook tips 3821 to fall into the recess 4417, and the connector (2800C, FIG. 43) is retained in the adapter upon insertion of the connector into adapter port. Referring to FIG. 44B, the plastic hook tip 3822 is in the connector body recess. The dimensional design of the hook (FIGS. 40A-40B), the adapter port (FIG. 39) and the connector 2800C front portion ensure the ferrule assembly 2850 engages and mates within alignment sleeve 4430B, to be opposite a ferrule from a connector inserted at an opposing port on the second side of the adapter as shown in FIG. 63A. This establishes a communication or signal path from a first connector to a second connector as illustrated in FIG. 63B.

Referring to FIGS. 45A-C, the section views C-C and D-D illustrate the connector 2800C push-pull tab 2820D engaged with the hook 3744 at ramp areas 4410a and 4415A. As discussed in FIGS. 44A-44B, as the connector is inserted the ramp areas deform the hook tip 3722, to allow the connector to be inserted, and then the hook relaxes with its hook tips 3721 resting in the recess 4317.

Referring to FIGS. 46A-46D, section views FIG. 46B and FIG. 46E illustrate inserting the connector 2800C or connector 5000 (not shown) into the adapter port. The connector push-pull tab 2820C ramp areas 4415A is configured to engage the middle hook tip 3622 of hook 3644, lifting and deforming the hook tips 3621, and when the ramp areas pass by the hook tip 3622, the hook tips 3621 rest in the recess 4317 as shown in FIG. 46E. As described in FIGS. 44A, 44B, 45A-C and 46A-46D, connector front portion and its ramp area is independent of hook type (3644, 3744, 3844).

Referring to FIGS. 47A-C, the proximal end 4700 of the connectors (2800, 5000, 5100, 5200C, 5310A-5310D, 5400A, or 5800D) is illustrated. The dimensions Y, R, Q, etc. are found in Table 1. The ferrules are 4702a 4702b. The recess 4717 accepts the hook tips (3621, 3721 or 3821). The ramp areas (4410a, 4415a) lift and deform the hook upon insertion and remove of the connector. The opening 4720 is the ramp profile containing the ramp areas to add in connector alignment, release and unintentional misalignment as described herein.

Referring to FIGS. 48A-D, the proximal end 4800 of the connector of the present invention illustrates various dimensions found in Table 1. The ramp areas 4810a, 4815b along the pull tab profile engage and deform the hook upon insertion and removal. The recess 4817 captures the hook tip 3621, 3721 3821 after the hook is deformed and relaxes when the ramp areas are passed upon fully insertion of the proximal end of the connector into an adapter port for a push-pull tab connector (2800C, etc.). FIG. 48C is a side section view of the proximal end 4800 showing various dimensions found in Table 1. FIG. 48B is looking into the proximal end 4800 showing various dimensions found in Table 1. FIG. 48D is a side section view at the tip of the proximal end showing various dimensions found in Table 1. FIG. 48A is a lower right front end view of the proximal end 4800 showing various dimensions found in Table 1.

The use of a CS connector allows for a compact fiber implementation, as well as improved flexibility. For example, in some existing systems, as shown in FIGS. 49A.1-49A.2, a 200G transceiver module 4901 may receive an MPO connector 4902. The MPO connecter may then be split out using an additional tool, such as a fan out 4903 or a cassette 4906. Once the cable is split out, it can be connected to a 100G module device (e.g., a LC uniboot as shown) 4904. The 100G module device 4904 may then be inserted into a 100G transceiver 4905.

Alternatively, in some embodiments, and as shown in FIG. 49B, a plurality of CS connectors 4906 are inserted into a 200G transceiver module 4901. Each CS connector 4906 may then independently connect to the 100 as shown in FIG. 49A, a 200G transceiver module 4901 may receive an MPO connector 4902. The MPO connecter may then be split out using an additional tool, such as a fan out 4903 or a cassette 4906. Once the cable is split out, it can be connected to a 100G module device (e.g., a LC uniboot as shown) 4904. The 100G module device 4904 may then be inserted into a 100G transceiver module 4905.

As discussed herein, various types of connectors exist with various methods of implementation (e.g., those embodiments shown in FIGS. 28-34). Referring now to FIG. 50A, an embodiment of a CS connector is shown exploded for detail. It should be noted that this visual example is for explanatory purposes, and that various alternative examples may exist, some of which are discussed herein. In some embodiments, a CS connector may be a miniature single-position plug generally characterized by dual cylindrical, spring-loaded butting ferrule(s) of approximately 1.25 mm in diameter, and a push-pull coupling mechanism. In some embodiments, the optical alignment mechanism of the connectors is of a rigid hole or a resilient sleeve style.

Referring to FIG. 50A, in some embodiments, the CS connector 5000 may comprise a front body (i.e., plug frame) 5001, which houses the ferrule(s) and ferrules flange(s) 5002, at its proximal end 5100. A rear body (i.e., back post) 5004 may connect to the rear of the front body 5001 and contain the ferrule-flange(s) 5002. The ferrule-flange(s) 5002 may be held in place using one or more springs 5003. The rear body 5004, as shown, may connect to a behind the wall (BTW) fiber boot 5018. In some embodiments, and as shown, a dust cap 5007 may be placed over the front body 5001 in order to protect the ferrules housed in the front body from damage and/or debris.

In additional embodiments, a push-pull tab 5010 may attach to the CS connector, as discussed in more detail herein. The push-pull tab 5010 may have a side portion 5012 and a center protrusion (i.e., 5014), which serve various functions discussed further herein. The push-pull tab 5010 may utilize a tab spring 5008 to apply a constant directional force on the push-pull tab to allow for various benefits which are discussed herein. In some embodiments, and as shown, the push-pull tab 5010 has a front portion 5014 which resides in a groove 5075 within the front body 5001. Thus, when the push-pull tab 5010 traverses the connector along groove 5075, as discussed in detail herein, the front portion 5014 moves independently of the front body 5001. A further embodiment is shown in FIG. 50B wherein the CS connector is assembled completely except for the removable dust cap 5007. A recess 5017 accepts the hook tips.

As discussed herein, CS connectors can come in various embodiments. For example, some CS connectors 5100, such as that shown in FIGS. 51A.1-51A.2 may be configured to have a normal cable boot (e.g., be on the front side of a fiber optic patch panel) or at the distal end 5150 of the connector. Alternatively, some CS connectors, such as that shown in FIG. 51B.1-51B.2, may be configured to have a BTW boot (e.g., those connectors that are behind or on the back side of a fiber optic patch panel). As shown, the ferrule pitch (i.e., the distance between the center point of the ferrules may be equal in the various connector types (3.8 mm as shown). The pull tab ramp profile 5120 remains unchanged by the boot type of FIGS. 51A.1-51A.2 or FIGS. 51B.1-51B.2.

As discussed herein, a connector (e.g., CS connector) may come in various embodiments. By way of example, and referring now to FIGS. 52A and 52B, an embodiment of a CS connector 5200 is shown exploded for detail. In some embodiments, the CS connector may comprise a front body (i.e., plug frame) 5201, which houses a thin MT ferrule 5202 designed for multi-fiber uses, at its proximal end 5218. Referring to FIG. 52A, the push-pull tab 5210 may utilize a tab spring 5208 to apply a constant directional force on the push-pull tab to allow for various benefits which are discussed herein. In some embodiments, and as shown, the push-pull tab 5210 has a front portion 5214 which resides in the groove 5275 within the front body 5201. The front portion 5214 includes the ramp area 5020. Thus, when the push-pull tab 5210 traverses the connector, as discussed in detail herein, the front portion 5214 moves independently of the front body 5201 and the ramp area 5020 can engage the hook tips.

Referring to FIG. 52B. in some embodiments, an MT ferrule may have a row of ferrules and/or fiber strands (e.g., 12 fibers, 24 fibers, 48 fibers, etc.) or multiple rows of ferrules and/or fiber strands (e.g., 2 rows, 3 rows, 4 rows, etc.) for up to 72 fibers per ferrule. The ferrules and/or fibers may be located at the front of the MT ferrule 5202 (e.g., at 5202a and 5202b). A rear body (i.e., back post) 5204 may connect to the rear of the front body 5201 and contain the MT ferrule 5202. The MT ferrule 5202 may be held in place using one or more springs 5203. The rear body 5204, as shown, may include a crimp ring 5205 attached to the rear of the rear body. In some embodiments, a cable boot 5206 may surround the crimp ring 5205. In some embodiments, and as shown, a dust cap 5207 may be placed over the front body 5201 in order to protect the ferrules and/or fibers housed in the front body from damage and/or debris.

In additional embodiments, a push-pull tab 5210 may attach to the CS connector 5200, as discussed in more detail herein at FIG. 52A. The push-pull tab 5210 may have a side portion 5212 and a center protrusion (i.e., 5214), which serve various functions discussed further herein. The side portion 5212 connects the pull tab to the rear body 5204. The front portion ramp area 5214 engages the middle hook tip 3822 to deform it while the connector 5200 is being inserted into the adapter. Referring to FIG. 52C a MPO connector 5200 is inserted into single port adapter at a first side and the CS connector 2800C is inserted into the second side of the adapter. This allows the interconnection or communication of two different push/pull type connector types using the same patch cord adapter 4000.

As shown in FIG. 52D, the MT ferrule connectors can also utilize the connection methods discussed above (e.g., the push-pull tab and MPO connector interconnection). FIG. 52E shows a detailed view of the MT thin ferrule 5200E. The ferrule length, width and thickness are reduced over the prior art ferrule assemblies.

In some embodiments, and as discussed herein (see FIG. 34), CS connectors may have push-pull tabs of various size and shape, which may generally be 8 mm to 6.4 mm.'

In some embodiments, the push-pull tab may be modified to increase the grip ability of the push-pull tab in various environments. As shown in FIGS. 53A-53J, various push-pull tabs may be utilized by an embodiment (e.g., 5310A, 5310B, and 5310C). It should be understood that these are simply non-limiting illustrations for explanatory purposes, and that various other embodiments may exist including combinations of those shown.

Similar to the no mal boot connectors shown in FIGS. 53A-53J, BTW connectors may also have push-pull tabs of various size and shape. In some embodiments, the push-pull tab may be modified to increase the grip ability of the push-pull tab in various environments. As further shown in FIGS. 53A-53J, various push-pull tabs may be utilized by an embodiment (e.g., 5310D and 5310E).

In one or more further embodiments, a push-pull tab may have a modifiable design. For example, an embodiment, as shown in FIGS. 54A-54A.1, may have a hinge 5419 that connects a first portion 5410.1 of the push pull tab with a second portion 5410.2 of the push-pull tab. As shown in FIGS. 54A-54A.1, the hinged or deformable portion 5419 allows for the first portion 5410.1 to be elevated and/or angled away from the main body (e.g., the boot) to allow for easier gripping of the tab. As shown, the first portion 5410.1 and second portion 5410.2 may be arranged in various portion with respect to each other. The deformable portion may be a scored providing a point of weakness to bend the pull tab knob 5410.1 out of the way.

For example, FIGS. 54B-54B.1 shows the first portion 5410.1 and the second portion 5410.2 substantially in a parallel line as the first portion is brought down toward the boot of the CS connector. Alternatively, FIG. 54C shows an embodiment wherein the first portion 5410.1 of the push-pull tab has been lifted or moved along the deformable region 5419. This foldable tail design allows for space savings during install, while also having the ability to fold up and thus making it easier to handle. Moreover, a support structure at the folding groove allows pushing action to make installation of the connector easier in the folded position. In some additional embodiments, such as those shown in FIGS. 55A, 55B, and 55C the push-pull tab 5510 may be removably connected to the CS connector via a moveable side portion 5512.

Referring now to FIG. 56A, an embodiment of a CS connector is shown exploded for detail. It should be noted that this visual example is for explanatory purposes, and that various alternative examples may exist, some of which are discussed herein. In some embodiments, a CS connector may be a miniature single-position plug generally characterized by dual cylindrical, spring-loaded butting ferrule(s) of approximately 1.25 mm in diameter, and a push-pull coupling mechanism. In some embodiments, the optical alignment mechanism of the connectors is of a rigid hole or a resilient sleeve style.

Still referring to FIG. 56A, in some embodiments, the CS connector may comprise a front body (i.e., plug frame) 5601, which houses the ferrule(s) and ferrules flange(s) 5602. The front body 5601 may have, as shown, a flexible latching mechanism 5601.1. As discussed further herein, the flexible latching mechanism (or bend latch) 5600 may interlock with a corresponding latching mechanism in one or more adapter/transceiver port housings.

A rear body (i.e., back post) 5604 may connect to the rear of the front body 5601 and contain the ferrule-flange(s) 5602. The ferrule-flange(s) 5602 may be held in place using one or more springs 5603. The rear body 5604, as shown, may include a crimp ring 5605 attached to the rear of the rear body. The bend latch 5601 has two adapter engagement surfaces 5620 that upon full insertion of the connector 5600 into the port of the adapter or transceiver 6000, the surfaces 5620 are secured at the adapter to hook engagement surfaces or adapter cutouts 6010, as shown in FIG. 59H and FIG. 62G. In some embodiments, a cable boot 5606 may surround the crimp ring 5605. In further embodiments, and as shown, a dust cap 5607 may be placed over the front body 5601 in order to protect the ferrules housed in the front body from damage and/or debris. FIGS. 56B and 56C show example embodiments including dimensions of potential CS connectors with a flexible latching mechanism 5601.1.

Referring now to FIG. 57A, an embodiment of a CS connector is shown exploded for detail. It should be noted that this visual example is for explanatory purposes, and that various alternative examples may exist, some of which are discussed herein. In some embodiments, a CS connector may be a miniature single-position plug generally characterized by dual cylindrical, spring-loaded butting ferrule(s) of approximately 1.25 mm in diameter, and a push-pull coupling mechanism. In some embodiments, the optical alignment mechanism of the connectors is of a rigid hole or a resilient sleeve style.

In some embodiments, the CS connector may comprise a front body (i.e., plug frame), which houses the ferrule(s) and ferrules flange(s) 5702. The front body 5715 may have, as shown, a flexible latching mechanism 5701.1 and a latch engagement surface 5701.2. The flexible or bend latch has latch adapter contact surfaces 5720 that seat behind the adapter to hook engagement surfaces or adapter cutouts 6010 upon insertion of the connector 5700 into a port.

A rear body (i.e., back post) 5704 may connect to the rear of the front body 5715 and contain the ferrule-flange(s) 5702. The ferrule-flange(s) 5702 may be held in place using one or more springs 5703. The rear body 5704, as shown, may connect to a behind the wall (BTW) fiber boot 5718. The front body 5715 integrates the adapter latch 5701 into one piece. In some embodiments, and as shown, a dust cap 5707 may be placed over the front body 5715 in order to protect the ferrules housed in the front body from damage and/or debris. FIGS. 57B and 57C show example embodiments including dimensions of potential CS connectors with a flexible latching mechanism 5701.1 and a BTW fiber boot 5718. FIG. 57C shows the direction of the press on the latch to release the connector from the adapter.

Various CS style connectors have been discussed herein. In order to pair two connectors, or transfer data to a transceiver, an adapter 5800 device is needed to securely fasten one or more connectors into a proper orientation. As shown in FIG. 58A, in some embodiments, an adapter may be a simplex adapter (i.e., only capable of accepting a single connector per side). As shown, an adapter 5800 may have an adapter housing 5841. The adapter housing 5841 may comprise one or more flanges 5842 and one or more top hook support rails 5843. In some embodiments, the top hook support rails 5843 allow for insertion and securing of a CS adapter hook 5844.

In further embodiments, the adapter housing 5841 may comprise an integrated mounting plate 5845. The adapter housing 5841 may also comprise a multi-function recess 5846. The multi-function recess 5846 may be used for a variety of purposes (e.g., fitting in particular fiber arrays, etc.). In the non-limiting example shown in FIG. 58A, the multi-function recess allows for the CS adapter mounting plate 5888. In some embodiment, the adapter may have one or more alignment sleeves 5847 and one or more sleeve holders 5848. Referring now to FIG. 58B, in some embodiments, the interior base of the adapter may have a guide rail 5835 and at the top hook support rails 5843. As discussed herein, the guide rail helps align the CS connector to guarantee the most secure and proper connections. The adapter to hook engagement surfaces or adapter cutouts 6010 secure a hook in the adapter port. FIG. 58C is a further detailed angle for the adapter showing the various parts, such as the mounting plate 5888, the top hook support rails 5843, one or more flanges 5842, and the removable hook 5844 for a MPO connector 5200. FIGS. 58D-58D.1 show the outer dimensions of the CS connector front portion of the CS connector 5800C of the present invention.

Referring now to FIGS. 59A.1-A.2, an adapter may comprise one or more flanges 5942. The flanges are typically utilized when securing an adapter to a fiber connector array. However, FIGS. 59B.1-59B.2 illustrate an alternative design for an adapter, wherein the one or more flanges are no longer present. FIG. 59C illustrates the versatility of the adapter. Specifically, various hook designs are capable of being incorporated into the adapter housing at FIG. 59C.1. A hook selected from a hook 3644, 3744 or 3844 (as none limiting choices) is inserted into the port as shown in FIG. 59C.2 or FIG. 59C.3. The hook 3844 is retained by the top hook support rail 5843, and the guides rails 5935, 5940 align and mate the connector front portion within the port, as shown in FIG. 59C.4 or FIG. 59C.5, upon insertion of the connector into the adapter.

FIGS. 59D.1-59D.2 and FIGS. 59E-59E.2 show hook type 3844 of FIGS. 38A-C interacting with the recess 2817 of FIG. 28D and the adapter port structure 6241 and how they interact with a connector (e.g., such as that discussed herein.) FIGS. 59F.1-59F.5 shows the steps to insert the hook 3844 into the port of the adapter base 6000. Starting with the upper left hand corner figure, the adapter base 6000 has no hook inserted into the adapter port. Continuing clockwise following the arrow, the hooks 3844 are shown before insertion. The next figure shows the adapter with the hooks included, then continuing clockwise, the connector 5900D is shown just prior to insertion. The last figure shows the connector 5900D fully inserted into the port of the adapter base 6000.

FIGS. 59G.1-59G.3 show the latch type connectors similar to FIGS. 57A-C before and after insertion into an adapter base. The bend latch connector does not require an adapter hook as the front body 5715 is adapted to engage the adapter rails 3635 of FIG. 36A and the adapter hook support 3660. FIGS. 59G.1-59G.3 show the bend latch connector of FIGS. 57A-C and the push/pull connector of FIGS. 51A.1-A.2 and 52A-B being inserted into an adapter on either side, where the latter adapter port uses the hook to secure the push/pull connector into the adapter. FIG. 59H shows the bend latch connector 5600 prior to insertion. The connector latch contact points 5915H engage and seat at the adapter to hook engagement surfaces or adapter cutouts 6010 upon insertion. Pushing in the connector 5600, the latch is depressed along the latch engagement surface 5601.2 by the port inner structure and clicks into place.

Removal of the bend latch connector 5600 from the adapter or transceiver port is shown in FIGS. 62G-62I. FIG. 62G shows the connector 5600 fully inserted and seated in the adapter 6000 opening or port. Referring to FIG. 59H, once the connector 5600 is inserted, the connector latch points 5915H engage with the adapter to hook engagement surfaces or adapter cutouts 6010, and the connector is secured in the adapter. The connector 5600 is inserted through the adapter port 6020.

To remove the bend latch connector, the user presses the latch feature down (FIG. 62H), the connector latch point 5915H moves down below 6240H the adapter to hook engagement surfaces or adapter cutouts 6010, and the user can then pull the latch rearward in the direction of the arrow (FIG. 62I) and pull out 62301 the connector 5600.

As stated, in order to pair two connectors, or transfer data to a transceiver, an adapter device is needed to securely fasten one or more connectors into a proper orientation. As shown in FIG. 60A, in some embodiments, an adapter may be a duplex adapter (i.e., capable of accepting a two connecters per side). As shown, an adapter may have an adapter housing 6041. The adapter housing 6041 may comprise one or more flanges 6042 and one or more cut out windows 6041. In some embodiments, the window cutouts 6041 allow for insertion and securing of a CS adapter hook 6044. The adapter to hook engagement surfaces or adapter cutouts 6010 secures the connector latch point 5915H or the hook 3844 within the port 6020 of the adapter 6000.

In further embodiments, the adapter housing 6041 may comprise an integrated mounting plate 6045. The adapter housing 6041 may also comprise a multi-function recess 6046. The multi-function recess 6046 may be used for a variety of purposes (e.g., fitting in particular fiber arrays, etc.). In the non-limiting example shown in FIG. 60A, the multi-function recess allows for the CS adapter mounting plate 6044. In some embodiment, the adapter may have one or more sleeves 6047 (as shown in FIG. 60D.1) and one or more sleeve holders 6048. Referring now to FIG. 60B, in some embodiments, the interior base of the adapter may have a guide rail 6035, and a top hook support rail 6043. As discussed herein, the rail structures that help align and orient the CS connector to guarantee the most secure and proper connections between opposing connector optical ferrules.

FIGS. 60C-60H show various additional angles and views of a duplex adapter 6000. FIGS. 60D and 60D.1 illustrate an example embodiment where the sleeves 6048 fit into the housing before installing the hook(s) 6044. FIG. 60E illustrates an example embodiment showing a partial cross section of FIGS. 60C and 60D showing partial insertion of a sleeve holder and alignment sleeves into a low profile, compact adapter housing. Referring to FIGS. 60D, 60D.1, 60E and 60F-60F.1, the adapter top hook support rail 6043 secures the hook 3844 in the top portion of the port as shown in FIG. 35A AD1, AD2 and FIG. 39. The guide rails 6035 orient and help align the front portion 2801 of the connector 2800C or 5600 upon insertion into the adapter port 6020. The adapter recess 6052 accepts a corresponding protrusion (not shown) on the outer surface of a connector front body 2801. The above structure is similarly used in a transceiver port.

Referring to FIG. 60E, this figure illustrates a sleeve holder 6048 that can accept one or more sleeves 6047 partially inserted into an adapter port. A sleeve holder with one sleeve of the present invention can be used in a single port adapter, such as FIG. 58C, without departing from the scope of the invention. A sleeve holder is formed of one piece with a back flange having opposing wings 6053 at a top portion and a pair tabs 6050 (e.g. FIG. 60F) at a bottom portion. The wings can be along any side. The tabs likewise can be along any side. Other structural features such as pins can be used without departing from the scope of the invention to secure the sleeve holder in the port. The sleeve holder is press fitted into the adapter port, and the wings 6053 snap into a respective cutout 6049, as shown by the dotted line 6051. Referring to FIG. 60F.1, the section view shows the wings 6053 snapped into the cutout 6049, and the tabs 6055 final position. The hidden line 6054 further shows the wing 6053 snapped into the adapter cutout 6049. FIG. 60G.1 section view shows the tabs 6055 secured at bottom portion of the port. FIG. 60G is a side perspective view of an adapter 6000. FIGS. 60H-60H.1 illustrate a side view with a cutaway showing the sleeve holder 6048 latched within an adapter 6000. In FIG. 60H instead of a tab located at the bottom of the sleeve holder flange, a wing 6050 is used. FIG. 60H.1 is a zoomed view of FIG. 60H.

Referring now to FIGS. 61A.1-61A.2, an adapter 6000 may comprise one or more flanges 6142. The flanges 6142 are typically utilized when securing an adapter to a fiber connector array. However, FIGS. 61B.1-61B.2 illustrate an alternative design for an adapter, wherein the one or more flanges are no longer present. Referring to FIGS. 61C-61C.1, the front and top side view of a duplex adapter 6000 with inserted hooks 6144 and sleeve holders 6120C. Specifically, this embodiment shows the location of the guide rails 6135 as well as the sleeve holders 6120C and adapter hooks 6144.

As discussed herein, in some embodiments, a CS connector may have a flexible latching mechanism. Referring now to FIGS. 62A-62F, an illustrated example of a flexible latching mechanism interlocking with an adapter is shown. In FIG. 62A, the connector 6200 is shown just prior to entry into the adapter 6041, which has guide rail 6249. FIGS. 62B-62D show the insertion process wherein the connector 6200 is compressed (see FIG. 62D) as the flexible latching mechanism is pressed down as the connector enters the adapter 6241. FIGS. 62E and 62F show the connector 6200 fully inserted into adapter 6241.

FIGS. 63A, 63B, and 63C illustrate an example embodiment where a simplex adapter 6341 is being utilized with two CS connectors 5600 using the flexible latching or bend latch mechanism means of interlocking. The plug frame 6301 of connector 5600 engages the bottom guide rails 6235 within the port to further secure the connector in the adapter. FIGS. 63A-63C.5 illustrate removing the bend latch connector 5600 from the port of the adapter 6000 by depressing the latch 6301.1 in the direction of the arrow. Upon pulling out the connector 5600 in the direction of the arrow 6312C, the connector latch points 5620 slide beneath the adapter latch points 6310C, releasing the connector 5600 as shown in FIGS. 63C.4-63C.5.

FIGS. 64A and 64B illustrate an example embodiment where a duplex adapter 6441 is being utilized with four CS connectors 6400 using a flexible latching mechanism means of interlocking. FIGS. 65A and 65B illustrate an example embodiment where a simplex adapter 6541 is being utilized with two CS connectors 6501.1 and 6501.2 using the flexible latching mechanism or bend latch 5600 means of interlocking. The first side of the adapter has the bend latch behind the wall connector 5700 inserted therein, and the second side has the bend latch connector 5600 with the ruggedized boot. However, unlike FIGS. 63A and 63B, one of the CS connectors 6501.2 is constructed of a BTW fiber boot. Thus, as discussed herein, this implementation could be used in a fiber optic patch panel wherein one side of the adapter is behind the wall, and the other is front facing. Referring to FIGS. 63C.1-63C.5 an embodiment is shown wherein a connector has a flexible latching mechanism 6301.1, and wherein that flexible latch mechanism is depressed causing the latch mechanism to lose contact between the latching surfaces of the adapter. The connector is then free to slide backward under the adapter latching 6310C feature as shown in the progression of the illustrations.

As discussed herein, specifically FIGS. 35-40F.1, adapters and/or transceivers can be modified using a removable anchor device (e.g., 5844, 6044, etc.). Accordingly, in some embodiments an adapter may be utilized the anchor device on one side, but not the other. Referring now to FIGS. 66A and 66B, embodiments are shown wherein one side of the adapter includes the removable anchor device 6644, while the other side of the adapter does not. Thus, as shown in FIGS. 66A and 66B, an adapter may be used with different types of CS connectors (e.g., those with flexible latching mechanisms (e.g., FIG. 56C), and those with push-pull tab release (e.g., FIG. 28B). FIGS. 67A, 67B, 68A, and 68B illustrate further example embodiments wherein an adapter (e.g., simplex or duplex) is utilized, and, similar to FIGS. 66A and 66B, the CS connectors on each side are of a different type. In FIG. 67A one side of the adapter 6741 has hooks 6744 inserted into the port and the opposite or second side has no hooks. The push/pull tab connector 2800C is inserted into the first side 6701.1, and the bend latch connector 5600 is inserted into the second side 6701.2 of the adapter 6741. Referring to FIG. 68B, the same quad adapter with hooks 6844 on the first side, and no hooks on the second side, have the push/pull tab connector 6801.1 inserted into the first side, and the bend latch behind the wall connector 6801.2 inserted in the second side to form a communication path between the connector types.

Referring now to FIGS. 69A.1-B, a removal tool is shown, which may allow for removal of the removable anchor devices. FIGS. 69A.1-69A.2 show a side, front, and sectional view of the tool, which may be made out of a metal, metal alloy, polymer, or any substance of sufficient structural strength to perform the task of removing the anchor device. AS shown in FIG. 69B, the tool is designed to interlock with the removable anchor via a protrusion 6941 and a hook 6942 which both interlock with corresponding members in the anchor device (e.g., a window and ledge). Additional illustrative examples of the tool being used to remove the anchor device are shown in FIGS. 70A-F.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

What is claimed is:

1. An adapter comprising:
a body having a first end, a second end opposite the first end, and a wall extending longitudinally from the first end to the second end, the body having one or more first ports opening through the first end and having a first top and a first bottom, the first top comprising a first cutout and the first bottom comprising at least one guide rail;

the one or more first ports being configured so that a first connector is passable through the first end of the body into the first port; and the one or more first ports being further configured so that a removable anchor device and a second connector are passable through the first end of the body into the first port;

the body having one or more second ports opening through the second end and having a second top and a second bottom, the second top comprising a cutout and the second bottom comprising at least one guide rail;

the one or more second ports being configured so that a first connector is passable through the second end of the body into the second port; and the one or more second ports being further configured so that a removable anchor device and a second connector are passable through the second end of the body into the second port.

2. The adapter of claim 1, wherein the removable anchor device comprises a first portion including an outwardly projecting hook engagement member having an adapter engagement surface for securing the removable anchor device within the port of the adapter.

3. The adapter of claim 2, wherein the removable anchor device comprises a second portion formed integrally with the first portion and having at least one outer hook tip and at least one interior hook tip for locking and releasing the connector from the port having the anchor device.

4. The adapter of claim 3, wherein the interior hook tip has a different shape than the at least one outer hook tip.

5. The adapter of claim 1, wherein the first connector is a LC push/pull tab connector and the second connector is flexible or bend latch connector.

6. The adapter of claim 1, wherein the first connector is flexible or bend latch connector further comprising a behind the wall boot and the second connector is a MPO push/pull tab connector.

7. The adapter of claim 5, wherein the first connector is inserted into the second end and the second connector is inserted into the first end.

8. A transceiver-adapter comprising:
a body having a first end, a second end opposite the first end, and a wall extending longitudinally from the first end to the second end, the body having one or more first ports opening through the first end and having a first top and a first bottom, the first top comprising a first cutout and the first bottom comprising at least one guide rail;

the one or more first ports being configured so that a first connector is passable through the first end of the body into the first port; and the one or more first ports being further configured so that a removable anchor device and a second connector are passable through the first end of the body into the first port;

the second end of the body being configured to accept a transceiver.

9. A transceiver-adapter of claim 8, wherein the body has one or more second portions opening through the second end comprising one or more second ports opening through the second end and having a second top and a second bottom, the second top comprising a second cutout and the second bottom comprising at least one guide rail;

the one or more second ports being configured so that a first connector is passable through the second end of the body into the second port; and the one or more second ports being further configured so that a removable anchor device and a second connector are passable through the second end of the body into the second port; and the first end of the body being configured to accept the transceiver.

10. The transceiver-adapter of claim 9, wherein the second connector is a LC push/pull tab connector.

11. The transceiver-adapter of claim 9, wherein the first connector is flexible or bend latch connector.

12. The transceiver-adapter of claim 11, wherein the first connector further comprises a behind the wall boot and the second connector is an MPO push/pull tab connector.

13. An adapter comprising:
a body having a first end, a second end opposite the first end, and a wall extending longitudinally from the first end to the second end, the body having one or more first ports opening through the first end and having a first top and a first bottom, the first top comprising a first cutout and the first bottom comprising at least one center guide rail;

the one or more first ports being configured so that a first connector is passable through the first end of the body into the first port; and the one or more first ports being further configured so that a removable anchor device and a second connector are passable through the first end of the body into the first port;

the body having one or more second ports opening through the second end and having a second top and a second bottom, the second top comprising a cutout and the second bottom comprising at least one guide rail;

the one or more second ports being configured so that a first connector is passable through the second end of the body into the second port; and the one or more second ports being further configured so that a removable anchor device and a second connector are passable through the second end of the body into the second port.

14. The adapter of claim 13, wherein the removable anchor device comprises a first portion including an outwardly projecting hook engagement member having an adapter engagement surface for securing the removable anchor device within the port of the adapter.

15. The adapter of claim 14, wherein the removable anchor device comprises a second portion formed integrally with the first portion and having at least one outer hook tip and at least one interior hook tip for locking and releasing the connector from the port having the anchor device.

16. The adapter of claim 15, wherein the interior hook tip has a different shape than the at least one outer hook tip.

17. The adapter of claim 13, wherein the first connector is a LC push/pull tab connector and the second connector is flexible or bend latch connector.

18. The adapter of claim 13, wherein the first connector is flexible or bend latch connector further comprising a behind the wall boot and the second connector is a MPO push/pull tab connector.

19. The adapter of claim 17, wherein the first connector is inserted into the second end and the second connector is inserted into the first end.

* * * * *